(12) United States Patent
Karamanos et al.

(10) Patent No.: US 11,815,923 B2
(45) Date of Patent: Nov. 14, 2023

(54) FLUID FLOW DEVICE WITH DISCRETE POINT CALIBRATION FLOW RATE-BASED REMOTE CALIBRATION SYSTEM AND METHOD

(71) Applicant: Best Technologies, Inc., Reno, NV (US)

(72) Inventors: John C. Karamanos, San Jose, CA (US); Herbert Willke, New York, NY (US)

(73) Assignee: Best Technologies, Inc., Reno, NV (US)

( * ) Notice: Subject to any disclaimer, the term of this patent is extended or adjusted under 35 U.S.C. 154(b) by 0 days.

(21) Appl. No.: 17/814,327

(22) Filed: Jul. 22, 2022

(65) Prior Publication Data

US 2023/0023417 A1 Jan. 26, 2023

Related U.S. Application Data

(60) Continuation-in-part of application No. 17/522,481, filed on Nov. 9, 2021, now Pat. No. 11,429,121,
(Continued)

(51) Int. Cl.
*G05D 7/06* (2006.01)
*G01F 1/42* (2006.01)
(Continued)

(52) U.S. Cl.
CPC ............ *G05D 7/0647* (2013.01); *F24F 11/30* (2018.01); *F24F 11/62* (2018.01); *F24F 11/75* (2018.01);
(Continued)

(58) Field of Classification Search
CPC .. G05D 7/0647; G05D 7/0635; G05D 7/0676; F24F 11/62; F24F 11/30;
(Continued)

(56) References Cited

U.S. PATENT DOCUMENTS 2,462,182 A 2/1949 Guerdan et al.
3,203,196 A 8/1965 Malkoff
(Continued)

FOREIGN PATENT DOCUMENTS

CN 2529912 Y 1/2003
CN 1918575 A 2/2007
(Continued)

OTHER PUBLICATIONS

International Search Report and Written Opinion received for PCT Application Serial No. PCT/US2014/046554 dated Jan. 21, 2015, 10 pages.
(Continued)

*Primary Examiner* — Jessica Cahill
(74) *Attorney, Agent, or Firm* — Amin, Turocy & Watson, LLP

(57) ABSTRACT

A method/structure for calibrating a product fluid flow device having one or more apertures with aggregate area $A_o$, where fluid flows along a fluid flow path therethrough in response to pressure differentials $\Delta P$ across the apertures. Calibration is effected relative to a calibration fluid flow device having a geometry and operational parameters corresponding to those of the product fluid flow device. A piecewise curved calibration controller establishes calibration conditions and generates a discrete point calibration flow rate (dpCFR) Function by measuring at a sparse set of points in a range of interest and determining a piecewise curved mathematical representation of fluid flow through the calibration fluid flow device. Data representative of the CFR function is transferred to a product blade controller, which processes the mathematical representation, and controls fluid flow through product fluid flow device based on values extracted from the received dpCFR Function.

44 Claims, 61 Drawing Sheets

Related U.S. Application Data which is a continuation-in-part of application No. 17/176,537, filed on Feb. 16, 2021, now Pat. No. 11,231,196, which is a continuation of application No. 16/819,343, filed on Mar. 16, 2020, now Pat. No. 10,955,159, which is a continuation of application No. 16/017,335, filed on Jun. 25, 2018, now Pat. No. 10,591,175, which is a division of application No. 15/338,166, filed on Oct. 28, 2016, now Pat. No. 10,030,882, which is a continuation-in-part of application No. 15/225,482, filed on Aug. 1, 2016, now Pat. No. 10,088,821, which is a continuation-in-part of application No. 15/146,477, filed on May 4, 2016, now Pat. No. 10,124,983, which is a continuation-in-part of application No. 14/330,941, filed on Jul. 14, 2014, now Pat. No. 10,444,771.

(60) Provisional application No. 61/872,576, filed on Aug. 30, 2013, provisional application No. 61/845,665, filed on Jul. 12, 2013.

(51) Int. Cl.
| | |
|---|---|
| *G01F 15/00* | (2006.01) |
| *F24F 11/62* | (2018.01) |
| *F24F 11/30* | (2018.01) |
| *F24F 11/79* | (2018.01) |
| *G05B 17/02* | (2006.01) |
| *F24F 11/75* | (2018.01) |
| *F24F 110/30* | (2018.01) |
| *F24F 140/40* | (2018.01) |
| *F24F 11/63* | (2018.01) |
| *F24F 11/64* | (2018.01) |
| *F24F 110/40* | (2018.01) |
| *F24F 11/56* | (2018.01) |

(52) U.S. Cl.
CPC ............... *F24F 11/79* (2018.01); *G01F 1/42* (2013.01); *G01F 15/003* (2013.01); *G05B 17/02* (2013.01); *G05D 7/0635* (2013.01); *G05D 7/0676* (2013.01); *F24F 11/56* (2018.01); *F24F 11/63* (2018.01); *F24F 11/64* (2018.01); *F24F 2110/30* (2018.01); *F24F 2110/40* (2018.01); *F24F 2140/40* (2018.01); *G05B 2219/2614* (2013.01); *G05B 2219/36249* (2013.01); *G05B 2219/40573* (2013.01)

(58) Field of Classification Search
CPC ........ F24F 11/75; F24F 11/79; F24F 2140/40; F24F 11/63; F24F 11/64; F24F 2110/30; F24F 2110/40; F24F 11/56; G01F 1/42; G01F 15/003; G05B 17/02; G05B 2219/2614; G05B 2219/36249; G05B 2219/40573
See application file for complete search history.

(56) References Cited

U.S. PATENT DOCUMENTS

| | | | |
|---|---|---|---|
| 3,342,211 | A | 9/1967 | Johnson |
| 3,495,521 | A | 2/1970 | Foster |
| 3,698,429 | A | 10/1972 | Lowe et al. |
| 3,805,612 | A | 4/1974 | Shiba |
| 3,888,090 | A | 6/1975 | Meyer |
| 3,934,851 | A | 1/1976 | Illing |
| 4,223,832 | A | 9/1980 | Gorchev et al. |
| 4,241,647 | A | 12/1980 | Herr |
| 4,732,318 | A | 3/1988 | Osheroff |
| 4,754,919 | A | 7/1988 | Otsuka et al. |
| 4,796,651 | A | 1/1989 | Ginn et al. |
| 4,836,096 | A | 6/1989 | Avery |
| 4,995,307 | A | 2/1991 | Floyd |
| 5,205,783 | A | 4/1993 | Dieckert et al. |
| 5,307,288 | A | 4/1994 | Haines |
| 5,318,104 | A | 6/1994 | Shah et al. |
| 5,341,988 | A | 8/1994 | Rein et al. |
| 5,365,795 | A | 11/1994 | Brower, Jr. |
| 5,458,148 | A | 10/1995 | Zelczer et al. |
| 5,461,932 | A | 10/1995 | Hall et al. |
| 5,469,749 | A | 11/1995 | Shimada et al. |
| 5,486,140 | A | 1/1996 | Abbott et al. |
| 5,535,814 | A | 7/1996 | Hartman |
| 5,562,537 | A | 10/1996 | Zver et al. |
| 5,579,993 | A | 12/1996 | Ahmed et al. |
| 5,705,734 | A | 1/1998 | Ahmed |
| 5,730,652 | A | 3/1998 | Van Becelaere |
| 5,860,592 | A | 1/1999 | Dozier et al. |
| 5,863,246 | A | 1/1999 | Bujak, Jr. |
| 5,901,565 | A | 5/1999 | Morton, Jr. |
| 6,176,435 | B1 | 1/2001 | Nielsen |
| 6,196,469 | B1 | 3/2001 | Pearson |
| 6,209,792 | B1 | 4/2001 | Boorer |
| 6,234,208 | B1 | 5/2001 | Magdelyns et al. |
| 6,415,617 | B1 | 7/2002 | Seem |
| 6,481,463 | B1 | 11/2002 | Harms |
| 6,527,194 | B1 | 3/2003 | Burke |
| 6,564,819 | B2 | 5/2003 | Zelczer |
| 6,574,884 | B1 | 6/2003 | Jokinen |
| 6,725,731 | B2 | 4/2004 | Wiklund et al. |
| 6,817,378 | B2 | 11/2004 | Zelczer |
| 6,832,951 | B2 | 12/2004 | Orendorff |
| 6,991,177 | B2 | 1/2006 | George |
| 7,177,776 | B2 | 2/2007 | Whitehead |
| 7,255,012 | B2 | 8/2007 | Hedtke |
| 7,543,759 | B2 | 6/2009 | George |
| 7,815,327 | B2 | 10/2010 | Shamshoian |
| 7,891,573 | B2 * | 2/2011 | Finkam .............. F24F 11/30 |
| | | | 236/1 C |
| 8,038,075 | B1 | 10/2011 | Walsh |
| 8,224,489 | B2 | 7/2012 | Federspiel |
| 8,483,883 | B1 | 7/2013 | Watson |
| 8,561,738 | B2 | 10/2013 | Charnesky et al. |
| 8,669,730 | B2 | 3/2014 | Nakajima et al. |
| 8,881,766 | B2 | 11/2014 | Ranade et al. |
| 9,500,382 | B2 | 11/2016 | Grabinger et al. |
| 10,108,154 | B2 | 10/2018 | Varadi et al. |
| 10,161,774 | B2 * | 12/2018 | Nortman .............. G01F 1/698 |
| 10,175,669 | B2 | 1/2019 | Karamanos et al. |
| 10,317,261 | B2 | 6/2019 | Noboa et al. |
| 10,444,712 | B2 | 10/2019 | Nagarathinam et al. |
| 10,641,515 | B2 | 5/2020 | Puranen et al. |
| 2001/0027814 | A1 | 10/2001 | Stone et al. |
| 2002/0020446 | A1 * | 2/2002 | Federspiel ........... F24F 11/74 |
| | | | 137/12 |
| 2002/0069922 | A1 | 6/2002 | Johnson et al. |
| 2002/0179159 | A1 | 12/2002 | Zelczer |
| 2003/0042012 | A1 | 3/2003 | Pearson |
| 2003/0047703 | A1 | 3/2003 | Patterson |
| 2003/0096572 | A1 | 5/2003 | Gutta et al. |
| 2003/0171092 | A1 | 9/2003 | Karamanos et al. |
| 2004/0249597 | A1 | 12/2004 | Whitehead |
| 2005/0016196 | A1 | 1/2005 | Kadle et al. |
| 2005/0173547 | A1 | 8/2005 | George |
| 2005/0173548 | A1 | 8/2005 | Kramer |
| 2005/0182524 | A1 | 8/2005 | Brodeur et al. |
| 2005/0242317 | A1 | 11/2005 | Malki et al. |
| 2006/0035580 | A1 | 2/2006 | Anderson et al. |
| 2006/0099904 | A1 | 5/2006 | Belt et al. |
| 2006/0112773 | A1 | 6/2006 | Hedtke |
| 2006/0260698 | A1 | 11/2006 | Bailey et al. |
| 2007/0044787 | A1 | 3/2007 | Brice |
| 2007/0087681 | A1 | 4/2007 | Cook et al. |
| 2007/0218827 | A1 | 9/2007 | Baik |
| 2007/0218828 | A1 | 9/2007 | Baik |
| 2007/0218830 | A1 | 9/2007 | Baik |
| 2007/0262162 | A1 | 11/2007 | Karamanos |
| 2008/0004754 | A1 * | 1/2008 | Pouchak .............. F24F 3/0442 |
| | | | 700/276 |
| 2008/0121729 | A1 | 5/2008 | Gray |

(56) References Cited

U.S. PATENT DOCUMENTS

| | | | |
|---|---|---|---|
| 2008/0277486 | A1 | 11/2008 | Seem et al. |
| 2009/0171512 | A1 | 7/2009 | Duncan |
| 2009/0264063 | A1 | 10/2009 | Tinsley et al. |
| 2010/0163633 | A1 | 7/2010 | Barrett et al. |
| 2011/0002477 | A1 | 1/2011 | Zickmantel |
| 2011/0031322 | A1 | 2/2011 | Zou et al. |
| 2011/0155354 | A1 | 6/2011 | Karamanos et al. |
| 2011/0198404 | A1 | 8/2011 | Dropmann |
| 2011/0253359 | A1 | 10/2011 | Stockton |
| 2012/0042955 | A1 | 2/2012 | Gierszewski |
| 2012/0052791 | A1 | 3/2012 | Kurelowech |
| 2012/0064818 | A1 | 3/2012 | Kurelowech |
| 2012/0131900 | A1 | 5/2012 | Kenyon et al. |
| 2012/0174990 | A1 | 7/2012 | Yasuda |
| 2012/0180572 | A1 | 7/2012 | Lawrence |
| 2012/0286715 | A1 | 11/2012 | Nakajima et al. |
| 2012/0322358 | A1 | 12/2012 | Wendorski et al. |
| 2013/0068313 | A1 | 3/2013 | George et al. |
| 2013/0233411 | A1 | 9/2013 | Donohue |
| 2013/0236183 | A1 | 9/2013 | Chao et al. |
| 2013/0252537 | A1 | 9/2013 | Wiley et al. |
| 2014/0260368 | A1 | 9/2014 | Wintemute et al. |
| 2014/0371918 | A1 | 12/2014 | Douglas et al. |
| 2015/0018979 | A1 | 1/2015 | Tomii et al. |
| 2015/0019022 | A1 | 1/2015 | Karamanos et al. |
| 2016/0116177 | A1 | 4/2016 | Sikora et al. |
| 2016/0218807 | A1 | 7/2016 | Tran |
| 2016/0223221 | A1 | 8/2016 | Harris |
| 2016/0370029 | A1 | 12/2016 | Kurelowech |
| 2017/0016642 | A1* | 1/2017 | Spalink ................... F24F 11/46 |
| 2017/0016646 | A1 | 1/2017 | Lee |
| 2017/0097171 | A1 | 4/2017 | Cermak et al. |
| 2017/0167740 | A1 | 6/2017 | Yi et al. |
| 2017/0176032 | A1 | 6/2017 | Wang et al. |
| 2017/0198910 | A1 | 7/2017 | Garg |
| 2019/0128550 | A1 | 5/2019 | Campos |

FOREIGN PATENT DOCUMENTS

| | | |
|---|---|---|
| CN | 101061338 B | 5/2012 |
| FR | 2 956 182 A1 | 8/2011 |
| JP | 5556200 B2 | 7/2014 |
| KR | 10-2013-0112235 A | 10/2013 |
| WO | 99/34173 A1 | 7/1999 |
| WO | 2009/121145 A1 | 10/2009 |

OTHER PUBLICATIONS

Non-Final Office Action received for U.S. Appl. No. 14/330,941 dated Apr. 10, 2017, 35 pages.
Partial Supplementary European Search Report received for EP Patent Application Serial No. 14823799.3 dated May 3, 2017, 10 pages.
Non-Final Office Action received for U.S. Appl. No. 15/146,447 dated Sep. 21, 2017, 31 pages.
Final Office Action received for U.S. Appl. No. 14/330,941 dated Aug. 4, 2017, 25 pages.
Extended European Search Report received for EP Patent Application Serial No. 14823799 3 dated Aug. 16, 2017, 11 pages.
Communication Pursuant to Rules 70(2) and 70a(2) EPC received for EP Patent Application Serial No. 14823799.3 dated Sep. 1, 2017, 1 page.
Non-Final Office Action received for U.S. Appl. No. 15/225,482 dated Nov. 20, 2017, 27 pages.
Restriction Requirement received for U.S. Appl. No. 15/338,166 dated Dec. 29, 2017, 8 pages.
Non-Final Office Action received for U.S. Appl. No. 14/330,941 dated Feb. 14, 2018, 81 pages.
Final Office Action received for U.S. Appl. No. 15/146,447 dated Feb. 14, 2018, 32 pages.
Notice of Allowance received for U.S. Appl. No. 15/338,166 dated Mar. 28, 2018, 36 pages.
Notice of Allowance received for U.S. Appl. No. 15/146,447 dated Aug. 23, 2018, 20 pages.
First Office Action received for Chinese Patent Application Serial No. 201480050374.2 dated Jun. 1, 2018, 16 pages.
Second Office Action received for Chinese Patent Application Serial No. 201480050374.2 dated Jan. 30, 2019, 8 pages.
Non-Final Office Action received for U.S. Appl. No. 16/197,723 dated Jun. 6, 2019, 29 pages.
Non-Final Office Action received for U.S. Appl. No. 16/017,335 dated Jul. 25, 2019, 48 pages.
Non-Final Office Action received for U.S. Appl. No. 16/243,616 dated Jun. 14, 2019, 104 pages.
Final Office Action received for U.S. Appl. No. 16/197,723 dated Sep. 9, 2019, 16 pages.
Final Office Action received for U.S. Appl. No. 16/243,616 dated Nov. 4, 2019, 117 pages.
Calvert J.B., "Theory of Discharge from an Orifice", URL: https://mysite.du.edu/-jcalvert/tech/fluids/orifice.htm, Coefficient of Discharge, Jun. 15, 2003, 3 pages.
Non-Final Office Action received for U.S. Appl. No. 16/378,024 dated Nov. 7, 2019, 170 pages.
Non-Final Office Action received for U.S. Appl. No. 16/290,162 dated Nov. 27, 2019, 185 pages.
Webster, M., "Vena Contracta", URL: https://www.merriam-webster.com/dictionary/vena%20contracta, retrieved on Oct. 22, 2019, 2 pages.
Johansen, F.C., "Flow through Pipe Orifices at Low Reynolds Numbers", Royal Society, vol. 126, Issue 801, Jan. 1, 1930, pp. 1-15.
Yakhot et al., "Simulating Pulsatile Flows Through a Pipe Orifice by an Immersed-Boundary Method", Journal of Fluids Engineering, vol. 126, No. 6, Nov. 2004, 9 pages.
Accutrol, "AccuValve: Operational Video; Delivering State-of-the-art Critical Air Flow Control for Laboratories, Life Science and Healthcare", URL: https://www.accutrolllc.com/accuvalve-air-flow-control-valve-videos.php?userid=, 1 page.
Non-Final Office Action received for U.S. Appl. No. 16/277,201 dated Mar. 2, 2020, 105 pages.
Final Office Action received for U.S. Appl. No. 16/378,024 dated Feb. 20, 2020, 73 pages.
Examination Report received for U.S. Patent Application Serial No. 201617001141 dated Feb. 14, 2020, 6 pages.
Non-Final Office Action received for U.S. Appl. No. 16/819,343 dated Jul. 31, 2020, 49 pages.
Office Action received for Canadian Patent Application Serial No. 2,919,507 dated Aug. 18, 2020, 3 pages.
Communication Pursuant to Rules 94(3) received for EP Patent Application Serial No. 14823799.3 dated Oct. 26, 2020, 4 pages.
Non-Final Office Action received for U.S. Appl. No. 16/840,757 dated Jun. 1, 2021, 52 pages.
Ex Parte Quayle Action received for U.S. Appl. No. 17/176,537 dated Jun. 29, 2021, 25 pages.
Office Action received for Canadian Patent Application Serial No. 2,919,507 dated Jun. 22, 2021, 3 pages.
Communication pursuant to Article 94(3) EPC received for EP Patent Application Serial No. 14823799.3 dated May 12, 2021, 4 pages.
Non-Final Office Action received for U.S. Appl. No. 17/522,481 dated Mar. 1, 2022, 42 pages.
Notice of Allowance received for Canadian Patent Application Serial No. 2,919,507 dated Aug. 18, 2022, 1 page.
U.S. Appl. No. 17/522,481 U.S. Appl. No. 16/017,335, filed Nov. 9, 2021, filed Jun. 25, 2018.
U.S. Appl. No. 17/176,537, filed Feb. 16, 2021.
U.S. Appl. No. 16/819,343, filed Mar. 16, 2020.
Non-Final Office Action received for U.S. Appl. No. 17/550,523 dated Nov. 7, 2022, 50 pages.
Non-Final Office Action received for U.S. Appl. No. 17/726,866 dated Dec. 1, 2022, 59 pages.
Extended European Search Report received for EP Patent Application Serial No. 22162037.0 dated Oct. 14, 2012, 7 pages.
Final Office Action received for U.S. Appl. No. 17/550,523 dated Jan. 27, 2023, 44 pages.

(56) References Cited

OTHER PUBLICATIONS

Notice of Allowance received for U.S. Appl. No. 17/550,523 dated Mar. 21, 2023, 55 pages.
Non-Final Office Action received for U.S. Appl. No. 17/726,835 dated Dec. 19, 2022, 48 pages.
Notice of Allowance received for U.S. Appl. No. 17/726,866 dated Feb. 8, 2023, 60 pages.
Notice of Allowance received for U.S. Appl. No. 17/726,835 dated Feb. 14, 2023, 32 pages.
Non-Final Office Action received for U.S. Appl. No. 18/181,813 dated Jul. 26, 2023, 66 pages.
Communication pursuant to Article 94(3) EPC received for European Patent Application Serial No. 22162037.0 dated Aug. 3, 2023, 4 pages.
Office action received for Indian Patent Application Serial No. 201617001141 dated Jun. 28, 2023, 2 pages.

* cited by examiner

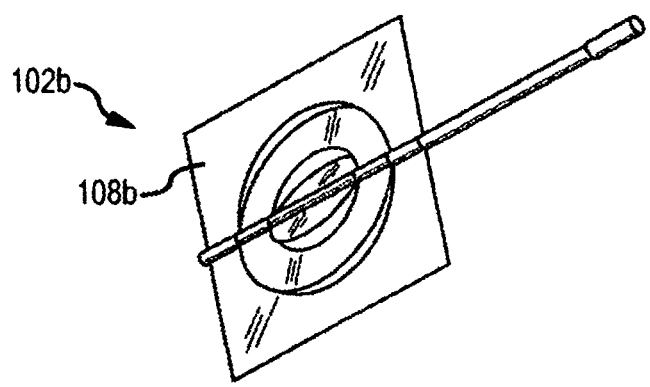
FIG.2B
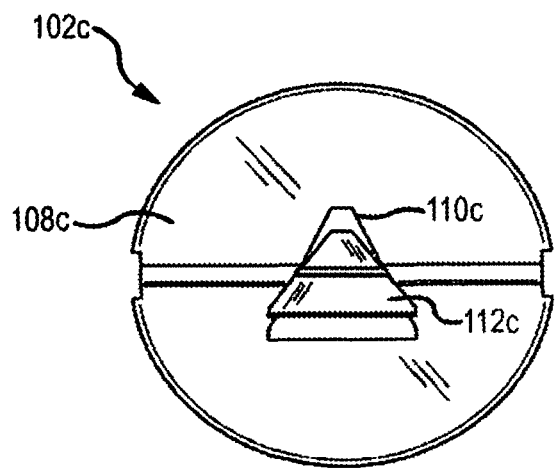 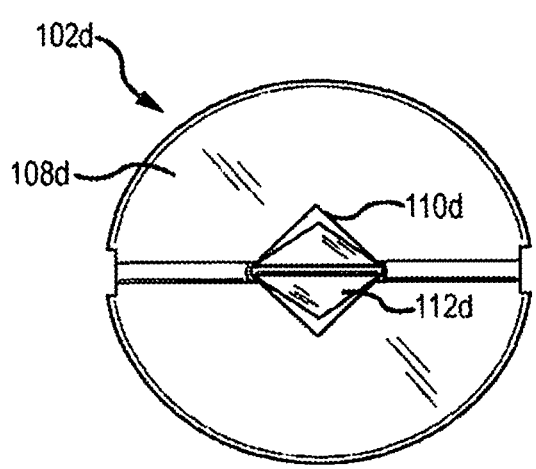
FIG.2C  FIG.2D

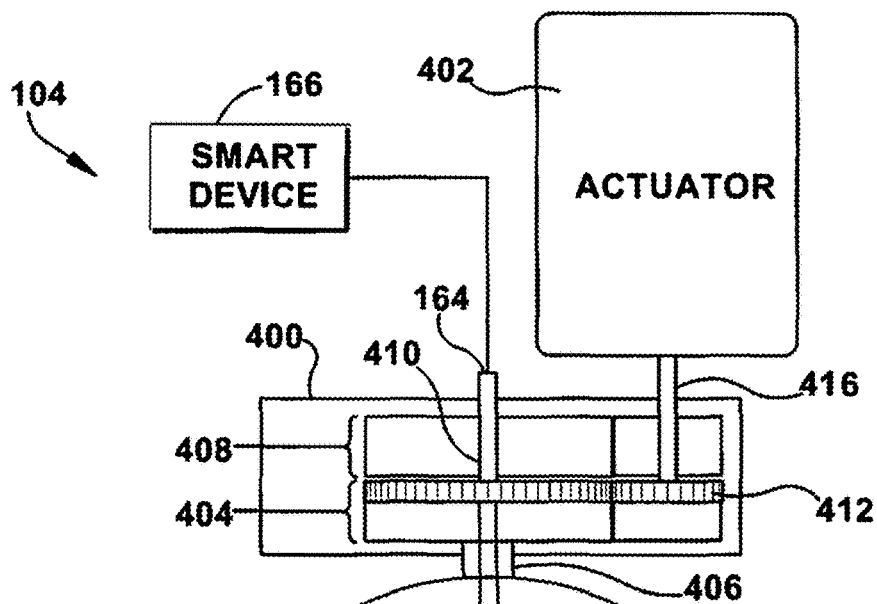
Fig. 4A
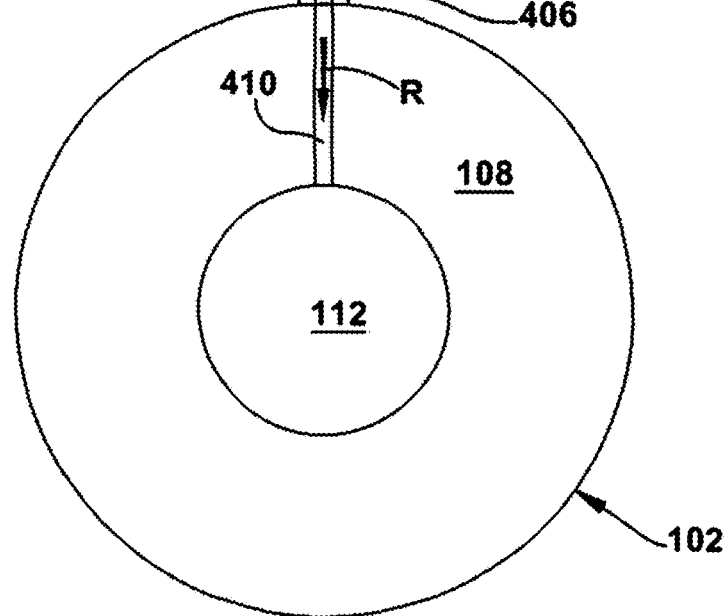
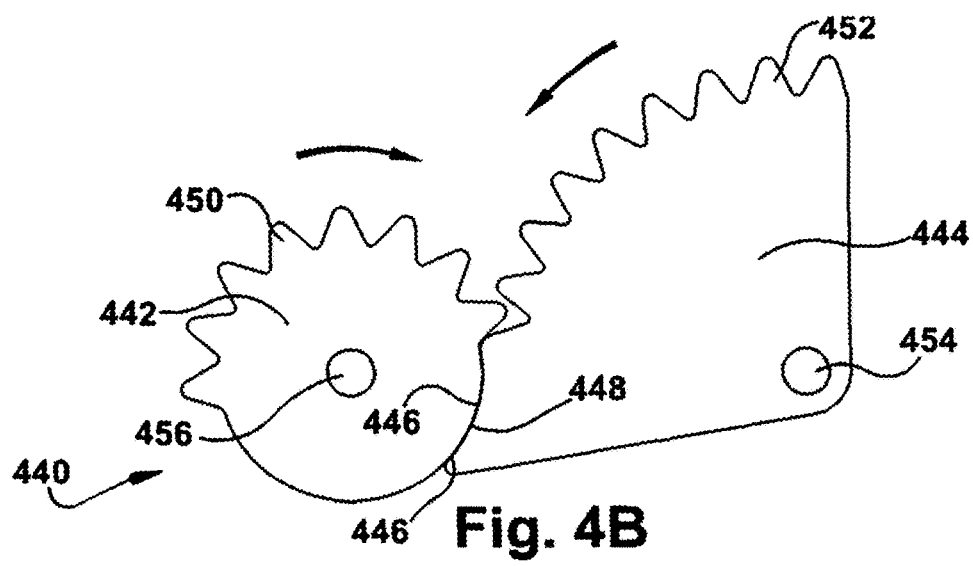
Fig. 4B

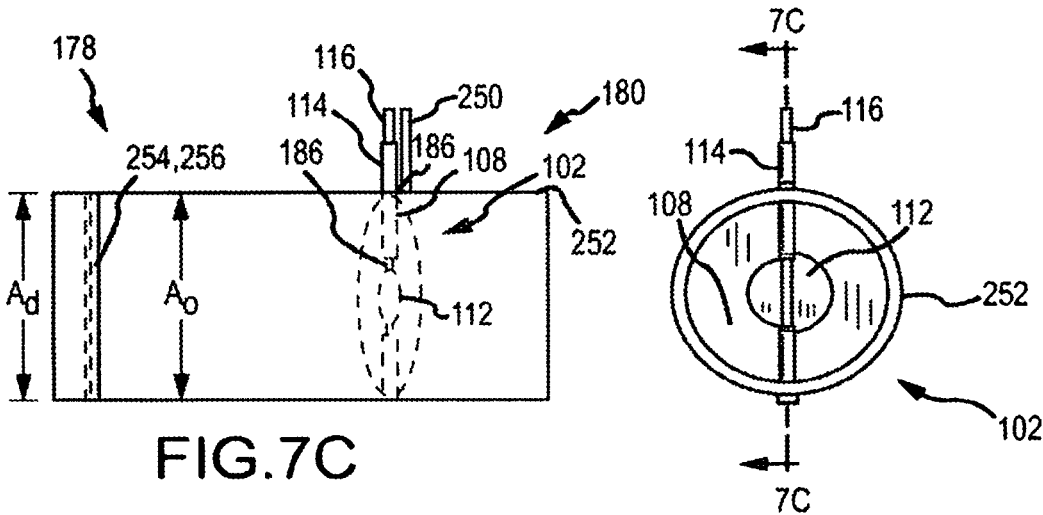
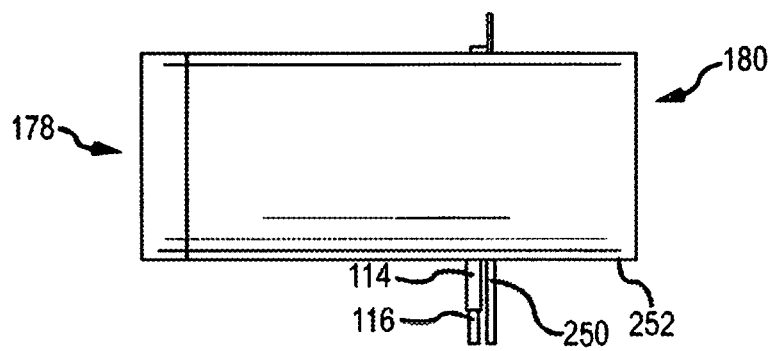
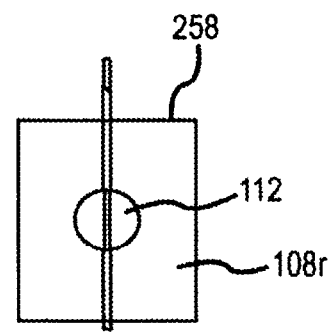

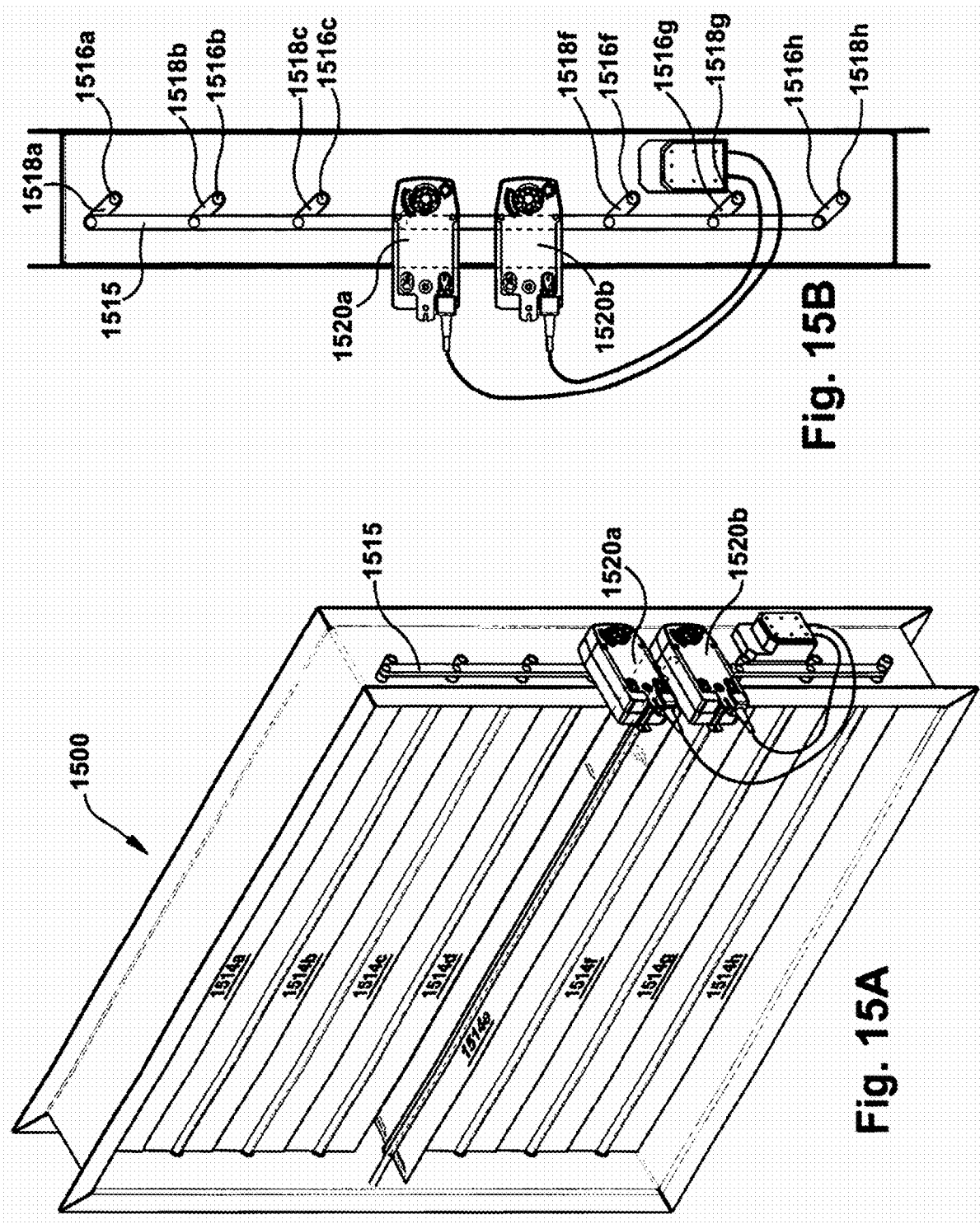

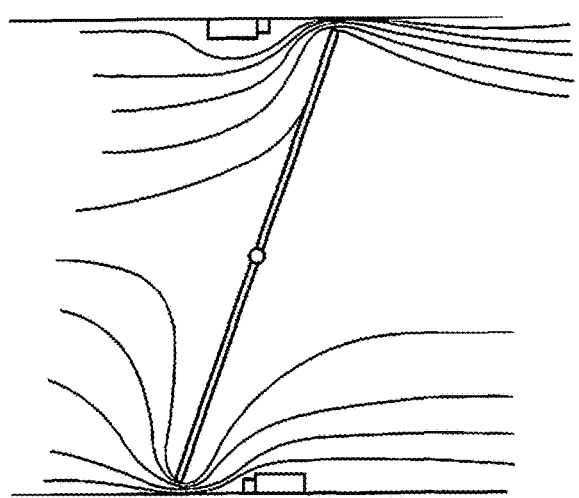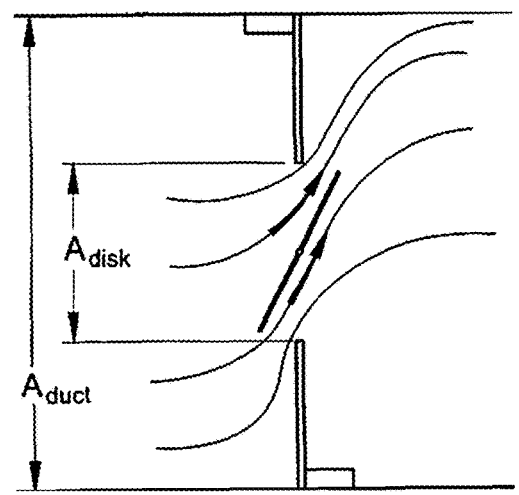
Fig. 18I    Fig. 18J
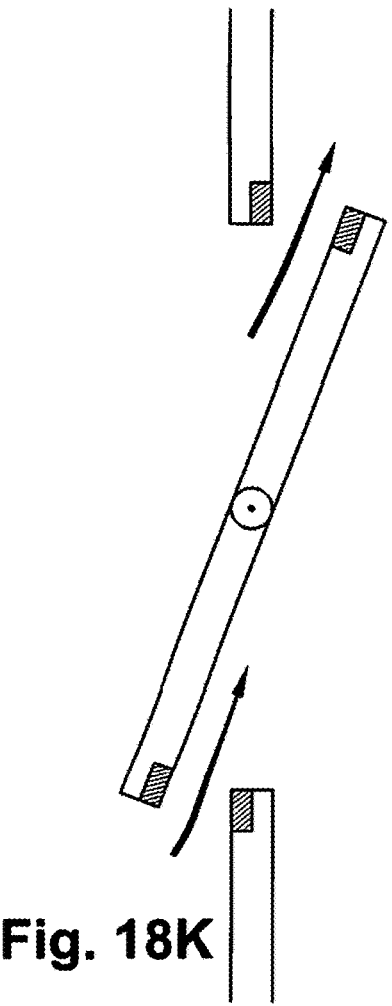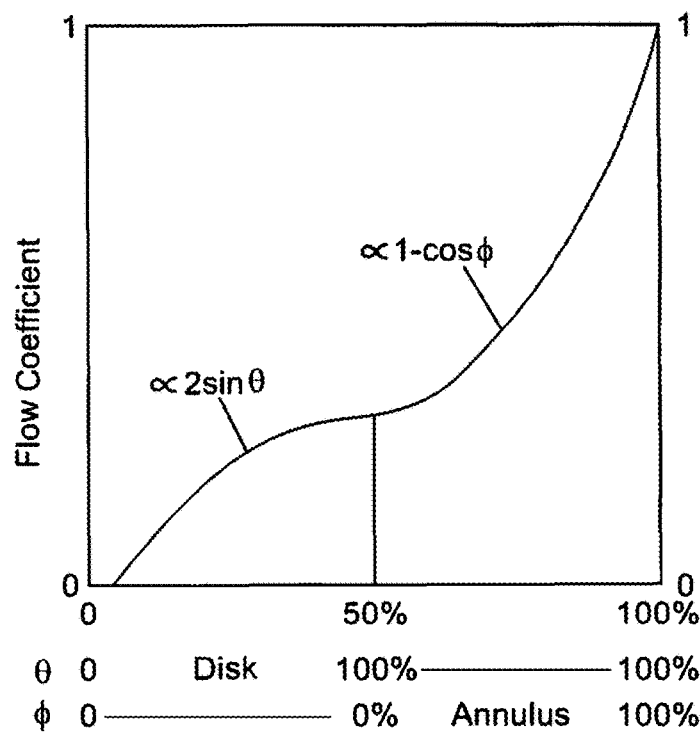
Fig. 18K    Fig. 18L

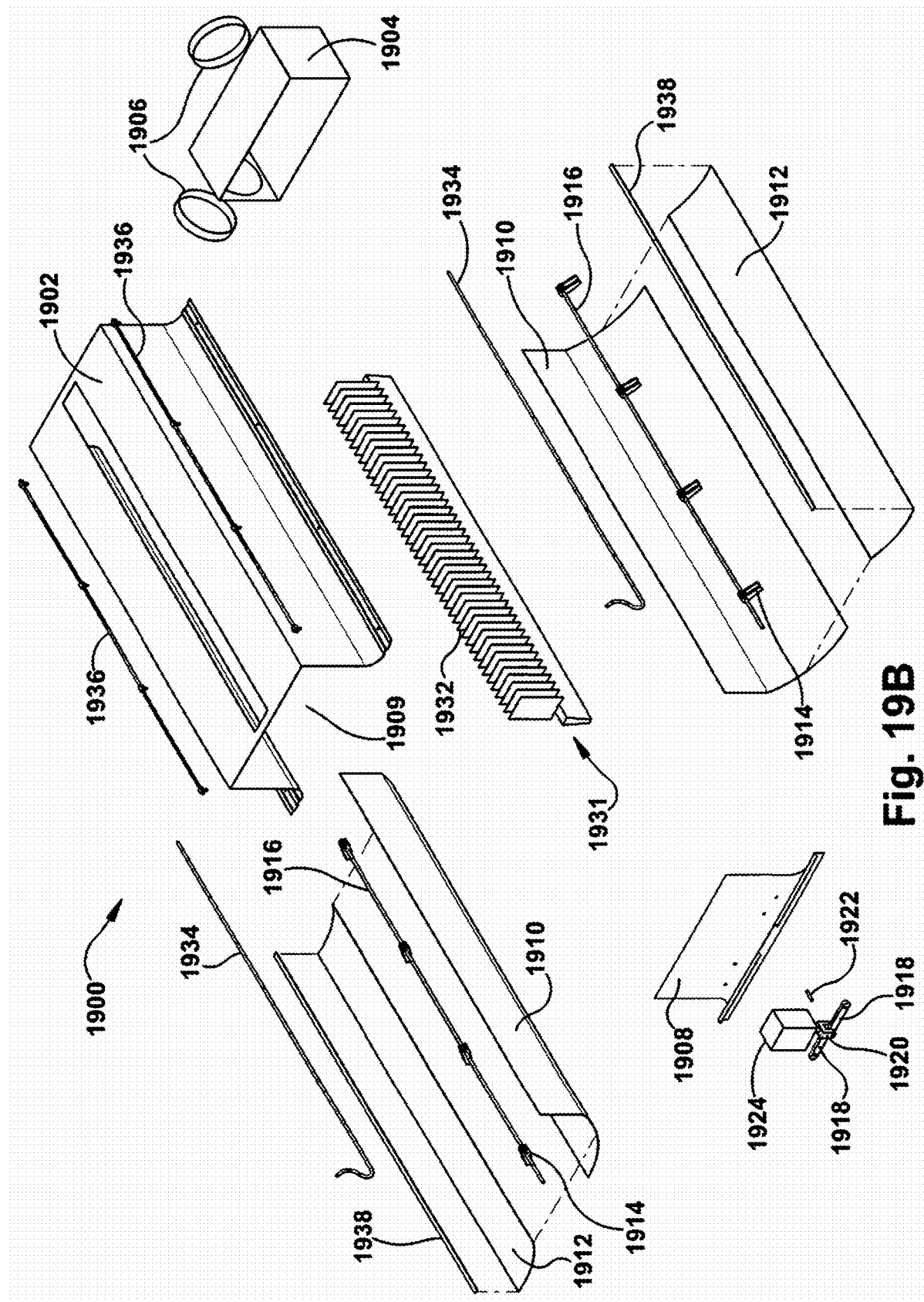

FLUID FLOW DEVICE WITH DISCRETE POINT CALIBRATION FLOW RATE-BASED REMOTE CALIBRATION SYSTEM AND METHOD

CROSS-REFERENCE TO RELATED APPLICATIONS

This application is a continuation-in-part of, and claims priority to, each of U.S. application Ser. No. 17/522,481, filed Nov. 9, 2021, entitled FLUID FLOW DEVICE WITH SPARSE DATA SURFACE FIT-BASED REMOTE CALIBRATIONSYSTEM AND METHOD, which is a continuation-in-part of U.S. application Ser. No. 17/176,537, filed Feb. 16, 2021 (now U.S. Pat. No. 11,231,196), entitled DATA TABLE-BASED FLUID FLOW DEVICE WITH REMOTE CALIBRATION SYSTEM AND METHOD, which is continuation of U.S. application Ser. No. 16/819,343, filed Mar. 16, 2020 (now U.S. Pat. No. 10,955,159), entitled "VARIABLE APERTURE FLUID FLOW ASSEMBLY", which is a continuation of application of U.S. application Ser. No. 16/017,335, filed Jun. 25, 2018 (now U.S. Pat. No. 10,591,175), entitled "LOW FLOW FLUID CONTROLLER APPARATUS AND SYSTEM", which is a divisional application of U.S. application Ser. No. 15/338,166, filed Oct. 28, 2016, (now U.S. Pat. No. 10,030,882), entitled "LOW FLOW FLUID CONTROLLER APPARATUS AND SYSTEM," which is a Continuation-in-Part of U.S. application Ser. No. 15/225,482, filed Aug. 1, 2016 (now U.S. Pat. No. 10,088,821), entitled "SELF-BALANCING AIR FIXTURE," which is a Continuation-in-Part of U.S. application Ser. No. 15/146,447, filed May 4, 2016 (now U.S. Pat. No. 10,175,669) entitled "FLUID CONTROL MEASURING AND CONTROLLING DEVICE," which is a Continuation-in-Part of U.S. application Ser. No. 14/330,941 filed Jul. 14, 2014 (now U.S. Pat. No. 10,444,771), entitled "FLUID CONTROL MEASURING DEVICE," which claims priority to U.S. Provisional Patent Application No. 61/872,576 filed Aug. 30, 2013 and entitled "LOW FLOW FLUID CONTROLLER," and claims priority to U.S. Provisional Patent Application No. 61/845,665 filed Jul. 12, 2013 and entitled "LOW FLOW DAMPER." The entire contents of each of these disclosures are hereby incorporated by reference for all purposes, as if fully set forth herein.

BACKGROUND OF THE INVENTION

Measuring and regulating fluid flows, such as air or water flow, is common but typically expensive, particularly for low fluid flows. In many cases, costs for measuring low fluid flows may be prohibitive and not commercially viable. Further, current flow measurement devices provide limited turndown ratio, typically less than 10:1, and therefore do not support accurate measuring functionality for fluid flows. These low turn-down devices create millions of unnecessary part numbers which creates a dysfunctional cumbersome business model. For instance, typical heating, ventilation, air conditioning ("HVAC") systems do not perform with accuracy due to the high costs of measuring air flow and limited turndown. The only option is to run them no lower than it can be measured and controlled. This causes the HVAC systems to consume needless amounts of energy and also hinders their purpose of providing comfort to people in a building. Current technology uses large Total Pressure which significantly drains energy. The new technology works on low Total pressure saving considerable energy.

There is a need for a practical way to measure fluid volumes and regulate the resulting fluid flow. Further, there is a need to do so in an economically viable manner. This disclosure is intended to address the above-noted concerns and to provide related advantages.

SUMMARY

This disclosure is generally directed to fluid measurement/fluid control devices, and more particularly, to a fluid flow measurement, fluid control, analytics and control system. Currently available fluid flow control mechanisms are often based on existing formulas or devices that characterize or measure fluid flow through an orifice. For example, various ducted orifice plate devices have been used to measure fluid flow for well over 100 years.

Advantageously, the instant application discloses new formulas and techniques which can be implemented for use with fluid control systems and methods. For example, the instant application describes new correlations that resolve contradictions observed between theory and practice dating back to the 1600's. Specifically, the correlations and related techniques disclosed herein, including the Flow and Discharge Coefficient Equations, can be used to address contradictions, inconsistencies, and/or limitations with respect to the vena *contracta* and other flow phenomena in view of earlier observations, see e.g. Torricelli (1643), Newton (1713), Bernoulli (1738), Borda (1760), Weisbach (1872), Kirchoff (1869), and/or Johansen (1930), as further discussed elsewhere herein.

A multi-stage damper can be used to address limitations of a standard butterfly damper, where the butterfly damper can be viewed as a variable orifice plate with projected open area $A_o = A_{duct} - A_{damper} * \cos(\theta)$. With a multistage damper such as a two-stage damper, the vena *contracta* of the inner disk can be controlled, not by the area projected normal to the duct as in the standard butterfly damper, but by the projection of the inner annulus opening $A_o$ normal to the faces of the annulus and opening disk itself.

In one embodiment, a flow device for measuring and controlling a fluid flow through a flow pathway is provided. The flow device may be incorporated in a duct of a heating, ventilation, and air conditioning (HVAC) system. The flow device may comprise an orifice plate positioned within the flow pathway and defining a variable opening for receiving flow therethrough. Further, the orifice plate may include an outer assembly comprising a central opening and an inner assembly extending through the central opening. The flow device may further have an actuator assembly operatively connected with the orifice plate.

The inner assembly may comprise a plurality of nested elements, whereby at least one of the plurality of nested elements includes an additional opening. In some embodiments, the inner assembly comprises an inner damper and the outer assembly comprises an outer damper. The outer and inner dampers can me made of various shapes such as square, rectangle, triangle, diamond and more.

In another aspect, the variable opening comprises a plurality of additional openings that are arranged in parallel. By way of example, at least one of the nested elements may be 10 inches in diameter D and a nested element 3.5 inches in diameter d, further wherein a scaling ratio D:d of about 10:3.5 is exhibited.

At least one of the inner and outer assemblies may further comprise a plurality of additional assemblies disposed side-by-side in the flow pathway. The inner and outer assemblies may be offset to obtain enhanced flow measurement characteristics. Further, the inner assembly comprises a nonperforated plate or a perforated plate. In another aspect, at least one of the inner and outer assemblies may define a shape selected from a group consisting of a circle, triangle, diamond, trapezoid, rectangle, ellipse, sphere, half sphere, and quarter sphere.

A gasket may be disposed on the duct of the flow device and configured to compress and seal against the outer assembly. The inner and outer assemblies may overlap to define an overlap region, further wherein the overlap region includes a compressible gasket embedded on at least one of the inner and outer assemblies. Further, the flow device may include a gasket that provides a tight positive pressure seal between at least two members from the group consisting of an air valve stop, the inner assembly, and the outer assembly. Another design may include the gasket mounted directly on the dampers.

The fluid device may further include a regain section defined by a tear drop nacelle defining at least a portion of the flow pathway downstream of the orifice plate, wherein the tear drop nacelle reduces losses from increased velocity Venturi or Bernoulli effects imparted on the fluid flow upstream of the nacelle. In some embodiments, the flow device includes a hollow outer shaft extending from the outer assembly and an inner shaft extending from the inner assembly through the hollow outer shaft, wherein the inner and outer shafts are operatively connected with the actuator assembly. The actuator assembly may comprise a first actuator operatively coupled to the hollow outer shaft and a second actuator operatively coupled to the inner shaft. Furthermore, the first and second actuators may be collinear and ganged together to enable measurability and controllability over a wide flow range. In other embodiments, the first and second actuators are mounted in parallel or on opposite sides of the flow device.

The actuator assembly may comprise an actuator having a gearing with dual concentric output to rotate the inner and outer assemblies generally in sequence or in an overlapping fashion, whereby the gearing comprises an inner track operatively coupled with the inner shaft and an outer track operatively coupled with the outer shaft. Alternatively, a dual race linear or rotational cam may be employed to the same effect. The actuator assembly may include an operating electro-mechanical, pneumatic mechanical device. The actuator may use gears or cables to stroke the shaft mechanism. Further, the actuator assembly may be incorporated with or into a smart device or a device having a programmable embedded controller. In a different aspect, the smart device includes an algorithm with at least one member selected from a group consisting of flow measuring, orifice metering and actuator metering element. The flow device may be a standalone flow measurement device.

Furthermore, the orifice plate increases a pressure of the fluid flow for the purpose of measuring and controlling fluid flow or mass fluid volume. The orifice plate may split the fluid flow into multiple streams for the purposes of increasing velocity pressure or recovering velocity pressure for a more accurate measurement. In some embodiments, the fluid flow measured and controlled by the flow device defines a flow velocity between about 5 feet per minute to about 3000 feet per minute in replacement service, and not over say a recommended 1500 FPM in new designs.

In another embodiment, the present disclosure provides a controller in operative communication with the orifice plate. The controller comprises a processor and a memory communicatively coupled with and readable by the processor and having stored therein processor-readable instructions that, when executed by the processor, enable the processor to determine flow based on a pressure differential between a first sensor disposed upstream of, and a second sensor disposed downstream of the orifice plate, together with position feedback received from the actuator assembly, and regulate the variable opening provided by the outer and inner assemblies to effect conformance between measured and desired flow. The controller may be disposed remotely from the orifice plate and in operative communication with the orifice plate through a network connection or a building automation system (BAS).

In other aspects, the first sensor is disposed in the flow pathway upstream of the orifice plate. The pressure differential may further be obtained relative to a second sensor disposed in the flow pathway downstream of the first sensor. The second sensor may be placed behind the orifice plate in a flow wake or still air in the flow pathway. Further, at least one of the first and second sensors uses or comprises a shaft that operatively connects the outer or inner assembly with the actuator assembly. For instance, at least one of the first and second sensors may use the actuator shaft to convey pressure through a duct wall, or may, incorporate the sensor opening itself into the shaft. The shaft may provide at least one of an upstream or a downstream flow measuring device or sensor. In some aspects, at least one of the first and second sensors is a Pitot tube or a multitap linear or crossed Pitot tube-like or similar device such as an orifice ring downstream of the orifice plate. In other aspects, at least one of the first and second sensors comprises a plurality of transducers.

In some embodiments, it is contemplated that the first sensor senses a total pressure of the fluid flow and the second sensor senses a static pressure or a diminished representative static pressure of the fluid flow. A difference between first and second sensor pressures yields a large pressure differential that is capable of measuring smaller fluid velocities of less than 25 FPM. In some aspects, the first sensor is embedded on an upstream surface of the orifice plate and/or the second sensor is embedded on a downstream surface of the orifice plate. Furthermore, the orifice plate comprises an inner assembly and an outer assembly surrounding the inner assembly, wherein the first and/or second sensor is embedded on an inner assembly of the orifice plate.

In another embodiment, the controller determines a flow coefficient based on the position of the inner and outer assemblies, further wherein the flow coefficient is determined based on a calculation or a look-up table. It is contemplated that the flow coefficient is a non-constant coefficient. In some aspects, the look-up table comprises empirical test data. In another aspect, the controller determines a flow rate based on the pressure differential and a flow coefficient, wherein the flow coefficient is determined theoretically as a function of a ratio of a variable opening area and a duct area. In a further aspect, the controller determines a flow rate further based on a flow coefficient that is applied at a maximum fluid flow to determine a maximum flow rate for use in calibration.

Still, in other embodiments, the controller compares the flow rate to a target flow that may be based on a desired temperature setting and operates the actuator assembly to maintain or change the variable opening area defined by the inner and outer assemblies based on the comparison. The controller outputs the flow rate to a central controller at a central system that supplies the fluid flow to the flow device. The controller may further output the flow rate to at least one of a cloud-based system and a BAS (building automation system), and/or the output the pressure differential to a room or local controller to manage a total flow in and out of a single room or laboratory. Still, in other aspects, the controller signals a variable frequency driver (VFD) or a motor of an air movement device to effect control of the air movement device. The controller may operate other air flow movement devices placed downstream or upstream of the orifice plate, further wherein the controller operates a motor of the air flow movement device based on a pressure differential. In some aspects, the air flow movement device comprises one or more fans. In another aspect, the controller regulates the variable opening based in part on a turndown ratio defined by a maximum volume of fluid flow through the orifice plate to a minimum volume of controllable fluid flow through the orifice plate, wherein the turndown ratio greater than 10: 1. The turndown ratio, also known as a rangeability of the controller, may be greater than 100: 1, and/or be a member selected from the group consisting of 25:1, 50:1, 75:1,100:1,125:1,150:1, 175: 1, 200: 1, 225: 1, 250: 1, 275: 1, and 300: 1. Ina particular aspect, the turndown ratio is between about 25:1 to about 300:1. Furthermore, the flow device is self-commissioning based on the turndown ratio.

In some embodiments, the controller is a single microelectronic controller in communication with a plurality of room sensors in a plurality of room zones to control the plurality of room zones. The controller operates the fluid device such that the HVAC system meets at least one prevailing energy code selected from a group consisting of ASHRAE Standard 55-2010, ASHRAE Standard 62.1-2010, ASHRAE Standard 90.1-2010, ASHRAE Standard 62.2-2010, ASHRAE Standard 90.1-2010, California Title 24, and CAL Green. At least one of the orifice plate and the actuator assembly are in communicative operation with another air distribution device selected from a group consisting of fan-powered devices, air handlers, chilled beams, VAV diffusers, unit ventilators, lights, fire or smoke dampers, control dampers, control valves, pumps, chillers, Direct Expansion Evaporative cooled air conditioning package units, and pre-piped hydronics. Furthermore, the flow device may be in communication or equipped with at least one ancillary component selected from a group consisting of controls, sensors, firmware, software, algorithms, air moving devices, fluid moving devices, motors, and variable frequency drives (VFDs).Even further, the flow device is in communication or equipped with additional linkages, gears or special actuators to turn additional concentric tubes, dampers, valves or rods to optimize air flow measurement performance. In yet another aspect, the flow device is configured with or as a multiple outlet plenum with two or more fluid device assemblies, wherein the multiple outlet plenum permits multiple accurate room or zone control of multiple rooms or zones simultaneously with at least member selected from a group consisting of a single self-contained BTUH generating device, a multiple thermal transfer device, an air to air HVAC system, and a fluid based system.

In other embodiments, the flow device is provided in combination with 5 to 180 degree symmetrical or flow-straightening elbows defining at least a portion of the flow pathway upstream or downstream of the orifice plate, wherein the elbows adapt the device to tight space constraints. In an alternative embodiment, a plurality of venturi or orifice valves of different sizes are ganged together to simulate multiple variable venturi flow measurement. In another aspect, the flow device includes a double-duct housing having two or more different sized inner and outer assemblies to replicate a two-stage assembly. The flow device may further be in combination with at least one thermal transfer unit installed upstream or downstream of the device where the duct is larger, thereby increasing a heat transfer surface and allowing for at least one of a member selected from a group consisting of a lower air pressure drop, a lower water pressure drop, a localized heating and cooling, a re-setting chiller, a re-setting boiler, and a reduced pump horsepower. In yet another aspect, the device is housed in or in communication with at least one member selected from a group consisting of a variable air volume (VAV) diffuser, a grill diffuser, and a linear diffuser. The VAV diffuser may be wireless or hardwired with the flow device and may use various means of actuation such as gear, cable, rotors. Can be controlled from smart devices such as mobile devices and tablets In still other embodiments, the fluid flow downstream of the orifice plate is discharged directly into an ambient space of a room. The flow device may include an all-inclusive light. Still further, at least one of the all-inclusive light and an HVAC diffuser are controlled by one onboard controller. In yet another aspect, the flow device further comprises or is in communication with a built-in occupancy sensor, wherein the sensor is selected from a group including an infrared sensor, a motion sensor, an ultrasonic sensor, a temperature sensor, a carbon dioxide sensor, a humidity sensor, and smart camera with occupant tracking capability The flow device is in operative communication or housed in a smart self-balancing air distribution (SBAD) adjustable diffuser having a temperature sensor, further wherein the operative communication is wireless or hardwired. In some aspects, the flow device is in operative communication or housed in a smart self-balancing air distribution (SBAD) motorized diffuser.

In still further embodiments of the present disclosure, a controller is provided that is in communication with a damper assembly and configured to measure fluid flow through a flow pathway. The controller comprises a processor and a memory communicatively coupled with and readable by the processor and having stored therein processor-readable instructions that, when executed by the processor, cause the processor to determine at least one of the following: 1) a pressure differential based on a first pressure sensed upstream of the damper assembly and a second pressure sensed downstream of the damper assembly, wherein the damper assembly is disposed in the flow pathway; 2) a variable opening area defined by the damper assembly, wherein the variable opening area receives the fluid flow there through; 3) a flow coefficient MF based on a function of a ratio of the variable opening area to a flow pathway area, wherein the flow coefficient $M_F$ is $0 \geq M_F \leq 1$; and 4) a flow rate based on the pressure differential and the flow coefficient.

It is contemplated that the processor further controls a flow velocity or feet per minute of the fluid flow while varying a flow rate or cubic feet per minute of the fluid flow throughout an entire turndown range defined by the processor. The flow rate is further based on a flow coefficient that is applied at a maximum fluid flow to determine a maximum flow rate, wherein the maximum flow rate is used for calibration purposes. The controller may, incorporate the required pressure transducer.

In other aspects, the controller controls the variable opening area of the damper assembly and the processor-readable instructions are programmed for optimal performance, acoustics, and energy of the controller and the controlled damper assembly. The controller may be in communication with at least one of a cloud-based control computing and wireless control components. In still other aspects, the controller is further monitored and controlled by building automation system (BAS) software of a BAS system. The controller further balances the damper assembly in real time from a front end software building automation system (BAS). Merely by way of example, the real-time balancing data is displayed at a member selected from a group comprising a front end software BAS system, a controller installed on self-contained compressor, a fluid moving device, and a room air discharge device to allow the moving device to be controlled and interface with another equipment controller.

In yet another aspect, the controller provides real-time turn down capabilities of a fluid moving device in operative communication with the damper assembly. The controller may include processor-readable instructions that further comprise an algorithm based on calculating fluid through orifices. The algorithm may be based on at least one member selected from a group consisting of an orifice metering device, a fluid sensing element, an actuator resolution, and a transducer. Furthermore, the controller automatically calculates the flow coefficient $M_F$ based on the variable opening area. The flow coefficient $M_F$ calculation is performed with a turndown ratio of 10:1 or greater. In other aspects, the controller determines the flow rate based on multiplying the flow coefficient $M_F$ with a square root of the determined pressure differential and then scaling to read mass fluid flows in desirable engineering units.

In still another embodiment of the present disclosure, an actuator assembly in operative communication with a damper assembly that is configured to measure and control fluid flow through a flow pathway comprises a first actuator in communication with a first gearing.

The first gearing is adapted to receive at least one of a first and second shaft extending from at least one of an inner and an outer assembly of the damper assembly.

In some aspects, the first gearing comprises a dual concentric output to rotate the inner and outer assemblies. The first gearing comprises an inner track operatively coupled with the first shaft and an outer track operatively coupled with the second shaft. Furthermore, a second actuator is provided in communication with the first actuator, wherein the first actuator is operatively connected to the first shaft and the second actuator is operatively connected to the second shaft. The first and second actuators may be ganged together. At least one of the first and second actuators is in wireless communication with a controller that operates the actuator assembly. In still another aspect, the actuator assembly outputs feedback from at least one of the first and second actuators. In other embodiments, at least one of the first and second actuators is removably received on a mounting bracket that is adapted to engage an outer surface of a housing of the damper assembly. Another actuator uses one motor with gear drives to drive both the shafts. Another actuator can use cranks and/or a camrace to drive both the shafts. A feedback signal can be accomplished by using a potentiometer.

In yet another embodiment of the present disclosure, a flow device for measuring fluid flow through a flow pathway comprises a damper assembly disposed in the flow pathway, wherein the damper assembly comprises a rotary damper plate positioned within the flow pathway and defining at least a portion of a variable opening. The flow device further comprises an actuator assembly operatively connected with the damper assembly and a controller in operative communication with the damper assembly, wherein the controller comprises a processor and a memory communicatively coupled with and readable by the processor and having stored therein processor-readable instructions that, when executed by the processor, cause the processor to determine at least one of the following: 1) a pressure differential based on a first pressure sensed upstream of the damper assembly and a second pressure sensed downstream of the damper assembly; 2) a variable opening area based on a position of the damper plate; 3) a flow coefficient $M_F$ based on a function of a a ratio of the variable opening area to a flow pathway area, wherein the flow coefficient $M_F$ satisfies $0 \leq M_F \leq 1$; and 4) a flow rate based on the pressure differential and the flow coefficient.

In some aspects, the flow pathway is defined by a housing having a hollow inner surface configured to removably receive the damper assembly and an opposing outer surface configured to removably mount the actuator assembly thereon. The housing may include a Venturi valve defining a constriction section for the flow pathway. In other aspects, the housing further defines a door or plate covering an opening in the housing, wherein the opening permits access to the damper assembly in the housing for maintenance cleaning and replacement of parts.

The damper assembly may be a butterfly damper and the variable opening is defined between the damper plate and a surface defining the flow pathway. The butterfly damper includes a primary damper that is substantially circular or rectangular and the variable opening is a controllable opening that enables measurability and controllability over a wide flow range. In some aspects, the controllable opening is substantially circular or rectangular. The controllable opening may be a sliding or guillotine-type opening. Further, the primary damper may be a sliding or guillotine-type damper. In another aspect, the primary damper further includes regain fittings enabling measurability and controllability over a wide flow range. The regain fittings comprise at least one of a fairing placed upstream of the primary damper and a nacelle placed downstream of the primary damper.

The damper assembly may be a 2-stage damper assembly comprising a central opening in the damper plate and an inner rotary disk extending through the central opening to define the variable opening. The damper plate and the inner disk overlap to define an overlap region that may include a compressible gasket embedded on at least one of the damper plate and the inner disk. A plurality of damper assemblies may be provided in series or in parallel in the flow pathway and the pressure differential may be determined based on a first pressure sensed upstream of the damper assemblies and a second pressure sensed downstream of the damper assemblies. In another aspect, the controller determines a new position setting for the damper assembly based on the flow rate and signals the actuator assembly to adjust the damper assembly to the new position. The controller may output at least one of the pressure differential, the variable opening area, the flow coefficient, and the flow rate to an external controller in communication with another controller. Further, the actuator assembly may further comprise an electromechanical or pneumatic mechanical device.

In yet another embodiment of the present disclosure, a method is provided for controlling fluid flow through a duct defining a cross-sectional area $A_d$. The method includes the step of providing a control element in the duct, wherein the control element defines a variable opening area $A_o$ that amplifies a velocity pressure of the fluid flow through the control element. The method further includes measuring a pressure differential $\Delta P$ across the control element, determining a flow coefficient $M_F$ based on a function of a ratio $A_o/A_d$, and determining a flow rate Q based on a product of the flow coefficient $M_F$, the duct area $A_d$, and a square root of the pressure differential $\Delta P$. Further, the method may include comparing the flow rate Q to a predetermined target flow F. If Q=F, the method includes the step of maintaining a setting of the control element defining the variable opening area $A_o$. If Q F, the method includes the step of performing at least one of: 1) adjusting the setting of the control element to a new setting defining the variable opening area $A_o$; 2) notifying a central controller of a central system that supplies the fluid flow to the control element to increase or reduce the fluid flow; and 3) controlling a speed of a fan disposed upstream or downstream of the control element based on the pressure differential $\Delta P$, damper % open, and/or state of satisfaction of downstream requirements. Thus, in an embodiment shown in FIG. 12, described below, an upstream pressure source, such as the upstream control/supply mechanism of element 1210, effects a pressure drop $\Delta P$ across control element 1204. The fluid flow area $A_o$ normal to flow past control element 1204 is controlled in response to a damper area control signal. In alternative embodiments, for example, there is an additional fan or fans disposed upstream or downstream, or both, with respect to the control element (e.g., damper) 1204. Such separate embodiments are shown in each of FIGS. 12A, 12B and 12C. FIG. 12A shows an embodiment with a fan 1210A disposed upstream of control element 1204; FIG. 12B shows an embodiment with a fan 1212A disposed downstream of control element 1204; and FIG. 12C shows an embodiment with a fan 1210A disposed upstream of control element 1204, and a fan 1212A disposed downstream of control element 1204. The assembly provides additional positive or negative pressure drops across the control element 1204, resulting in additional positive or negative flow effected by one or more of fans, like fans 1210A and 1212A, at their various locations, in the aggregate with the nominal contribution to $\Delta P$ which would occur without any of fans 1210A and/or 1212A, for example, as in FIG. 12. The augmented assembly, with fans 1210 and/or 1212, represents a net pressure source assembly operative to effect a net pressure difference across the control element (e.g., damper) 1204, augmented by contributions from fans 1210 and/or 1212. The fluid flow area $A_o$ normal to flow past control element 1204 is controlled in response to a a resultant net pressure control signal.

The method may further include the step of checking if the predetermined target flow F has changed, wherein if the target flow F has not changed and Q #F, signaling an actuator to adjust the control element to the new setting. Further, the method comprises providing a plurality of control elements in series or in parallel in the flow pathway, measuring the pressure differential $\Delta P$ across the plurality of control elements, and determining the flow coefficient $M_F$ based on the variable opening area $A_o$ of a critical control element in the plurality of control elements. Still further, the method includes enhancing or magnifying the measured pressure differential $\Delta P$ across the control element and calculating the flow rate Q based on the enhanced or magnified pressure differential $\Delta P$ along with the flow coefficient to achieve a precise flow rate Q. In some embodiments, the control element is a thin blade control element and the pressure differential $\Delta P$ is measured across the blade to enhance readings.

In further embodiments of the present disclosure, a flow device for measuring and controlling a fluid flow through a flow pathway in a duct of a heating, ventilation, and air conditioning (HVAC) system is shown. The flow device comprises an orifice plate positioned within the flow pathway and defining a variable opening for receiving flow there through. The orifice plate comprises an outer assembly comprising a generally central opening and an inner assembly extending through the central opening. Further, the flow device includes an actuator assembly operatively connected with the orifice plate, a first sensor disposed in the flow pathway upstream of, and a second sensor downstream of, the orifice plate, and a controller in operative communication with the orifice plate. The controller comprises a processor and a memory communicatively coupled with and readable by the processor and having stored therein processor-readable instructions that, when executed by the processor, cause the processor to perform at least one of: 1) determine a pressure differential based on a first pressure obtained between the first and second sensors; 2) determine a position of the outer and inner assemblies based on a position feedback received from the actuator assembly; and 3) regulate the variable opening based on the pressure differential the position of the outer and inner assemblies.

In yet another embodiment of the present disclosure, a central control system for use in a heating, ventilation, and air conditioning (HVAC) system is provided. The central controls system includes a processor and a memory communicatively coupled with and readable by the processor and having stored therein processor-readable instructions that, when executed by the processor, cause the processor to receive data from a plurality of flow controllers, wherein each of the plurality of flow controllers operates a flow device positioned remotely from the central controls system. The data may comprise a pressure differential measured at each of the plurality of flow controllers, a variable opening area of a flow pathway provided by each flow device, a flow coefficient $M_F$ based on square of a ratio of the variable opening area to a flow pathway area at each of the plurality of flow devices, wherein the flow coefficient $M_F$ is a non-constant coefficient and $0 \leq M_F \leq 1$, and/or a flow rate based on the pressure differential and the flow coefficient. The central controller may adjust fan parameters such that 1) all remote controllers are satisfied and 2) at least one remote control device is wide open, thus optimizing energy consumption. The central control system may further send operation parameters to each of the plurality of flow controllers independently. If one or more remote controllers is unsatisfied (i.e. wide open and needing more flow), and fan is at maximum, central control may command satisfied or more nearly satisfied controllers to feather back to balance the load, based on degree of dissatisfaction reported by remote controllers.

Other operation parameters may include duct and/or zone CFM measurements for the purposes of balancing and meeting fresh air requirements. Furthermore, the central control system may adjust a volume of a supply fluid flow to at least a portion of the plurality of flow devices based on the data received. In some embodiments, the central processor is in wireless communication with the plurality of flow controllers. The data may be stored in real-time as it is collected by and sent from each of the plurality of flow controllers.

BRIEF DESCRIPTION OF THE DRAWINGS

FIG. 2B is a side perspective view of a damper assembly having a rectangular outer damper and a plurality of nested dampers;

FIG. 2C is a front view of a damper assembly having different geometric form;

FIG. 2D is a front perspective view of a damper assembly having another geometric form;

FIG. 4A is a schematic diagram of a damper assembly attached to a gear box and actuator according to various embodiments of the present invention;

FIG. 4B is a side view of a drive gear and driven gear according to various embodiments of the present invention;

FIG. 7A is a side view of a circular housing having the flow device of FIG. 1;

FIG. 7B is a front perspective view of FIG. 7A;

FIG. 7C is a phantom view of FIG. 7A;

FIG. 7D is a front perspective view of a rectangular 2 stage damper;

FIG. 15A is a perspective view of another embodiment of a damper assembly having a plurality of horizontal blades;

FIG. 15B is a left side view of the damper assembly shown is FIG. 15A;

FIG. 18I is a schematic view of initial airflow through a Butterfly Damper with an Annular Gasket;

FIG. 18J is a schematic view of airflow at the initial opening through a 2-Stage Damper;

FIG. 18K is a schematic view of the inner disk showing gasketing options;

FIG. 18L is a graph of a simplified model for the Flow Coefficient of a 2-Stage Damper;

FIG. 19B is a detailed perspective view of some components of the air distribution apparatus shown in FIG. 19A;

DETAILED DESCRIPTION OF THE INVENTION

Figure 1:
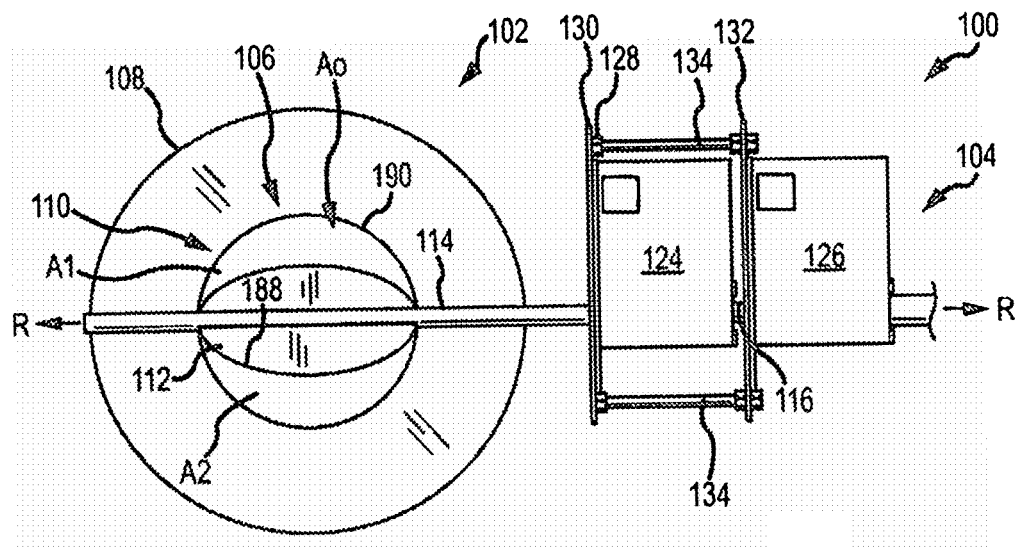
FIG. 1 is a front perspective view of a flow device according to various embodiments of the present invention.

The present disclosure describes a flow device, also referred to as a fluid control measuring device or a low flow fluid controller ("LFFC") that offers a high turndown ratio for measuring and regulating various types of fluid flow, such as gaseous or liquid fluid flows having high or low velocity. It is noted that although the term LFFC may be used throughout the application, the flow device is applicable to a variety of fluid flows and is not limited to low flow. The LFFC can be incorporated into a duct, a self-contained heating, ventilation, and air conditioning ("HVAC") equipment, or any air or fluid discharge or distribution device. Further, the LFFC is a smart device capable of interacting with other devices through a variety of networks, including Bluetooth, WiFi, 3G, 4G, and the like.

In some embodiments, the LFFC is a circular plate-like device that includes one or more damper regulators and/or fluid control valves mounted in series and/or parallel in a flow pathway. The dampers and valves may be housed or un-housed in a tube or other geometric housing defining a portion of the flow pathway. Numerous other geometric configurations and materials for the LFFC may be utilized, as described below.

In practice, the LFFC may be implemented in conjunction with a method of control that applies the Flow and Discharge Coefficient Correlations. This method provides a comprehensive orifice plate model that contributes to the high turndown ratio and facilitates the LFFC to measure or regulate very low volumes of fluid flow with precision inexpensively. Further, the LFFC offers superior acoustics by greatly reducing noise generation and eliminating the need for sound-attenuating liners such as fiberglass, double wall, armor flex, and the like. Eliminating such sound-attenuating components may reduce pressure drop of the fluid flow and contribute to energy savings.

Overview of Benefits of the LFFC

The LFFC described herein provides a practical means for measuring fluid flow, particularly low air and fluid volumes, and regulating the resulting flows. In practice, implementation of the LFFC in an HVAC building system offers building operators more options to provide fresh air to occupants, while meeting new energy standards and providing high zone controllability. The LFFC described herein simplifies current HVAC system designs. In this way, the LFFC eliminates or reduces prior needs for a plurality of device sizes in building construction. Furthermore, the LFFC allows for self-balancing and continuous commissioning of systems.

In another aspect, the high turndown ratio of the LFFC enables streamlining product portfolios by combining many product part numbers into a much smaller number of offerings, sometimes as much as 10,000, or more, part numbers. In this way, the LFFC reduces manufacturing costs, engineering time, cataloguing, engineering documentation, drawings, acoustical calculations, and the like. It is further contemplated that in doing so, complex software programs are not required, thereby reducing overhead and mistakes for customers, manufacturers and sales channels. In addition, a streamlined product offering allows for more sensors, hardware, software and firmware to be installed on devices at low incremental cost, thus enhancing product technology and system integration.

In some embodiments described herein, the LFFC allows for a substantial reduction in fluid pressure of HVAC/ process systems, which substantially reduces energy requirements. Furthermore, the LFFC redefines the current controls firmware/software architectures by making cloud computing of building control networks feasible and continuous commissioning of buildings applicable in an inexpensive manner. The LFFC has applications in multiple types of existing products, such as air distribution devices, air valves, fan coils, air handlers, thermal transfer devices using fluid, electric, chemical, gas, nano-fluid, process equipment as well as hybrid products that combine several existing products into one, while both encompassing mechanical systems and controls network architectures, software and firmware.

In further aspects, the LFFC may be introduced for new and retrofit construction into HVAC building equipment (commercial, residential and industrial), as well as other implementations such as burner and boiler equipment. For instance, the LFFC may be sized to those of existing valves for quick retrofit into existing installations. In another aspect, the LFFC may entail only two or three LFFC sizes for a new construction.

The LFFC is also applicable in residential settings, oil refineries, industrial, pharmaceutical, and process markets, and may be utilized for air and water, with direct expansion into hybrid electric reheat or other types of thermal conductivity, including nuclear, chemical and electrical. In a particular aspect, the LFFC may be incorporated into central systems and zone systems of building HVAC equipment. Central systems equipment tend to be large, while zone systems equipment tend to be located at the room level and sold in larger quantities. It is contemplated that the LFFC may replace or displace existing variable air volume ("VAV") terminal control boxes in zone systems, which are ubiquitous throughout buildings today. The LFFC may also be used on large systems, including air handlers/package rooftop units and other ancillary products in a HVAC system in a building. Even further, the LFFC can be used in fluid-based systems, such as variable refrigerant systems, chilled beams and in under floor applications and/or hybrid systems. In addition, the LFFC facilitates hybrid systems utilizing water and gas to become more feasible, including facilitating the use of nano-fluids and heat pipes in low static pressure systems.

Merely by way of example, the LFFC can be incorporated into under floor design and chilled beams to accurately measure or control primary air into the child beams. This optimizes the heat coefficient of chilled water coils commensurate with system requirements, occupant comfort, and zone performance. The LFFC can also be used on a device that heats or cools with a single controller, maintaining a set point within several separate zones simultaneously. In this way, chilled beams can be replaced altogether. Furthermore, doing so may replace fan-powered boxes and fan coils or small AHUs. In another aspect, the LFFC can be coupled with next-generation, smart "Lego" systems, thereby reducing installation costs by about 50% and utilizing energy savings of local water-based or refrigerant-based heating and cooling.

In another example, the LFFC can be used in fan coils and small AHUs. Legacy fan coils utilize high pressure drops through the coils, filters, and the like, to achieve a sufficiently compact foot print. Incorporation of the LFFC allows for mixing and matching of ancillary components in various geometric shapes and sizes. This may reduce space requirements, pressure drops, and deliver superior occupant comfort to various zones simultaneously, exactly per each zone's set point. Even further, product portfolios may be streamlined since the same portfolio may be applied to multiple vertical channels. In another aspect, the LFFC may provide a new device that replaces horizontal fan coils.

In still another example, the LFFC can provide new dampers, since the LFFC has lower pressure drops and improved air flow measurement at substantially less cost than existing damper technology. It is contemplated that various streamlined damper designs can be used with the LFFC to permit the LFFC to support various applications, such as packaged rooftop units, variable refrigerant flow ("VRF") applications, air handling units ("AHUs"), and the like. The LFFC can also be used on economizers and/or high humidity applications. Further, the LFFC can be incorporated in smart self-balancing air distribution ("SBAD") devices, which may use wireless technology and communicate directly with an equipment controller. Incorporation of the LFFC in SBAD devices can also yield pressure independent, pressure dependent, or hybrid devices. In yet another example, the LFFC may be incorporated residential markets with multiple outlet plenum designs to feed multiple zones and reduce equipment load requirements.

The high turndown LFFC makes it possible to more precisely measure air and water volumes to guarantee compliance with fresh air standards, while not breaking the energy bank. The key to improved LFFC operation is a high turndown ratio. Merely by way of example, current devices operate with 4 to 5-1 turndown ratio. The LFFC, by design and/or unlocking software code related to the functionality of the LFFC, can operate with a turndown ratio that can be increased to 100-1 or 200-1, or even higher. Reliable low flow data from the terminals allows central fans and pumps to be controlled by supply requirements at the neediest terminal device rather than by the energetically wasteful fixed pressure in the supply duct. Dissipation of excess pressure is responsible for excessive noise generation in the terminal devices. Moreover, a higher turndown ratio results in a streamlined product portfolio and/or a consolidation of several product portfolios into one. This results in reduced manufacturing costs, installation costs and lower life cycle costs for the building.

Merely by way of example, the high turndown ratio allows the LFFC to be shipped more easily at an earlier time frame to the job site. The high turndown frequently allows a single part number to cover requirements of an entire system, which allows for shipping the product earlier and decreasing the time to completion of a building. According to some embodiments, the LFFC can provide a single approach that is universally applicable for many HVAC designs, rather than having one design for each operating range. In today's fast-paced construction business, shipment lead times are a major factor into the construction cycle planning and timing. By reducing the number of product variations and/or making one product cover a much larger dynamic operating range, building architects and engineers are freed up to focus on the overall project and the details of the design. Incorporation of the LFFC allows for phasing of shipments later in the construction cycle without having to deal with difficulties about whether the air moving and/or water controlling equipment will still work after all the las-minute changes are made by the building owner.

In another example, the high turndown LFFC allows the LFFC and any ancillary components to have lower pressure drops, which further reduces fan horsepower and energy consumption. In practice, this may aid in achieving optimized performance of variable frequency drives ("VFDs") and electrically commutated motors or solid-state motors. The LFFC further facilitates lowering condenser water temperature, which lends to energy savings utilizing condensing boilers, heat recovery etc. In another aspect, the LFFC allows for hot reheat temperatures to be reduced to 95-105° F. (37-40° C.) with higher delta temperatures and reduced GPM (gallons per minute) or LPM (liters per minute). In another respect, the LFFC allow for chilled water temperatures to be increased with higher delta T's thus making the chillers more efficient. In that case, pump horsepower may be reduced and efficient utilization of heat recovery, heat pump chillers, condensing boilers and optimum zone controllability may be realized. In yet a further aspect, the LFFC provides high turndown and accurate flow measurement for localized chilled water coil optimization design or performance. In another respect, the LFFC allows the BTUHs and fluids to be shifted to occupied zones as required and setting unoccupied zones to the minimums, thus saving additional energy.

It is noted that the LFFC air valve or damper described herein can be built/designed in countless geometric shapes/sizes, various materials, with several air flow sensors and actuators. The dampers can be installed in various geometric angles and various damper assemblies and linkages. The devices can be designed and manufactured with innumerable turndown ratios and numerous actuator/controls options. Furthermore, there are several variations of damper designs, such as designs more conducive for stand-alone dampers and equipment such as large air handlers and packaged roof top units.

In this way, it is contemplated that the LFFC disclosed herein provides at least the following: 1) Measurement and regulation of high and very low volumes of air and/or fluid flows with precision, inexpensively and with superior acoustics and requiring less energy; 2) A high turndown device that permits use at lower velocities, greatly reducing noise generation and eliminating the need for sound-attenuating liners such as fiberglass and double walls; 3) A high rangeability device that allows streamlining product portfolios by combining several product part numbers into much smaller number of offerings; 4) An inexpensive device that allows equipment to be scaled back 100-1 or higher, rather than the legacy 4 to 5-1, which leads to energy savings, fewer product variations simpler and more robust application designs; 5) A device that provides better fluid, air volume and water temperature control, while conserving more energy, employing a fundamentally simpler design and meeting all new and old building fresh air, comfort and energy codes; and 6) A device that can be engineered, selected, and sized without sophisticated software programs.

Components of the LFFC

Turning now to FIG. 1, one embodiment of a flow device or LFFC 100 is illustrated. In general, the LFFC 100 comprises a damper assembly 102 operatively connected with an actuator assembly 104 through one or more rotating shafts. The damper assembly 102 is adapted to be positioned within a fluid flow pathway of a duct. The damper assembly 102 functions as an orifice plate that defines a variable opening 106 for receiving fluid flow there through to measure and control various types of air, gaseous, and liquid fluid flow. In a particular aspect, the damper assembly 102 permits measurement and control of very low flow that are not measurable or controllable by conventional technology. Merely by way of example, such flows may be 11 cubic feet per minute (CFM) or lower. Further, the LFFC 100 may be a standalone device for measuring and controlling fluid flow.

As shown in FIG. 1, the damper assembly 102 is a two-stage assembly that includes an outer damper 108 having a central opening 110 and an inner damper 112 extending through the central opening 110. The outer and inner dampers 108,112 are generally thin, flat rotary plates that rotate relative to each other about a common rotational axis R to vary an opening size, or a variable opening area $A_o$, of the variable opening 106. In particular, the damper assembly 102 defines the variable opening area $A_o$ by the position of the outer and inner dampers 108,112 relative to one another. Such positioning may include different angles or offset distances defined between the dampers 108,112. In this way, the variable opening area $A_o$ may be a summation of one or more holes in the damper assembly 102 where fluid flows through. For instance, FIG. 1 shows two passageways A1 and A2 defined by the damper assembly 102 that contribute to the total variable opening area $A_o$. In another aspect, the variable opening 106 comprises a plurality of additional openings that are arranged in parallel.

Rotation of the damper assembly 102 is driven by the actuator assembly 112 through one or more shafts. In the embodiment of FIG. 1, two rotating shafts are provided with one shaft corresponding to each of the two dampers 108,112. A hollow outer shaft 114 extends from the outer damper 108 along the rotational axis R to the actuator assembly 112. An inner shaft 116 extends from the inner damper 112 and through the hollow outer shaft 114 along the same rotational axis R. The inner shaft 116 may be solid or hollow and in operative communication with the actuator assembly 112. The outer and inner shafts 114,116 are driven by the actuator assembly 104 to rotate relative to one another to alter the variable opening area $A_o$ for measurement and control of various types of fluid flow. It is contemplated that the damper 15 assembly 102 and/or shafts 114,116 can be formed from a variety of materials, including carbon fiber, 316 steel, injection molded elements, and other materials or combinations thereof. The dampers 108,112 can be sized according to a size of the flow pathway or cross-sectional duct area $A_d$ defining the flow pathway. In one aspect, the inner damper 112 is sized corresponding to the central opening 110 of the outer damper 108. Merely by way of example, the outer damper 108 is about 10 inches in diameter and the nested inner damper is about 3.5 inches in diameter.

Figure 2A:
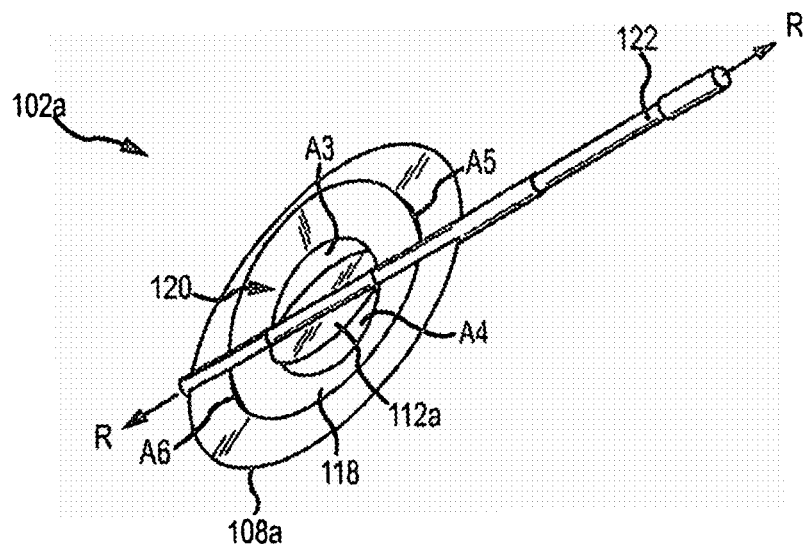
FIG. 2A is a side perspective view of a damper assembly having a plurality of nested dampers.

As shown in FIG. 1, the outer damper 108 is circular or ring-shaped and the inner damper 112 is a circular, non-perforated solid disk. The outer and inner dampers 108,112 are nested together. It is noted that other geometric forms and configurations can be provided, as illustrated in FIGS. 2A-D. For instance, FIG. 2A illustrates a three-stage damper assembly 102a comprising an outer damper 108a, an inner damper 112a, and an intermediary damper 118 nested therebetween. The three dampers 108a, 112a, 118 rotate relative to one another and/or independently, and/or are driven independently, about the common rotational axis R. The intermediary damper 118 is ring-shaped in similar fashion to the outer damper 108 such that the 30 intermediary damper 118 defines an additional opening 120 that receives the inner damper 112a therethrough. It is contemplated that any of the dampers 108a, 112a, 118 can be provided and in any geometric shape. Single-stage, four-stage, five-stage, and n-stage damper assemblies can be contemplated. Selection of the number and shapes may be dependent on optimization of the damper assembly 102a in controlling a particular type of fluid flow.

Further, it is contemplated that any number of damper plates may be provided in a nested assembly as shown in FIGS. 1 and 2A or offset from each other such that the additional dampers are arranged side-by-side down the flow pathway. For instance, the damper assembly 102a may include an inner damper comprising a plurality of nested dampers, wherein at least one of the plurality of nested dampers comprises an additional opening. In another aspect, the damper assembly 102a may define an offset distance between one or more neighboring dampers through the flow pathway. It is contemplated that each of the plurality of dampers is operatively connected to a shaft that further connects to an actuator assembly, such as the actuator assembly 104 in FIG. 1. The shafts may comprise hollow and solid shafts nested concentrically to form a shaft assembly 122, as generally indicated in FIG. 2A. In this way, each of the plurality of dampers can rotate relative to one another. In another aspect, the total variable opening area A is defined by a total area of holes in the damper assembly 102a where fluid flows through. As shown in FIG. 2A, the total variable opening area $A_o$ includes four passageways $A_3$, $A_4$, $A_5$, and $A_6$.

FIG. 2B illustrates a damper assembly 102b that is similar to the three-stage damper assembly 102a, but with a rectangular outer damper 108b. The outer damper 108b may be formed in any shape. In an exemplary embodiment, the outer damper 108b is shaped corresponding to a shape of a flow pathway defined by the duct or housing surrounding the outer damper 108b. Merely by way of example, as further shown in FIGS. 2C-D, various other geometric shapes may be contemplated. FIG. 2C illustrates an outer damper 108c having a central opening 110c that is triangular or trapezoidal in shape. An inner damper 112c is defines a corresponding triangular or trapezoidal shape. FIG. 2D illustrates an outer damper 108d having a central opening 110d that is diamond-shaped and an inner damper 112d that is correspondingly diamond-shaped. Any of the inner, intermediate, and outer dampers can define any combination of shapes, such as shapes that are generally circle, triangle, diamond, trapezoid, rectangle, ellipsis, and dough-nut shaped. In another aspect, the dampers may be symmetrical, non-symmetrical, and/or irregular-shaped.

Figure 2E:
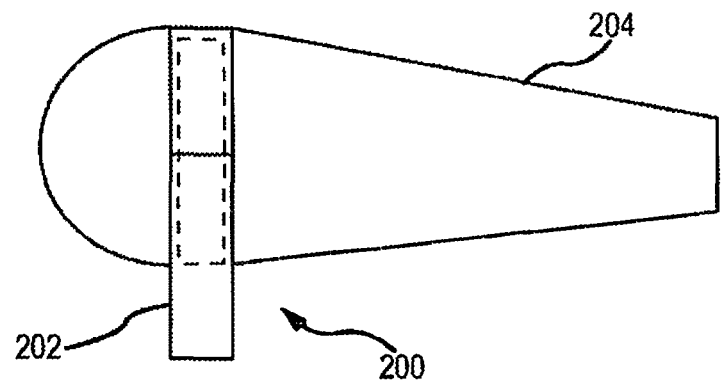
FIG. 2E is a cross-sectional view of one of generally a number of guillotine-damper assemblies in regain nacelles which may be disposed across a generally rectangular duct, according to some embodiments of the present disclosure.
Figure 2F:
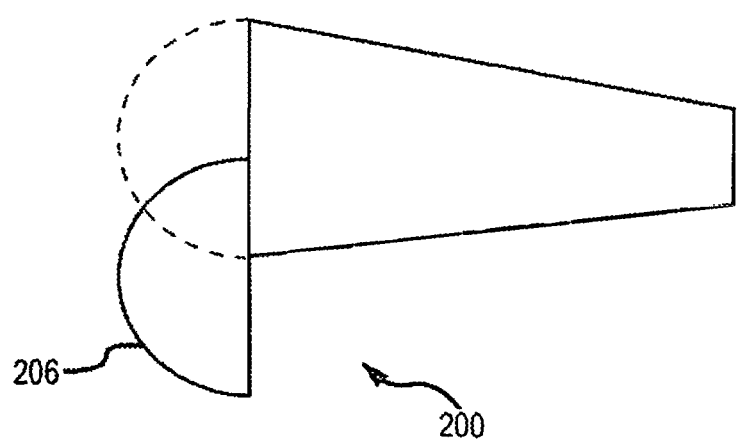
FIG. 2F is a cross-sectional view of another guillotine-damper assembly in a regain nacelle, according to some embodiments of the present disclosure.

Still, in another aspect, the damper assembly 102 is a butterfly damper nested within another butterfly damper (the inner damper 112 nested within the outer damper 108). The variable opening 106 is defined between the outer damper 108 and a surface defining the flow pathway, as well as between the butterfly dampers. The variable opening is a controllable opening that enables measurability and controllability over a wide flow range. It is contemplated that the controllable opening is substantially circular or rectangular. In still another aspect, the controllable opening is a sliding or guillotine-type opening. For instance, the primary damper is a sliding or guillotine-type damper 200. As shown in FIG. 2E, the guillotine-damper 200 may include a plurality of long, symmetrical parallel wings 204 with slots to accommodate the solid strips 202 in a movable flat plate containing many long narrow parallel slots. The plate slides so that the solid strips 202 are inside the wings (or regain nacelles) in a fully open position, and almost fully out sealing the paths in fully closed position.

In another embodiment of the guillotine-type damper, upstream half-cylinders 206 may be attached to, or integral with, a movable plate, such that the half cylinders slide. In another embodiment, it is contemplated that quarter-cylinder at one wall slides little or not at all, and the one at the other wall extends in a line perpendicular to the wall which passes into a slotted piece outside the wall as the damper opens.

Turning back to FIG. 1, the actuator assembly 104 is shown comprising a first actuator 124 and a second actuator 126. The first and second actuators 124, 126 are ganged together, collinearly, by a stacking bracket 128 comprising first and second shelves 130, 132 secured together by four rods 134, whereby each shelf 130, 132 is adapted to receive each actuator 124, 126. The actuators 124, 126 may be removed from the stacking bracket 128. In another embodiment, the actuators 124, 126 are not ganged together or collinear and are arranged separately. It is contemplated that any number of actuators and/or corresponding number of shelves can be provided for the LFFC 100 and/or the stacking bracket 128. In some embodiments, one actuator is provided for each damper of the damper assembly to rotate the dampers independently. For instance, the first actuator 124 may be operatively coupled to the hollow outer shaft 114 and the second actuator 126 may be coupled with the inner shaft 116.

Figure 3A:
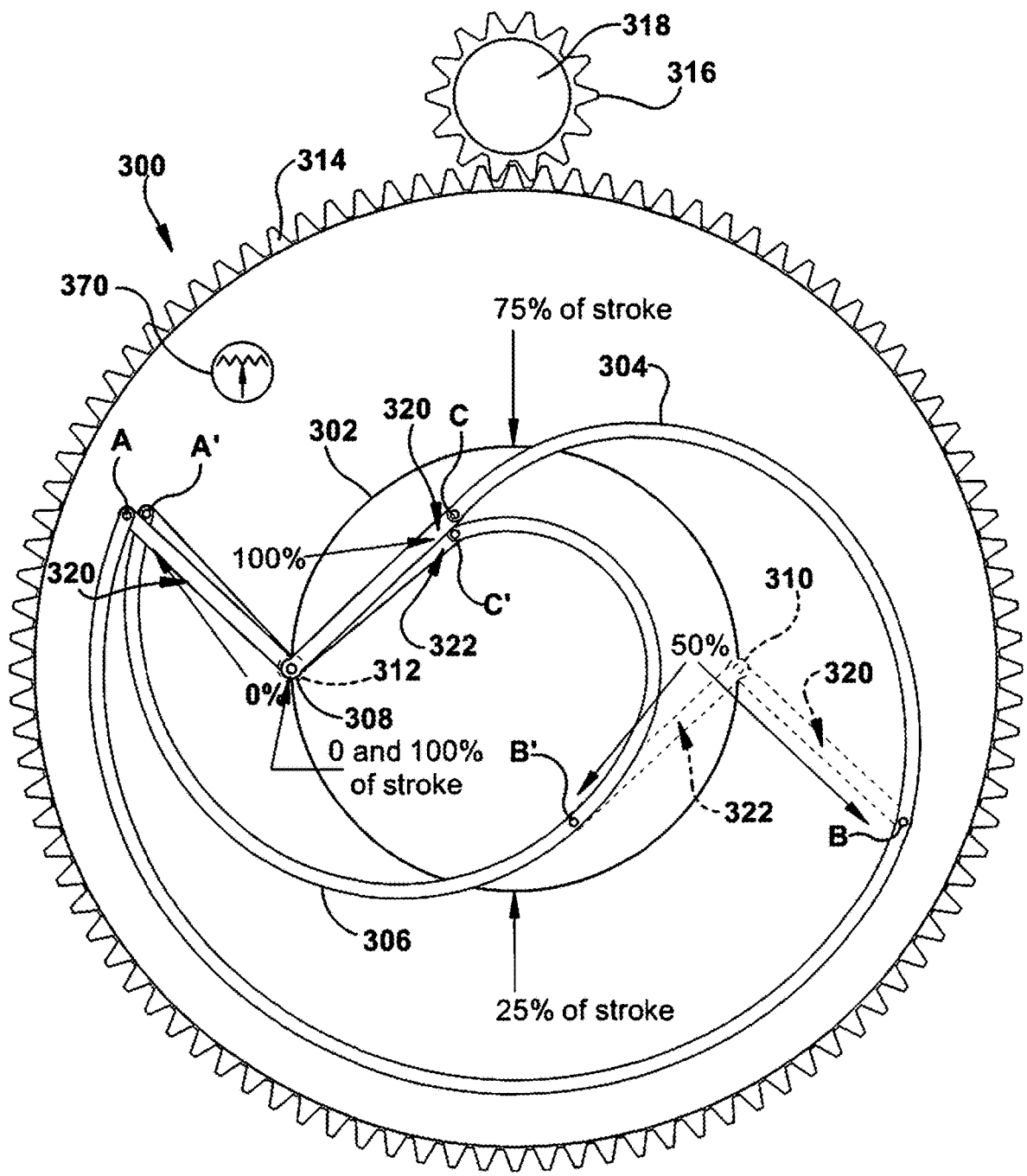
FIG. 3A is a schematic diagram of a camrace in a single gear for a one-piece actuator that drives two damper shafts according to various embodiments of the present invention.

Referring to FIG. 3A, a dual cam race gear 300 is generally shown. A circular shaft path 302 illustrates that position of concentric outer 114 and inner damper shafts 116 as dual cam race gear 300 rotates. Dual cam race gear 300 comprises an outer damper cam race 304 and an inner damper cam race 306. In this embodiment, outer damper shaft 114 attaches to cam follower 320 which follows cam race 304 to form a high flow blade actuation assembly and inner damper shaft 116 attaches to cam follower 322 which follows cam race 306 to form a low flow blade actuation assembly. When both the outer damper 108 and inner damper 112 are closed at 0% of stroke, position 308 shown on the shaft path 302, the follower 320 is in position A and follower 322 is in position A'. As dual cam race gear 300 rotates clockwise 180 degrees to position 310 on the shaft path 302 at 50% of stroke, the outer damper 108 remains closed, its follower 320 remaining fixed as it follows the outer cam race 304 which maintains a fixed radius traveling from A to B, while inner damper 112 opens fully, its follower 322 rotating linearly following a centered trochoid in the inner camrace 306 from A' to B'. After dual cam race gear 300 rotates a further 180 degrees to complete its 360 degree stroke, both the outer damper 108 and inner damper 112 are completely open at 100% of stroke, position 312, which coincides with initial position 308, on the shaft path 302; the outer damper follower 320 is in position C in race 304 while the inner damper follower 322 is in position C' in race 306. For sequential linear actuation, inner damper follower 322 follows a converging centered trochoidal path in race 306 from position A' at 0% to near position B' at 310, 50% of stroke, then smoothly joins a circular path concentric with the central axis from a little after B' to position C' at 100% of stroke. Outer damper cam follower 320 follows a circular path from position A to position B at 50%, then smoothly joins a centered trochoid from a little after position B to position C at 100% open. Dual cam race gear 300 further comprises teeth 314 that engage with teeth 316 on a pinion gear 318 that provides the driving force to rotate dual cam race gear 300. If the camstroke were contracted to slightly less than 360 degrees, a rotary potentiometer 370 could be positioned on dual cam race gear 300 to detect the position (angle) of the outer damper 108 and inner damper 112 and provide feedback to any controller. Alternatively, and more accurately, rotary potentiometers may be positioned on the damper shafts themselves to provide feedback of damper position to any controller.

Figure 3B:
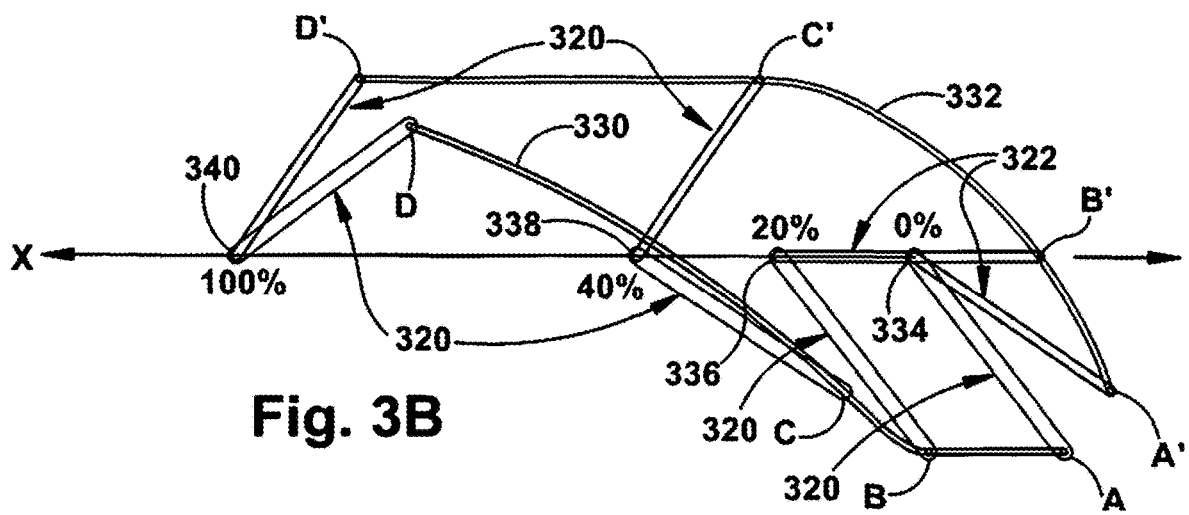
FIG. 3B is a schematic of a linear actuated cam-driven air valve in accordance with an embodiment of the invention.

Referring to FIG. 3B, the linear path of Airvalve concentric outer 114 and inner damper 116 shafts are depicted based on a linear actuation along axis X. Linear, non-concentric, actuation is preferable for parallel blade damper assembly 1300, described below. When both outer damper 108 and inner damper 112 are closed (0% of stroke) position 334 on axis X, the outer damper cam follower 320 is shown at A and the inner damper 112 cam follower 322 at A'. As the actuation proceeds to the 20% stroke position 336, the outer damper follower 320 is shown at B and the inner damper follower 322 at B'. As the actuation proceeds further along to the 40% stroke position 338, the outer damper follower 320 is shown at C and the inner damper follower 322 at C'. Finally, as the actuation proceeds to the end at the fully open 100% position 340, the corresponding positions of the outer follower 320 is shown at D and the inner follower 320 at D'. Constant cam follower position is shown as straight lines AB and C'D' parallel to the axis of actuation X, with linear actuation following trochoids from positions B to D and A' to C'. It can be seen that outer follower 320 and inner follower 322 rotation range of 0 degrees to 90 degrees correlates with actuation range of 0% to 100% stroke. Inner damper 112 is fully open at the 90 degree follower position when actuation is as 40%, and outer damper 108 only begins to open when actuation passes the 20% position and continues to open completely to 90 degrees follower rotation when actuation is at 100%.

Figure 3C:
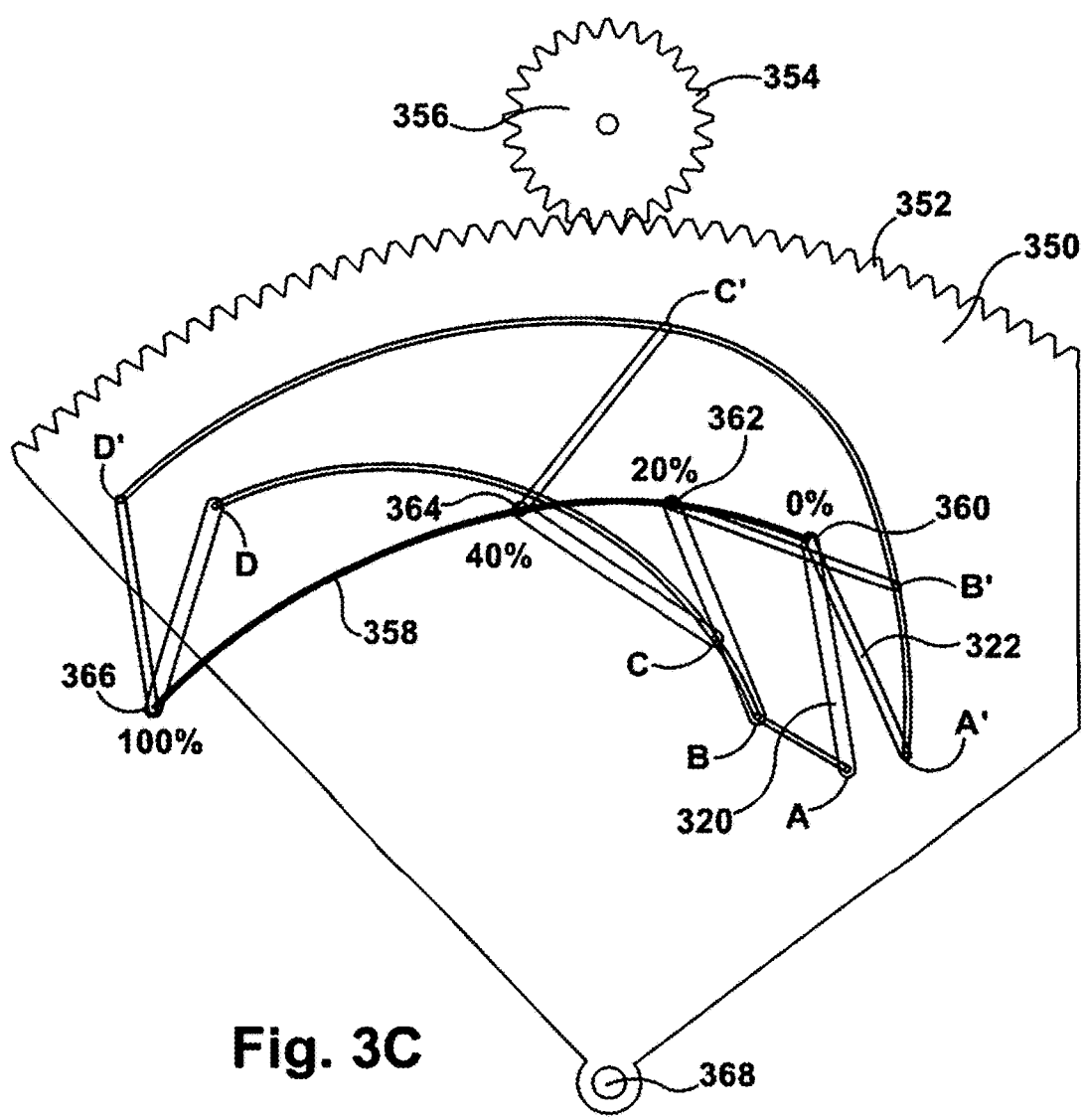
FIG. 3C is a schematic of a rotary actuated cam-driven airvalve in accordance with an embodiment of the invention.

Turning to FIG. 3C, the relative positions of outer damper 108 and inner damper 112 are depicted based on a rotary actuation mechanism. Gear segment 350 has teeth 352 are driven by corresponding teeth 354 on pinion gear 356. Shaft path 358 depicts the relative positions of outer damper 108 and inner damper 112 as gear segment 350 is actuated. When both outer damper 108 and inner damper 112 are closed (0% stroke), position 360 on shaft path 358, the outer follower 320 is shown at A and the inner follower 322 at A'. As the actuation proceeds to the 20% position 362, the outer follower 320 follows a circular path AB and the inner follower 322 begins a centered trochoid A'B'. As the actuation proceeds further along to the 40% position 364, the outer follower begins a centered trochoid BC and the inner follower completes centered trochoid A'B'C'. Finally, as the actuation proceeds to the end at the fully open 100% stroke, position 366, the outer follower 322 completes trochoidal path BCD and the inner follower holds steady on circular path C'D'. Gear segment 350 rotates around pivot point 368 during its actuation. If linear actuation is desired, inner damper cam race rotates 90 degrees following an expanding centered trochoid from position A' at 0% stroke to fully open at C', 40% stroke, then remains fully open following a circular arc centered on pivot 368 from position C' to D'. The outer damper cam follower 320 follows a circular arc from A at 0% stroke to position B at 20% stroke (so no cam follower rotation), then continues with linear follower rotation following an expanding centered trochoid from position B to position D at 100% stroke. Shaft path 358 represent an approximately 75 degree arc between the 0% and 100% positions of dampers 108 and 112. Use of cam races described herein can prevent kinks that typically appear in the flow coefficient actuation curves other means of damper actuation. Smooth non-linear transfer characteristics are more easily implemented with either rotary or linear cam race configurations.

Figure 3D:
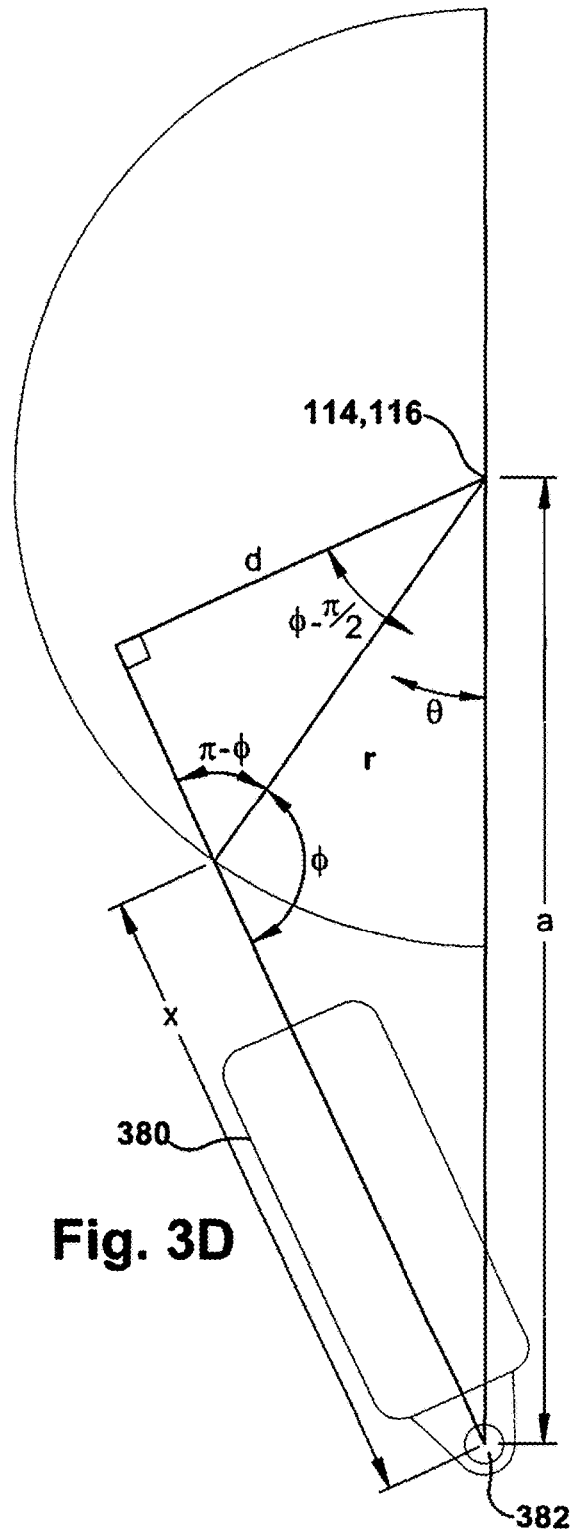
FIG. 3D is schematic representation of a crank actuated shaft with an actuator in a general position.

As shown in FIG. 3D, a representation of a crank actuated shaft is generally shown wherein an actuator 380 is shown in a general position. Crank actuation is non-linear over the 90 degree range of action wherein actuation slope $$\frac{d\vartheta}{dx}$$

varies by a factor of at least $\sqrt{2}$, and this nonlinear transfer function can be incorporated into the a flow coefficient algorithm with minimal loss of accuracy and control. Shaft rotation δ and actuator extension x are related through the Law of Cosines:

$$x^2 = r^2 - 2ar\cos\vartheta + a^2 \text{ or } \vartheta = \mathrm{acos}\left(0.5\left(\frac{r}{a}\left(1 - \left(\frac{x}{r}\right)^2\right) + \frac{a}{r}\right)\right)$$

for crank arm length r and shaft-actuator pivot distance a.

$$2x\frac{dx}{d\vartheta} = 2ar\sin\vartheta$$

relates actuation slope $$\frac{d\vartheta}{dx} \text{ to } x \text{ and } \vartheta.$$

The moment arm d is the perpendicular distance from the shaft to the line of actuation, which is an arc of radius r. It can be seen that $d = r \cos(\varphi - \pi/2) = r \sin \varphi$. By the Law of Sines, $$\frac{\sin\varphi}{a} = \frac{\sin\vartheta}{x}, \text{ so } d = \frac{ra}{x}\sin\vartheta = \frac{dx}{d\vartheta}.$$

Figure 3E:
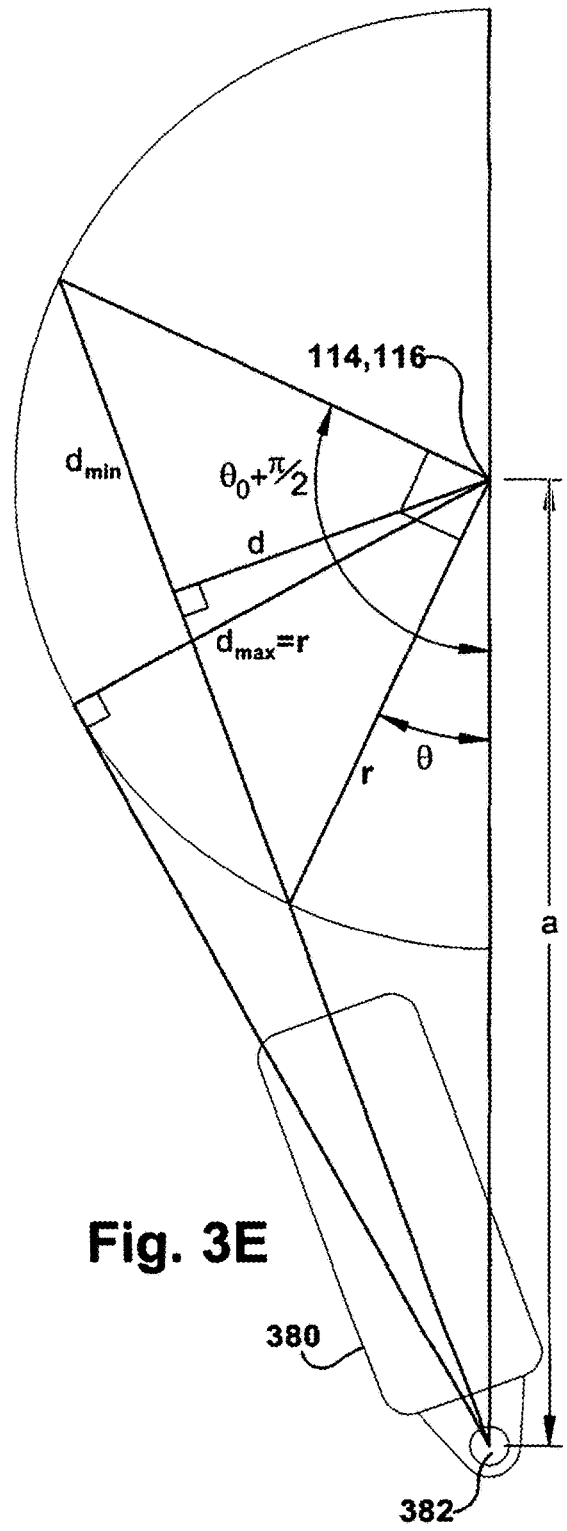
FIG. 3E is schematic representation of a crank actuated shaft with an actuator in both open and closed position, as well as at the intermediate position of maximum leverage.

Referring to FIG. 3E, actuator 380 is shown in its fully extended position. $d_{max}=r$ occurs near the middle of the stroke and $d_{min}$ occurs at one or both endpoints; maximized if at both. This done, $$d_{min} = \frac{r}{\sqrt{2}}, \text{ so } \frac{dx}{d\vartheta} = d$$

is $\sqrt{2}$ times larger near the middle of the stroke than at the endpoints and the actuation slope $$\frac{d\vartheta}{dx}$$

is $\sqrt{2}$ times bigger at the endpoints than near the middle of the stroke. This nonlinearity makes the flow coefficient curves less tractable as functions of stroke x rather than directly in terms of δ.

$$\text{Actuator stroke} = 2d = \frac{r}{\sqrt{2}}.$$

The shaft actuator pivot distance $$a = \sqrt{d_{min}^2 + (d_{min} + x_0)^2} = \sqrt{r^2 + \sqrt{2}\,rx_0 + x_0^2} \geq r, \geq x_0,$$

in which $x_0$ is the contracted actuator pivot—crank arm attachment length. The actuator pivot 382 is usually but not necessarily at the opposite end of the actuator from the extension rod. Those skilled in the art will appreciate that actuation may be accomplished hydraulically, pneumatically, electrically, thermally or magnetically.

Figure 3F:
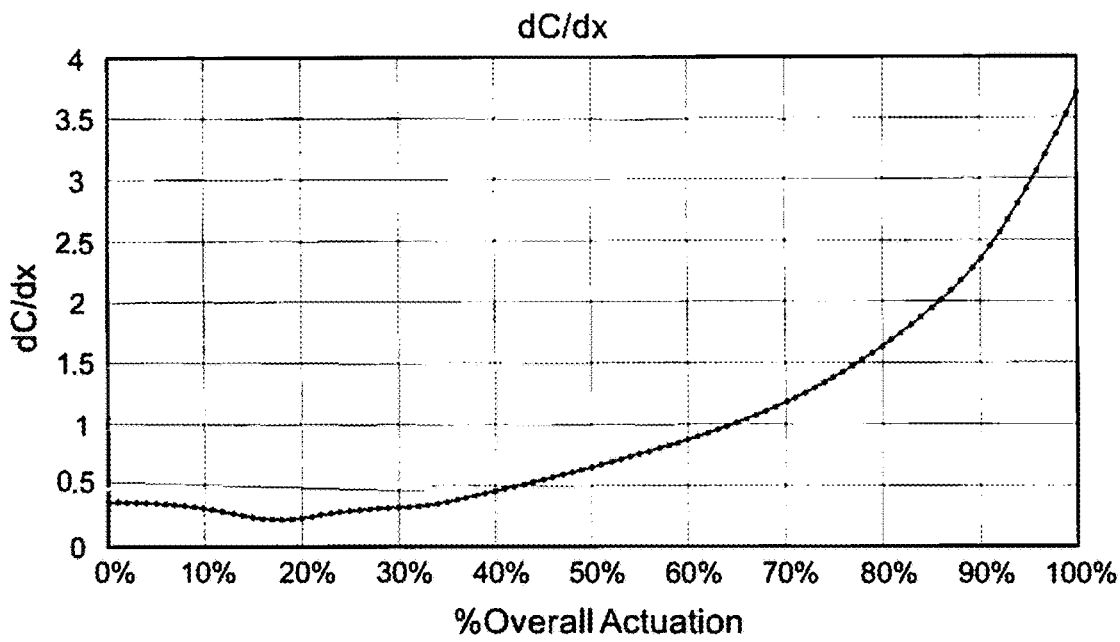
FIG. 3F is a graph representing the flow coefficient relative to actuator position when using cam races as disclosed herein.

Referring to FIG. 3F, a graph depicting the slope of a flow coefficient curve is represented under cam actuation. Compare this to FIG. 3H showing slope of the flow coefficient curve under any other form of actuation When dampers are partially opened, for example, between 0% and 30%, the slope is relatively constant, and as the dampers open further, the slope increases. The relatively constant actuation slope allows the controller to regulate the HVAV system more tightly with less overshoot and undershoot.

Figure 3G:
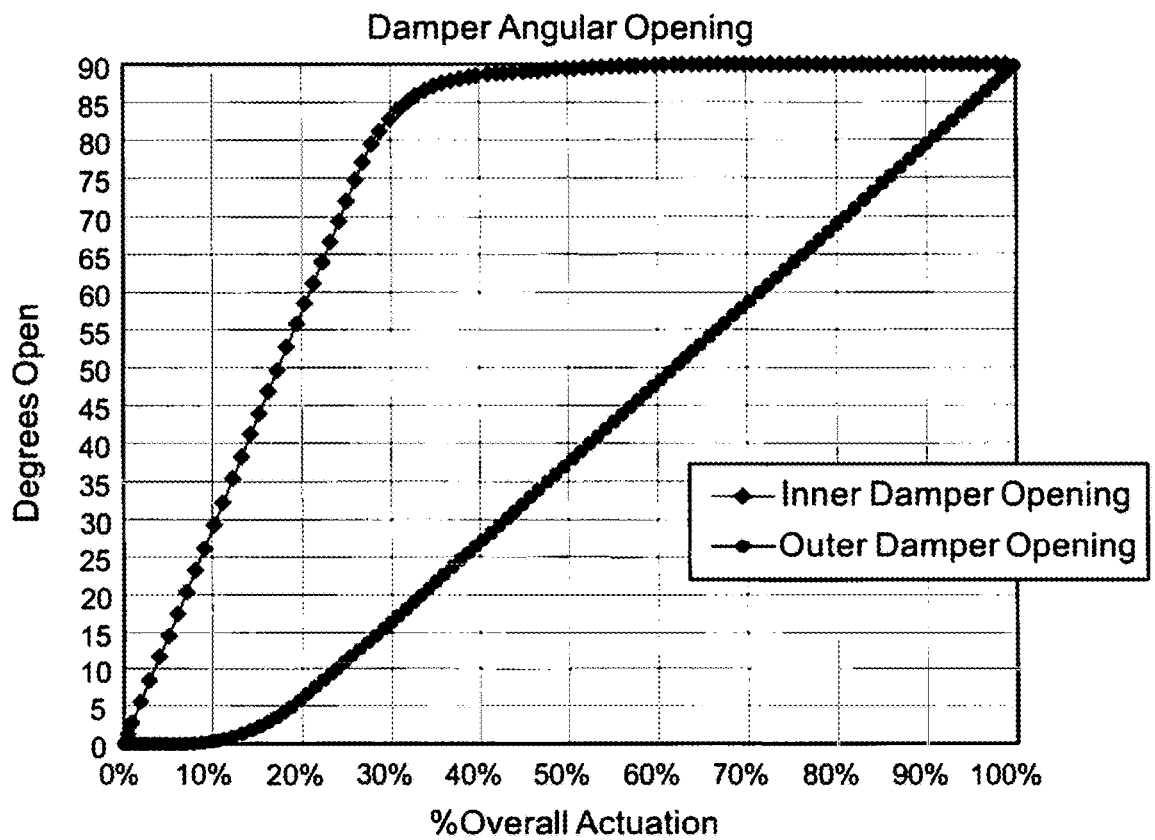
FIG. 3G is a graph representing the blade position relative to actuator position when using cam races as disclosed herein.
Figure 3H:
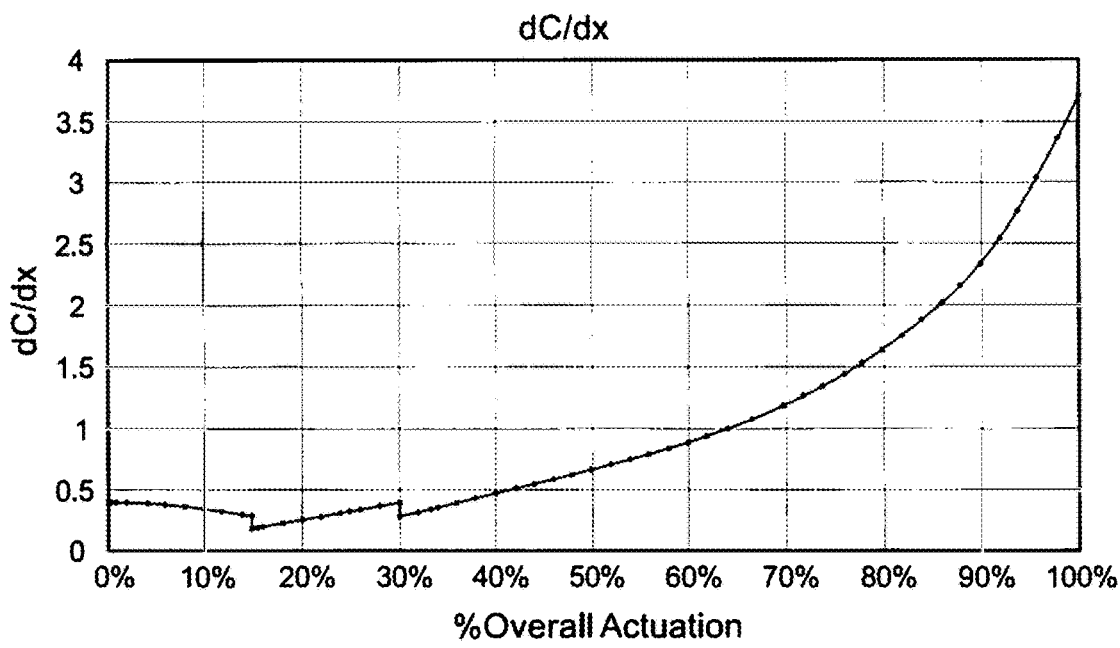
FIG. 3H is a graph representing the flow coefficient relative to actuator position when using other means of actuation.
Figure 3I:
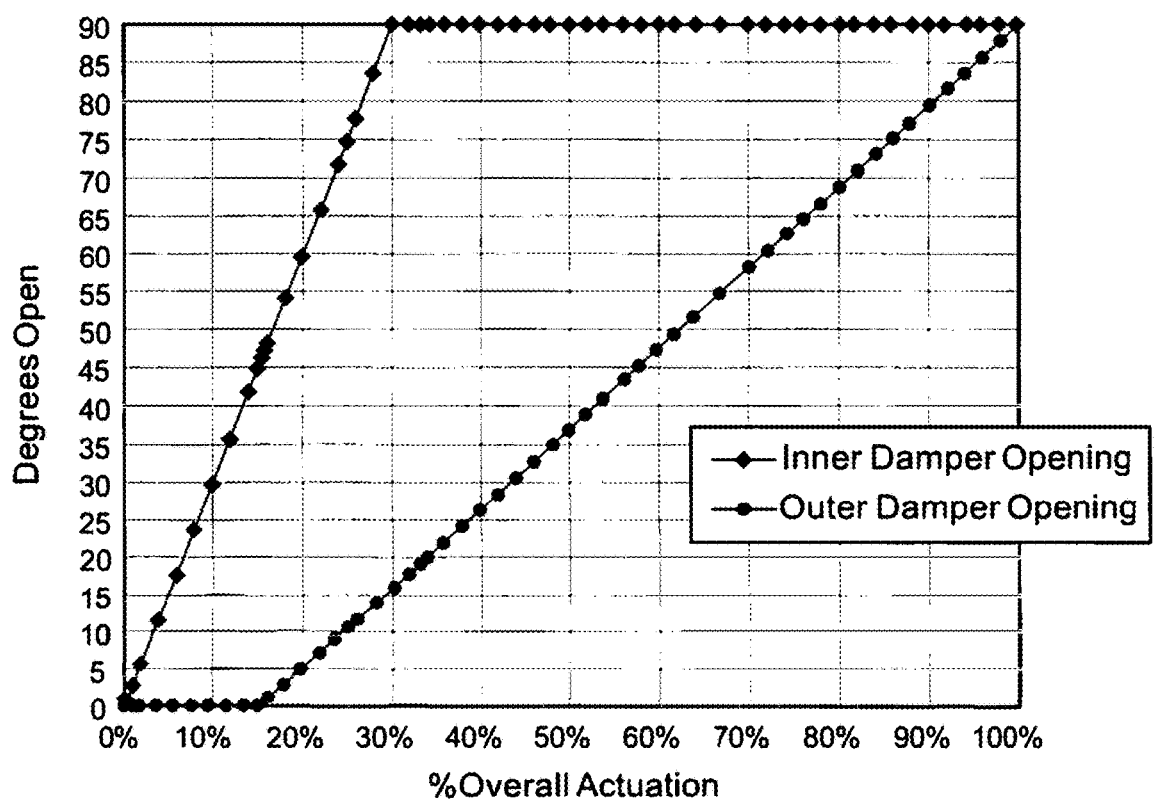
FIG. 3I is a graph representing the blade position relative to actuator position when using other means of actuation.

Referring now to FIGS. 3G and 3I, graphs depicting the underlying relationship between inner and outer damper positions and actuation position are represented, first under cam actuation, then under any other form of actuation. The corner rounding and its effect on FIG. 3G are obvious. Inner damper 112 begins opening immediately under actuation in this simplified model and continues to open linearly to approximately 30% actuation. Outer damper 108 begins opening at approximately 15% actuation and continues linearly throughout the actuation range. Low flow blade or inner damper 108 set opens linearly from 0% stroke through approximately 30% of the actuation cycle and is completely open thereafter, with the high flow blade or outer damper 112 opening at a slower rate starting at approximately 15% of the actuation cycle and opening linearly thereafter. This overlap ameliorates (1) a flat region between about 25% and 50% of the actuation cycle that would occur if the high flow blade does not begin opening until the low flow blade is completely open, both at approximately 50% as can be seen in FIG. in 3A, and (2) a very steep flow coefficient curve as the actuation cycle approaches 100%. As previously stated, a relatively constant flow coefficient curve is preferable. This in no way precludes other options, including nonlinear opening characteristics of general character.

Referring to the schematic diagrams in FIG. 4A, the outer and inner dampers 108,112 are attached to a gearbox 400 driven by the remaining gears of the actuator 402. A gearbox 400 can contain any number of gears to impart appropriate rotation to outer and inner dampers 108,112. In a particular embodiment shown in FIG. 4A, gearbox 400 includes an outer damper gear 404 that is adapted to receive the outer shaft 406 connected to outer damper 108; an inner damper gear 408 adapted to receive the inner shaft 410 of the inner damper 112, and A driving gear 412 that in turn rotates the outer damper gear 404 connected to the outer shaft 406, and subsequently the outer damper 108 in sequence with or overlapping actuation of the inner damper gear 408. In this way, the outer and inner dampers 108,112 can be rotated along the rotational axis R relative to one another by the actuator 402. Actuator 402 employs a shaft 416 that is attached to gearbox 400 and turns driving gear 412.

In a different aspect, the gearbox 400 may incorporate compound, non-concentric driving and driven gears that may allow stationary and rotating gears to coexist simultaneously. In a particular aspect, the compound gear may include a partially-toothed drive gear that is ganged with a partial disk that locks a concave surface ganged with the partially-toothed driven gear to prevent rotation while other shafts/gears are rotating. In an exemplary embodiment, the driving shaft may rotate 360 degrees per generally overlapping 90 degree rotations of both driven shafts, with the non-rotating shaft held fixed at each driving stage. Under these conditions the compound driven gears have twice the effective diameter of the compound driving gears. Further, clutches and brakes may be used alternatively or additionally to the locking mechanisms in the partially-toothed gears.

Still referring to FIG. 4A, in yet another embodiment, actuator assembly 104, gearbox 400, the damper assembly 102, and/or the LFFC 100 in general, is in operative communication with ancillary devices 164, such as an electromechanical or pneumatic device. Merely by way of example, LFFC 100 system or components is in communicative operation with another air distribution device. Such devices may be fan-powered devices, air handlers, chilled beams, VAV diffusers, unit ventilators, lights, fire or smoke dampers, control dampers, and pre-piped hydronics. Even further, ancillary devices 164 may comprise other controls, sensors, firmware, software, algorithms, air moving devices, fluid moving devices, motors, and variable frequency drives ("VFDs").Still further, the LFFC 100 may be in communication or equipped with additional linkages, gears or special actuators to turn additional concentric tubes, dampers, valves or rods to optimize air flow measurement performance. The LFFC 100 may further be in combination with at least one thermal transfer unit installed upstream of the device where the heat transfer surface may be much larger than the duct normal area, thereby allowing for at least one of a member selected from a group consisting of a lower air pressure drop, a lower water pressure drop, a localized heating and cooling, a re-setting chiller, a re-setting boiler, and a reduced pump horsepower.

Still referring to FIG. 4A, in a different aspect, the LFFC 100 may be further equipped or in communication with an ancillary device 164 that is a built-in occupancy sensor, wherein the sensor is selected from a group consisting of an infrared sensor, a motion sensor, an ultrasonic sensor, a temperature sensor, a humidity sensor, and a visual or infrared camera. The built-in occupancy sensor may detect if a service zone is occupied by persons, pets, activity, and the like, to adjust the flow of air thereto. For instance, if the zone is detected as vacant, the LFFC 100 may minimize, even shut off airflow to the room.

In still another embodiment, the actuator assembly 104 is further incorporated or in communication with a smart device 166 that may be local or remote from the actuator assembly 104. The communication may be a wireless communication with a remote controller that operates the actuator assembly 104. In another aspect, the smart device 166 includes an algorithm for flow measuring, orifice metering and/or actuator metering, and further controls the actuator assembly 104 depending on results obtained by the algorithm(s). In still another aspect, it is contemplated that the actuator assembly 104 outputs feedback, such as position feedback, from at least one of the first and second actuators 124,126 to a controller.

Referring to FIG. 4B, an embodiment of a rotary intermittent gearing arrangement 440 is generally shown. A driving gear 442 turning clockwise is engaging driven gear 444 that turns counterclockwise locking driven gear 444. It can be seen that driven gear 444 is in a locked position as a convex portion 446 of driving gear 444 engages a concave portion 448 of driven gear 444, including just the last point of contact with a final driven gear tooth's 446 proximal involute. Drive gear 442 incorporates a series of teeth 450 along 180 degrees of its circumference and convex portion 446 on the remaining circumference of drive gear 442. Driven gear 444 incorporates teeth 452 along 90 degrees of its circumference and concave portion 448 adjacent teeth 452. As shown in this embodiment, driven gear 444 rotates 90 degrees counterclockwise while drive gear 442 rotates 180 degrees clockwise. Drive gear 442 locks driven gear 444 for the remaining 180 degrees of rotation. The rotational axis 454 of driven gear 444 may incorporate a shaft that operatively attaches and actuates either inner damper 112 or outer damper 108. A drive shaft 456 connect drive gear 442 to an actuator. Gear ratios may be modified to provides various rotation rates and any desired degree of actuation overlap.

Figure 5A:
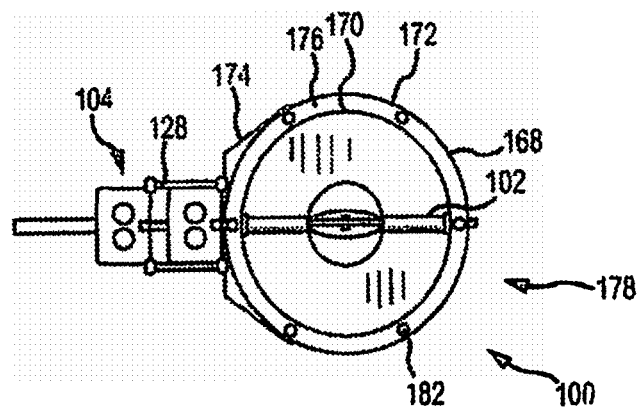
FIG. 5A is a front perspective view of the flow device of FIG. 1 within a housing.
Figures 5B, 5C:
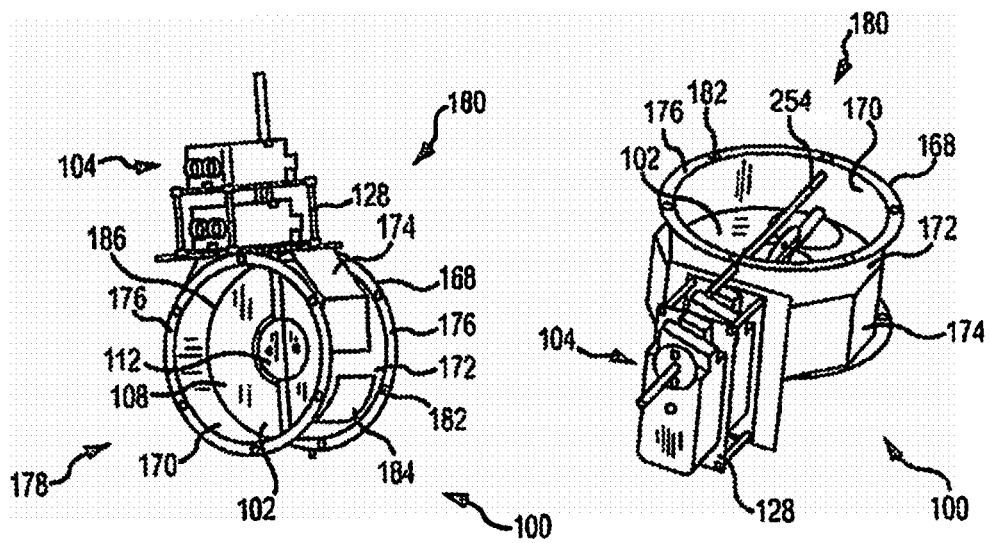
FIG. 5B is a front angled view of FIG. 5A.
FIG. 5C is a back angled view of FIG. 5A.

Turning now to FIGS. 5A-C, the LFFC 100 is shown mounted to a housing 168. The housing 168 may be any shape, such as cylindrical as shown, tubular, rectangular, and so on. 1. In a particular aspect, the flow pathway is defined by a hollow inner surface 170 configured to removably receive the damper assembly 102 therein and an opposing outer surface 172 configured to removably mount the actuator assembly 104 thereon. More particularly, the actuator assembly 104 and/or the stacking bracket 128 is removably secured to a mounting bracket 174 that removably engages the outer surface 172 of the housing 168. The mounting bracket 174 may be configured to wrap around a portion of the housing 168. In this way, the mounting bracket 174 may be shaped to the geometric form and measurements of the housing 168.

As further shown in FIGS. 5A-C, the housing 168 may include mounting flanges 176 at an upstream end 178 and/or a downstream end 180. The mounting flanges 176 may have a plurality of holes 182 for receiving a securing mechanism, e.g. screw, that further secures the housing 168 to a duct, such as a duct of an HVAC system. In that case, the fluid flow downstream of the damper assembly 102 or orifice plate may be discharged directly into an ambient space of a room. In another aspect, the housing 168 includes a door or plate 184 as shown in FIG. 5B. The door 184 covers an opening in the housing to permit permits access to the damper assembly 102 for maintenance, cleaning, and replacement of parts.

As shown in FIG. 5B, the inner surface 170 defining the flow pathway duct through the housing 168 may include a gasket 186, such as a ring-like compressible seal configured to compress and seal against the outer damper 108. Alternatively, or additionally, the gasket 186 can be embedded on at least one of the outer and inner dampers 108,112, such as in a region where the inner and outer dampers overlap, or an outer peripheral edge of the outer damper 108.

In reference back to FIG. 1, the overlap region may include an outer periphery 188 of the inner damper 112 and an edge of the outer damper 108 defining the central opening 110. In yet another embodiment, the gasket 186 may be provided on an air valve stop, such as a metal ring above an open damper area that provides a tight positive pressure seal when the damper is fully shut.

Figure 6A:
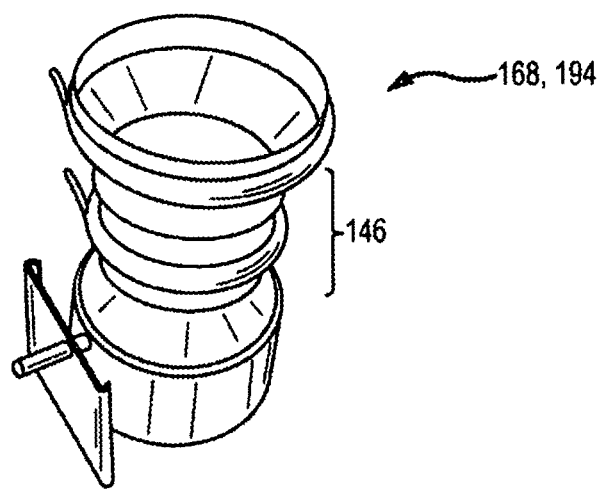
FIG. 6A is an angled perspective view of a Venturi valve having the flow device of FIG. 1.
Figure 6B:
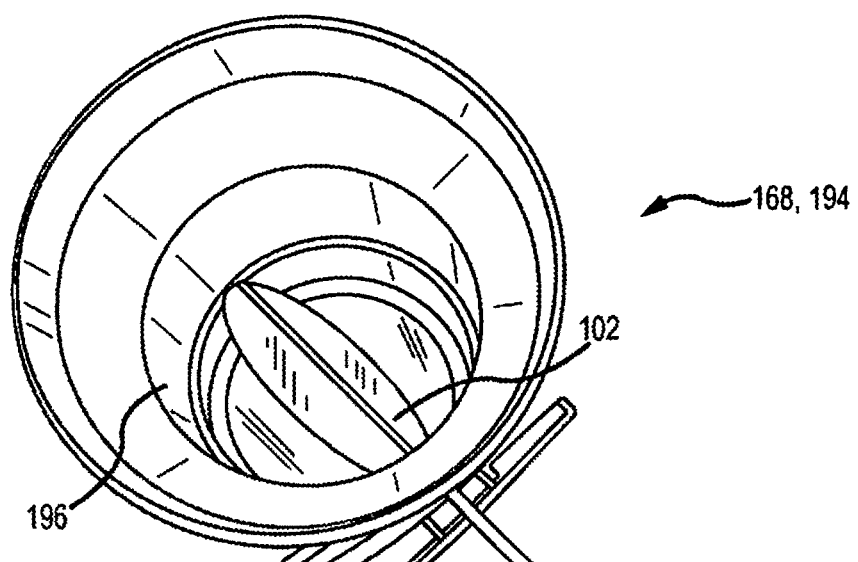
FIG. 6B is a front angled view of FIG. 6A.

Turning now to FIGS. 6A-B, the housing 168 may form a venturi valve 194 that defines a constriction section 196 for the flow pathway. The damper assembly 102 may be disposed in the constriction section 196. In one embodiment, it is contemplated that a plurality of venturi valves of different sizes are ganged together in series upstream of the damper assembly 102 to simulate multiple variable venturi flow measurement. In still another embodiment, it is contemplated that the housing is a double-duct housing having two or more different sized inner and outer dampers to replicate a two-stage damper. In still another embodiment, the LFFC 100 is combined with 5 to 180 degree symmetrical elbows defining at least a portion of the flow pathway upstream or downstream of the damper assembly 102, wherein the elbows or angled walls projecting into the flow pathway to adapt the device to tight space constraints. For instance, the LFFC 100 may be installed with aerodynamically sound 45 or 90 degree elbows that can be oriented at any angle to fit tight space constraints. It is contemplated that such elbows are aerodynamically balanced to maintain proper airflow and optimize the LFFC performance in confined space constraints.

Still, in other embodiments, the flow device may be housed in or in communication with a wireless or hardwired variable air volume ("VAV") diffuser, a grill diffuser, and/or a linear diffuser. In another aspect embodiment, the HVAC diffuser having the LFFC 100 or the LFFC 100 itself further comprises an all-inclusive light, such as a lighting device integrated with and/or on the LFFC 100 to light a surrounding room or other environment. The all-inclusive light and/or an HVAC diffuser may be controlled by one onboard controller, such as the LFFC controller described below. Merely by way of example, the all-inclusive light may be one or more LED lights.

Referring back to FIG. 5C, a upstream sensor 254, such as an upstream tap or Pitot tube may be placed in the flow stream. A downstream sensor 250 may be placed in a flow wake or still air portion of the flow pathway, preferably within 1" downstream of the concentric shafts. In yet another embodiment, it is contemplated that a shaft of the damper assembly 102, such as the outer or inner shaft 114,116, provides or functions as an upstream and/or a downstream flow measuring device or sensor. In some embodiments, it is contemplated that the downstream or second sensor 250 senses a static pressure of the fluid flow. A total pressure sensor could be used downstream, to the detriment of proper functioning of the device.

Turning now to FIGS. 7A-D, the damper assembly 102 is shown disposed in various housings or ducts with upstream and downstream sensors. In one aspect, the housings or ducts may be existing housings or ducts and the damper assembly 102, and/or LFFC 100, is retrofit installed into the existing structures. FIGS. 7A-C illustrate a circular, cylindrical duct 252 with the two-stage damper assembly 102 disposed therein. The outer and inner shafts 114,116 may extend out of the duct 252 to an actuator assembly 104 (not shown). The downstream sensor 250 is disposed at the downstream end 180 of the cylindrical duct 252 adjacent to the shafts 114,116. As mentioned previously, the shafts 114,116 may be attached to the downstream sensor 250 and/or provide downstream pressure sensing. In some aspects, the downstream sensor 250 is referred to as a second sensor. A first or upstream sensor 254 is positioned in the flow pathway at the upstream end 178. It is contemplated that the first and second sensors 254,250 are used together to obtain the required pressure differential. The upstream sensor 254 may measure a total or, with some loss of sensitivity, a static pressure of the fluid flow. In some embodiments, it is contemplated that the second sensor 250 provides a little sub-SP amplification. The sensor 254 may be a Pitot tube, orifice ring, or other pressure sensing device. 250 is a straightforward SP tap.

Still in reference to FIG. 7C, in yet another embodiment, an orifice ring 256 is installed upstream of the damper assembly 102 to impart an upstream stagnation circle from which total pressure may be tapped. For the circular duct 252, the orifice ring 256 may comprise 20 an orifice plate having an opening diameter that defines an area $A_{op}$, whereby $A_{op}/A_d$ is approximately 0.8 or 0.9. In another aspect, the gasket 186 may be installed on the cylindrical duct 252 and/or in the damper assembly 102. Still, in another aspect, it is contemplated that a plurality of damper assemblies, having the same or different stages, may be installed in series upstream or downstream through the flow pathway. In that case, a pressure differential is determined between the upstream and downstream sensors.

FIG. 7D illustrates a rectangular duct 258, whereby the damper assembly 102 is shaped to fit the rectangular duct 258. More particularly, a rectangular outer damper 108*r* defines the central opening 110 that receives the inner damper 112. It is contemplated that the orifice plate defined by the damper assembly 102 increases a pressure of the fluid flow for the purpose of measuring and controlling fluid flow or mass fluid volume. For instance, the orifice plate defines the variable opening 106. The variable opening 106 splits the fluid flow into multiple streams for the purposes of increasing velocity pressure or recovering velocity pressure for a more accurate measurement. Merely by way of example, a 10 inch round LFFC 100 can measure accurately down to about 5 FPM. In a different aspect, the LFFC 100 is in operative communication with a duct or plenum that splits fluid flow into multiple streams, such as a Y-shaped duct.

In yet another aspect, the LFFC 100 may be configured as a multiple outlet plenum with two or more fluid device assemblies, wherein the multiple outlet plenum permits multiple accurate room or zone control of multiple rooms or zones simultaneously with at least member selected from a group consisting of a single self-contained BTUH generating device, a multiple thermal transfer device, an air to air HVAC system, and a fluid based system. Merely by way of example, the BTUH generating device delivers heat energy to controlled rooms or zones. One BTUH device may be found in U.S. patent application Ser. No. 13/073,809 filed Mar. 28, 2011 titled "MODULAR BUILDING UTILITIES SYSTEMS AND METHODS", the contents of which is fully incorporated in its entirety herein.

LFFC Controller

Figure 8:
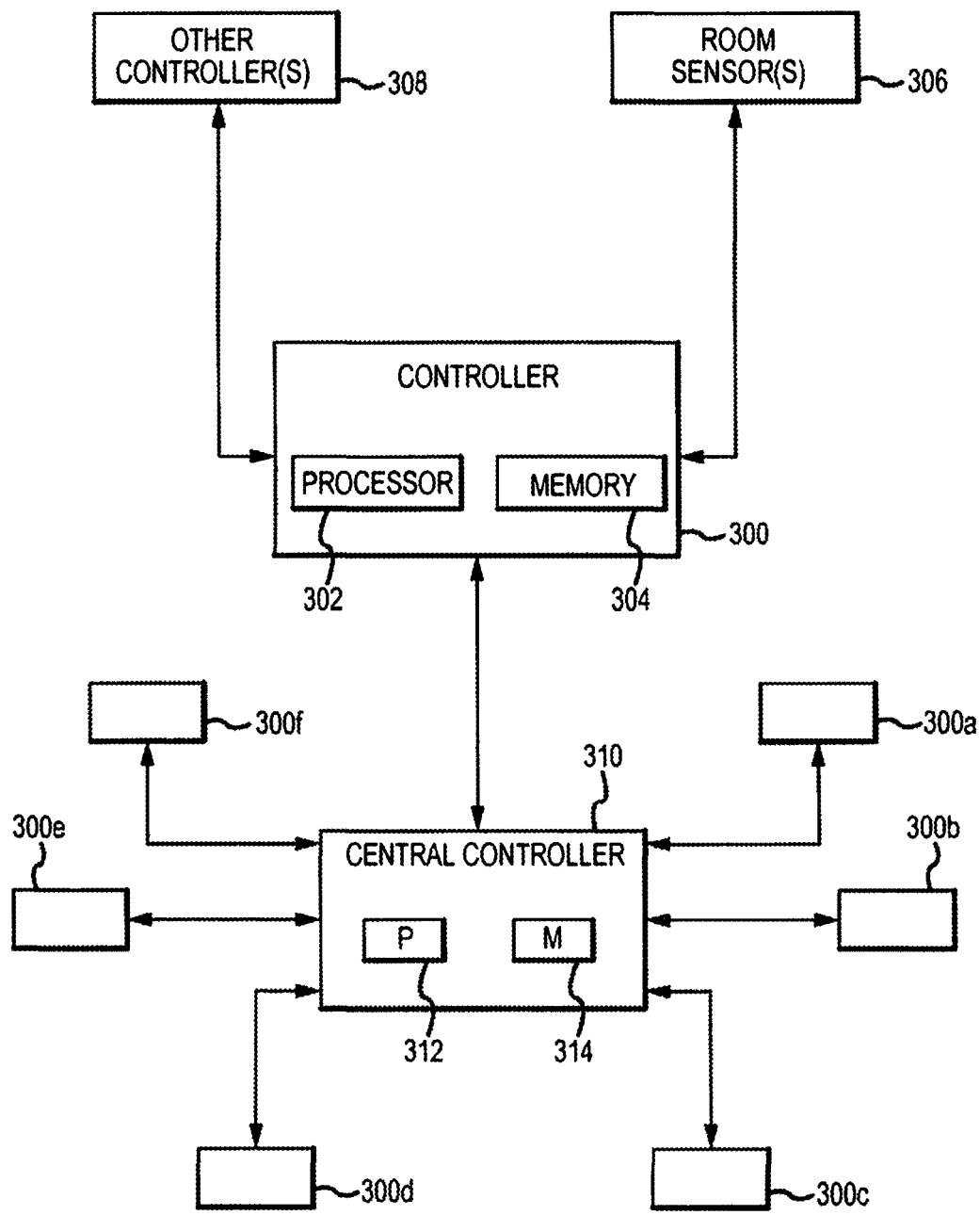
FIG. 8 is a schematic diagram of a controller and network according to various embodiments of the present invention.

Turning now to FIG. 8, the LFFC 100 may be in operative communication with a hardwired or wireless controller 300 that is local, onboard, or remote from the LFFC 100. The controller 300 comprises a processor 302 and a memory 304 communicatively coupled with and readable by the processor 302 and having stored therein processor-readable instructions that, when executed by the processor 302, cause the processor 302 to perform one or more steps. It is contemplated that the processor-readable instructions are programmed for optimal performance, acoustics, and energy of the controller and the controlled damper assembly. In a different aspect, the processor-readable instructions comprise an algorithm based on calculating fluid through orifices. The algorithm may be based on at least one of an orifice metering device, a fluid sensing element, an actuator resolution, and a transducer.

In some embodiments, the controller 300 is a single microelectronic controller in communication with a plurality of room sensors 306 in a plurality of room zones to control the plurality of room zones. In some embodiments, it is contemplated that the controller 300 operates the LFFC 100 such that the HVAC system meets prevailing energy codes, such as one or more of ASHRAE Standard 55-2010, ASHRAE Standard 62.1-2010, ASHRAE Standard 90.1-2010, ASHRAE Standard 62.2-2010, and ASHRAE Standard 90.1-2010.

For instance, the controller 300 may determine a pressure differential between the first sensor 254 at the second sensor 250. Further, the controller 300 may determine a position of the outer and inner dampers 108,112 based on a position feedback received from the actuator assembly 104. Even further, the controller 300 regulates or controls the variable opening 106 based on the pressure differential and the position of the outer and inner dampers 108,112. In some embodiments, the controller 300 determines a new position setting for the damper assembly 102, such as a new angle of rotation for the dampers, based on a flow rate. Thereafter, the controller 300 may signal the actuator assembly 104 to adjust the damper assembly 102 to the new position. In other embodiments, the controller regulates the variable opening 106 based in part on a turndown ratio defined by a maximum volume of fluid flow through the variable opening 106 to a minimum volume of controllable fluid flow through the variable opening 106, wherein the turndown ratio is a high turndown ratio that is greater than 10:1. More preferably, the turndown ratio is greater than 100:1 or 250:1. With a high turndown ratio, the LFFC 100 may be self-commissioning.

In some aspects, self-commissioning allows for the LFFC to measure fluid flows within a system and set a damper position accurately, such as a damper extreme position, over any flow range required, without a need for typical on site commissioning, for instance by a professional balancer. Further, it is contemplated that self-commissioning permits the LFFC to adjust any settings, such as minimum and maximum flows, on the spot according to instructions sent from a network connection to the LFFC controller. For instance, an engineer may instruct the LFFC controller through their mobile phone to alter settings.

Still, in another embodiment, the controller 300 determines a flow coefficient $M_F$ based on a ratio of the variable opening area $A_o$ to a flow pathway area, which may be a duct area $A_d$. It is contemplated that the flow coefficient $M_F$ discussed herein is therefore a non-constant variable and $0 \leq M_F \leq 1$. The flow coefficient $M_F$ may be based on the position of the outer and inner dampers 108,112 and/or determined based on a calculation or a look-up table comprising a plurality of flow coefficients $M_F$ that were previously determined from testing, such as empirical data. In still another aspect, it is contemplated that the controller 300 automatically calculates the flow coefficient $M_F$ based on the variable opening area $A_O$. The flow coefficient $M_F$ calculation may be performed with a turndown ratio of 10:1 or greater.

In a particular aspect, a table of measured flow coefficients versus percentage open may be provided for each LFFC-based configuration and stored in the memory 304 of the controller 300. The table may be based particularly on the upstream sensor 254 being used. It is contemplated that if an actuator with significant hysteresis is mandated, no single table can be used unless the hysteresis is uniform and predictable, so that actual damper position can be calculated based on historical data, such as data collected from laboratory test. Alternatively, a theoretical formula for calculating the flow coefficient $M_F$ coefficient provided and implemented by the controller. The theoretical formula may include the Flow and Discharge Coefficient Correlations $$C_F = \frac{A_c}{A_o} = \frac{c}{1-(1-c)\left(\frac{A_o}{A_d}\right)^2}$$

for a flow coefficient $M_F$ in combination with an upstream total pressure sensor, or $$C_d = \frac{c}{\sqrt{1 - (1-c)^2 \left(\frac{A_o}{A_d}\right)^2}}$$

for flow coefficient $M_F$ utilized in combination with an upstream static pressure sensor.

In another aspect, the controller 300 may determine by calculation or a lookup table the flow rate based on the pressure differential and the flow coefficient $M_F$. The flow rate may be determined based on multiplying the flow coefficient $M_F$ with a square root of the determined pressure differential and then calibrated to read mass fluid flows in desirable engineering units. In a different aspect, the controller 300 determines a flow rate further based on a flow coefficient that is applied at a maximum fluid flow to determine a maximum flow rate for use in calibration, further wherein the flow coefficient includes a constant factor. The controller may further compare the flow rate to a target flow F or a desired temperature setting and/or operate the actuator assembly to maintain or change the variable opening area $A_o$ defined by the damper assembly 102 based on the comparison. The target flow F may be one of a plurality of target flow F's stored in the memory 304 or communicated to the controller 300 based on input from a user or other wireless/hardwired system.

Still referring to FIG. 8, in yet another embodiment, the controller 300 outputs at least one of the pressure differential, the variable opening area $A_o$, the flow coefficient $M_F$, and the flow rate to an external controller or another controller 308. The controller 300 or 308 may be a cloud-based control computing and wireless control components. In another aspect, the controller 300 is further monitored and controlled by BAS software of a BAS system, which may be represented as the other controller 308. For instance, the controller 300 balances the damper assembly 102 in real time from a front end software building automation system (BAS). Such real-time balancing data is displayed at a front end software BAS system, a controller installed on self-contained compressor, a fluid moving device, and a room air discharge device to allow the moving device to be controlled and interface with another 15 equipment controller. In another aspect, the controller 300 provides real-time turn down capabilities of a fluid moving device in operative communication with the damper assembly 102.

In reference again to FIG. 8, the controller 300 may output the flow rate to a central controller 310 at a central system that supplies the fluid flow to the flow device, LFFC 100. The controller 300 may further output the pressure differential to the central controller 310 to control a variable frequency driver or inverter of the central system, such as an air flow movement device placed downstream or upstream of the damper assembly 102. More particularly, the controller 300 may operate a motor of the air flow movement device based on the pressure differential. In some embodiments, the air flow movement device comprises one or more fans. In a further aspect, the controller 300 may communicate to the central system's central controller 310 that a limit of a control range has been reached, e.g., the damper assembly 102 is wide open, and/or the damper assembly 102 is out of the control range, e.g., the damper assembly 102 is wide open and unsatisfied.

Still referring to FIG. 8, the central controller 310 may be a central controls system for use in an HVAC system. The central controller 310 may comprise a central processor 312 and a central memory 314 communicatively coupled with and readable by the central processor 312 and having stored therein processor-readable instructions that, when executed by the central 312 processor, cause the central processor 312 to perform a plurality of steps. Merely by way of example, the central controller 310 may receive and send data to and from a plurality of flow controllers generally indicated as 300a-f. Each of the plurality of flow controllers 300a-f may operate a flow device, such as an LFFC 100, positioned remotely from the central controller 310. The data received by the central controller 310 may comprise one or more of a pressure differential measured at each of the plurality of flow controllers 300a-f, a variable opening area of a flow pathway provided by each flow device, a flow coefficient $M_F$ based on square of a ratio of the variable opening area to a flow pathway area at each of the plurality of flow devices, wherein the flow coefficient $M_F$ is a non-constant coefficient and $0 \geq M_F \leq 1$, and a flow rate based on the pressure differential and the flow coefficient $M_F$.

Furthermore, the central controller 310 may send operational parameters to each of the plurality of flow controllers 300a-f independently. The central controller 310 may also adjust a volume of a supply fluid flow to at least a portion of the plurality of flow devices based on the data received. Further, it is contemplated that the central system may operate such that at all times, at least one LFFC 100 reports to it that a limit of the control range is reached; i.e. its damper is wide open; and no LFFC 100 reports that it cannot meet its target, generally flow rate or temperature. If an LFFC 100 reports that cannot meet its target, the central system may increase fan output if possible. If no LFFC 100 is at a limit or out of the control range, the central system may feather back fluid flow supply. In a different aspect, if at startup, the central system operates with an LFFC 100 wide open and the plurality of LFFC's 100 report operation out of the control range, then the central system may be preprogrammed to temporarily reset selected, less essential delivery zones/rooms to receive a smaller portion of the total supply flow. For instance, preprogramming may include temporarily resetting certain remote temperature set points. Such normal set points may be gradually restored until all LFFC 100's report satisfaction; i.e., targets met, and at least one LFFC 100 reports operation at a limit of the control range; i.e., damper wide open. Normal set points may be thus restored and supply flow may be controlled by the fans. In a further aspect, the central controller 310 may be programmed to feather back rooms or zones that are not expected to be occupied and/or to precondition certain rooms expected to be occupied.

Figure 9:
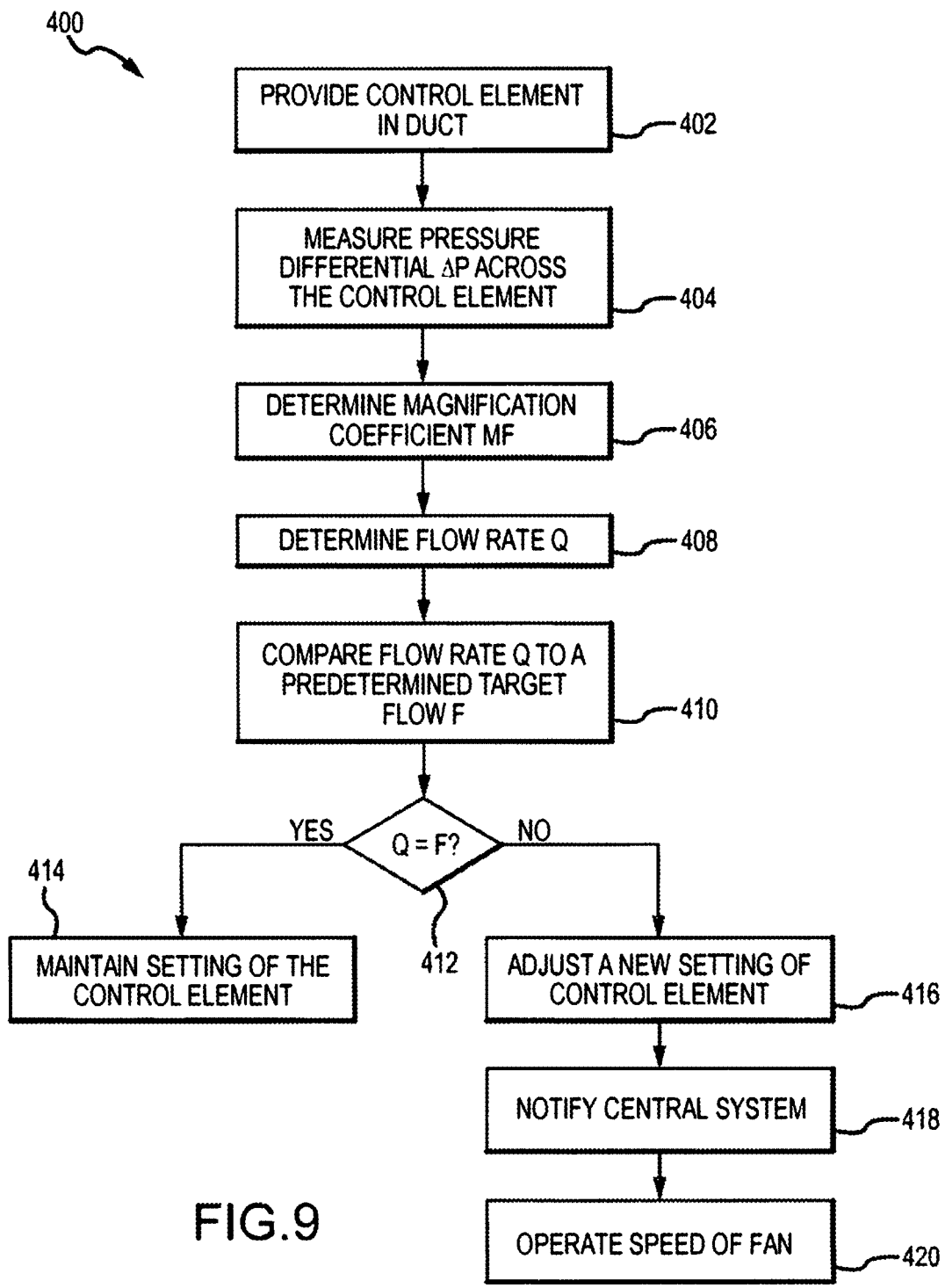
FIG. 9 is a flow diagram of a method according to various embodiments of the present invention.

Turning now to FIG. 9, a method 400 for controlling fluid flow through a duct defining a cross-sectional area $A_d$ is shown. The method includes the step of providing 402 a control element in the duct, whereby the control element defines a variable opening area $A_o$ that amplifies a velocity pressure of the fluid flow through the control element. The control element may refer to the damper assembly 102 described above. In some embodiments, the control element is a thin blade control element and the pressure differential ΔP is measured across the blade to enhance readings. The method further includes measuring 404 a pressure differential ΔP across the control element, determining 406 a flow coefficient $M_F$ based on a ratio of $A_o/A_d$, and determining 408 a flow rate Q based on a product of the flow coefficient $M_F$, the duct area $A_d$, and a square root of the pressure differential ΔP. Further, the method may include comparing 410 the flow rate Q to a predetermined target flow F to determine 412 if Q=F. If Q=F, the method includes the step of maintaining 414 a setting of the control element defining the variable opening area $A_o$. If Q t F, the method includes at least one of the steps of adjusting 416 the setting of the control element to a new setting defining the variable opening area $A_o$, notifying 418 a central controller of a central system that supplies the fluid flow to the control element to increase or reduce the fluid flow, and/or operating 420 a speed of a fan disposed upstream or downstream of the control element based on the pressure differential ΔP, damper % open, and/or satisfaction of temperature or ventilation requirements. In a different aspect, the central controller is a central zone or room controller that adds fluid flow into and/or out of a controlled room or zone, and/or laboratory. In this way, two LFFC 100 devices (and/or their respective controllers) may be paired, providing an "in" device and an "out" device to provide a tracking pair for CFM tracking or, much more effectively, controlling room pressurization directly. In another aspect, a single controller may controller one or more LFFC 100 devices.

In another aspect, the method may include the steps of checking if the predetermined target flow F has changed, and/or signaling an actuator to adjust the control element to the new setting. Still, the method may include one or more steps of providing a plurality of control elements in series or in parallel in the flow pathway, measuring the pressure differential ΔP across the plurality of control elements, and determining the flow coefficient $M_F$ based on the variable opening area $A_o$ of the control element that is furthest downstream in the plurality of control elements. In still another embodiment, the method includes the step of enhancing or magnifying the measured pressure differential ΔP across the control element and calculating the flow rate Q based on the enhanced or magnified pressure differential ΔP along with the flow coefficient to achieve a precise flow rate Q.

Figure 10A:
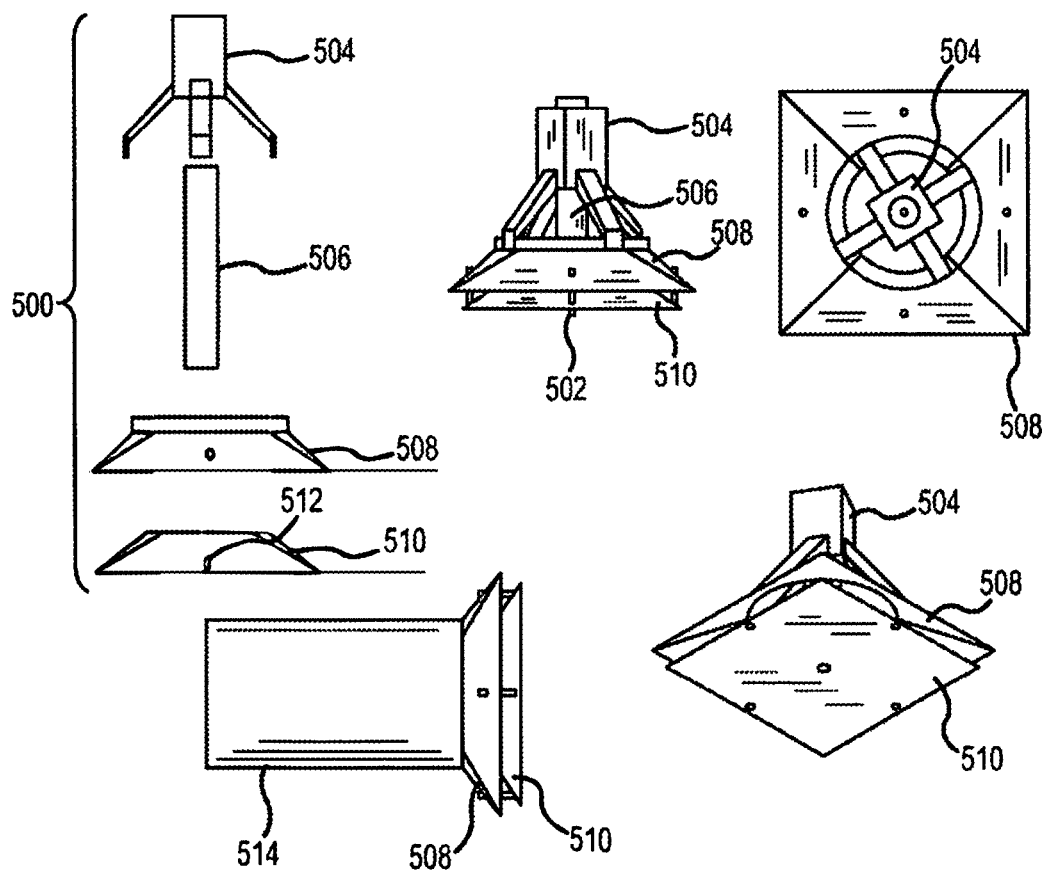
FIG. 10A illustrates an SBAD adjustable diffuser with temperature sensing, according to various embodiments of the present invention.

Turning now to FIG. 10A, the LFFC 100 may be in operative communication or constituted as a smart self-balancing air distribution (SBAD) adjustable diffuser 500. The diffuser 500 may have a temperature sensor 502, such as a thermostat. The diffuser 500 may further comprise a motor 504 operatively attached to a drive screw 506, that is further operatively connected with a plaque diffuser body 508 and an adjustable diffuser 510. In particular, the adjustable diffuser may provide a recess 512 for receiving an end of the drive screw 506 therein. It is contemplated that the diffuser 500 is inserted in a ductwork 514 tubing, such that the motor 504 and drive screw 506 are housed within the ductwork 514. The plaque diffuser body 508 and the adjustable diffuser 510 extend out of the ductwork 514 and may extend into a room. In operation, it is contemplated that the motor 504 moves the adjustable diffuser 510 toward and/or away from the plaque diffuser body 508 to control an amount of airflow from the ductwork 514, 10 through the plaque diffuser body 508 and out around the adjustable diffuser 510. For instance, the motor 504 may be regulated by a sensed temperature of the temperature sensor 502.

Figure 10B:
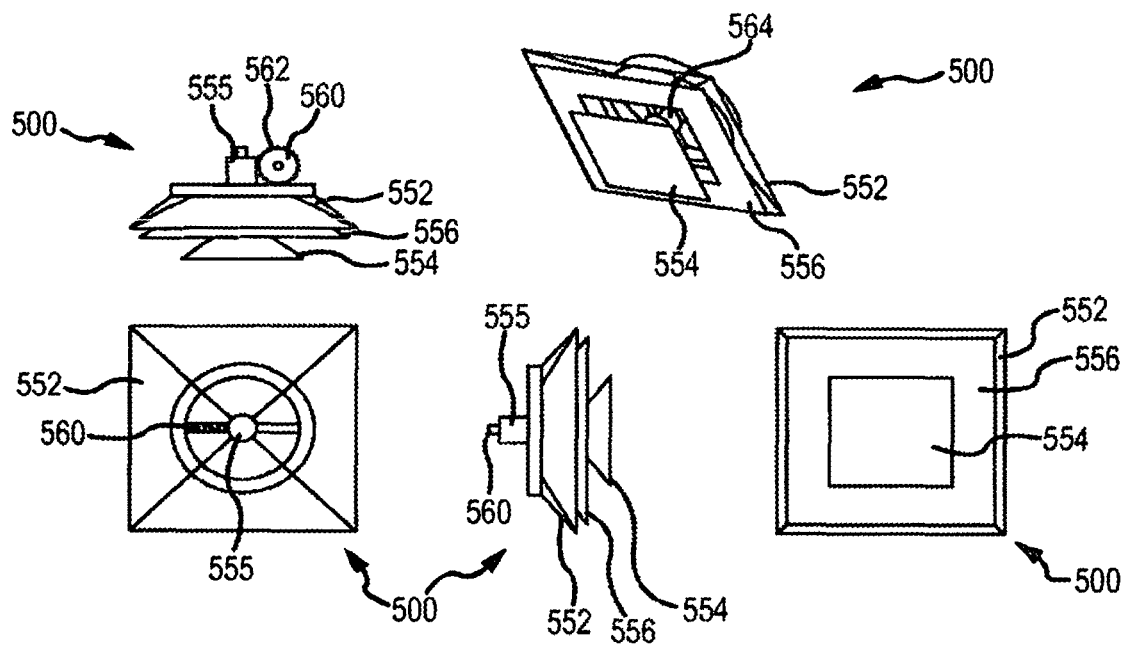
FIG. 10B illustrates an SBAD motorized diffuser.

Turning now to FIG. 10B, a motorized SBAD diffuser variant 550 is shown. The diffuser 550 may be similar to the diffuser 500 except for the differences noted herein. In particular, the motorized diffuser 550 comprises a plaque body 552, an adjustable diffuser 554, and an intermediary diffuser 556 disposed there between. The adjustable diffuser 554 and/or the intermediary diffuser 556 are adapted to move toward or away from one another, and/or from the plaque body 552. The movement may be effected by vertical movement of a drive screw 558 that is connected to the diffuser components 552,554,556. In particular, a motor 560 having a toothed ring 562 may engaged corresponding teeth 555 provided on the drive screw 558. In a particular aspect, the intermediary diffuser 556 provides an intermediary opening 564 that may be sized corresponding to the geometric shape and size of the adjustable diffuser 554, such that the adjustable diffuser 554 may extend or overlap with the opening 564. As shown in FIG. 10B, the plaque body 552, adjustable diffuser 554, and intermediary diffuser 556 are rectangular, although any shape and size, or combinations thereof, may be contemplated.

Figure 10C:
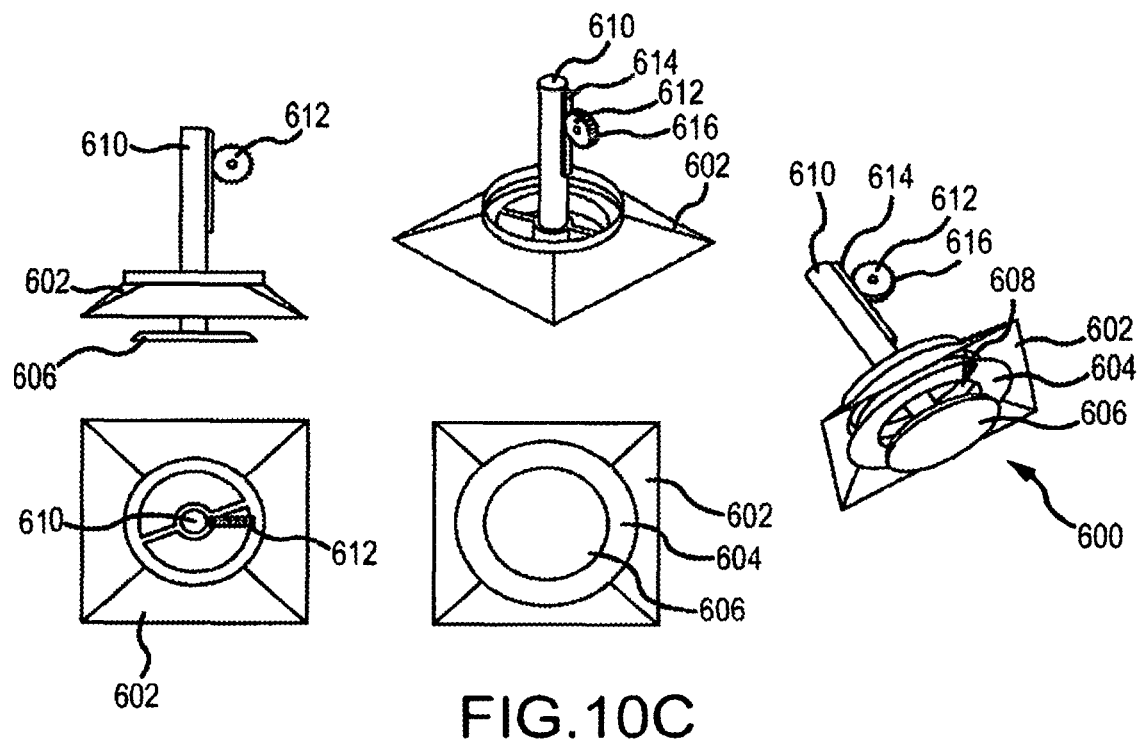
FIG. 10C illustrate an SBAD diffuser damper.

Turning now to FIG. 10C, a SBAD diffuser damper assembly 600 is illustrated. The diffuser damper assembly 600 may be similar to the motorized SBAD diffuser 550 and the diffuser 500 described above, except for the differences noted herein. The diffuser damper assembly 600 comprises a plaque body 602, an outer damper 604, and an inner damper 606. In a particular aspect, the outer damper 604 is ring-shaped with a damper opening 608 defined centrally. The central opening 608 may be circular or otherwise and shaped corresponding to the geometric form of the inner damper 606, which is also circular as shown in FIG. 10C. A drive shaft 610 is operatively connected with a motor 612 by a toothed column 614 disposed along the drive shaft 610 that engages a toothed ring 616 of the motor 612. In a particular aspect, the motor 612 rotates to move the drive shaft 610 in a linear fashion, so that the outer damper 604 and/or the inner damper 606 are moved toward or away from the plaque body 602.

Figure 11:
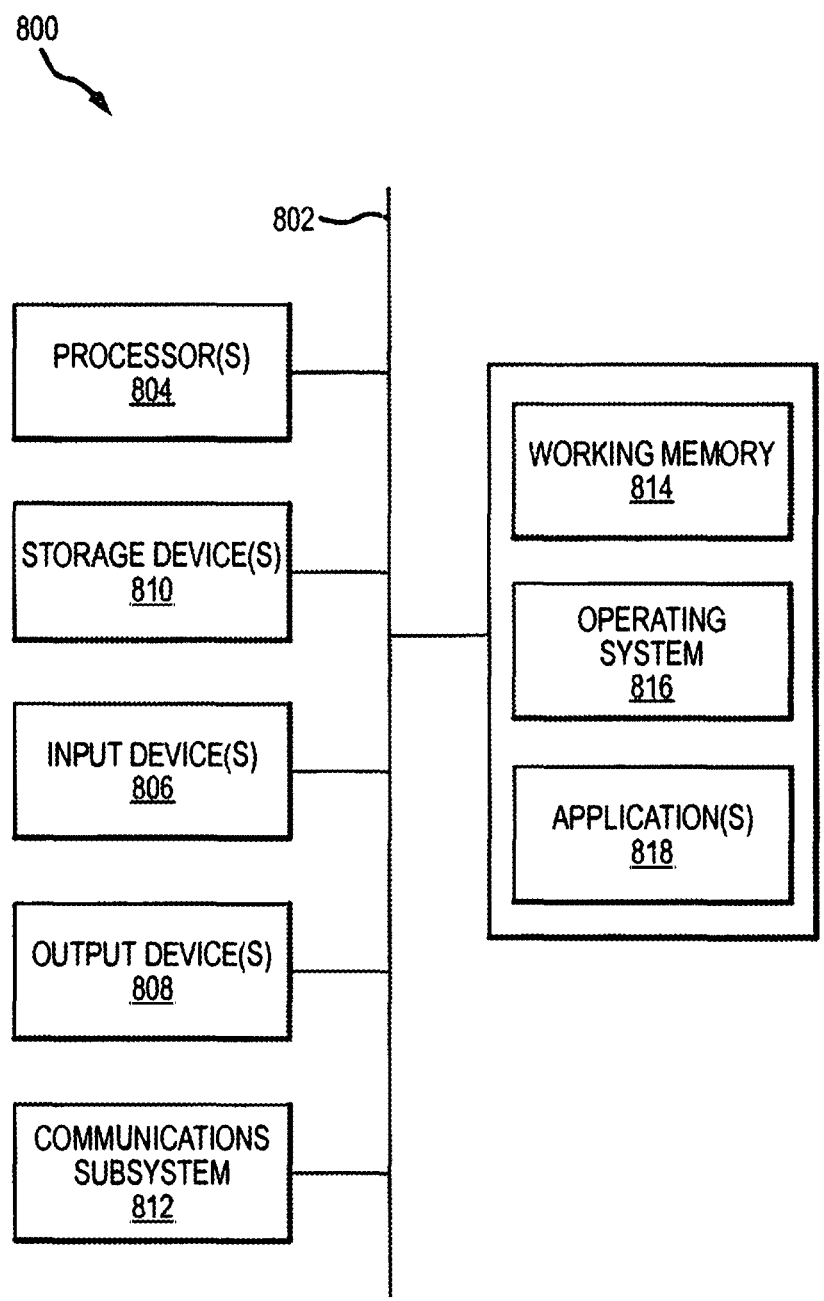
FIG. 11 shows a schematic diagram of a controller or computer device.

FIG. 11 shows an example computer system or device 800, such as the controller 300, in accordance with the disclosure. An example of a computer system or device includes an enterprise server, blade server, desktop computer, laptop computer, tablet computer, personal data assistant, smartphone, and/or any other type of machine configured for performing calculations. Any particular one of the previously-described computing devices may be wholly or at least partially configured to exhibit features similar to the computer system 800, such as any of the respective elements of at least FIG. 8. In this manner, any of one or more of the respective elements of at least FIG. 8 may be configured to perform and/or include instructions that, when executed, perform the method of FIG. 9 and/or other instructions disclosed herein. Still further, any of one or more of the respective elements of at least FIG. 8 may be configured to perform and/or include instructions that, when executed, instantiate and implement functionality of the controller 300, other controllers 308, and/or the central controller 310.

The computer device 800 is shown comprising hardware elements that may be electrically coupled via a bus 802 (or may otherwise be in communication, as appropriate). The hardware elements may include a processing unit with one or more processors 804, including without limitation one or more general-purpose processors and/or one or more special-purpose processors (such as digital signal processing chips, graphics acceleration processors, and/or the like); one or more input devices 806, which may include without limitation a remote control, a mouse, a keyboard, and/or the like; and one or more output devices 808, which may include without limitation a presentation device (e.g., controller screen), a printer, and/or the like.

The computer system 800 may further include (and/or be in communication with) one or more non-transitory storage devices 810, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 800 might also include a communications subsystem 812, which may include without limitation a modem, a network card (wireless and/or wired), an infrared communication device, a wireless communication device and/or a chipset such as a Bluetooth device, 802.11 device, WiFi or LiFi device, WiMax device, cellular communication facilities such as GSM (Global System for Mobile Communications), W-CDMA (Wideband Code Division Multiple Access), LTE (Long Term Evolution), etc., and/or the like. The communications subsystem 812 may permit data to be exchanged with a network (such as the network described below, to name one example), other computer systems, controllers, and/or any other devices described herein. In many embodiments, the computer system 800 will further comprise a working memory 814, which may include a random access memory and/or a read-only memory device, as described above.

The computer device 800 also may comprise software elements, shown as being currently located within the working memory 814, including an operating system 816, device drivers, executable libraries, and/or other code, such as one or more application programs 818, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 810 described above. In some cases, the storage medium might be incorporated within a computer system, such as computer system 800. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 800) to perform methods in accordance with various embodiments of the disclosure. According to a set of embodiments, some or all of the procedures of such methods are performed by the computer system 800 in response to processor 804 executing one or more sequences of one or more instructions (which might be incorporated into the operating system 816 and/or other code, such as an application program 818) contained in the working memory 814. Such instructions may be read into the working memory 814 from another computer-readable medium, such as one or more of the storage device(s) 810. Merely by way of example, execution of the sequences of instructions contained in the working memory 814 may cause the processor(s) 804 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 800, various computer-readable media might be involved in providing instructions/code to processor(s) 804 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 810. Volatile media may include, without limitation, dynamic memory, such as the working memory 814.

Example forms of physical and/or tangible computer-readable media may include a floppy disk, a flexible disk, hard disk, magnetic tape, or any other magnetic medium, a compact disc, any other optical medium, ROM, RAM, and etc., any other memory chip or cartridge, or any other medium from which a computer may read instructions and/or code. Various forms of computer-readable media may be involved in carrying one or more sequences of one or more instructions to the processor(s) 804 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 812 (and/or components thereof) generally will receive signals, and the bus 802 then might carry the signals (and/or the data, instructions, etc. carried by the signals) to the working memory 814, from which the processor(s) 804 retrieves and executes the instructions. The instructions received by the working memory 814 may optionally be stored on a non-transitory storage device 810 either before or after execution by the processor(s) 804.

It should further be understood that the components of computer device 800 can be distributed across a network. For example, some processing may be performed in one location using a first processor while other processing may be performed by another processor remote from the first processor. Other components of computer system 800 may be similarly distributed. As such, computer device 800 may be interpreted as a distributed computing system that performs processing in multiple locations. In some instances, computer system 800 may be interpreted as a single computing device, such as a distinct laptop, desktop computer, or the like, depending on the context.

Operational Algorithms

The Low Flow Fluid Controller (LFFC) described herein may be used in combination with a custom algorithm based on several mechanical construction features, such as construction, type of blade design, the material of the damper assembly/air valve (high end vs. low end version), and the like. This feature may allow for cost effective production. The algorithm may further depend on a type of actuator being used, based on resolution and application. In another aspect, the algorithm depends on a type of air flow sensing device being used, e.g., orifice ring, linear probe, cross flow sensor, electronic, etc. In still another aspect, the algorithm may depend on the type of application, such as Chemical and Biological Pharmaceutical, HVAC, Industrial Process Control and Equipment.

Figure 12:
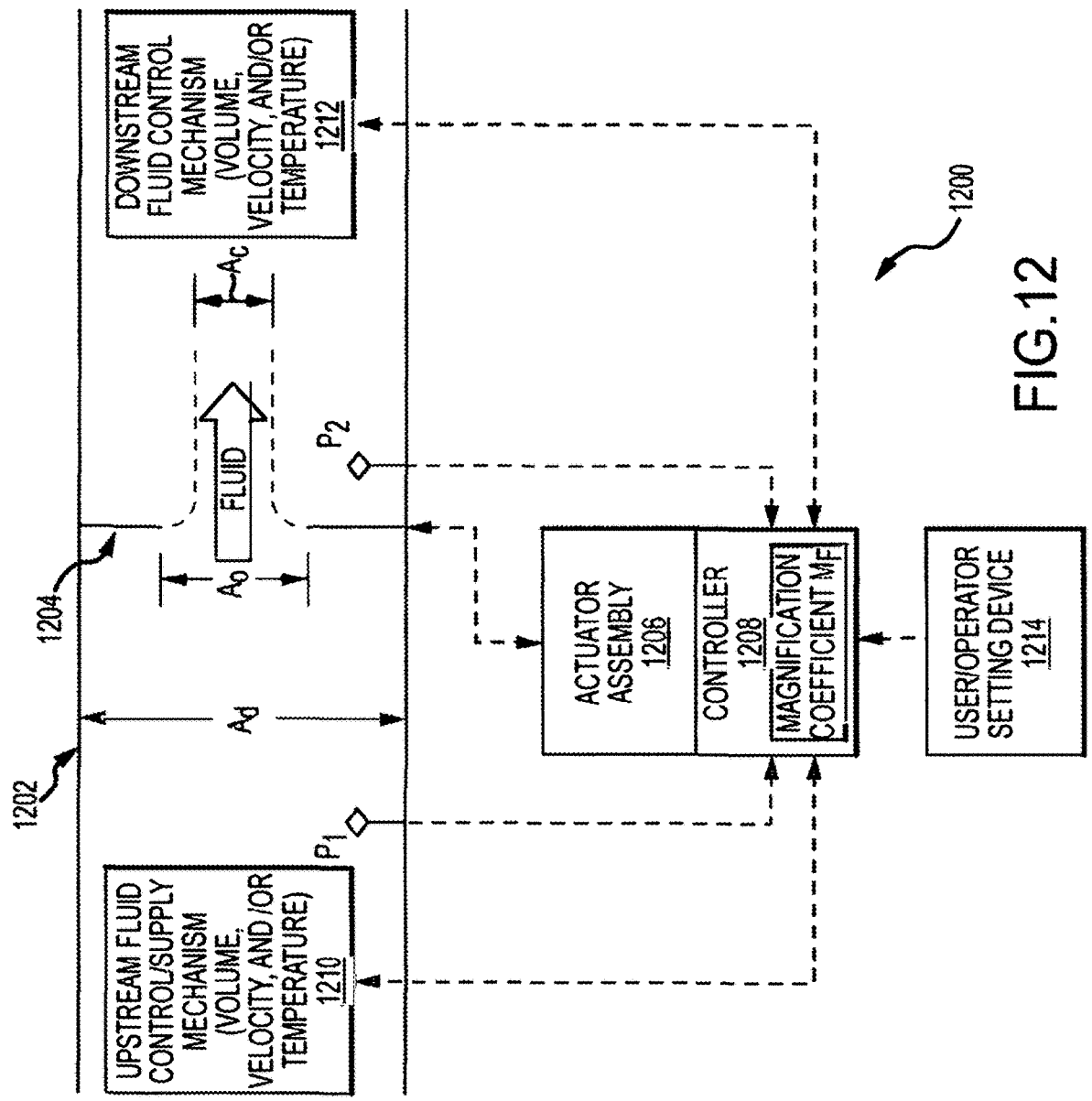
FIGS. 12A, 12B and 12C depict aspects of low flow fluid control systems and methods according to embodiments of the present invention.
Figure 12A:
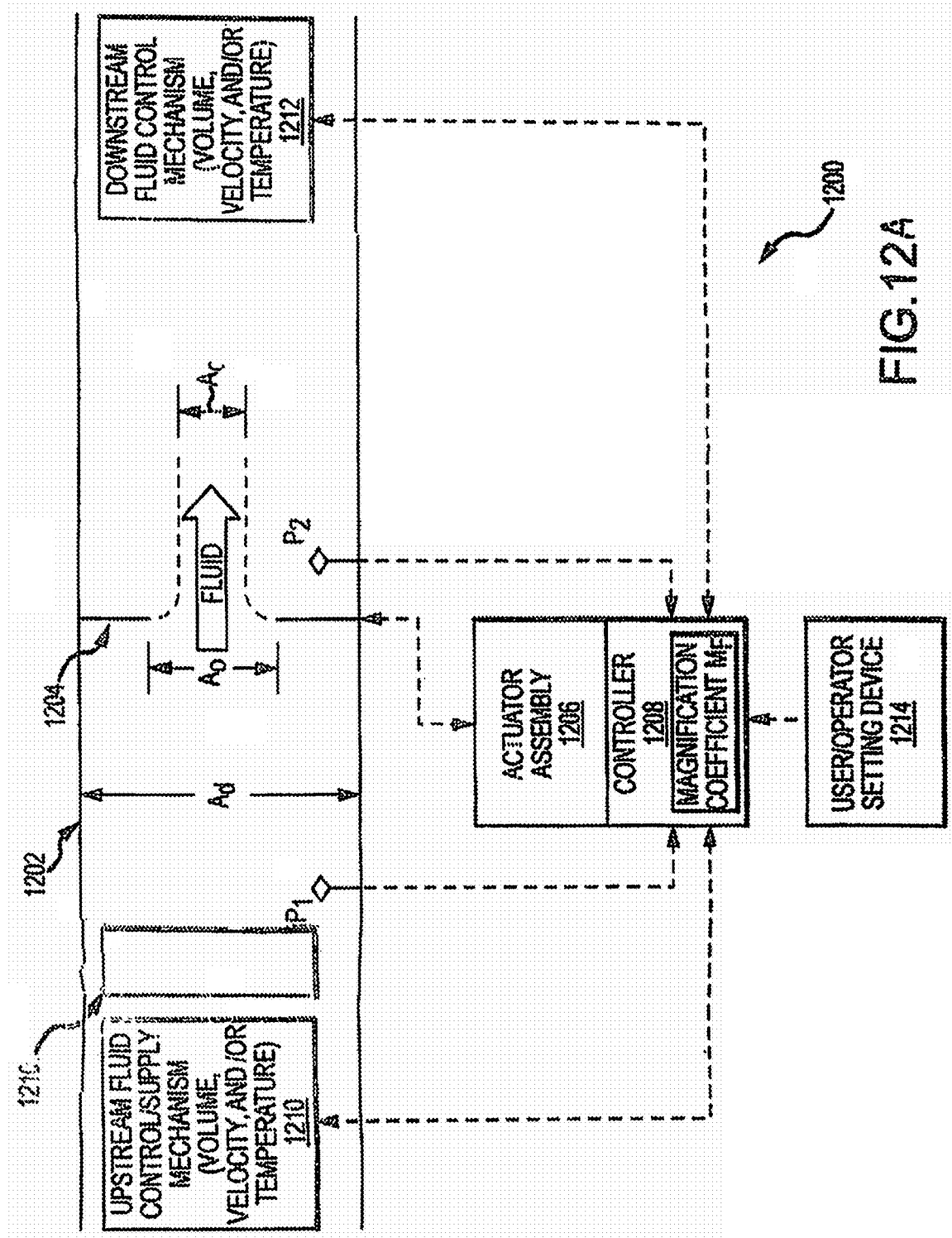
Figure 12B:
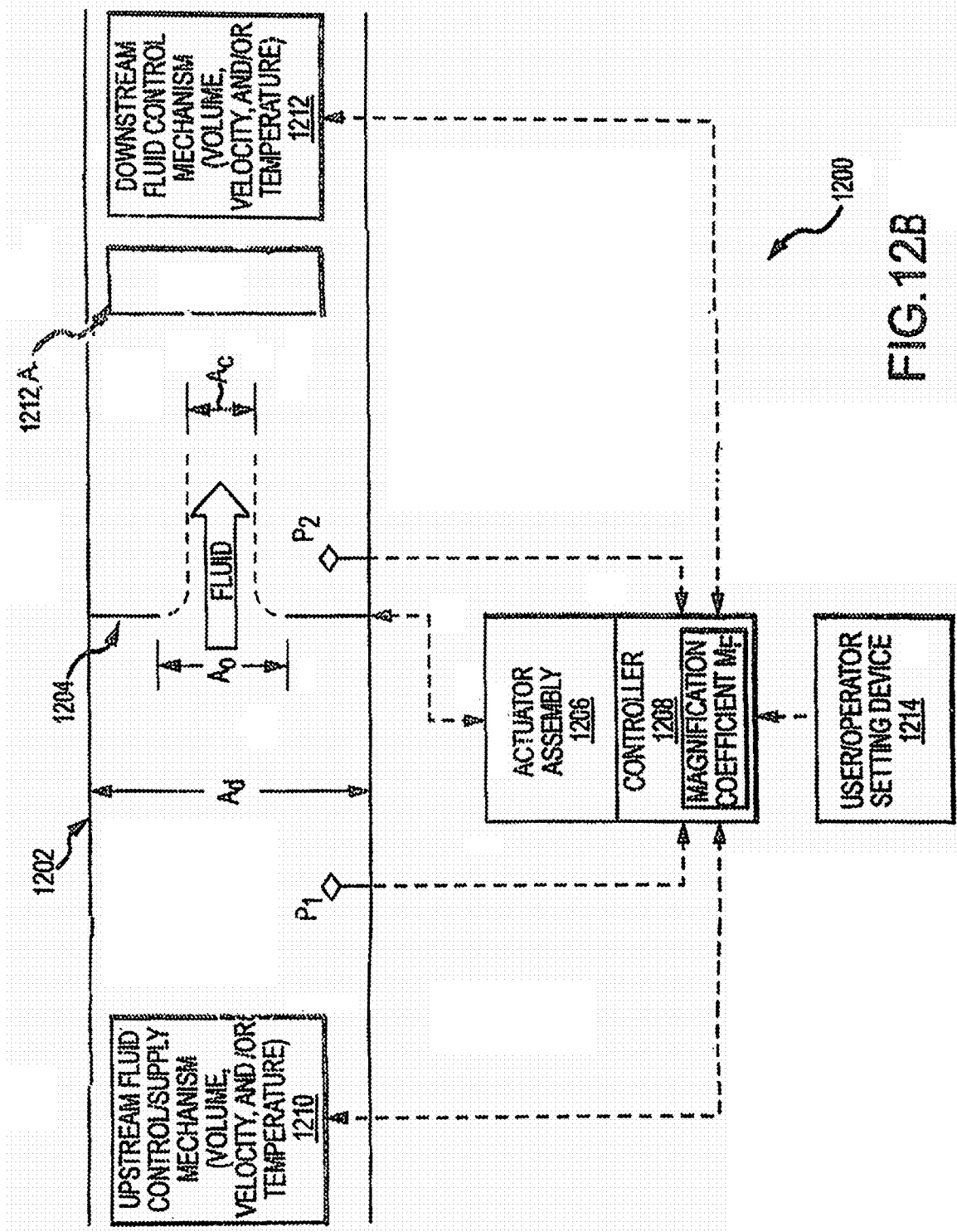
Figure 12C:
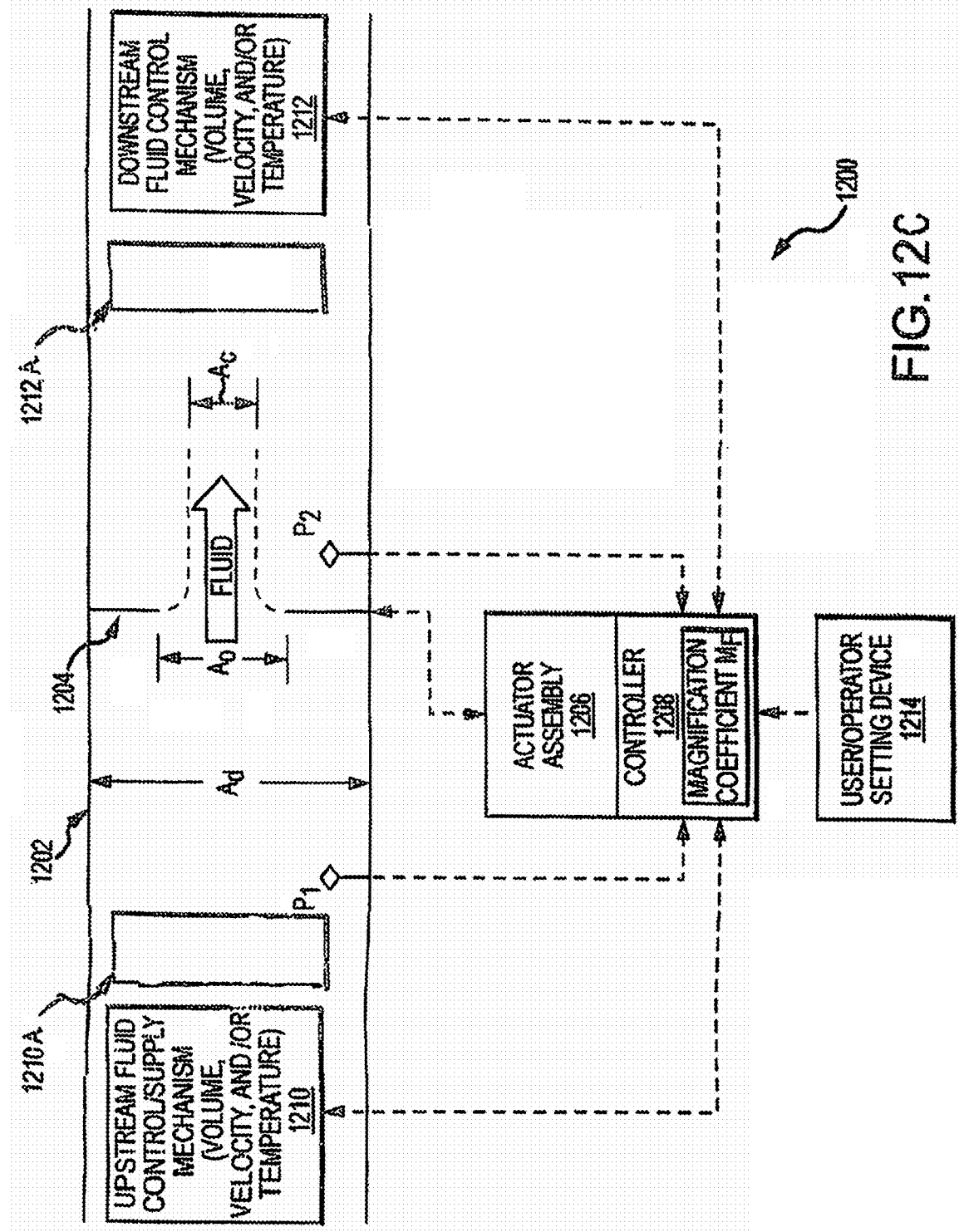

In practice, it is contemplated that a cost effective first article build of the air valve designed around performance parameters and channel application is manufactured and used as a "first build" prototype upon which production-for-sale valves are based. In a form, the production valves are calibrated by the first article build valve in a configuration shown in FIG. 9A. As shown, the first article build air valve 1200CV, for example, of the type illustrated in FIGS. 1 and 12, is used as a "calibration" variable aperture/orifice fluid flow valve (referred to as a "calibration" variable aperture/ orifice fluid flow valve 1200CV because, it is used to preform calibration by the first build air valve 1200CV), including a "calibration" damper assembly 1204CV and an aperture/orifice ($A_O$)-area controlling "calibration" actuator assembly 1206CV. While a test stand is used as a representative example, it is understood that any "calibration" fluid flow device can be any suitable device such as a test stand or a computational fluid dynamics (CFD) simulation device or other suitable device. The calibration valve structure 1200CV, further including a "calibration" blade controller 1208CV, is installed in a "calibration" duct 1202CV on a specially calibrated test stand/wind tunnel 1200CWT and, operating under control of a test stand controller and associated calibration fan, referred to as a test stand controller 1200TSC, so that the first build "calibration" air valve 1200CV is tested/calibrated to the algorithm. Then, the algorithm is updated and the calibration air valve 1200CV is tested again. Once characterized and tested, by the test stand controller 1200TSC, resultant test data TD is transferred, or "mirrored", from calibration air valve 1200CV to one or more structurally similar "product" air valves 1200PV (with similar product damper assemblies 1204PV (including orifice $A_o$), product aperture/orifice ($A_o$)-controlling actuator assemblies 1206PV), and product blade controllers 1208PV) are ordered and shipped to the field sites 1209FS (remote with respect to the calibration air valve 1200CV at the test stand 1200CWT) for beta and cycle testing. Elements 1200PV, 1202PV, 1204PV (including product orifice $A_o$), 1206PV, 1208PV of the product valves 1200PV correspond to the respective elements 1200CV, 1202CV, 1204CV (including calibration orifice $A_o$), 1206CV, 1208CV of the calibration valve 1200CV, and may, for example, be of the respective types 1200, 1202,1204, 1206, and 1208 shown in FIG. 12. The beta and cycle testing are based on the algorithm, using performance parameters (e.g., a range of one or both pressure drops (ΔP) across the calibration air valve 1200CV and aperture area ($A_o$) values) from the calibration air valve 1200CV installed on test stand/wind tunnel 1200CWT. The algorithm is then scalable over the various sizes of the product air valve 1200PV commensurate to the product actuator 1206PV, product air valve design and product air flow sensor (above mentioned items). new product actuator 1206PV and product flow instrumentation performance and accuracy can be calculated, rather than laboratory tested making introduction of new variations faster. This feature may bring a new product to market much more rapidly than has been the case in the past. Alternative remote calibration configurations are shown in FIGS. 38-41 and described below in conjunction with those figures.

Wind Tunnel Testing and Results

Three wind tunnel configurations were fabricated and employed. Industry standards covering testing, like AMCA210.1999 Laboratory Methods for Testing Fans for Aerodynamic Performance Ratings do not adequately address the wide operating range. Finding a test setup that could test a device with high range-ability was a challenge in and of itself. In one test setup, the Wind Tunnel uses two different inlets (Hi & Lo) to cover the performance range of the LFFC since a single fixed setup could not designed to cover the range. Existing micro-manometer air pressuring sensing technology also makes accuracy testing over a broad operating range difficult. Furthermore, special software programs had to be written for the base software program, the sophisticated lab type controllers, and the highly accurate and calibrated sensors for verification purposes for the calibration valve. Unlike other air flow tests, this test included the resolution points from the electronics such as actuators at the various performance parameters, the type of fluid sensing element being used, the construction of the device, the various fluid patterns at various performance spectrums and the type of transducer commensurate to the algorithm. All this data collected at thousands of points of performance parameters, as we mirrored product valves in real time operation of an actual building system. Therefore, the test stand/wind tunnel was complex and validated the LFFC described herein. Moreover, the test stand/procedure executed and reduced the R&D time by several years.

A ratio test on a 10" low flow damper/flow meter was undertaken. In particular, the study utilized a 2-stage damper calibrated to function as a flow station. At any fixed damper position the device serves as an orifice plate, with flow coefficient $[C=(duct\ VP/DeviceDP)^{0.5}]$ which may be considered a fixed number over a wide range of Reynolds numbers. Each damper position has an associated critical Reynolds number below which the coefficient can be regarded as Reynolds-dependent.

Test results showed that with the instrumentation at hand, no Reynolds dependence was noted over the entire range of annulus positions (disk 100% open). The flow coefficient may be regarded as constant at each annulus setting; i.e., a function of damper position only. With annulus closed, a possible critical Reynolds number was determined at disk openings 40% and 80%.

Low Flow Air Valve 3 inch Ratio Test

A disk at 40% open ratio was tested and yielded a chart that plots $C^2$, the ratio of the Setra reading on the disk, to the MKS 3" Venturi reading at disk 40% open. The ratio remains substantially constant until the lowest two points are reached. At the lowest point, $C^2$ reads~10% high, so C~5% high. Velocity 31 FPM (6109 MPS), 17 CFM (481 LPM) in the 10" (25.4 CM) duct (note that this is about 1/10 walking speed). Turndown ratio 97 with respect to a full 15 flow duct velocity of 3000 FPM (590 kMPS) and still 39 with respect to 1200 FPM (236 kMPS), still an excellent turndown relative to the low fluid flow velocity, which is uncontrollable in existing systems. Venturi Reynolds number ~9000, still in the flat flow profile range. Reynolds number 2600 in the Duct, so velocity profile moving toward parabolic, which would increase the Damper delta P, possibly slightly offset by a decrease in orifice ring amplification, but not so abruptly as in the curve.

A disk at 80% open ratio was tested and yielded a chart that plots $C^2$ at disk 80% open. The ratio remains substantially constant until the lowest point is reached. At that lowest point, $C^2$ reads ~10% low, so C~5% low. Velocity 44 FPM (8663 MPS), 24 CFM (670 LPM) in the 10" (25.4 CM) duct (note that this is about 1/10 walking speed). Turndown ratio 68 with respect 25 to FPM full flow duct velocity of 3000 FPM (590.7 KMPS), 27 with respect to a still controllable 1200 fpm (236.2 KMPS) full flow. Venturi Reynolds number ~12000, well into the flat range. Reynolds number 3800 in the Duct, so velocity profile moving a little toward parabolic, which would increase the Damper delta P, possibly slightly offset by a decrease in orifice ring amplification, but the displayed ratio drops abruptly in the curve. In the wrong direction to be a Reynolds effect. Therefore, look at sensor and transducer limitations.

Calibration of the 1" (249 Pa) Setra yields a chart that plots the ratio of readings of the 1 "(249 Pa) Setra used in these tests well down to 0.02" w.g (4.98 Pa). It reads 8% high at 0.01" (2.49 Pa), corresponding to 4% in flow coefficients. The Setra remained above 0.02" (49.8 Pa) in these tests which is not the problem. May need to calibrate sensors against each other at these low flows.

This data will be refined using a 0.1" (24.9 Pa) delta pressure MKS transducer (on order), encompassing more disk settings than the 40% and 80% considered here, and extending 10 to even lower flows. In the process the current contradiction between 40% and 80% low end behavior will be resolved.

Flow Coefficient Data and Curves

In this series, 2-1 minute averages were taken over each 2 minute long damper setting, labeled Early and Late or 1st pt, 2nd pt. It may not have been possible to align sampling with repositioning, so Early average may include data from previous setting and repositioning interval.

Low Flow Air Valve 3 inch Char Test JCI

The 1" (249 Pa), 2" (498 Pa) and 10" (2490 Pa) Setra tracked each other quite well up to 60%, where the 1" Setra maxed out. The 2" (498 Pa) Setra maxed out at 65%, and the 10" 20 (2490 Pa) Setra at 90% opening, 85% closing. The artificial hysteresis caused by sensor saturation at 90-100% open is evident in the graph. Saturation lowered those plotted values, particularly at 100% Open. Similar artifacts are evident in the considerably lowered 1" (249 Pa) and 2" (249 Pa) Setra saturation curves. The JCI actuator introduced no significant hysteresis: opening and closing data were often identical to 4 decimal places, occasionally differed by a few 25 percent. Early readings were not noticeably contaminated by vestiges of the previous setting.

Low Flow Air Valve 3 inch Char Test GAP Actuator

The late (2nd minute) data shows the 1"(249 Pa), 2" (498 Pa) and 10" (2490 Pa) Setra again tracked each other quite well up to 60%. Above that, and over the entire early (1st minute) range, very considerable hysteresis is apparent. Since 2nd minute data is greatly improved over 30 1st minute data, we may try testing at 3 minutes; 3 readings per setting: a long relaxation time may be involved. In 2 minutes at the 100% setting the damper had not achieved 100% opening 41 from indicated 95%. The 100% early reading is higher than the later reading. The 90 and 95% early readings reduce to about the late 100% reading, but the late 95% reading is the highest of the whole set, giving the appearance that the actuator oscillates back and forth several times when commanded to reverse direction, before settling into (in this case) closing mode, lagging 5 about 9 degrees behind the opening path early, reducing to about 2 degrees after 2 minutes in position. Satisfactory agreement may be achieved 3 or 4 minutes after a position-changing command.

Benefits of the LFFC in HVAC Systems

The LFFC described herein may be incorporated in an HVAC system to facilitate the HVAC system in providing comfort at low-as-possible energy consumption levels. The American Society of Heating, Refrigerating and Air-Conditioning Engineers ("ASHRAE") established standards outlining room conditions that are acceptable for most, i.e. 80%, of building occupants. In particular, the ASHRAE provides a psychometric chart that shows comfort zones as defined in ASHRAE Std. 55 for summer and winter seasons. The ASHRAE Std. 55 identifies the comfort zone or range of conditions that satisfy most people who are appropriately dressed and performing light work, e.g. office work. People wearing heavier clothing and undertaking heavy work may need cooler conditions. Comfort in a controlled space depends on a combination of air flow temperature control and humidity.

Further, comfort is interrelated with ventilation of fresh air. Supplying metered amounts of outside air prevents the indoor air from becoming stale and unhealthful. The LFFC described herein measures and meters fluids, such as air or fresh air, into controlled zones to provide comfort to people in those rooms. It is noted that outdoor air standards have become more strict and created a demand for a higher turndown air controlling device. With the high turndown LFFC described herein, the LFFC can be incorporated into the HVAC system to promote conditioning of supply air and help provide each space or zone a portion of the conditioned fresh air within a comfort zone that has acceptable combinations of humidity and temperature.

Further, as defined in ASHRAE Std. 62 Fresh Air Standard, the HVAC system should provide sufficient amounts of outside air for human comfort ventilation. The effectiveness of the system to accomplish this depends on two main factors: 1) Quantity of supply air, which may be measured in cubic feet per minute ("CFM") or liters per minute ("LPM") and 2) temperature of the supply air, which may be measured in degrees Fahrenheit or Centigrade. To heat or cool a space, the quantity and temperature factors are combined in different ways depending upon the type and design of the particular HVAC system. A thermodynamic equation that incorporates these factors is shown below for sensible heating and cooling where humidity is not included. In the equation below, the constant ("Constant") and mass flow ("CFM") may be adjusted for liquid fluid flows.

$$BTU = (Constant \times CFM \times \text{Difference in Temperature})$$

Equation 1—BTU Equation Relating Flow and Temperature to Energy Transfer

The above equation shows that BTUs delivered to condition a space are affected by 10 the amount of air and/or air temperature. Changing either variable, the mass flow CFM (LPM) or temperature ° F. (° C.), can change the temperature in a controlled zone. In a particular aspect, the LFFC described herein measures and meters the mass flow CFM and gallons per minute ("GPM") flows, and other variables, into controlled spaces.

Commercial offices need to utilize ventilation systems that provide indoor climate conditions that comply with fresh air and energy codes. The airflow may be independent of room occupancies, and therefore, existing ventilation systems may waste energy in unnecessarily supplying fresh conditioned air to unoccupied zones, e.g., zones without people. Wasted energy generates unnecessary utility costs. In order to comply with new energy standards, HVAC systems should reduce air flow when people are not present. The LFFC described herein may facilitate the adjustment of air flow so the necessary ventilation is provided, while not sacrificing temperature quality and CO2 concentrations. In particular, by providing cool conditioned air at 55° F. (13° C.) simultaneous cooling, heating and humidity control are possible. The cool 55° F. (13° C.) air can remove the excess heat and humidity generated by people, plug loads, computers and incoming sunlight. In other cases, zones within buildings may require both heating, cooling and humidity control all in a short time period, e.g. a single day. In that case, the HVAC system can be capable of reheating air, which is heating air that was previously cooled to 55° F. (13° C.). The LFFC described herein can measure smaller air and fluid volumes with high turndown. Further, the LFFC described herein offers precise fluid flow measurement that also generates lower sound levels, while providing fresh air to zone occupants and reducing energy consumption, in particular by reducing the need for reheat.

LFFC controller technology enables installation of systems with no reheat boxes. For morning warmup, an inexpensive unit heater located in the MER outside air/return air mixing area replaces the reheat boxes and the attendant building-wide piping or heavy wiring. In reheat mode, the LFFC reverses thermometer control loop operation, becoming satisfied when the zone temperature reaches a centrally provided warm-up set point. It also may control nearby peripheral heating units. The central system reverts to normal operation when the number of LFFC controllers calling for cooling exceeds the number still calling for heating, which will generally be on the Northernmost face of the building. Peripheral heating is generally operative near the windows, so these zones continue to be heated as needed. If some zones still require heating after cooling is 90% satisfied, the central controller may alternate episodes of cooling and heating until there are no more calls for heating. This is made possible by timely communication between the central controller and the LFFC's, and the ability of the FFFC to feather subject to MOA requirements maintained using local $CO_2$ sensors or preset rules of thumb. When this cannot be accomplished without overcooling/heating the LFFC advises the central controller to increase % outside air (which may have been set at zero at the beginning of the morning warmup cycle. The above arrangement is vastly more efficient than cooling central air to 55F followed by reheating to 90F at the periphery.

In another aspect, humidity increases and decreases along with indoor air temperature variation. The LFFC described herein may facilitate the HVAC system in maintaining indoor humidity within the comfort zone. For instance, an HVAC system in a dry climate may include an added humidifier unit in the central air handler to increase the moisture level in the conditioned air when required. An HVAC system in a humid climate may dry or remove moisture from the supply air by overcooling the conditioned air and then reheating it back to the comfort zone temperature. The LFFC described herein makes these processes more efficient by more accurately measuring and controlling air and fluid quantities.

In a further aspect, the LFFC described herein can be used in both central HVAC and zone HVAC systems, including air to air and water/fluid-based systems. Central HVAC systems may include large heating and cooling equipment that condition massive amounts of air for large areas on multiple floors of buildings. Such equipment may be located in basements and/or on roofs of the buildings and include, for example, steam boilers, hot water heaters, chillers, cooling towers and backup generators. Zone HVAC Systems may comprise smaller pieces of heating and cooling equipment. Such equipment may be placed within buildings to control zone or room level spaces. Zone control systems may control individual occupied spaces and represent a majority of cooling and heating equipment installed in the building.

Due to the advent of efficient low horsepower ECM's, it is now possible to hang efficient small AHU's in the ceiling space so HVAC takes away no floor space. Elimination of supply and return shafts saves more space than is lost to compact local units. Elimination of the return stack simultaneously eliminates stack effect and the need for return fans, so it is not difficult to design much more efficient 2500 CFM ceiling units than is achievable with central MER's. With care, HW and CW can be run to the units through the same pipes connecting via solenoids to the HW and CW risers. It is contemplated that the LFFC described herein can be implemented in both of the central and zone systems, with and without firmware and software.

It is worthy to note that an HVAC system for a building can provide a variety of different heating and cooling zones, particularly for a large building having numerous spaces. Different zones within a building have different heating and cooling needs, which may depend on thermal heat gains, geographic locations, number of floors, numbers and sizes of windows and doors. For instance, large buildings with inner cores insulated from the outdoors may not require heating during the winter months but may require cooling instead. On the other hand, outer zones or perimeter spaces along the outer walls may require heating due to cold air convection and electromagnetic ("EM") radiation passing through the windows. Further, all zones, whether heating or cooling, require fresh air ventilation. It is contemplated that the LFFC described herein aids the HVAC system to meet both new fresh air standards and energy standards at the same time, while providing the variety of heating and cooling zones. The LFFC-incorporated HVAC system is capable of adjusting air flow without causing significant pressure differences that may lead to considerable amounts of turbulence, i.e. sound that is distracting to building occupants. More importantly, LFFC's work fine at 1500 FPM or even 1200 FPM maximum compared to 3000 FPM or more for legacy VAV boxes, eliminating the principal source of HVAC noise problems in occupied space and reducing fan TP by more than the 1 in. wc. required by VAV boxes. LFFC's operate with 0.02" pressure loss, enabling the ceiling units mentioned above to operate at less than 1" TP: at least 5 or 6 times as efficient as the best legacy central systems with return or exhaust fans.

Application of the LFFC in VAV Systems

One type of HVAC system is a variable air volume ("VAV") system. It is contemplated that the LFFC described herein can be incorporated in VAV systems. In particular, the VAV system may include one or more supply ducts that distribute supply air at 55 of (13° C.). The supply air temperature in the VAV system may be held constant. The air flow rate in the VAV system may be varied to meet varying heat gains or losses within the thermal zone served. The VAV system may further include VAV fan capacity control through electronic variable speed drives or electronically communicated motor ("ECM")/solid state motor technology. Such VAV fan capacity control may greatly reduce the energy consumed by fans and thus a substantial part of the total energy requirements of the building served. The capacity controlling supply and return fans modulate the air volume up and down depending on thermal loads. Further, the VAV system may provide dehumidification control in a cooling mode, whereby supply air volume is reduced and reheat is introduced for dehumidifying. This can be done efficiently using a heat pipe. In larger commercial systems, the VAV system may include one or more VAV air handlers to serve multiple thermal zones such that the air flow rate to each zone may be varied. In that case, the VAV system may utilize the LFFC described herein, which may replace or be used in additional to traditional VAV terminal boxes.

The various LFFC devices described herein eliminate VAV terminal boxes as a primary zone-level temperature flow control device. The LFFC is a calibrated air damper equipped with an automatic actuator and air flow sensor. The LFFC is connected to a local or a central HVAC system. In VAV systems, fan capacity control is critical, since ever-changing duct pressures can influence the amount of air (CFM) delivered to zones. Without proper and rapid flow rate control, the VAV system can deliver too much air or generate excessive noise and potentially damage ductwork by over-pressurization.

In VAV cooling mode, the LFFC decrements to limit flow of cool air into spaces where zone temperatures are satisfied. When the zone temperature increases again, the LFFC increments to introduce larger volumes of fixed temperature air in order to cool the zone space temperature. In the VAV system, a central fan may maintain a variable supply of air,. Unlike legacy VAV terminal boxes, which operate independently of each other, LFFC's are in constant communication with each other and with central control as they supply conditioned air throughout the building zones. As Legacy VAV terminal boxes close, duct static pressure increases and the control system slows the fan down to restrict the volume of air going through the VAV system, and as the VAV terminal boxes open, the fan speeds up and allows more air flow into the duct system. The tight communication between LFFC's and central control enables exactly satisfying all LFFC's with no excess pressurization and no minimum pressure maintained anywhere in the system. With no minimum pressure set, fans can be selected in their maximum efficiency range at design flow without incurring danger of fan stall at lower flows. By contrast, in legacy systems, centralized building controllers still measure and wastefully maintain constant static pressure in the supply ducts. In addition to being wasteful such practice biases the system curve in the direction of fan stall. The LFFC needs 0.02" minimum and even that need not be maintained artificially; it is satisfied naturally in the simple central—peripheral interchange protocol outlined above.

Obviously, the LFFC may be placed in a ceiling or underfloor ductwork. The LFFC controls the volume of the air to the zone to maintain target temperature. In some cases, each zone has a thermostat that controls the LFFC by indicating when to modulate the air damper based upon the zone heating or cooling demand. For instance, a controller in the LFFC may take the thermostat's measured room temperature as an input, increment or decrement the LFFC damper proportional to the temperature deficit, and repeating at intervals to adjust the damper as necessary. In this way, the LFFC delivers fixed supply air temperature at required varying volume rates.

When sizing Legacy VAV terminal boxes, a substantial number of sizes were required for accurate flow measurement commensurate with acoustical requirements. The wide LFFC rangeability eliminates this need: a few sizes suffice for the entire range of design CFM's. To maintain flow measurability and control, an inlet of a legacy VAV terminal box requires high pressure/high velocity entering air, which is dissipated within the casing of the device to provide required low velocity/low pressure output air, with generation of considerable low frequency noise. LFFC's have essentially no minimum pressure requirement and operate over a range of much lower velocities entailing greatly reduced noise production. The inlet is connected to a system of supply ducts that is in communication with the Central Air Handling Unit. An outlet is in communication with an outlet duct leading to one or more zone diffusers. The LFFC may open or close to control the amount of conditioned air flow needed. The air damper may be controlled automatically by a motor, also referred to as an actuator, which is controlled by the controller based on inputs from the thermostat and air volume sensors. The thermal sensor may be placed in the zone to detect temperature and instruct the damper of the LFFC to open or close incrementally. This controls the amount of fixed temperature conditioned air into the zone. A few LFFC sizes replace typically 21 differently sized legacy VAV terminal boxes along with various size coils in manufacture.

In a legacy assembly, the VAV terminal box along with the air flow sensors might be supplied by sheet metal manufacturers. Controls companies might install the direct digital VAV controller ("DDC") with actuator and transducer after the fact, connecting into the air flow sensor and operating the damper shaft. Testing of VAV terminal boxes might include noise and leakage rates. In some cases, the legacy VAV terminal box is oversized or installed in uncontrollable spaces or zones, thereby generating control problems that result in reduced indoor air comfort, increased energy costs, zone controllability problems and maintenance problems. The ASHRAE RP 1353 standard validates the poor performance of VAV terminal boxes with DDC controls at low flow. LFFC manufacturers provide single source pre-commissioned wide control range devices that virtually eliminate the difficulties just described.

Traditional VAV terminal boxes in VAV systems have turndown ratios under 5 to 1 from 3000 FPM, despite promotional claims to the contrary. Traditional laboratory control air terminals have slightly higher turndown ratios of up to 10-1. It is contemplated that the LFFC described herein may be incorporated into the VAV system described above and offer higher turndown ratios that are greater than 10-1, or greater than 100-1, or greater than 250-1. Turndown is important for a variety of reasons, including the following: 1) Accurate measurement of the air and water (glycol and water used interchangeably) volumes being supplied, particularly important in laboratories where infectious diseases and toxic chemicals are present. 2) fewer part numbers, i.e. fewer devices are required to cover operating ranges. This allows for fundamentally simpler designs and systems, including streamlining and/or combining product portfolios and reduced manufacturing costs. 3) Lower pressure drops providing quieter air/fluid delivery systems and lower energy costs and superior acoustics. 4) Reduced Life Cycle costs of the building and cost of ownership. 5) Lower installed and first cost due to fundamentally fewer components and simpler equipment sizing. 6) Streamlined controls system architecture and software hosted in the cloud or through enterprise/legacy system. It is contemplated that the LFFC described herein provides a minimum turn down ratio of over 100-1 with respect to legacy device velocities, at a much more desirable energetically and acoustically FPM, depending on the design with multiple orifices, dampers and/or valves. This lends to fewer part numbers, lower manufacturing costs, lower system installed costs, smaller footprints, reduced cost of ownership and lifecycle, more standardized HVAC duct designs, quieter systems and less energy used to move fluids to the occupied zones.

Application of the LFFC in Dampers

In another embodiment, it is contemplated that the LFFC described herein provides an air flow damper assembly that can be used in conjunction with VAV or other HVAC systems. In particular, the damper assembly can be formed in many geometries and shapes, and used additionally or alternatively with existing damper devices, which may often be custom-ordered due to special size and configuration constraints. The damper assembly of the LFFC disclosed herein can be used in a variety of applications, including in emergency fire and smoke situations. In particular, the damper assembly of the LFFC may be utilized for turning air on and off and modulating in between the two extremes. The damper assembly disclosed herein may also be used in or with fan coils and unit ventilators that heat and cool spaces. Such unit ventilators may be similar to fan coils, but also introduce outside air into the ventilation system. Merely by way of example, unit ventilators may be larger with higher BTU capacities. Therefore, the high controllability of the damper assembly and/or LFFC disclosed herein may offer significant improvements in the efficiency of such systems.

In another aspect, it is contemplated that the damper assembly and/or LFFC disclosed herein can be used in laboratory spaces for fire and contamination control purposes, such as in fume hoods where chemical reactions take place. The damper assembly disclosed herein may also regulate the fresh air into hospital rooms.

In another aspect, the LFFC disclosed herein may provide a damper assembly for use in Central Building Air Handlers ("AHUs") to control air supply into the building, exhaust air out of the building, and mix the two air streams to conserve energy. The damper assembly disclosed herein may replace or be used in conjunction with an existing damper in the AHU to simplify control of the damping mechanism. Large parallel blade LFFC's described herein handle the large air volumes typical of AHU's. The damper assembly disclosed herein may be used in ductwork and in air distribution devices which deliver air into the zone. Further, the damper assembly may be used in refineries and process applications, including industrial applications and air pollution equipment. Still further, it is contemplated that the damper assembly can be used in conjunction with thermal transfer devices, e.g. facilitate design of more efficient thermal transfer units, which may reduce energy, product, and installation costs. In another aspect, the damper assembly described herein may be controlled by controllers and tied into networks. In that case, the amount of equipment required and the amount of control points may be reduced, yielding more cost efficient control networks with sophisticated capabilities that can be integrated in buildings and controlled/monitored through cloud computing and centralized 30 locations. In this way, the damper assembly and/or LFFC disclosed herein may utilize open source controls, as opposed to proprietary legacy systems.

Implementation and Operation of LFFC in HVAC Systems

It is contemplated that the LFFC described herein controls temperature and air flow for an HVAC system by utilizing air flow measurements and the damper configuration described herein, which allow for more precise air measurement and regulation. The LFFC may be retrofit into existing HVAC systems, replace and/or be used in conjunction with existing VAV terminal boxes, and/or be incorporated in new HVAC system designs.

In one aspect, the LFFC utilizes lower pressure models for controller delta-pressure ($\Delta P$) transducers. In this way, air pressure measurement enables or makes possible pressure independent control. Transducers are the most costly electronic element in typical HVAC VAV controllers. Furthermore, the LFFC can be used with more expensive pressure, silicon and electronic transducers for even greater control, but works fine with very inexpensive transducers.

Control Algorithms—Pressure Independent PI Control of Temperature

The LFFC described herein gives inherently pressure independent control of airflow, wherein the control of the airflow is independent of inlet air pressure conditions. For instance, when several LFFC devices are on the same supply air duct branch and each is opening and closing to control local zone temperature, they impact the air pressure down the supply duct. The inherently pressure independent LFFCs Maintain flow or temperature target values independent of pressurization while working with the central fan controller to maintain the least pressure consistent with satisfying all LFFC's. This is done very simply: fan pressurization is constrained so that at least one LFFC is wide open at all times, and no over-pressurization. This was not possible with legacy systems.

The LFFC may further be used with a Pitot sensor for sampling air pressures in the conditioned air stream that is further piped to the air flow transducer on the DDC controller. In one embodiment, a dead end transducer is used, i.e. air does not flow through the transducer, which may prevent clogged sensors, hoses, and transducers since air contaminants are not trapped therein. Such transducers may be implemented in hospital ventilation systems, since air in hospitals tend to be filled with lint, which clogs transducers. It is contemplated that the LFFC requires little or no maintenance, due at least in part to reliable air flow measuring for an extended period of time.

Air Velocity Measuring, CFM, Flow Coefficient and Calculations

Air in a duct has two components to be measured. A first sensor typically senses flow Total Pressure by creating a stagnation zone where air impinges directly on the face of the sensor. It is noted that the term "transducer" used herein will refer to a device that measures air pressure and converts to electrical signals that is located on or near the electronic DDC controller. The flow pickup or sensor samples the flowing air and sends to the transducer. A second sensor out of the direct airstream senses static pressure, which pushes in every direction with the same force with or without air flow.

Air velocity is measured in feet per minute using the two air components, total pressure and static pressure, each measured separately and subtracted from one another to obtain velocity pressure, in accordance with Bernoulli's Principle. This pressure difference is referred to as delta pressure and it is abbreviated as $\Delta P$. The mathematics of this measurement is as follows:

$$\Delta P = \text{Total Pressure} - \text{Static Pressure} = \text{Velocity Pressure}$$

Equation 2—Total Pressure Equation

Air velocity in feet per minute, abbreviated as FPM, is calculated relative to DP in inches H2O and fluid density in lb./ft3 using the following equation:

$$\text{Air Velocity in } FPM = 1097 * \sqrt{(\Delta P/\text{density})}$$
$$\sim 4004 * \sqrt{\Delta P}$$

Equation 3—Air Velocity Equation

Readings of electronic pressure transducers in common use are highly dependent on ambient temperature. In high precision applications, "Auto-zeroing" greatly reduces this effect. Auto-zeroing involves connecting the transducer inputs together so that the transducer voltage drift at zero pressure difference can be measured and used to compensate readings with restoration of the transducer sensor connections. The sensor used herein may provide total pressure in the "High" pressure tube and the static pressure in the "Low" pressure tube. The subtraction is accomplished at the controller transducer by putting total pressure on one side of a diaphragm and static pressure on the opposite side. This provides a mechanical subtraction of the two separate pressures.

Air velocity pressure is commonly measured in inches of water column. For reference purposes, there are 27.7 inches of water column in one PSI (6.89 kPa).

Air Volume Calculations $$CFM = FPM \times \text{Duct Area in square feet (as measured at LFFC inlet)}$$

Equation 4—Total Volume CFM Formula $$\text{Duct Area (Round Duct)} = \pi \times (\text{Duct Diameter in Feet}/2)^2$$

Equation 5—Duct Area Calculation

Airflow in CFM (cubic feet per minute) is calculated from FPM (feet per minute) and multiplied by the LFFC inlet duct area or the opening area which the flow pickup sensor is located within. Airflow or velocity pressure ("VP") is the difference in the total pressure (Tp) and static pressure (Sp), or high and low. A cone in front of the Sp port artificially decreases the Sp relative to the Tp, thereby making readings higher and more sensitive at low flows where pressure differences may become as low as 0.008 inches of water (1.992 Pa). The cone forms an obstruction that raises local velocity in the stagnant zone surrounded by the wake, thereby lowering the static pressure at the Sp tap located therein and making the pressure differential readings higher. Amplification at low flows is highly desirable, where the VP becomes too small to be measured with a typical inexpensive pressure transducer. Since the reading is no longer representative of the actual flow, the amplification can be removed from the ultimate reading to arrive at an accurate air flow calculation. This may be performed by modifying the flow coefficient and/or flow coefficient.

A flow pickup may artificially depress Sp at the downstream tap to improve flow pickup sensitivity. To get a calibrated, accurate CFM (LPM) reading, this enhancement can be mathematically removed from CFM (LPM) readings. Further, duct inlet conditions in field locations vary dramatically and can negatively impact pickup sensor accuracy. To obtain a good reading, there may be three to five straight duct diameters of straight duct piping in front of the pickup. In some cases, this may be prohibited due to construction constraints. Flexible duct may be used to make short length connections between straight round duct other inlets. The flex duct imparts a circular swirl to incoming air, throwing the flow readings off.

The flow pickups may have multiple ports to get an average of pressures. If duct inlet conditions are less than optimal and flow is not uniform, the maximum flow reading can be adjusted to be more accurate using a flow coefficient. Note the calibration adjustment can take place only at one flow reading and this is always maximum airflow. This means that at all other readings the pickup & transducer combination calculate may be slightly inaccurate; the modulating closed loop control will adjust the air flow to a flow that is necessary to thermodynamically balance the temperature of the room. Various air volumes of interest may include a maximum, minimum, and zero volume.

In other aspects, horizontal or diagonal set of pipes may be used to sample air pressures. Furthermore, a relationship between $\Delta P$ and CFM (LPM) may be plotted. There is no intrinsic difference between multiplying $\sqrt{\Delta P}$ by C and multiplying $\Delta P$ by $C^2$ before taking the square root. However, if C is large, there is a big difference in the scale at which the controller performs the multiplication and the square root.

$$CFM = \text{Flow Coefficient} \times 4004 \times \sqrt{\Delta P} \times \text{Duct Area}$$

Equation 6—Total Air Volume Calculation

Flow pickup flow may increase the smallest measurable flow rate. Consequently, the Flow Coefficient, which adjusts for the flow pickup gain, may be a fraction less than one and the reciprocal of the pickup gain or slope.

Air Velocity Transducers

It is contemplated that the LFFC described herein can be used in conjunction with various sensor technologies in HVAC applications. The sensors may be connected to a standalone transducer, such as devices made by Setra. It is contemplated that any transducer can be used in conjunction with the HVAC controls. Merely by way of example, a PCB mounted transducer may be used in HVAC systems.

Controller I/O Scanning Times

The controller utilized in conjunction with the LFFC 100 may scan, i.e. make A/D to conversions, once a second. Analog input data may be updated once a second. Loop calculation rates may also be made at the same rate. The rate at which the controller calculates the loop outputs may directly affect the size of the gain parameters. It is contemplated that loop output calculation is scheduled on regular intervals to enhance controller performance.

Air Velocity Averaging & Electrical Noise Concerns

Air velocity readings may vary widely. Readings can be averaged to obtain consistent control action. In some aspects, this may be accomplished by using a 4 byte (or 10 bit), or 8 byte adding FIFO buffer, and then performing a 2 or 3 step bit rotate to divide the number by 4 or 8. This method may average the data, with new incoming data and old data rotating out. If performing the averaging in a high-level programming language in decimal format, it is contemplated that the following equation may be used.

$$\mu = \Sigma Air \text{ Velocity Readings (FIFO)}/(\text{Number of measurements})$$

Equation 7—Averaging Algorithm Used with Air Velocity Measurement to Smooth Turbulent Readings Electrical noises in the room temperature readings may disturb control action. When a large step change goes through the P equation, the control loop proportional gain multiples the 20 step and the controller remembers the change in subsequent calculations. It is contemplated that good A/D conversions and freedom from spurious electrical noise are important. Such conversions should be consistently reliable, with all common mode 60 Hz noise removed. Well-designed instrumentation amplifiers may guarantee clean, noiseless A/D conversions.

Controller Hardware RS 485 Twisted Pair Galvanic Isolation Network Interfaces

RS 485 refers to a transmission standard that uses differential voltages to code transmission data for multipoint, multi-drop LAN systems. RS 485 is the de facto standard for HVAC Building Automations System LAN networks.

Many semiconductor manufacturers make RS 485 interface chips that follow similar industry guidelines. Equation 10 below may describe a RS 485 chip Common Mode Voltage rejection ratio. The RS 485 maximum Vcm rejection is specified as −7V to +12V.

$$Vcm=Vos+Vnoise+Vgpd \text{ (Ref: National Semiconductor)}$$

Equation 8—RS485 Hardware Interface Electrical Limits

This equation shows that if any of the above parameters exceed−7V to +12V, the chip fails to remove common mode noise. A key parameter when discussing galvanic isolation is Vgpd or voltage ground potential difference. Anytime the grounds between successive LAN nodes exceed the specified limits, the network fails. Nodes can be separated by thousands of feet. In cases when a 24 VAC is miswired, the controller may be forced to be 24 VAC above ground and cause network failure. To alleviate problems, using a transformer or a DC to DC converter may galvanic isolate the RS 485 interface. It may further keep RS 485 chips from burning due to wiring faults.

Triac Motor Driver Circuitry and Protection, Different Vendor Products

It is contemplated that pressure independent controls may be operated with actuators having interfaces called 3 point or floating modulating. One such actuator may be a Belimo actuator that is double insulated. In floating point control, the controller microprocessor sends the actuator to full close by sourcing 24V AC to the CW or CCW wires. Only one wire can be energized at a time. Energizing both wires at the same time causes the actuator to freeze and heat up. One wire rotates the actuator in one direction and one rotates the actuator in the other direction. The percentage the damper blade moves may be determined by a run time of 24V is applied to the CW or CCW wire. Direction is reversed by applying signal to the other wire. Direct action refers to actuator movement that opens the damper when temperature increases. Reverse action refers to actuator movements that closes the damper when temperature increases.

Tabulated below are representative actuator manufacturers' data. The key item in the table is the actuator run time. For a controller to accurately calculate damper blade percentage open, the controller can be configured to the correct run time. Generally, operation in the 60 second time frame is preferred. Faster actuation may be used in laboratory control. For instance, the 35 second actuator below is a laboratory actuator and is used on VAV controllers for pressurizing laboratories.

TABLE 2

Possible Actuator Motor Specifications

| Manufacturer | Product No | Torque | Running Time |
|---|---|---|---|
| Belimo | LM24 | 45 in-lbs (5.08 Nm) | 95 seconds |
| Belimo | LM24 | 35 in-lbs (3.05 Nm) | 35 seconds |
| Siemens | GDE | 44 in-lbs (4.79 Nm) | 108 seconds |
| JCI | M9104 | 35 in-lbs (3.05 Nm) | 60 seconds |

UL Specifications, UL916 Low Voltage Regulating Equipment

UL916 is the standard of choice for building controls. UL916 is for low voltage regulating equipment or control equipment that energizes or de-energizes electrical loads to achieve a desired use of electrical power. The equipment is intended to control electrical loads by responding to sensors or transducers monitoring power consumption, by sequencing, by cycling the loads through the use of preprogrammed data logic, circuits, or any combination 10 thereof. Summarized below are the key design concerns related to UL compliance:

- PCB digital output traces thickness in ounces of copper, width and separation to adjacent traces.
- Class 2 transformers, PC mounted relays, PCB manufacturer; plastic molder all can be UL recognized components/manufacturers.
- Plastic material used in the plenum air space, 94-VO flame retardant epoxy.
- Mixing NEC Class 1 line voltage with Class 2 low voltage in same enclosures.

UL Specifications, UL864 Smoke Control

The products covered by this UL standard are intended to be used in combination with other appliances and devices to form a commercial fire alarm system. These products provide all monitoring, control, and indicating functions of the system. The criteria for compliance with this standard are significantly higher than UL916 and involve all the components that make up a system. For an LFFC and/or LFFC incorporated in a Zone Control Unit ("ZCU") to comply with this standard, the controller, metal enclosure, transformers and wiring can form a complete approved solution. An UL864 compliant ZCU may fit into an entire control system with other hardware, software and mechanical components to form a commercial fire alarm smoke control system.

UL tests cover life safety issues and functionality of the tested device. In that regard, UL tests may force fundamental design decisions and tradeoffs to be made prior to a product becoming manufacturing ready. To comply with this standard, the "Controller under Test" should pass the test described in Section C.

Opportunities in a Segmented Industry where Equipment and Controls Remain Separate It is contemplated that the LFFC described herein and/or the central system may be controlled electronically with Direct Digital Control (DDC) or with pneumatic (air) control systems. Digital systems are computer-controlled systems that can employ sophisticated calculations and algorithms to implement control sequences. Pneumatic systems use air signals to change control sequences. As mentioned earlier, pressure independent refers to controller ability to measure air flow and ride through system variations that result when different zones within the building put different loads on the heating and cooling system.

Digital control systems have many advantages. They do not require frequent calibration, last longer, and do not require air compressors equipped with special air dryers and lubrications systems. DDC systems can perform complex calculations and sequences. DDC systems can receive instructions from a master computer and share data with multiple operators located anywhere with a Web interface. Further, DDC systems transmit to master front end computers information such as damper and valve position, room temperature, supply air quantity, and supply air temperature.

Multi-zone AHU System

The LFFC described herein may be used in a central air, or a multi-zone system that meets the varying needs of multiple and different zones within larger buildings. Such systems may be a mix of centralized and zone HVAC equipment. Multi-zones have a separate supply air ducts to serve each zone in a building. There is a heating and cooling water (glycol and water used interchangeably) coil in the central air handling unit.

Variable Air Volume Systems

The LFFC 100 described herein may be utilized in a variable air volume (VAV) system to be more energy efficient and to meet the varying heating and cooling needs of different building zones. A zone may be a single room or cluster of rooms with the same heat gain and heat loss characteristics. Such a VAV system can save at least 70 percent in energy costs as compared to conventional systems. In addition, it is contemplated that the LFFC 100 is economical to install and to operate. In some embodiments, the system utilizes 55° F. (10° C.) primary air. Room thermostats may control the amount of primary air delivered to each zone through LFFC's for each zone. Such dampers may vary the volume of air to each zone according to the cooling needs.

In some aspects, the fan CFM output may be varied according to the total need of the zones. The fan may be sized with diversity ~90% of worst case load. As the air volume for the zones vary, the static pressure (SP) in the main duct may vary. In legacy systems with VAV boxes requiring 1" SP to operate, an SP sensor in the main duct controlled the fan output to maintain that constant supply duct static pressure. With entire elimination of VAV boxes in favor of LFFC's, this is no longer required or desirable. With use of LFFC's throughout a building, no minimum supply pressure is maintained. Fans are controlled by the needs of the LFFC's. These systems may be variable volume, constant temperature. In some systems that provide cooling only, a separate source of heat may be utilized as needed for outer rooms. This may be supplied by perimeter heating in the rooms. Other units in the system may include a water coil and control valve to provide heating. A big advantage of VAV systems that utilize the LFFC described herein is that they are able to meet the comfort requirements of different zones in a building without heating and cooling at the same time. Under some circumstances short alternating periods of central heating and cooling may be employed, with tight synchronization of fan and LFFC control modes.

Varying Central Supply Air Fan

It is contemplated that the volume (CFM/LPM) of primary air delivered by the central air handling unit can vary according to the demands of the individual units containing the LFFC's in the system. In this way, the supply fan in the central air handling unit may vary its output in order to meet the needs of all the units. The task of the central fan controller is to keep all LFFC's satisfied while not over-pressurizing the system so that all LFFC's would have to feather to hold back the excess pressure. The system is balanced while all LFFC's are satisfied and at least one LFFC is fully open. Without this last simple condition fan operating point is not well defined: it might run wide open, wasting a tremendous amount of energy and creating tremendous noise at the nearly tightly closed LFFC's.

Applications of the LFFC in Burners and Boilers

It is contemplated that the LFFC described herein may be utilized for burner boiler fluid control. Merely by way of example, the LFFC can be utilized in a large fire tube boiler, which can mix natural gas and air in the burner to produce a flame that converts water to steam. The steam may be used to heat buildings and industrial processes. Large equipment efficiencies are important, since small changes in efficiency translate into large changes in fuel input. Therefore, the LFFC can be applied for high turndown air control in burner boilers.

In particular, new energy efficiency standards drive burner boiler manufacturers toward $O_2$ trim control. In $O_2$ trim control, burner exhaust gas $O_2$ concentrations are monitored and used to modulate gas and supply air to obtain the highest efficiency air/fuel mixture or Stoichiometric ratio. Tracking controls proportion fuel and air ratios by applying the Bernoulli equation. As combustion air and gas flow change through metering devices, air pressure changes with the square of air and/or gas velocity. The blower and damper are adjusted together. It is contemplated that the LFFC be applied to both the air blowers and fuel metering valves to more precisely meter air into the combustion chamber and allow boiler to throttle down further. The LFFC may be used alternatively or in combination with linkage-less actuators that are currently used in burner boilers.

It is noted that CFM measurement may not be required from the LFFC in burner boiler applications. Rather, the LFFC provides high turndown resolution on both the air and fuel side. The combustion controller frequently does not need to calculate the mass air flow rate and simply positions the damper so the control feedback variable, $O_2$ approaches the set point value.

INDUSTRIAL APPLICABILITY

The LFFC described herein has application in any industrial sector that measures and throttles air or fluids. Such industrial sectors may include, but are not limited to: Biotechnology and drugs, Hospitals and Healthcare, Laboratories and Pharmaceuticals, Pollution and Treatment Controls, Water Utilities, Treatment and Filtration, Selected Manufacturing Industries, Semiconductor fabrication, Mining and Metals, Data Centers, and Diversified Machinery and Farming.

It is contemplated that multiple industrial applications are possible for the LFFC due to the accurate turndown of the damper design, advanced firmware, and software integration. For example, the LFFC can be used in devices for controlling multiple zones through multiplexing of dampers commensurate to thermal conductivity requirements and resetting of ancillary equipment such as fans, pumps, chillers and boilers at the zone level or system level. Localized zone heating and cooling now becomes affordable as several devices are being incorporated into one. This permits shutting down or going to minimum set points in unoccupied zones, thus conserving energy and maintaining IAQ and occupant comfort. The high turndown and accurate flow measurement makes the LFFC a natural integration into process type applications and refineries where an accurate air fuel mixture is commonly required resulting in increased productivity and reduced energy costs. The LFFC can be made out of various materials for caustic environments and various ancillary components such as sensing elements, transducers, firmware and software.

It is contemplated that the invention disclosed herein provides for a device that measures and regulates high and very low volumes of air and/or fluid flows with precision, inexpensively and with superior acoustics and greatly reduced energy consumption. The disclosure also provides for a high turndown device that permits use at lower velocities, greatly reducing noise generation and eliminating the need for sound-attenuating liners such as fiberglass and double walls. Further, the disclosure provides for a high rangeability device that allows streamlining product portfolios by combining several product part numbers into much smaller number of offerings. In another aspect, the disclosure provides for an inexpensive device that allows equipment to be scaled back 100-1 or higher, rather than legacy 5-1, which leads to energy savings, fewer product variations simpler and more robust application designs. Still further, the disclosure provides for a device that provides better fluid, air volume and water temperature control, while conserving more energy, employing a fundamentally simpler design and meeting all new and old building fresh air, comfort and energy codes. The disclosure is also directed to a device that can be engineered, selected, and sized without sophisticated software programs.

Related Device, System, and Method Embodiments

FIG. 12 depicts aspects of a fluid system 1200 according to embodiments of the present invention. As depicted here, system 1200 can include a device for measuring and controlling a fluid flow. In some cases, the fluid flow can be through a flow pathway in a duct 1202 of a heating, ventilation, and air conditioning (HVAC) system. The device can include an orifice plate 1204 positioned within the flow pathway and defining a variable opening $A_o$ for receiving flow there through. In some cases, the system or device can include an actuator assembly 1206 in operative association with the orifice plate 1204. As shown here, the system or device can also include a controller 1208 in operative association with the actuator assembly 1206, orifice plate 1204, or both. The controller 1208 can include a processor, and a memory communicatively coupled with and readable by the processor. Further, the controller memory can include stored processor-readable instructions that, when executed by the processor, cause the processor to determine a pressure differential between upstream and downstream sensors. In some cases, the instructions cause the processor to determine a position, configuration, or orientation of the plate 1204 (or components thereof), for example based on a position feedback received from the actuator assembly 1206. In some cases, the instructions cause the processor to operate the actuator assembly 1206 so as to regulate the variable opening $A_0$ based on the pressure differential and the position, orientation, or configuration of the plate 1204.

According to some embodiments, processor-readable instructions, when executed by the processor, cause the processor to determine one or more of (i) the sensor pressure differential, (ii) a variable opening area $A_o$ defined by the damper assembly or plate 1202, (iii) a flow coefficient $M_F$, and (iv) a flow rate based on the pressure differential and the flow coefficient.

In some cases, operation of the plate 1204, the actuator assembly 1206, an upstream fluid control and/or supply mechanism 1210, and/or a downstream fluid control mechanism 1212, as controlled by the controller 1208, can be based on input received by the controller 1208 from a user/operator setting device 1214, the plate 1204, the actuator assembly 1206, the 20 upstream fluid control and/or supply mechanism 1210, the downstream fluid control mechanism 1212, the upstream sensor $P_1$, and/or the downstream sensor $P_2$.

Embodiments of the present invention provide accurate flow measurement devices and methods. For example, such techniques can allow for control of fans which automatically saves 30 percent of energy in a building and substantially cuts part numbers and skews as one device has such a broad measuring range. Measuring accurately over such a wide range makes it more efficient to control flow. In addition, when only 20 CFM of outside air is required in a zone the device can meter in exactly 20 CFM of outside air. Currently available VAV boxes cannot measure down below say 300 CFM, so 280 CFM per zone needs to be re heated or re cooled thus unnecessarily loading the chillers and the boilers. Additional energy savings and better occupancy comfort are achieved.

The History and Theory Behind the Low Flow Fluid Controller (LFFC)

I. The Vena *Contracta*

Torricelli observed (1643) that water issuing from a small hole in a large tank contracts as it passes through the hole. Newton's attempts to quantify this discharge were unsuccessful until he too noticed the contraction in the "vein" of issuing water. He called the phenomenon the Vena *Contracta*, the name used to this day. He measured the contracted area to be about half the orifice area and published this in the $2^{nd}$ edition of his Principia (1713) as a correction to his earlier work.

In 1738 Bernoulli published his famous principle $$SP + \frac{1}{2}\rho v^2$$

is conserved along (not necessarily across) flow streamlines. In modern terminology TP(total pressure)=SP(static pressure)+VP(velocity pressure) constant on streamlines. So, if $\Delta p$ is the difference in static pressure inside the tank (at the level of the opening but far away so the velocity can be taken as 0) vs outside the tank, then $$\frac{1}{2}\rho v^2 = \Delta p.$$

Newton's Law of conservation of momentum, applied to fluids, gives $\rho v^2 A_o = \Delta p A_o$, $A_o$ the area of the opening, for one unaware of the Vena *Contracta*. This contradicts the previous equation unless $A_o = 0$: no "vein." Borda noticed (1760) that the momentum balance becomes $\rho v^2 A_c = \Delta p A_o$, $A_c$ the area of the contracted flow, when one takes the Vena *Contracta* into account, and the contradiction disappears if $$\frac{A_c}{A_o} = \frac{1}{2}.$$

Unfortunately, this result was in conflict with contemporary direct experiment, which estimated $$\frac{A_c}{A_o}$$

to be between .60 and .64. This contradiction between nature and the laws so recently won from nature has persisted for the past 250 years, standing in the way of deeper understanding of the orifice plate. By enforcing the more recently exploited concept of continuity of pressure, which by Bernoulli's principle implies also continuity of velocity along streamlines, consistency between nature and nature's laws obtains for $$\frac{A_c}{A_o}$$

between .536 and .753. Values below 0.536; in particular Newton/Borda's .5, are not viable.

II. Reconciliation of Theory and Measurement $$\frac{A_c}{A_o} = \frac{\text{Area of contracted stream}}{\text{Area of orifice} = \pi r_0^2}$$

Figure 18A:
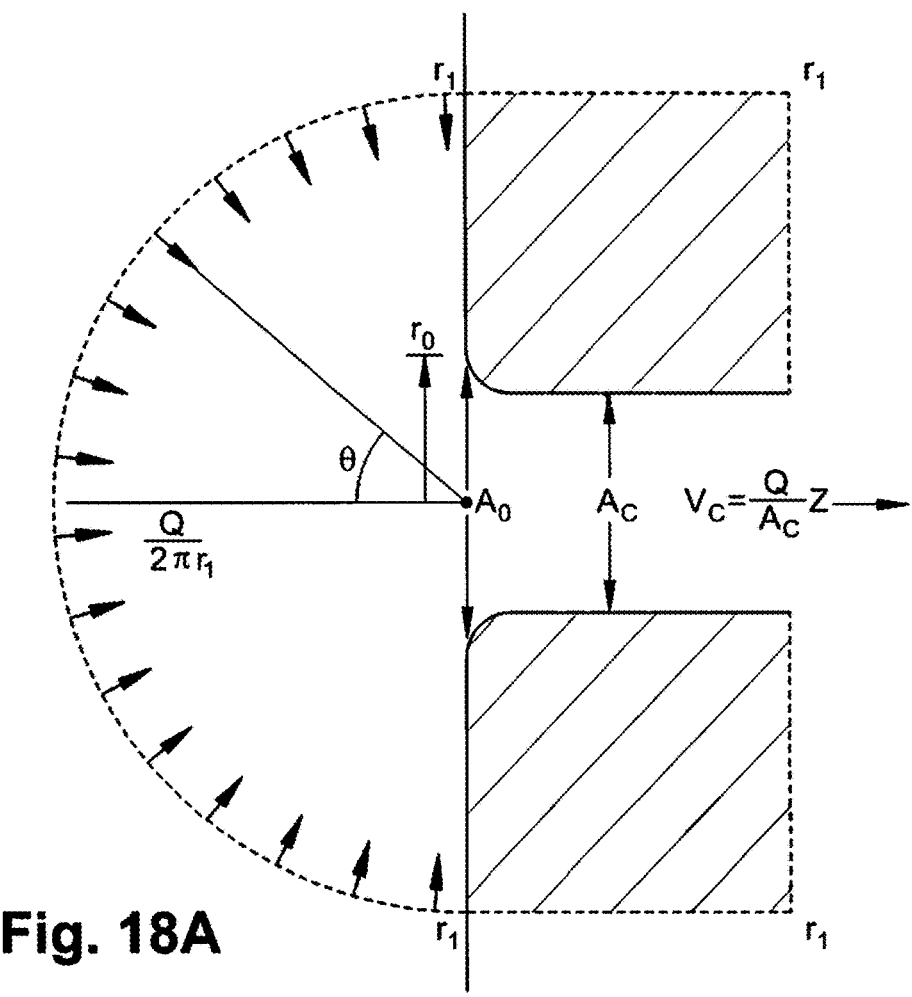
FIG. 18A shows a schematic view of an Orifice plate in Infinite Reservoir.

The model here is an infinite reservoir with a flat wall containing an orifice of area $A_o$. For concreteness axisymmetric flow is considered about a circular hole of radius $r_o$ (see FIG. 18A). Similar but weaker results are obtainable for more general shapes. The flow is complex in the area of the opening, but simple far upstream and beginning a short distance downstream of the hole. Upstream, at a radius $r >> r_o$, the flow becomes uniformly radial inward on concentric hemispheres:

$$v_r \to -\frac{Q}{2\pi r^2}, \text{ where } Q \text{ is the total flow; } v_\theta = v_\varphi = 0. \; r \gg r_o \quad (1)$$

(1) satisfies the incompressible Navier-Stokes equation in that region. Downstream of the Vena *Contracta* the flow is again simple: velocity is 0 outside of $A_c$, with uniform parallel flow (Velocity $v_c = Q/A_c$) in the z direction within $A_c$ downstream of the region of contraction.

The contracting "veins" of water Torricelli, Newton, and Borda observed issuing into still air appeared very much like FIG. 1. Viscosity and, at the indicated scale, gravity are not at issue here. With water issuing into still water or air into air, viscosity soon diffuses away the shear boundary of the "vein" and the flow spreads in a generally turbulent fashion. Nonetheless, the contracted jet does persist over a sufficient distance to validate the following analysis. z components of Force and Momentum Flux require balancing. The other components balance automatically in axisymmetric flow. The terms "Force and Efflux" will refer here to respective components in the z direction in FIG. 1.

Although Bernoulli's equation applies individually to each streamline, all streamlines in the present flow arise from uniform still fluid at $r = \infty$, so Total Pressure (TP) can reasonably be equated on all streamlines. This can't be said for the still fluid downstream of the plate, which does not originate in the upstream reservoir, need not even consist of the same type of fluid, and will be seen to have a uniform TP less than the TP just defined for the flow originating upstream.

$$S_1\text{:Efflux} = \quad (2a)$$

$$-\int_{S_1} \rho v v_z dS = -\rho\left(\frac{Q}{2\pi r_1^2}\right)^2 (2\pi r_1^2)\int_0^{\pi/2}\cos\theta\sin\theta d\theta = -\left(\frac{\rho Q^2}{4\pi r_1^2}\right), r_1 \gg r_o$$

$$\text{Force} = \int SP_1\cos\theta dS = \quad (2b)$$

$$\left(TP - \frac{\rho}{2}\left(\frac{Q}{2\pi r_1^2}\right)^2\right)2\pi r_1^2\int_0^{\pi/2}\cos\theta\sin\theta d\theta = TP\pi r_1^2 - \left(\frac{\rho Q^2}{8\pi r_1^2}\right), r_1 \gg r_o$$

$$S_2\text{:Efflux} = \rho V_c^2 A_c = \rho\frac{Q^2}{A_c} \quad (3)$$

Forces on $S_2$ and downstream face of $S_o$ balance for $r >= r_0$, leaving $$\text{net Force} = -SP_c A_o = -\left(TP - \frac{\rho}{2}\left(\frac{Q}{A_c}\right)^2\right)A_o \text{ for } r < r_0. \quad (4)$$

$S_o$:Force of upstream face of plate = \quad (5)

$$-\int SP dS_0 = -\int_{r_0}^{r_1}\left(TP - \frac{\rho}{2}v_r^2\right)2\pi r dr = -TP(\pi r_1^2 - \pi r_0^2) + \frac{\rho}{2}\int_{r_0}^{r_1}v_r^2 2\pi r dr.$$

TP terms cancel, as they must, leaving $$\frac{1}{r_1^2}$$

terms which drop out when $$r1 \to \infty. \frac{\rho Q^2}{2}$$

will then factor out of remaining terms, if $-v_r$ is written as $$\frac{Q}{2\pi r^2}(1+f): \begin{matrix} f \to 0 \\ r \to \infty \end{matrix} . v_r \approx -\frac{Q}{4\pi r^2}$$

asymptotically for $r >> r_0$, but continuity of v along the constant velocity, constant pressure streamlines issuing downstream from the orifice edge requires $$-v_r(r_0) = v_c = \frac{Q}{A_C} > \frac{Q}{2\pi r_0^2} = \frac{Q}{2A_o}\cdot\left(\frac{A_c}{2A_o} \approx \frac{.62}{2} = .31\right).$$

Setting $$f(a_o) = \frac{2\pi r_0^2}{A_c} - 1$$

accomplishes this $$v_r^2 = \left(\frac{Q}{2\pi r^2}\right)^2 + \left(\frac{Q}{2\pi r^2}\right)^2 f(2+f), \text{ and} \qquad (6)$$

$$\frac{\rho}{2}\int_{r_0}^{r_1} v_r^2 2\pi r\, dr =$$

$$\frac{\rho Q^2}{2}\int_{r_0}^{r_1}\left(\frac{1}{2\pi r^2}\right)^2 2\pi r\, dr + \frac{\rho Q^2}{2}\int_{r_0}^{r_1}\left(\frac{1}{2\pi r^2}\right)^2 f(2+f)2\pi r\, dr =$$

$$\frac{\rho Q^2}{2}\int_{r_0}^{r_1}\frac{1}{2\pi}r^{-3}dr + \frac{\rho Q^2}{2}\int_{r_0}^{r_1}\frac{1}{2\pi}r^{-3}f(2+f)dr = \frac{\rho Q^2}{2}\frac{1}{2\pi}\frac{r^{-2}}{-2}\Big|_{r_0}^{r_1} +$$

$$\frac{\rho Q^2}{2}\int_{r_0}^{r_1}\frac{f(2+f)}{2\pi r^3}dr = \frac{\rho Q^2}{2}\left(\frac{1}{4\pi r_0^2} - \frac{1}{4\pi r_1^2}\right) +$$

$$\frac{\rho Q^2}{2}\int_{r_0}^{r_1}\frac{f(2+f)}{2\pi r^3}dr.$$

Figure 18B:
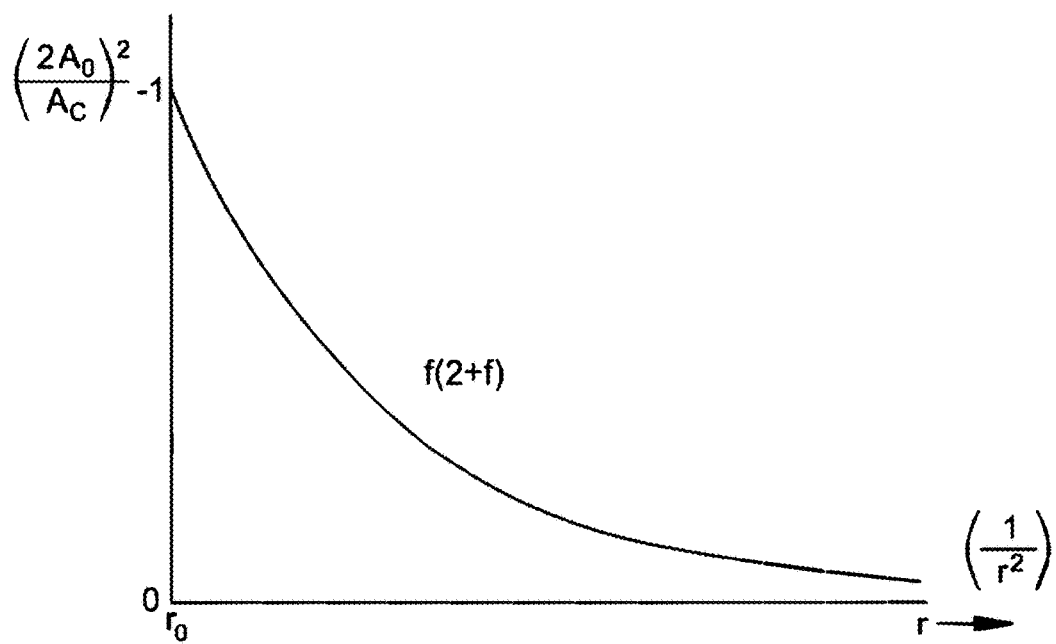
FIG. 18B is a graph of Scaled $v^2$ Correction Term f(2+f)

See FIG. 18B.

Note: $f(a_o)(2+f(a_o)) =$ $$\left(\frac{2\pi r_0^2}{A_c}-1\right)\left(\frac{2\pi r_0^2}{A_c}+1\right) = \left(\frac{2\pi r_0^2}{A_c}\right)^2 - 1 = \left(\frac{2A_o}{A_c}\right)^2 - 1.$$

Letting $r_1 \to \infty$ now and factoring out $$\frac{\rho Q^2}{2},$$

the force-efflux balance becomes $$\frac{A_o}{A_c^2} + \frac{1}{4A_o} + \int_{r_o}^{\infty}\frac{f(2+f)}{2\pi r^3}dr = \frac{2}{A_c}. \qquad (7)$$

Multiplying through by $A_o$:

$$\left(\frac{A_o}{A_c}\right)^2 - 2\left(\frac{A_o}{A_c}\right) + \frac{1}{4} + A_o\int_{r_o}^{\infty}\frac{f(2+f)}{2\pi r^3}dr = 0,$$

and passing to a dimensionless variable $$x = \frac{A_o}{\pi r^2} = \left(\frac{r_o}{r}\right)^2 \text{ so } dx = -\frac{2A_o}{\pi r^3}dr,$$

put this into dimensionless form:

$$\left(\frac{A_o}{A_c}\right)^2 - 2\left(\frac{A_o}{A_c}\right) + \frac{1}{4} + \frac{1}{4}\int_0^1 f(2+f)dx = 0 \qquad (8)$$

Figure 18C:
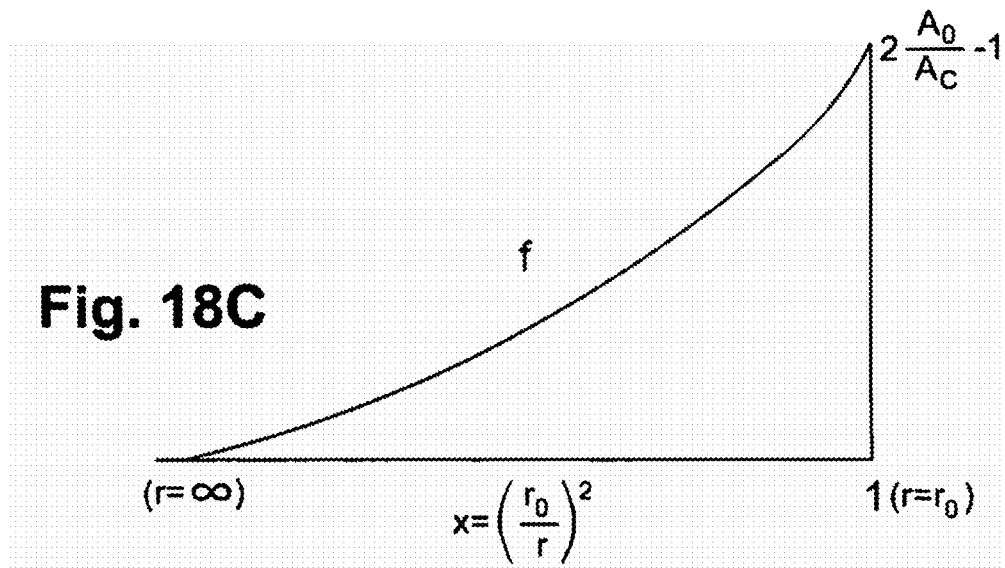
FIG. 18C is a graph of a Flow Correlation Factor f.

See FIG. 18C.

$$\frac{Q}{2\pi r^2}$$

represents the lowest order (n=0; mass flow) term in an expansion of the axisymmetric potential flow in the upstream infinite hemisphere using harmonic potentials $$\varphi_{2n} = \frac{P_{2n}(\cos\theta)}{r^{2n+1}}.$$

The even order Legendre Polynomials $P_{2n}$ (COS $\theta$) form an orthogonal basis on $$\left[0, \frac{\pi}{2}\right],$$

and the flow terms $\propto \nabla\varphi_{2n}$ give radial velocities $$\frac{c}{r^{2n+2}}$$

along the boundary $$\theta = \frac{\pi}{2};$$

the upstream surface of the orifice plate. Take $$f_n = \left(\frac{2A_o}{A_c}-1\right)\left(\frac{r_o}{r}\right)^{2n} = \left(\frac{2A_o}{A_c}-1\right)x^n$$

the, so $$-V_r = \frac{Q}{2A_o}x\left(1+\left(\frac{2A_o}{A_c}-1\right)x^n\right), \text{ so } \frac{1}{4}\int_0^1 f_n(2+f_n)dx =$$

$$\left(\frac{A_o}{A_c}\right)^2\frac{1}{2n+1} + \left(\frac{A_o}{A_c}\right)\left(\frac{1}{n+1}-\frac{1}{2n+1}\right) - \frac{1}{4}\left(\frac{1}{n+1}-\frac{1}{2n+1}\right),$$

so (8) becomes $$\left(\frac{A_o}{A_c}\right)^2\left(1+\frac{1}{2n+1}\right) - 2\frac{A_o}{A_c}\left(1-\frac{.5}{n+1}+\frac{.5}{n+1}\right) + \frac{1}{4}\left(1-\frac{2}{n+1}+\frac{1}{2n+1}\right), \qquad (9)$$

and $$\frac{A_c}{A_o} = \frac{1+\frac{1}{2n+1}}{\left(1-\frac{.5}{n+1}+\frac{.5}{2n+1}+\sqrt{\left(1-\frac{.5}{n+1}+\frac{.5}{2n+1}\right)^2 - \frac{1}{4}\left(1+\frac{1}{2n+1}\right)\left(1-\frac{2}{n+1}+\frac{1}{2n+1}\right)}\right)} \qquad (10)$$

Values of the contraction coefficient $$\frac{A_c}{A_o}$$

using a single higher order $\varphi_{2n}$ are plotted in a table at right. The lower limit 0.536 is rigorous and obtainable independently and for more general orifice shapes, without recourse to the axial symmetry and zonal harmonics employed above. The upper limit 0.753, on the other hand, is dependent on a single higher harmonic $\varphi_{2n}$, together with the $\varphi_o$ term, dominating the flow. A more complex model giving values to nonzero coefficients for more, possibly all, of the $\varphi_{2n}$ would be needed to further narrow the range of, or possibly completely define, $$\frac{A_c}{A_o}.$$

AS It is, including more zonal harmonics just fills in $$\frac{A_c}{A_o}$$

between the Table 1 values and also a bit above 0.753.

TABLE 1

| n | $\frac{A_c}{A_o}$ |
|---|---|
| 1 | .753 |
| 2 | .675 |
| 3 | .638 |
| 4 | .617 |
| 5 | .603 |
| 6 | .593 |
| 7 | .585 |
| 8 | .58 |
| ↓ | ↓ |
| ∞ | .536 |

Kirchoff, 1869, found 0.611 rigorously for an orifice in the form of an infinite slot.

The above stands as a limiting case of ducted orifice plates for $$\frac{A_o}{A_d} \to 0 \text{ (duct area } A_d \to \infty\text{)}.$$

A similar analysis applies for finite $A_d$.

III. Ducted Orifice Plates

The ducted orifice plate has been a standard device for measuring fluid flow for well over 100 years. For an orifice in a duct the contraction ratio $$\frac{A_c}{A_o}$$

cannot remain constant at the often assumed values of 0.61 or 0.62 as $$\frac{A_o}{A_d} = \frac{\text{orifice area}}{\text{duct area}} \to 1:$$

at $$\frac{A_o}{A_d} = 1$$

there is no orifice plate, so $$\frac{A_c}{A_o} \text{ must} = 1$$

also. In 1872 Weisbach summarized contemporary experimental results in the correlation $$\frac{A_c}{A_o} = .62 + .38\left(\frac{A_o}{A_d}\right)^3. \tag{11}$$

Figure 18D:
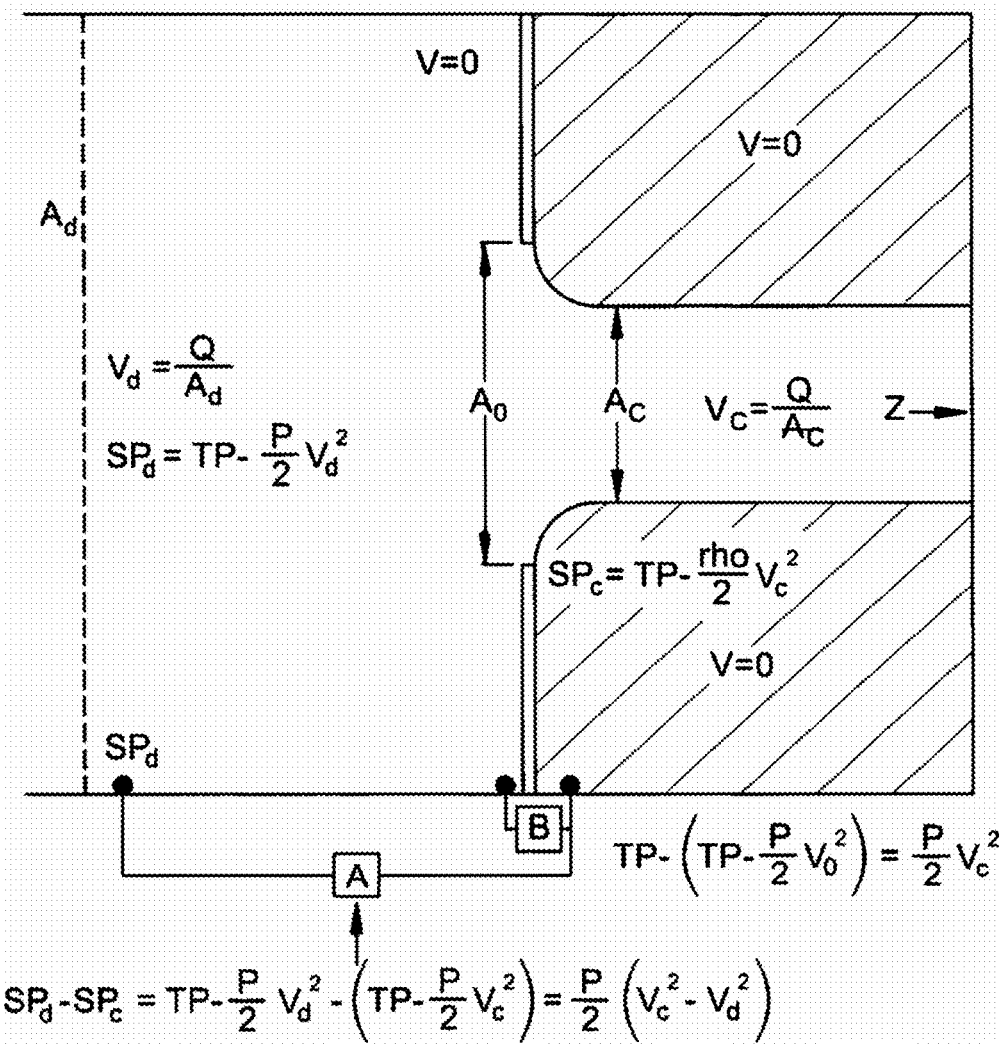
FIG. 18D is a schematic view of a Ducted Orifice Plate.

Test (11) and similar expressions for compatibility with z-force and momentum and mass flux balance:

On $S_1$, z-flux=$-\rho V_d^2 A_d$ See FIG. 18D

On $S_2$, z-flux=$\rho V_c^2 A_c$

On $S_1$, $$z\text{-force} = SP_d A_d = TP A_d - \frac{\rho v_d^2}{2} A_d$$

TP and velocity may be taken constant across streamlines far upstream, with duct face velocity $v_d$. The periphery of the upstream surface of the orifice plate is a stagnation zone: V=O, so SP=TP–O=TP there. The velocity along the upstream face increases to $V_c$ as it nears the edge of the opening, so SP drops from TP to TP-$VP_c$ at the edge.

For r>$r_o$ forces in the back of the orifice plate and at $S_2$ are in balance, leaving net force $$-SPA_o = -\left(TP - \rho\frac{v_c^2}{2}\right)A_o.$$

Figure 18E:
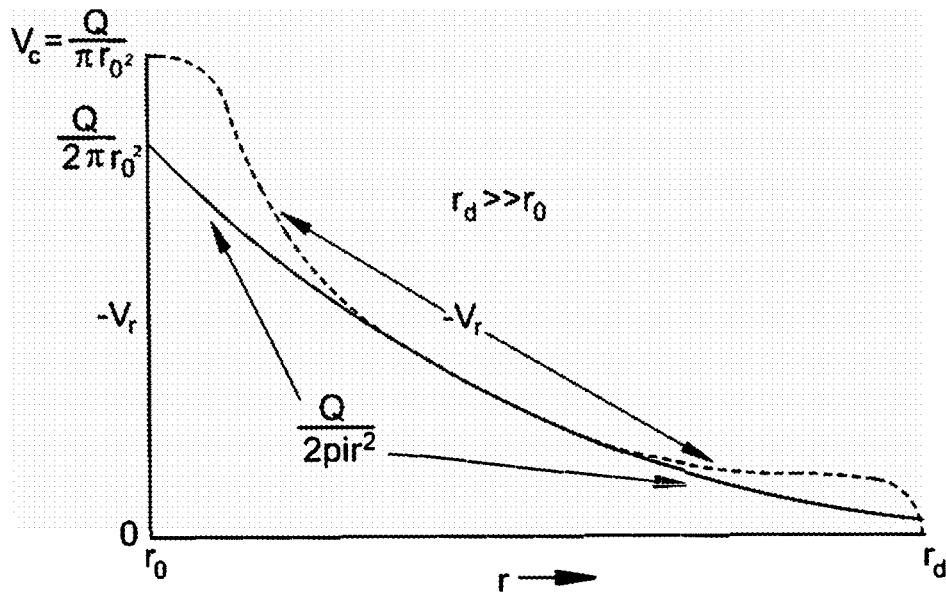
FIG. 18E is a graph of Radial Velocity on Orifice Plate.
Figure 18F:
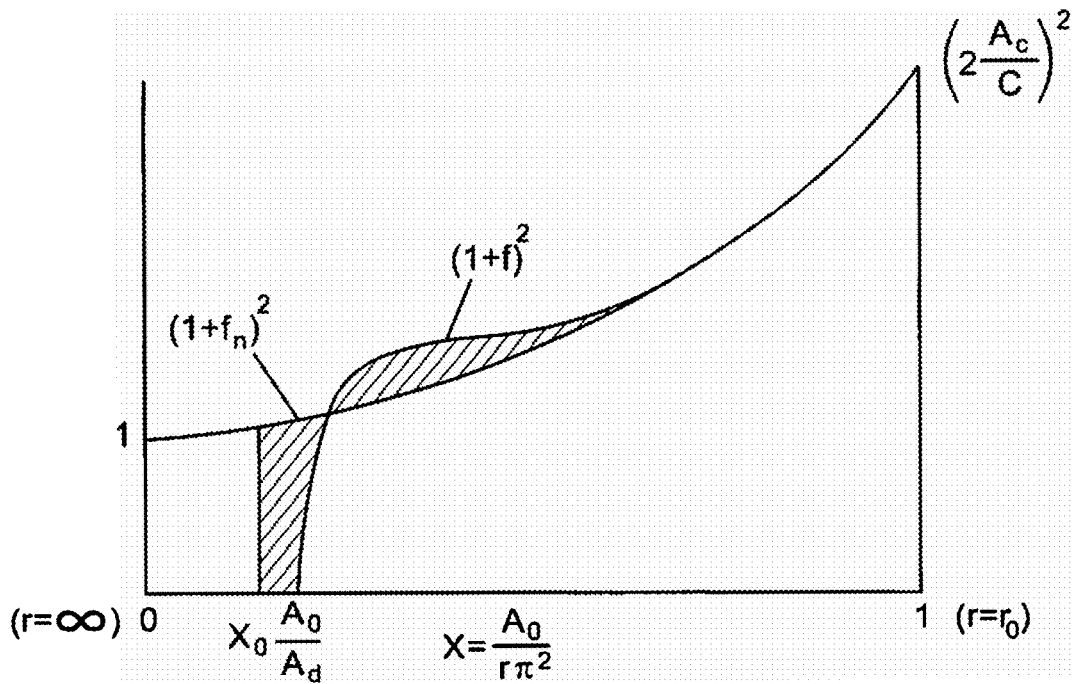
FIG. 18F is a graph of Integrands of Ducted vs. Infinite Plate.

For duct radius $r_d$>>$r_o$, there is a region of radial flow $v_r \approx$ $$v_r \approx -\frac{Q}{2\pi r^2},$$

with departures near r=$r_o$ and r=$r_d$.
See FIG. 18E.
$f_n$ satisfying conditions at r=$r_o$, or $$x = \left(\frac{r_o}{r}\right)^2 = 1$$

were developed above. Now 1+f must vanish at the stagnation point $r_d$, where the plate meets the duct at 90°. We plot the $(1+f)^2$ and $(1+f_n)^2$ integrands in FIG. 18F. Find $x_o$ s.t. $\int_{x_o}^{1}(1+f_n)^2 = \int_{A_o/A_d}^{1}(1+f)^2$.

This permit replacing the lower limit of integration 0 in (8) with $x_0$, which evaluates to an even less tractable sequel to (10):

$$\frac{A_c}{A_o} = \frac{1 + \frac{1-x_o^{2n+1}}{2n+1}}{1 - \frac{1-x_o^{n+1}}{2(n+1)} + \frac{1-x_o^{n+1}}{2(n+1)} + \sqrt{\left(1 - \frac{1-x_o^{n+1}}{2(n+1)} + \frac{1-x_o^{n+1}}{2(n+1)}\right)^2 - \left(1 + \frac{x_o^{2n+1}}{2n\pi}\right)\left(\frac{1-x_o}{4} - \frac{1-x_o^{n+1}}{2(n+1)} + \frac{1-x_o^{2n+1}}{4(n+1)}\right)}} \quad (12)$$

$x_0$ is not constant: it must catch up with $$\frac{A_o}{A_d} \text{ as } \frac{A_o}{A_d} \to 1$$

and the integral vanishes. A natural choice for this function, $$x_o = \frac{A_o}{A_d}\left(\varepsilon + (1-\varepsilon)\frac{A_o}{A_d}\right),$$

yields a good match between Weisbach's curve and $A_c/A_0$ from (12), with $\varepsilon=0.2$ and $n=4$. (With this crude model, just bounding curves a little above and below Weisbach's were anticipated. Instead, a near perfect match emerged.)

With these results in hand, examination of orifice plate flow/discharge coefficients can proceed.

IV. The Flow Coefficient

Bernoulli's Principle relates velocities and pressures along streamlines: at arbitrary points 1 and 2 on any streamline, $$SP_1 + \rho\frac{v_1^2}{2} = SP_2 + \rho\frac{v_2^2}{2}. \quad (13)$$

For flow uniform across areas $A_1$ and $A_2$ enclosing the same bundle of streamlines, and with Q the common total flow through the $A_i$, (13) becomes $$\Delta P = SP_1 - SP_2 = \frac{\rho}{2}\left(\frac{Q}{A_2}\right)^2 - \frac{\rho}{2}\left(\frac{Q}{A_1}\right)^2 = \frac{\rho Q^2}{2}\left(\frac{1}{A_2^2} - \frac{1}{A_1^2}\right). \quad (14)$$

(14) expresses differences in static pressure as a function of $Q^2$ and a coefficient with dimensions $$\frac{1}{A^2}.$$

It rearranges directly into an expression of Q in terms of pressure differences:

$$Q = \frac{\sqrt{\frac{2\Delta p}{\rho}}}{\sqrt{\frac{1}{A_2^2} - \frac{1}{A_1^2}}} \quad (15)$$

It is common to redefine (15) in terms of flow through a reference area $A_o$ and a dimensionless constant, here called $C_F$. Multiplying and dividing by $A_o$ in (15), gives $$Q = \frac{A_o\sqrt{\frac{2\Delta p}{\rho}}}{\sqrt{\left(\frac{A_o}{A_2}\right)^2 - \left(\frac{A_o}{A_1}\right)^2}} \equiv C_F A_o\sqrt{\frac{2\Delta p}{\rho}}, \quad (16a)$$

$$C_F = \frac{1}{\sqrt{\left(\frac{A_o}{A_2}\right)^2 - \left(\frac{A_o}{A_1}\right)^2}} \text{ the Flow Coefficient} \quad (16b)$$

(16) is immediately applicable to any inviscid system in which the same flow passes uniformly through at least 2 distinct areas $A_1$ and $A_2$ $$A_2 \cdot \sqrt{\frac{2\Delta p}{\rho}}$$

has the dimensions of a velocity: multiplied by $A_o$, it can be thought of as the mean flow through that area. The physical system being modeled may not actually possess a section of area equal to the reference $A_o$, and in case $A_o$ does refer to a physical location in the system, the flow need not be uniform or even measurable there. $A_o$ may refer to one of the actual measurement areas $A_1$ or $A_2$; in the case next considered, it does not.

IV-A. The Orifice Plate Discharge Coefficient

Something like (16) is widely used with a great variety of flow measuring devices, along with tables and graphs of the flow coefficient $C_F$, or the related discharge coefficient $C_d$. In families of devices in which the areas $A_1$ and $A_2$ may approach arbitrarily closely to each other, $C_F$ graphs can never be complete: $C_F = \infty$ if $A_1 = A_2$. For orifice plates, particularly in the US, a variant of (16) has been developed in which the explosive behavior as $A_2 \to A_1$ has been factored out.

FIG. 4A illustrates a typical orifice plate tap arrangement. The downstream tap is located just downstream of the plate, where it measures still air at essentially $SP_c$, the static pressure in the contracted stream. (In still air, SP is constant, and by continuity of pressure, must equal the constant pressure $P_c$ in the contracted stream.) The upstream tap measures $SP_d$ in the undisturbed flow at a fixed distance upstream of the plate. $A_o$ is the area of the orifice itself. (16) becomes $$Q = \frac{A_o\sqrt{\frac{2\Delta p}{\rho}}}{\sqrt{\left(\frac{A_o}{A_c}\right)^2 - \left(\frac{A_o}{A_d}\right)^2}} = C_F A_o \sqrt{\frac{2\Delta p}{\rho}} : C_F = \frac{1}{\sqrt{\left(\frac{A_o}{A_c}\right)^2 - \left(\frac{A_o}{A_d}\right)^2}}. \quad (17)$$

The variant is $$Q = \frac{C_d A_o}{\sqrt{1 - \left(\frac{A_o}{A_d}\right)^2}} \sqrt{\frac{2\Delta p}{\rho}} \quad (18)$$

which has been the standard form in the US since at least 1930 (Johansen). (18) differs markedly from (17) and appears to have no theoretical foundation. It is extremely useful and successful, however!

The measured Coefficient of Discharge $C_d$ varies little between $$\frac{A_o}{A_d} = 0$$

and 0.5, and by only about 10% on [0,1]. Yet it appears to arise from ignoring the Vena *Contracta*, so $$\left(\frac{A_o}{A_c}\right)^2$$

is replaced by 1 in (17), then bringing in $C_d$ as a correction factor to make it work. But it works superbly well! (17) and (18) give $$C_d = \sqrt{\frac{1 - \left(\frac{A_o}{A_d}\right)^2}{\left(\frac{A_o}{A_c}\right)^2 - \left(\frac{A_o}{A_d}\right)^2}} \quad (19)$$

If nothing else, (19) does explain the coinciding of $C_d$ and $$\frac{A_c}{A_o}$$

values for small $$\frac{A_o}{A_d}.$$

Setting $$\frac{A_o}{A_d} = 0$$

gives $$C_d(0) = \sqrt{\frac{1}{\frac{A_o}{A_c}(0)^2}} = \frac{A_c}{A_o}(0).$$

They are in fact identical.

It's far from obvious from the appearance of (19) that $C_d$ would be nearly independent of $$\frac{A_o}{A_d}.$$

Some words of explanation are in order. Assuming $$\frac{A_o}{A_c}$$

smooth, and noting $A_o = A_d$ means no orifice plate, so $A_c = A_d$, a removable singularity at $$\frac{A_o}{A_d} = 1$$

becomes apparent:

$$C_d(1) = \sqrt{\frac{0}{0}}$$

before $$1 - \frac{A_o}{A_d}$$

is factored out or numerator and denominator. Inserting Weisbach's correlation into (19) gives:

$$C_d = \sqrt{\frac{1 - \left(\frac{A_o}{A_d}\right)^2}{\left(.62 + .38\left(\frac{A_o}{A_d}\right)^3\right)^{-2} - \left(\frac{A_o}{A_d}\right)^2}} = \quad (20)$$

$$\left(.62 + .38\left(\frac{A_o}{A_d}\right)^3\right)\sqrt{\frac{1 - \left(\frac{A_o}{A_d}\right)^2}{1 - \left(.62 + .38\left(\frac{A_o}{A_d}\right)^3\right)^2\left(\frac{A_o}{A_d}\right)^2}} =$$

$$(.62 + .38\left(\frac{A_o}{A_d}\right)^3)\sqrt{\frac{1 - \left(\frac{A_o}{A_d}\right)^2}{1 - \left(.62\left(\frac{A_o}{A_d}\right) + .38\left(\frac{A_o}{A_d}\right)^4\right)^2}}$$

The denominator is an 8th degree polynomial which vanishes at $$\frac{A_o}{A_d} = 1.$$

$$1 - \frac{A_o}{A_d}$$

(but not $$1 - \left(\frac{A_O}{A_d}\right)^2 )$$

can be factored out of numerator and denominator, leaving $$1 + \left(\frac{A_o}{A_d}\right)$$

divided by an exceedingly cumbersome seventh degree polynomial. (20) sags slightly from $$\frac{A_o}{A_d} = 0$$

to 0.61 at 0.4 then works its way up to over 0.68 at 1. Since $C_d$ is considered a slowly and steadily increasing fraction of $$\frac{A_o}{A_d},$$

this would seem to eliminate Weisbach's expression for $$\frac{A_c}{A_o},$$

although it does demonstrate weak dependence of $C_d$ on $$\frac{A_o}{A_d}.$$

Looking again at (19), note that if $$\frac{A_o}{A_c}$$

were a polynomial in $$\left(\frac{A_o}{A_d}\right)^2,$$

equal to 1 at $$\frac{A_o}{A_d} = 1,$$

then $$1 - \left(\frac{A_o}{A_d}\right)^2$$

would necessarily factor out of $$\left(\frac{A_o}{A_c}\right)^2 - \left(\frac{A_o}{A_d}\right)^2.$$

The unique $1^{st}$ degree polynomial in $$\left(\frac{A_o}{A_d}\right)^2$$

satisfying these requirements and $$\frac{A_c}{A_o}(0) = c;$$

e.g. c=.62 (Weisbach), c=.6611 (Kirchoff 1869:infinite slot; 2-d conformal mapping), is $$\frac{1}{c} - (\frac{1}{c} - 1)\left(\frac{A_o}{A_d}\right)^2, \text{ or} \qquad (21)$$

$$\frac{A_c}{A_o} = \frac{c}{1 - (1-c)\left(\frac{A_o}{A_d}\right)^2}$$

With c=0.611 (Kirchoff 1869), $A_c/A_o =$ $$A_c/A_o = \frac{.611}{1 - .389\left(\frac{A_o}{A_d}\right)^2}$$

lies very close to Weisbach's $$.62 + .38\left(\frac{A_o}{A_d}\right)^3$$

in fact the c=0.60 and c=0.62 curves tightly bracket Weisbach's, lending support to the new correlation (21) with Kirchoff s 0.611. (21) is no more complex than Weisbach's (11) and will prove advantageous in what follows.

Substitution of (21) into (19) gives, far from the cumbersome (20) resulting from insertion of Weisbach's correlation, a simple result standing in clear relation to (21):

$$C_d = \frac{c}{\sqrt{1 - (1-c)^2\left(\frac{A_o}{A_d}\right)^2}} \qquad (22)$$

The square on the (1−c) factor: ((1-0.611)²=0.1513), together with the square root ($\sqrt{1-0.1513} \approx 0.917$), combine to create gently increasing curves compared to the superficially strikingly similar (21); increasing only about 9% at 1.

The theoretical (17) and the intensely practical US standard (18) have been shown to be compatible after all. A link has been forged. In the process, two new useful correlations have been adduced:

$$\frac{A_c}{A_o} = \frac{c}{1-(1-c)\left(\frac{A_o}{A_d}\right)^2} \quad (21)$$

and $$C_d = \frac{c}{\sqrt{1-(1-c)^2\left(\frac{A_o}{A_d}\right)^2}} \quad (22)$$

and $$c_d = c/\sqrt{1-(1-c)^2(A_o/A_d)^2}$$

$c \sim 0.611$, which greatly facilitate modeling of the LFFC. i. Notes:

1. $\left(\frac{A_o}{A_d}\right)^2 = \beta^4$ in terminology familiar to many.

2. The $$\sqrt{\frac{2}{\rho}}$$

factor appearing in (17) and (18) evaluates to about 4000-4005 fpm/√(in. wg.) in English units.

IV-B. The Orifice Plate Coefficient

There appears to be no standard usage for the terms flow coefficient and discharge coefficient. Here, "discharge coefficient" is used only in connection with (18), in the combination $$\frac{C_d}{\sqrt{1-\left(\frac{A_o}{A_d}\right)^2}}$$

to form the more general $C_F$. Flow coefficient, then, is the general term applied to the coefficient $C_F$ in (16), $$\frac{C_d}{\sqrt{1-\left(\frac{A_o}{A_d}\right)^2}}$$

being available as a replacement in cases in which $C_F$ blows up for $$\frac{A_o}{A_d} \to 1.$$

$C_F$ does blow up and is often replaced by $$\frac{C_d}{\sqrt{1-\left(\frac{A_o}{A_d}\right)^2}},$$

particularly in the US, in the standard tap setup in FIG. 4. The static pressure becomes the same upstream and downstream as $$\frac{A_o}{A_d} \to 1$$

and the plate disappears, so the above denominator does →0. If $$\frac{A_o}{A_d} \text{ is not} \approx 1,$$

and the upstream face of the orifice plate meets the duct wall cleanly at 90° that corner is a stagnation point (circle, really). v=0 right there, so TP=SP and a sufficiently small tap at that point will read TP. Or, a Pitot tube can be used in the undisturbed upstream flow. Either way, there results $$\Delta P = TP - \left(TP - \rho\frac{v_c^2}{2}\right) = \rho\frac{v_c^2}{2} = \frac{\rho}{2}\left(\frac{Q}{A_c}\right)^2, \quad (23a)$$

$$\text{so } Q = A_c\sqrt{\frac{2\Delta P}{\rho}} = \left(\frac{A_c}{A_o}\right)A_o\sqrt{\frac{2\Delta P}{\rho}}$$

Compare (16):

$$C_F = \frac{A_c}{A_o}. \quad (23b)$$

The contraction coefficient, which required so many pages in development, is the flow coefficient. Not only does $C_F$ not blow up; it never exceeds 1. With amplifying downstream tap, the maximum drops even lower (higher magnification).

This is the preferred implementation: upstream TP tap, so $$C_F = \frac{A_c}{A_o} = \frac{c}{1-(1-c)\left(\frac{A_o}{A_d}\right)^2}, c\sim.61, \frac{A_o}{A_d}$$

as described in the next section. When static upstream taps are mandated, the new correlation (22) can be used with (18), or (21) with (17).

When Pitot tubes are ruled out; in particular if the fluid contains particulates which would eventually block a pitot tube, one need not resort to static upstream taps. An orifice ring: an orifice plate with $$\frac{A_o}{A_d} \sim .8$$

installed upstream of the LFFC, affords an upstream stagnation circle from which TP may be tapped.

The Butterfly Damper

Figure 18G:
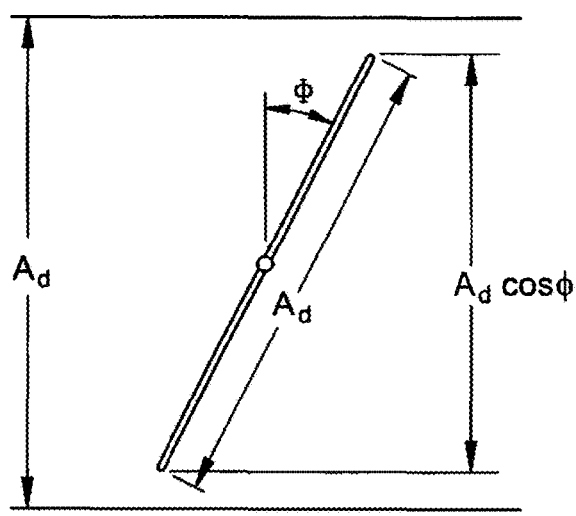
FIG. 18G is a schematic view of a Butterfly Damper.
Figure 18H:
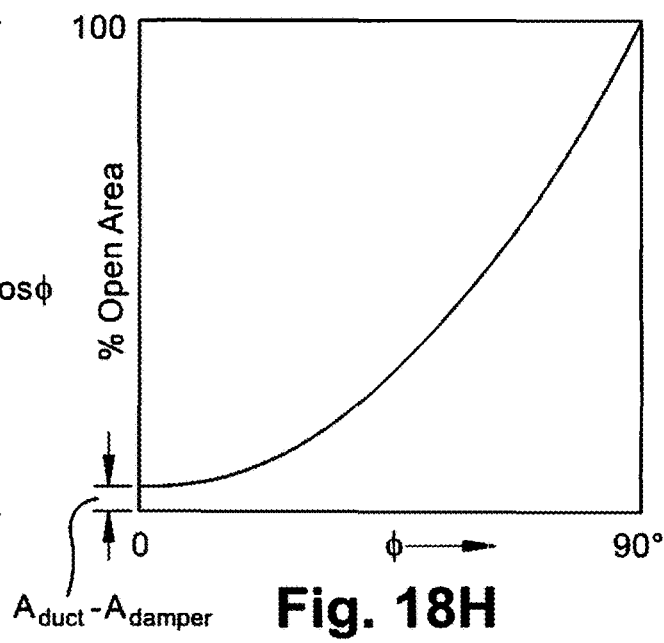
FIG. 18H is a graph of a Butterfly Damper Open Area.

Referring to FIGS. 18G to 18I, the butterfly damper can be viewed as a variable orifice plate with projected open area $A_o = A_{duct} - A_{damper} * \cos(\theta)$. Positive seal is possible using an annular seat, either very precisely machined or with a gasket working in compression (7c). In some realizations the latter is implemented. Because of variable gasket relaxation and memory set, and the complexity of flow through the nearly closed damper, the first few degrees of opening do not give reliable differential pressure readings in such an implementation.

The 2-Stage Flow Station/Damper

The 2-stage damper overcomes the limitations of the standard butterfly damper as a flow measuring device. The Vena Contracta of the inner disk is controlled, not by the area projected normal to the duct as in the simple butterfly damper, but by the projection of the inner annulus opening $A_o$ normal to the faces of the annulus and opening disk itself. See FIGS. 18J and 18K.

$A_o = A_{disk} \sin \theta$ (not cosine, as with the outer damper). The disk and annulus (possibly overlapping) opening sequence satisfies $$A_o \approx A_{disk} \sin \theta_{disk} + (A_{duct} - A_{disk})(1 - \cos \theta_{annulus})$$

As shown in FIG. 18L with the annulus, the first few degrees of disk opening are concerned with initial gasket decompression. After that, a delayed $\sin(\theta - \theta_o)$ curve sets in. Gasket set and relaxation do not substantially affect this curve, which is controlled by flow along the disk face and annulus face (7d). This picture is complicated by the fact that full gasket decompression does not occur simultaneously at all points around the disk. The point farthest from the shaft may decompress fully at 2°, say; then the opening appears in the shape of a widening smile as the disk opens. This actually affects the curve (7f) very little, but accounting for it greatly complicates the appearance of the flow coefficient formula.

At 100% open, the open area is not quite $A_{duct}$. The shaft and, if used, annular wall gasket remain as obstructions in an otherwise clear flow field. These account for nearly the entire pressure drop at 100% open, so must be modeled carefully in the formula. Formula elements are listed in the appendix. These are assembled in accord with the implementation to give the appropriate flow coefficient as function of % open. In preferred implementations, readings are obtained from a TP sensor upstream of the damper and a downstream SP tap in specified amplifying locations tight to the back of the annulus, slightly depressing the curve (70. Lower flow coefficient represents higher magnification, of course. Since between say 2% and 10% the flow coefficient increases linearly from 0 (if no leakage), maximum magnification is theoretically infinite, subject to practical considerations of actuator consistency at setting and defining angular position etc.

Reduction to Practice

Although, theoretical representations such as the above are extremely useful in working out new designs, actual measurements made on physical models must always take precedence. A table of measured flow coefficients vs % open rather than the theoretical formula will be provided for each LFFC-based product and configuration, based particularly on the upstream sensor being used. If an actuator with significant hysteresis is mandated, no single table can be used unless the hysteresis is uniform and predictable, so that actual damper position can be inferred from readings. Inexpensive actuators without significant hysteresis are readily available.

Measurement at Very Low Reynolds Numbers

With the exception of the remarkable Moody Chart, all commonly used flow and fitting loss coefficient values are valid only at sufficiently high Reynold Numbers. An auxiliary table may be incorporated into LFFC product configurations to indicate the boundary of the Reynolds-independent regime in which the Flow Coefficient depends only on damper position. Control extends perfectly well through the low-Reynolds regime: only display accuracy is affected. Depending on configuration of the upstream sensor and the % open of the LFFC, the transition may be anticipated in the neighborhood of $Re \approx 2000$.

In applications where accurate readout is required into this very low flow regime, a (much larger) low flow coefficient table dependent not only on damper setting, but on the low Reynolds number as well, provides this extension.

Actuation

A pair of ganged actuators has been employed, driving concentric shafts, although it's certainly possible to use isolated actuators at each end of collinear damper shafts. A more economical single actuator with 2-stage concentric output has been developed.

Installation Requirements

No flow sensing device is able to give an accurate measure of total flow in the presence of a severely disturbed flow profile. Manufacturers recommend, but seldom get, about 5 diameters of straight duct upstream of a sensor. For tight installations calibrated profile-preserving elbows may be provided for installation immediately upstream of the sensor/damper.

Legacy VAV boxes require ~2500 FPM or more maximum entry velocity in order to achieve turndowns of even 3 or 4. Since downstream devices require at most 700 FPM, this high velocity air is then dumped, requiring extensive silencing to reduce the familiar rumble issuing from the ceiling. The LFFC has more than 40:1 turndown from 1200 FPM, using an ordinary 1" w.g. transducer. To take full advantage of the more than 4:1 energy savings and 20 dB noise reduction inherent in this design, the final splits in the upstream duct work should be designed to deliver 1200 FPM full flow, not 2500 to 3000 FPM, to the LFFC at the end of the run.

Economical transducers are very sensitive to environmental temperature. If the low flow capabilities of the sensor/damper are to be fully realized, automatic means must be provided to periodically tie the transducer inputs together to a common source and update zero-offset. Our complete low flow assemblies include such capability.

System Control

To take full advantage of the energy savings and terminal (as well as central) noise reduction made possible by the LFFC, system flow control should be based on 1) keeping the all LFFC's satisfied with 2) at least one LFFC reporting wide open status. This last requirement is essential; otherwise flow control is not well defined: fans might run wide open forcing LFFC's nearly closed, with great noise production and waste of energy. Systems controlled as indicated are self-commissioning.

Flow Coefficient Elements

A. Annulus Opening Characteristic

Butterfly dampers are not commonly made with diameter exactly equal to duct diameter. Extreme accuracy and rigidity is required to prevent such an arrangement from jamming on the one hand or leaking on the other. The situation appears to ease somewhat under slight elliptical elongation of the damper, so it closes a degree of two shy of perpendicular to the duct. The above-mentioned difficulties still apply, however and this easement is seldom seen.

(i) One practical arrangement employs dampers with diameter slightly larger than duct diameter, but with the outermost few percent made of a flexible gasket material that bends and or compresses to seal against the duct surface.

A simple projected area formula of the form $$A_{damper} = \text{MAX}(A_{duct} - A_{damper} \cos\theta_{edamper}, 0) \quad (25)$$

gives excellent agreement with experiment. (ii) An annular duct-mounted gasket working purely in compression removes concerns that gasket abrasion and set may eventually compromise damper seal in arrangements like (i). The flow picture is greatly complicated by flow squeezing between the opening damper and just-cleared gasket. The effect is essentially negligible in the 2-stage damper, where the outer damper initial opening area is denominated by the wide open (or nearly so, depending on possible staging overlap) inner disc.

For completeness, development of the controlling formula is outlined.

Figure 18M:
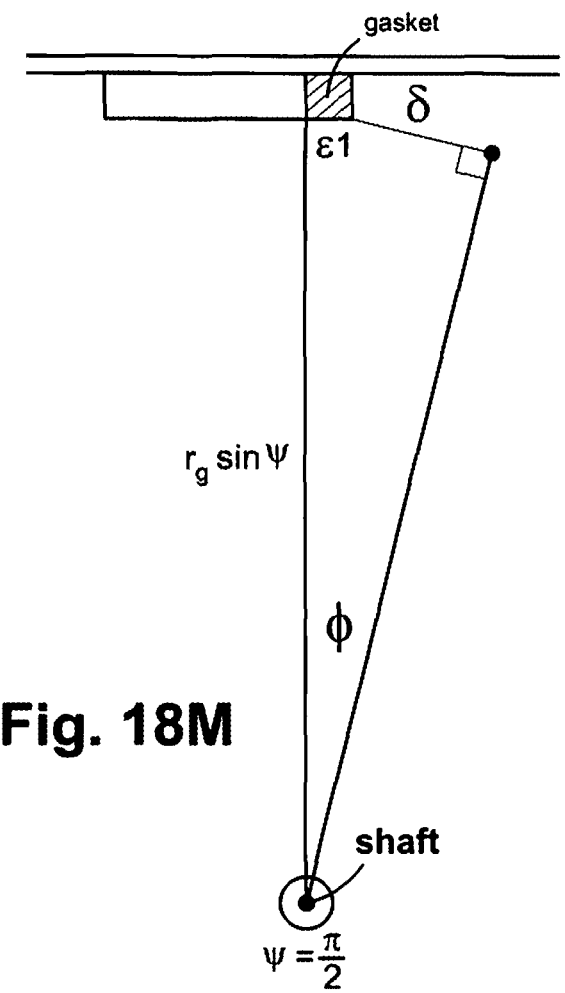
FIG. 18M is a detailed side view of the initial opening parameters for a damper with duct wall gasket
Figure 18N:
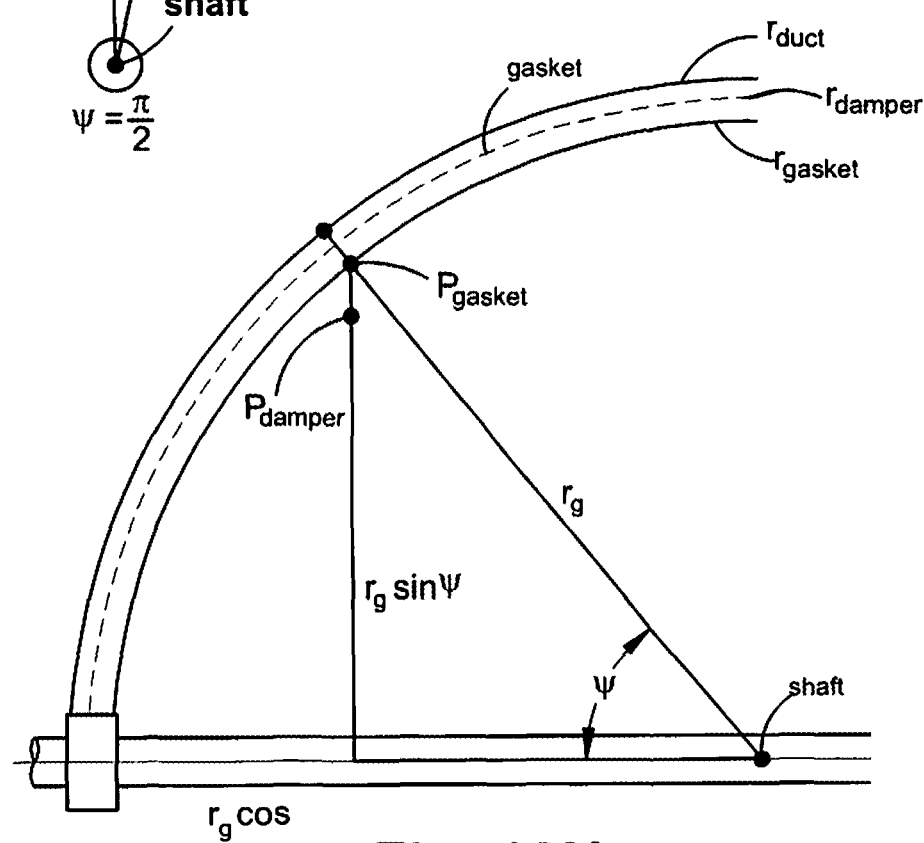
FIG. 18N is a detailed face view of the initial opening parameters for a damper with duct wall gasket

Referring to FIGS. 18M and 18N, the gasket is compressed when φ=0, and expands with the damper until it reaches its uncompressed extension and open are begins to appear, starting at plane angle $$\psi = \frac{\pi}{2}.$$

(FIG. 8,9) At general angle Ψ the normal from point $P_{gasket} = (r_g \cos\Psi, r_g \sin\Psi, \epsilon)$ (in Cartesian coordinates) to the point $P_{damper} = (r_g \cos\Psi, \cos\varphi(r_g \sin\Psi + \epsilon \sin\varphi, \sin\varphi(r_g \sin\Psi + \epsilon \sin\varphi))$ has length $\delta = r_g \sin\Psi \sin\varphi - \epsilon \cos\varphi$. The gasket opening area differential is $$dA_g = \delta \left| \frac{d}{d\psi}\left(\frac{P_{damper} + P_{gasket}}{2}\right) \right| d\psi =$$

$$(r_g \sin\psi \sin\varphi - \epsilon \cos\varphi) * r_g \sqrt{1 - \frac{3}{4}\cos^2\psi \sin^2\varphi} \, d\varphi,$$

which separates into a term that integrates readily and an elliptic integral of the second kind, which must be suitably approximated. $dA_g$ is the differential area of flow squeezing through narrow space between the annular gasket and plate: where the damper is farther from the gasket than the duct wall the differential form of (22) applies:

$$dA_w = \int_{\frac{r_a}{\sqrt{1+\sin^2\psi\tan^2\psi}}}^{r_d} r \, dr \, d\psi = \frac{1}{2}\left(r_d^2 - \frac{r_a^2}{1+\sin^2\psi\tan^2\psi}\right) d\psi \quad (26)$$

At the crossover point $dA_g = dA_w \sin(\Psi)$ satisfies a fourth degree algebraic equation, which, for sufficiently large φ, has two positive roots. Call the smaller of these, when they exist, $\Psi_1$. Otherwise $$\psi_1 = \frac{\pi}{2}.$$

The annulus open area is then $$A_{annulus} = 4\int_{\psi_o}^{\psi_1} dA_g + 4\int_{\psi_1}^{\frac{\pi}{2}} dA_w. \quad (27)$$

$$\psi_o = A\sin\left(\frac{\epsilon}{r_g \tan\varphi}\right)$$

is the angle at winch, for given damper opening angle φ, the damper just clears the gasket. Nothing happens until $$\geq \varphi_o = a\tan\left(\frac{\epsilon}{r_g}\right),$$

the camper angle at which the tip $$\left(\psi = \frac{\pi}{2}\right)$$

of the annulus just clears the gasket. The opening sequence is: A=0: $\Psi_0$=

$$A = 0: \psi_o = \psi_1 = \frac{\pi}{2} \text{ until } \varphi \geq \varphi \approx 2.2°, \approx 1.24\%$$

of the full 2 stage sequence, and $\Psi_o$ drops below $$\frac{\pi}{2}.$$

At around 3°, 1.7% of range, $\Psi_1$ drops below $$\frac{\pi}{2}. \quad \psi_1 \text{ and } \psi_o \to 0 \text{ as } \varphi \to \frac{\pi}{2}.$$

The annular gaskets end at around Ψ=4°, where they meet the damper bushings at the duct wall. The bushings together with the shaft between act as small obstruction, not limiting the effective area of opening but providing a small contribution to the wide open damper ΔP. Letting $\Psi_1$ and $\Psi_0 \to 0$ allows these losses to be treated separately from the orifice plate opening characteristic.

A similar analysis applies to rectangular and other convex duct and damper shapes.

B. Disk Opening Characteristic: 2 Stage Damper

Figure 18O:
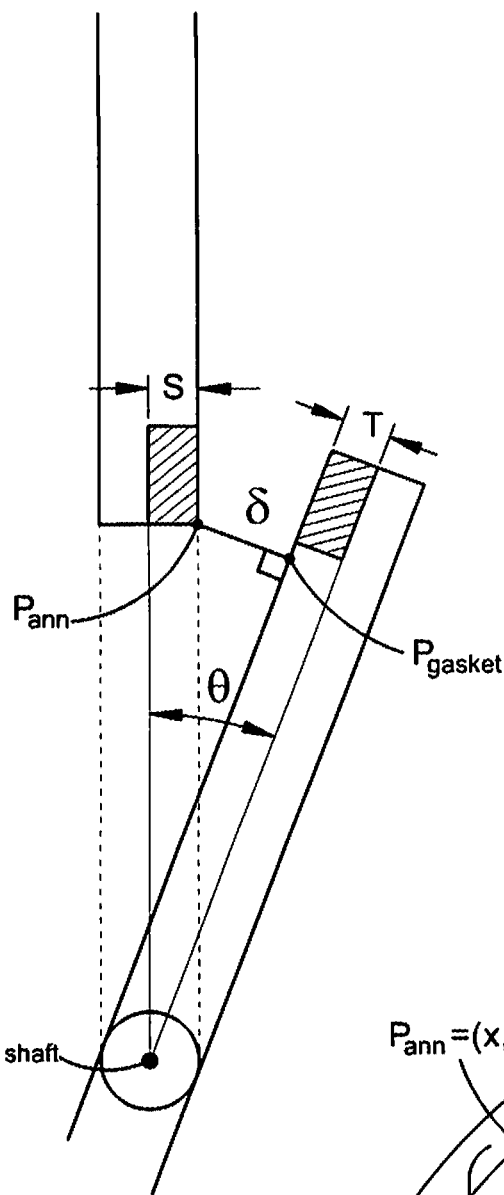
FIG. 18O is a detailed side view of the initial opening parameters for the inner disk of a 2-stage damper
Figure 18P:
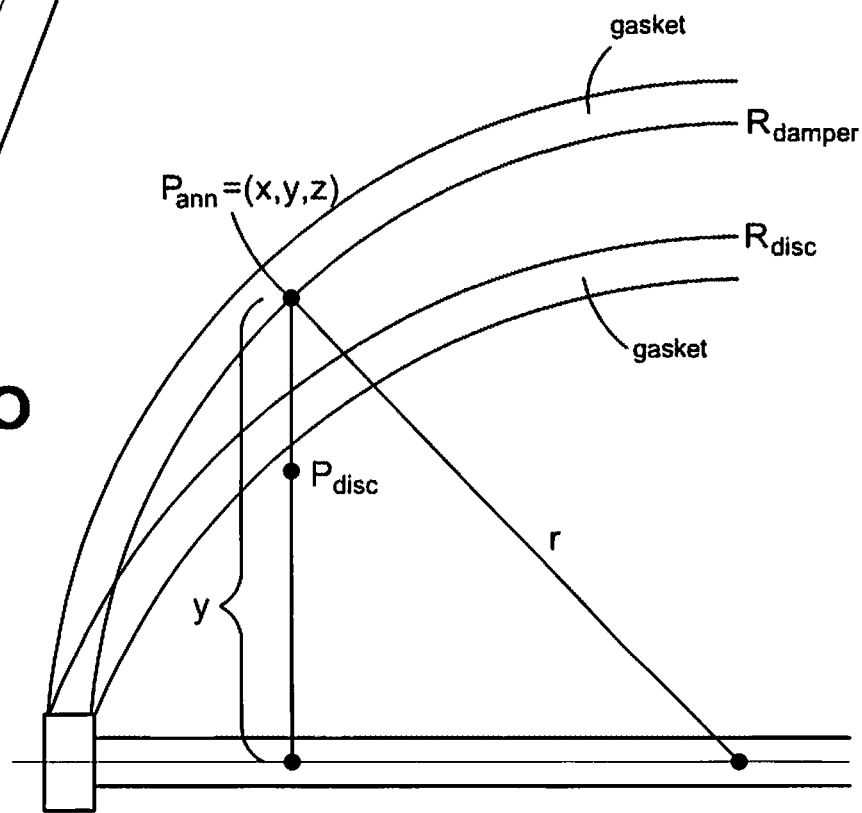
FIG. 18P is a detailed face view of the initial opening parameters for the inner disk of a 2 stage damper

Referring to FIGS. 18O and 18P, the inner damper element slightly overlaps the generally central opening in the outer damper element. The opening is here treated as circular and the slightly larger inner damper element as a modified disk: a similar analysis applies to elliptical and other convex element and opening shapes. The overlap region is provided with compressible gasket material, embedded in either or both the annulus and disk. The normal distance from the point $P_{ann}=(x,y,s)$, $x^2+y^2=r^2$, on the opening near edge to the disk surface is $\delta = y \sin\theta - s \cos\theta - t$, with θ the disk opening angle relative to the annulus, s half the annulus thickness, and t half the disk thickness. The projected opening area is $$A_{disk} = 4\int_0^{r_o} \text{MAX}(\delta, 0)dx = 4\int_0^{r_o} \text{MAX}\left(\sqrt{r^2-x^2}\sin\theta - s\cos\theta - t, 0\right)dx = \quad (28)$$

$$2\left[r^2 a\sin\left(\frac{x_o}{r}\right) - x_o(s\cos\theta + t)\right]$$

with $$x_o = \sqrt{\text{MAX}\left(r^2 - \left(\frac{s\cos\theta + t}{\sin\theta}\right)^2, 0\right)}$$

The disk clears the gasket for $x < x_0$. $x_0 > 0$ when $\theta > \theta_0$, the angle at which the tip of the disk just clears the gasket. $\theta_0$ satisfies $r\sin\theta_0 = s\cos\theta_0 + t$. If $t \ll s$, this becomes $$\theta_o = atn\frac{s}{r}; \text{ if } s \ll t, \theta_o = a\sin\frac{t}{r}.$$

The open area of the 2-stage flow station/damper is then $$A_o = A_{disk} + A_{annulus}. \quad (29)$$

The device functions as a variable area orifice plate almost over its entire range. Until the device is almost 100% open, a common pool of essentially still air in the shadow of the damper unites the venae contractae of flows emerging from (in this case) up to four separate areas of varying shape and orientation, so that various areas are simply added together, as was done in (29), to produce $A_o$ for use in the correlation $$C_F = \frac{A_c}{A_o} = \frac{c}{1-(1-c)\left(\frac{A_o}{A_d}\right)^2} \quad \text{Eq. (21)}$$

with $A_d$ the total duct area.

$c = 0.611$ gives Kirchoff's 1869 result asymptotically.

C. Residual Effects at 100% open

At 100% open, there is no orifice plate, and $C_F$ is nearly 1, assuming the upstream tap reads TP. The downstream tap, out of the airstream tucked in behind, possibly integral with the damper shaft, reads a little lower than surrounding SP because the flow is moving slightly faster around the obstructing shaft, and SP+VP is conserved. This effect is lumped together with residual pressure drops due to the upstream sensor, wall friction, and annular gasket (if employed) into a constant Co, and replace (23a) by $$\Delta P = TP - \left(TP - \frac{\rho}{2}\left(\frac{Q}{A_c}\right)^2 - Co\frac{\rho}{2}\left(\frac{Q}{A_d}\right)^2\right) = \rho\frac{Q^2}{2}\left(\frac{1}{A_c^2} + \frac{Co}{A_d^2}\right), \quad (30a)$$

or $$Q = \frac{A_o\sqrt{\frac{2\Delta\rho}{\rho}}}{\sqrt{\left(\frac{A_o}{A_c}\right)^2 + Co\left(\frac{A_o}{A_d}\right)^2}} \quad (30b)$$

so $C_F$ becomes $$\frac{\frac{A_c}{A_o}}{\sqrt{1 + Co\left(\frac{A_c}{A_o}\right)^2\left(\frac{A_o}{A_d}\right)^2}} \quad (30c)$$

Co is measured individually in each configuration for incorporation into (30c). This, with the new correlation $$\frac{A_c}{A_o} = \frac{c}{1-(1-c)\frac{A_o}{A_d}}$$

from (21) ($c \sim 0.61$), and $$\frac{A_o}{A_d}$$

from (29), comprises the theoretical foundation for the Low Flow Fluid Controller.

The methods, systems, and devices discussed herein are examples. In particular the indicated temperature and timing values as well as signaling protocols are to be taken as examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Any of the modules or components of system 1200, or any combinations of such modules or components, can be coupled with, or integrated into, or otherwise configured to be in connectivity with, any of the fluid flow control embodiments disclosed herein. Relatedly, any of the hardware and software components discussed herein can be integrated with or configured to interface with other flow control systems used in a single location or across multiple locations.

Each of the calculations or operations described herein may be performed using a computer or other processor having hardware, software, and/or firmware. The various method steps may be performed by modules, and the modules may comprise any of a wide variety of digital and/or analog data processing hardware and/or software arranged to perform the method steps described herein. The modules optionally comprising data processing hardware adapted to perform one or more of these steps by having appropriate machine programming code associated therewith, the modules for two or more steps (or portions of two or more steps) being integrated into a single processor board or separated into different processor boards in any of a wide variety of integrated and/or distributed processing architectures. These methods and systems will often employ a tangible media embodying machine-readable code with instructions for performing the method steps described above. Suitable tangible media may comprise a memory (including a volatile memory and/or a non-volatile memory), a storage media (such as a magnetic recording on a floppy disk, a hard disk, a tape, or the like; on an optical memory such as a CD, a CD-R/W, a CD-ROM, a DVD, or the like; or any other digital or analog storage media), or the like.

Figure 13A:
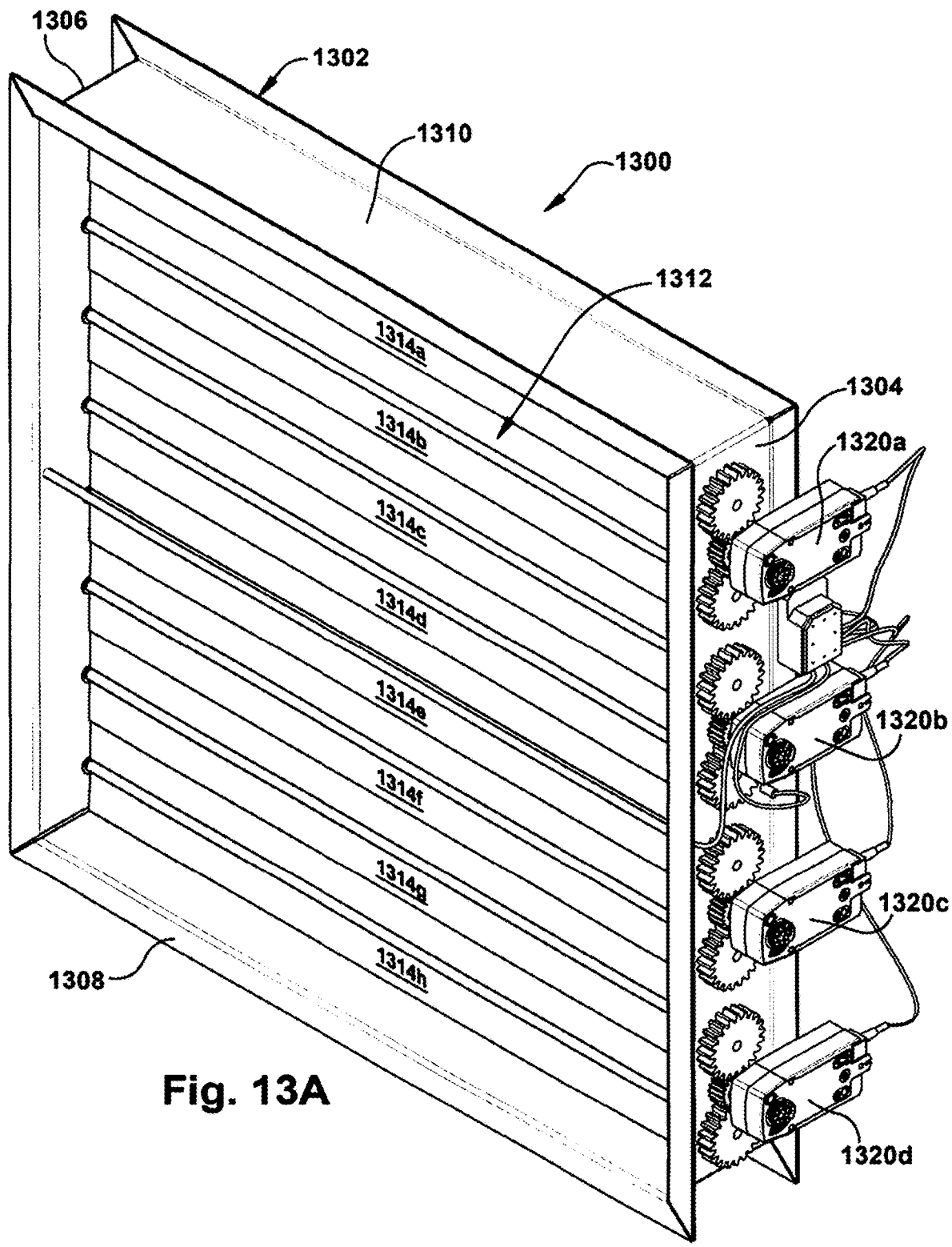
FIG. 13A is a perspective view an embodiment of a damper assembly having a plurality of horizontal blades.
Figure 13B:
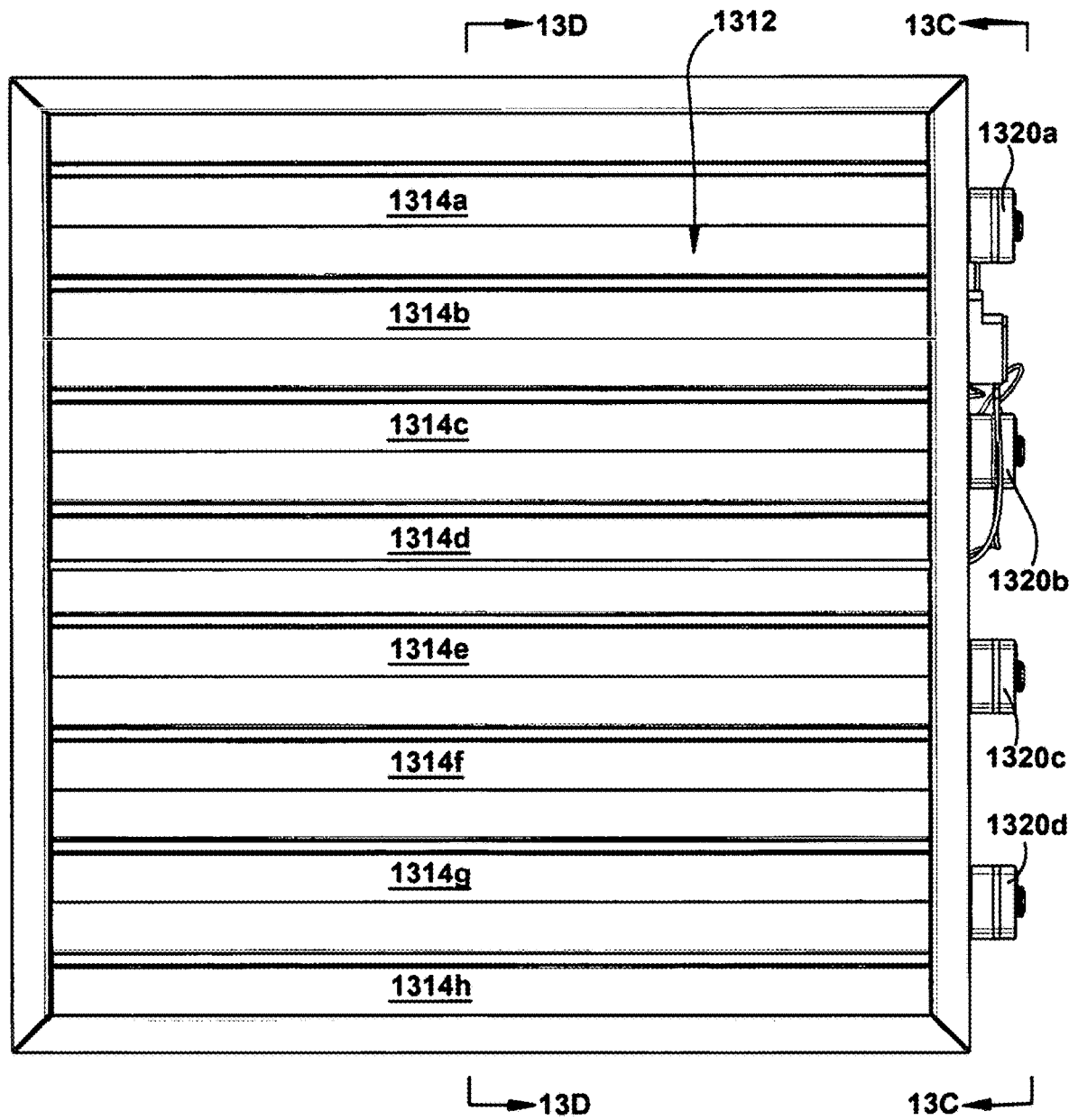
FIG. 13B is a frontal view of the damper assembly shown in FIG. 13A.
Figure 13C:
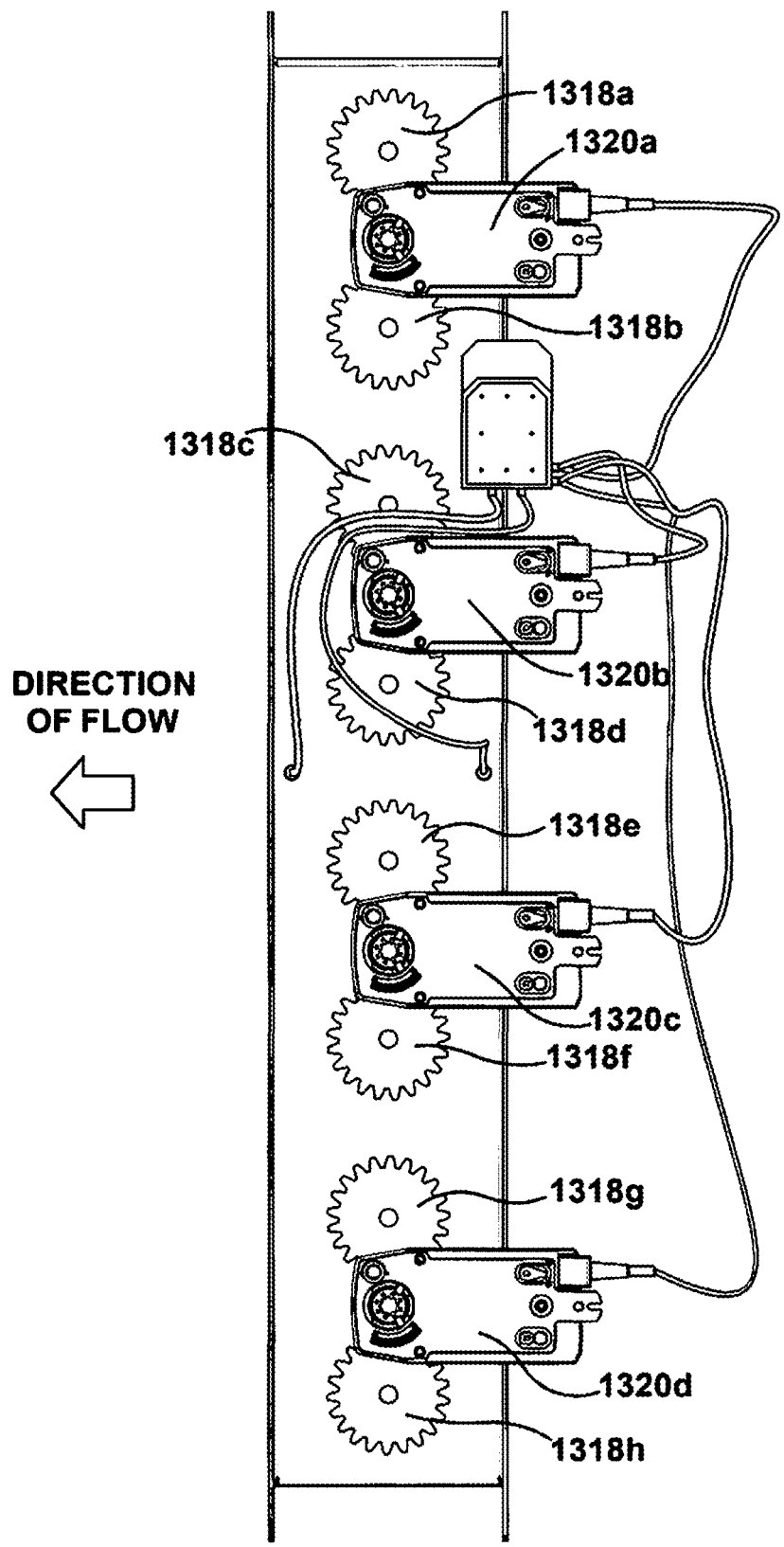
FIG. 13C is a right side view of the damper assembly shown in FIG. 13.
Figure 13D:
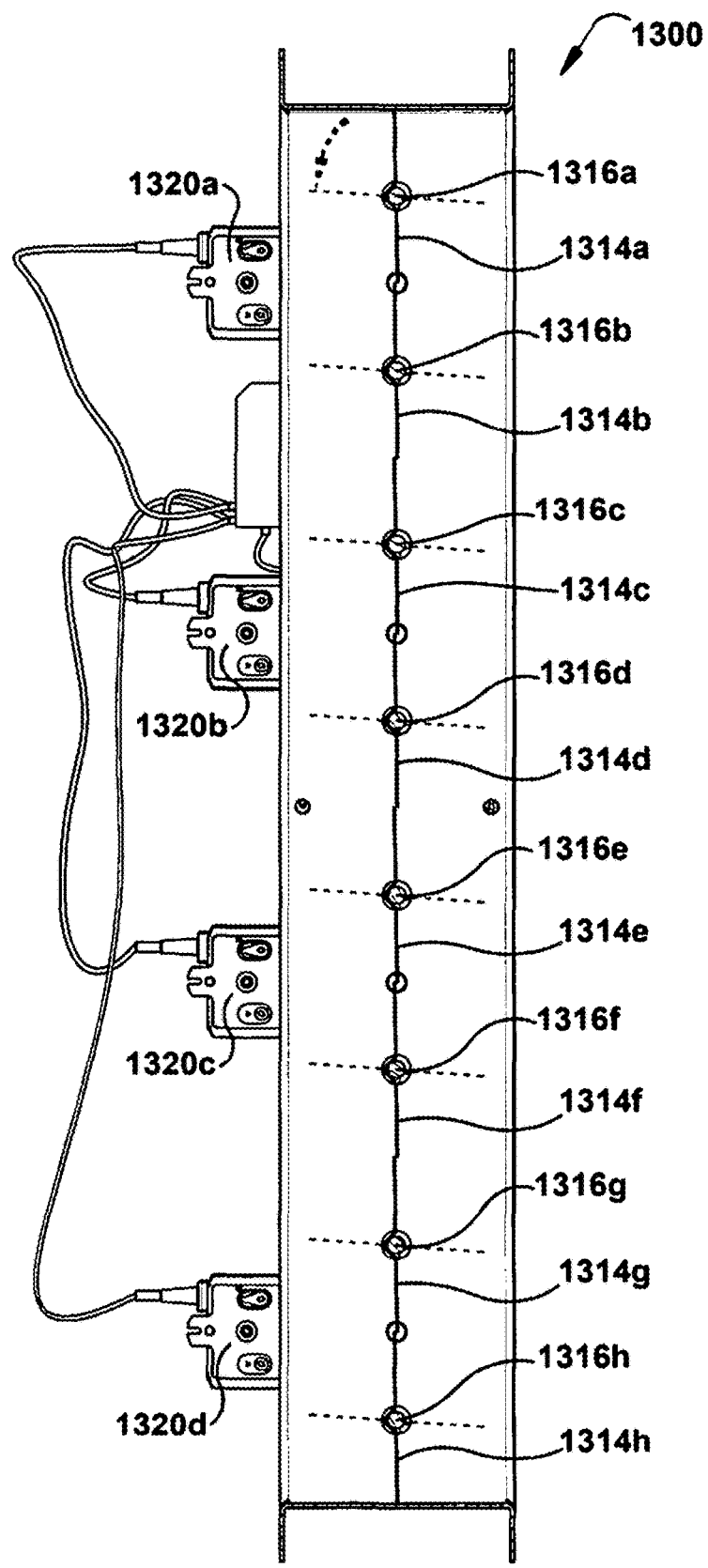
FIG. 13D is a left side view of the damper assembly shown is FIG. 13A.

Referring to FIGS. 13A-D, another embodiment of a damper assembly 1300 is illustrated. Damper assembly 1300 is adapted to be positioned within a fluid flow pathway of a duct and functions as an orifice plate that defines a variable opening for receiving various types of fluid and control fluid flow there through. Damper assembly 1300 comprises a frame 1302 having a right edge 1304, left edge 1306, lower edge 1308, and upper edge 1310. Frame 1302 defines a central opening 1312 within which a plurality of blades 1314*a*-1314*h* are disposed in a generally parallel orientation relative to each other. Each of blades 1314*a*-1314*h* is pivotable along its longitudinal axis on corresponding shafts 1316*a*-1316*h*, as shown in FIG. 13D with shafts 1316*a*-1316*h* extending from right edge 1304 to left edge 1306 of frame 1302. Shafts 1316*a*-1316*h* need not be a continuous single component as long as blades 1314*a*-1314*h* are pivotable along its longitudinal axis. Each of shafts 1316*a*-1316*h* is attached to corresponding gears 1318*a*-1318*h*, and the rotation of each gear is controlled by actuators 1320*a*-1320*d*. In this embodiment, there are four actuators (1320*a*, 1320*b*, 1320*c*, 1320*d*), and it can be seen that each actuator rotates a pair of gears; for example, actuator 1320*a* rotates gears 1318*a* and 1318*b*, actuator 1320*b* rotates gears 1318*c* and 1318*d*, actuator 1320*c* rotates gears 1318*e* and 1318*f*, and actuator 1320*d* rotates gears 1318*g* and 1318*h*. Turning to FIG. 13C, when actuator 1320*a* acts upon gears 1318*a* and 1318*b*, gear 1318*a* will rotate in a direction opposite to the direction that gear 1318*b* rotates. The rotation of gear 1318*a* will open corresponding blade 1314*a*, and similarly, the rotation of gear 1318*b* will open corresponding blade 1314*b*. Blades 1314*a* and 1314*b* may be larger than blades 1314*c* and 1314*d* whereby a larger area of central opening 1312 would be covered by blades 1314*a* and 1314*b* than by blades 1314*c* and 1314*d*. The variation in blade sizing provides for the benefit of increased "fine-tuning" of flow selection between the range of minimum and maximum flow rates. The optimum sizing of blades 1314*a*-1314*h* are determined by flow rate requirements and space considerations.

Figure 14:
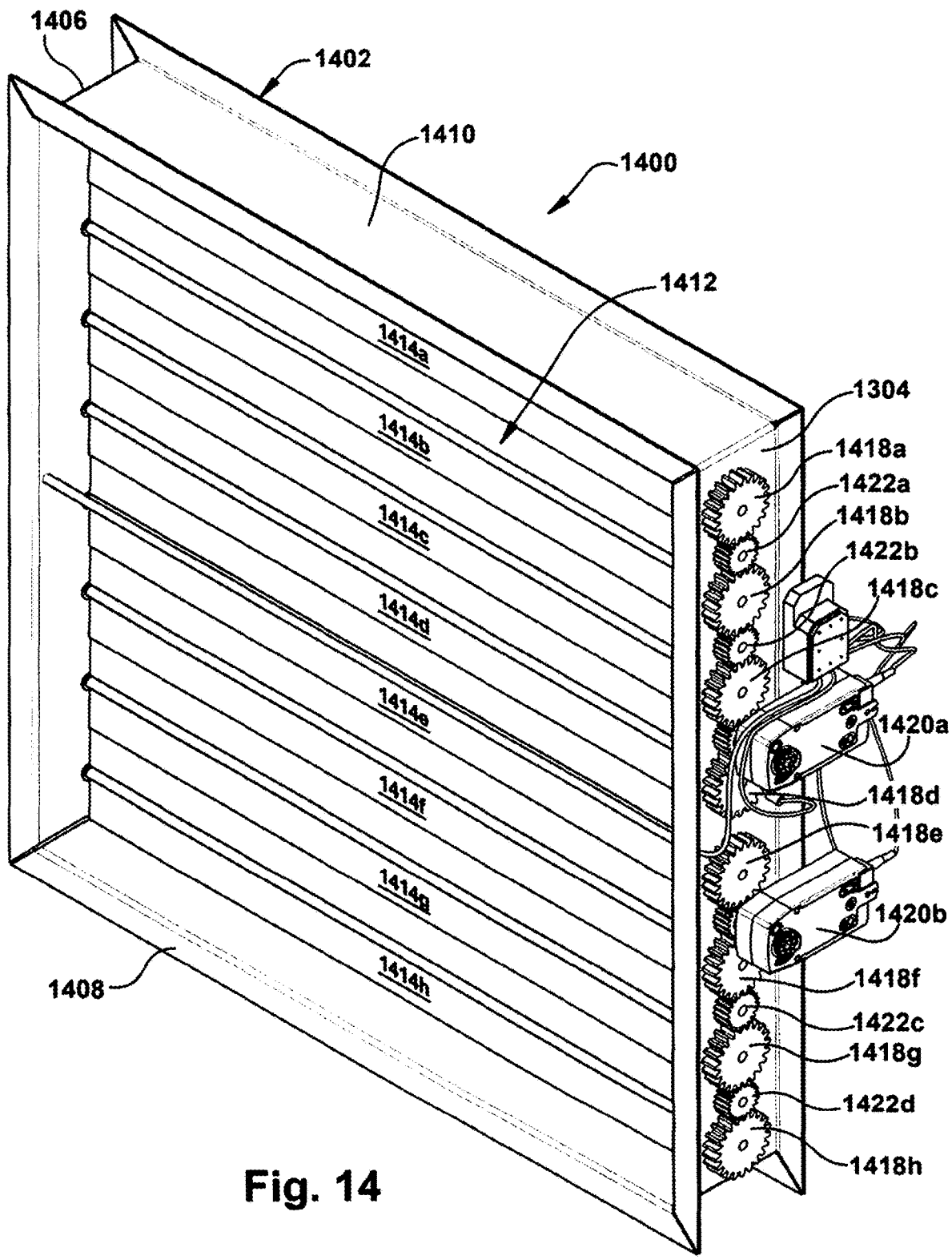
FIG. 14 is a perspective view of another embodiment of a damper assembly having a plurality of horizontal blades.

Referring to FIG. 14, another embodiment of damper assembly 1400 is generally shown. Damper assembly 1400 in this embodiment has two actuators 1420*a* and 1420*b* to vary the position of blades 1414*a*-1414h. Connecting gear 1422*a* articulates gears 1418*a* and 1418*b* while connecting gear 1422*b* articulates gears 1418*b* and 1418*c*. As such, when actuator 1420*a* rotates gears 1418*c* and 1418*d*, gears 1418*a* and 1418*b* are correspondingly rotated by the articulation of connecting gears 1422*a* and 1422*b* respectively. Similarly, connecting gear 1422*d* articulates gears 1418*h* and 1418*g* while connecting gear 1422*c* articulates gears 1418*g* and 1418*f*. As such, when actuator 1420*b* rotates gears 1418*e* and 1418*f*, gears 1418*g* and 1418*h* are correspondingly rotated by the articulation of connecting gears 1422*c* and 1422*d* respectively. In this embodiment, it can be seen that each actuator rotates four gears; for example, actuator 1420*a* rotates gears 1418*a*, 1418*b*, 1418*c*, and 1418*d*; and actuator 1420*b* rotates gears 1418*e*, 1418*f*, 1418*g*, and 1418*h*. Actuator 1420*a* and actuator 1420*b* may operate independently of each other to provide the flow through damper assembly 144 as required, such as for example, in sequence. Blades 1414*a* and 1414*b* may be larger than blades 1414*c* and 1414*d* whereby a larger area of central opening 1412 would be covered by blades 1414*a* and 1414*b* than by blades 1414*c* and 1414*d*. The variation in blade sizing provides for the benefit of increased "fine-tuning" of flow selection between the range of minimum and maximum flow rates. The optimum sizing of blades 1414*a*-1414*h* are determined by flow rate requirements and space considerations.

Figure 16A:
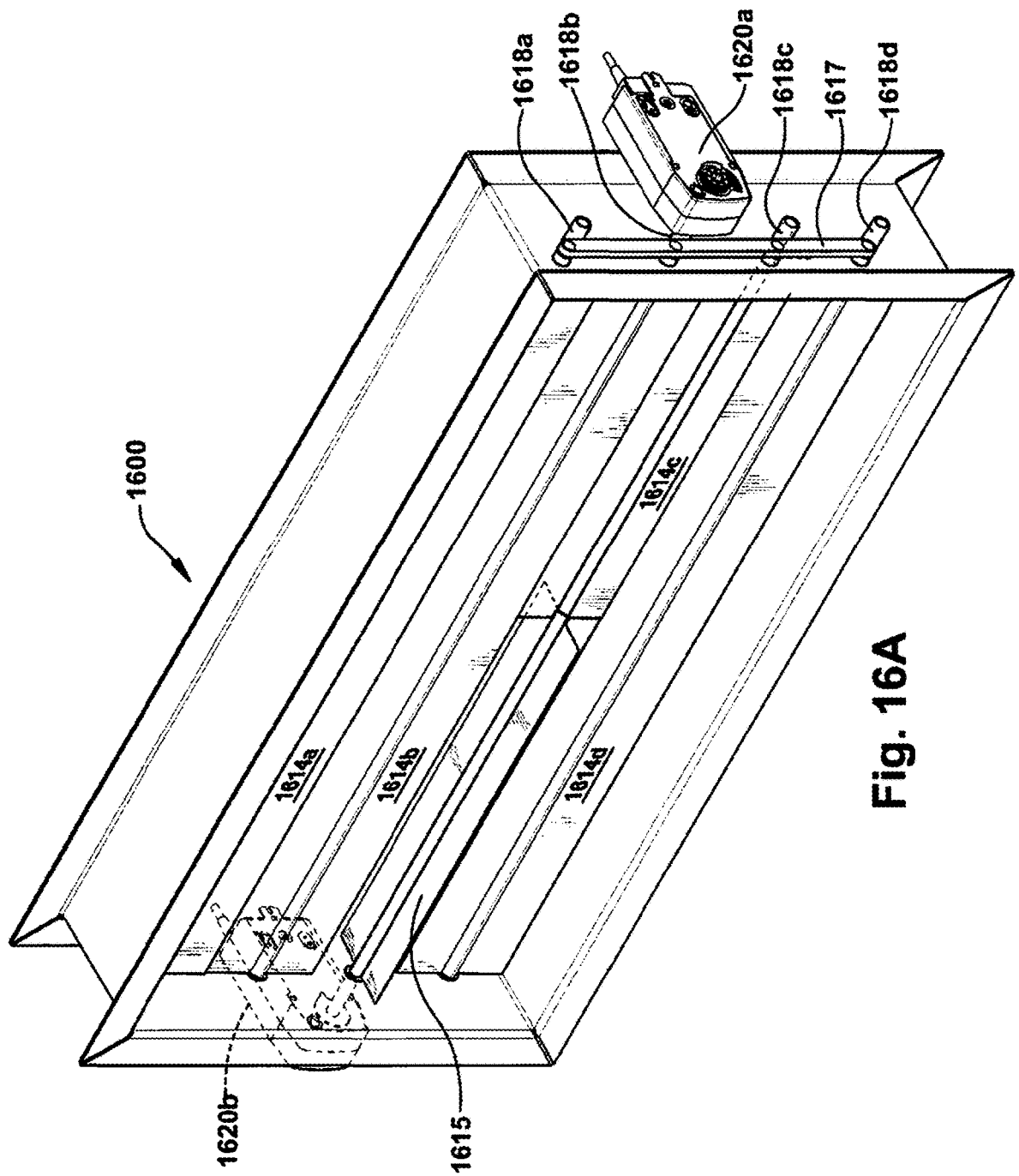
FIG. 16A is a perspective view of another embodiment of a damper assembly having a plurality of horizontal blades.
Figure 16B:
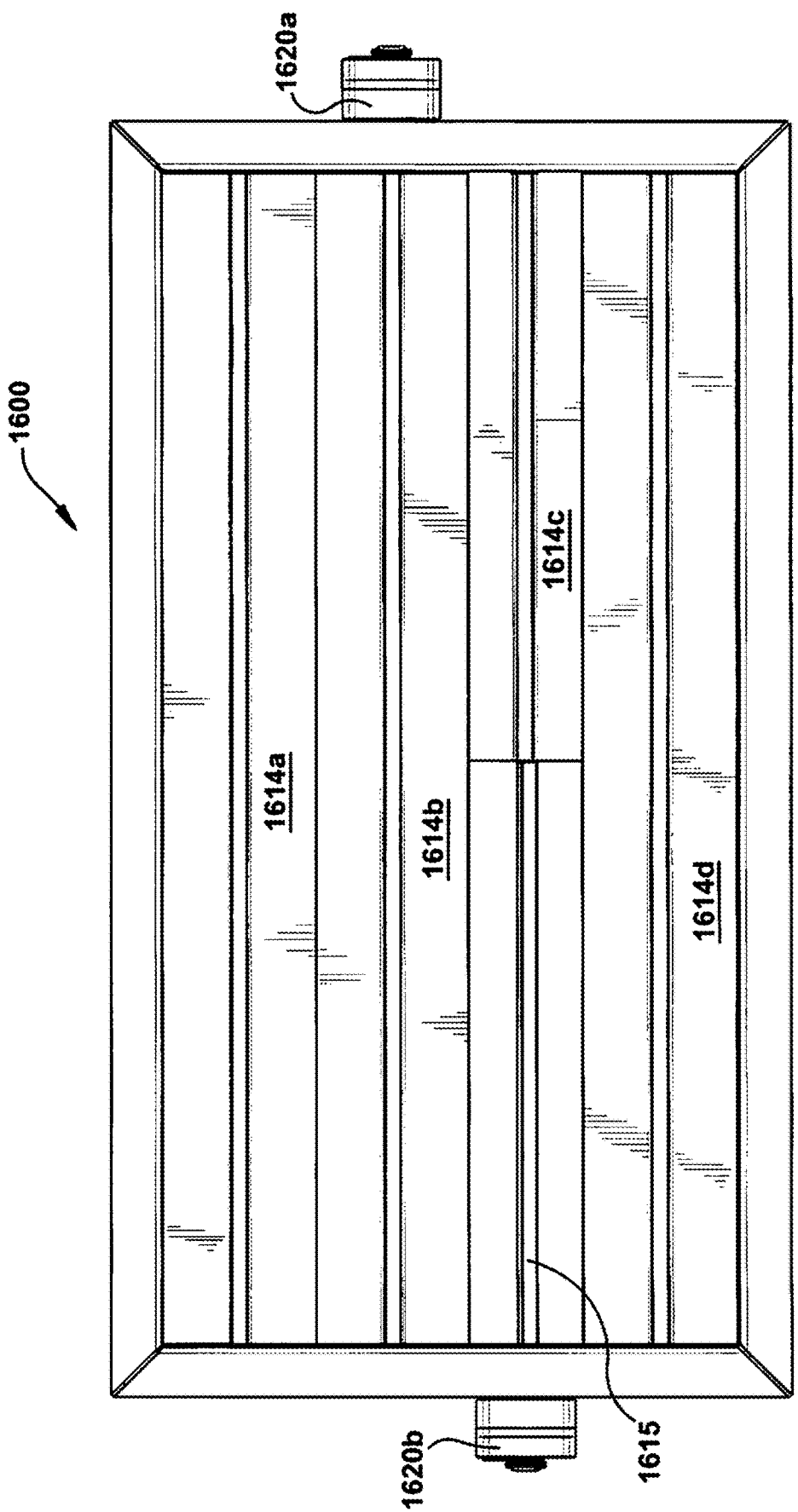
FIG. 16B is a frontal view of the damper assembly shown in FIG. 16A.

Typically, the low-flow blade is all or part of the middle blade if there are an odd number of blades in damper. If there are an even number of blades in damper, as shown in FIGS. 16, 15, and 13A, the low-flow blade is typically located just below the middle section of the damper assembly, particularly in outside air service. In exhaust or relief air service, it may be just above the middle. In these services the low edge of the blades is naturally to the outside. In a 6 or 7 identical blade damper assembly (not shown), one of the blades may for example be split proportionally into three-quarters and one-fourths, with the low-flow section comprising the three-quarters portion of the split blade and the remaining one-fourth portion of the split blade driven together along with the remaining blades that comprise the high-flow blades. The actuators could be ganged, side by side, or on opposite ends of the damper. In 4-blade to 7-blade damper assemblies, one blade may have two independent sections, as illustrated in FIGS. 16A and 16B for a 4-blade damper assembly, and locating the low-flow actuator on the opposite side of the damper assembly is simplest. In 9 or more blade assemblies, 2 or more blades or fractions of blades may be ganged to comprise the low-flow section of the damper. Alternatively, with the split blade, nesting shafts may be used wherein a rod driven by the low-flow actuator inside a tube ganged with the other remaining blades. Side-by-side actuators make for a more robust and compact arrangement of a damper assembly. In all cases, the preferred ratio of low-flow to total area is approximately 1:8. An alternative to splitting blades is providing a complete low flow blade of height ⅛ of the total height of the damper, different from the other blades except in the special case of 8 blades total: FIG. 15. If the total number of blades is n, the low-flow blade would have height ~(n−1)/7 of the others, adjusted for blade overlap. This would work well with more than 8 blades total, so the low-flow blade would be higher than the others, but below about n=6, the low-flow blade would become so skinny performance would begin to suffer. While the various embodiments of the damper assembly disclose a plurality of actuators for blade positional control, it is also contemplated that a damper assembly may comprise a single actuator capable of staging a low-flow and high-flow actuation of blade positioning using a progressive linkage system, gearing system, or cam race (not shown). Moreover, while the various embodiments disclose a plurality of horizontally disposed blades of the damper assembly, it is also contemplated that the damper assembly may comprise a plurality of vertically disposed blades. Nevertheless, blades are disposed in a generally parallel orientation relative to each other. A single actuator damper assembly progressively stages the low flow and high flow actuation of blade positioning by a linkage, gearing, or cam system, wherein the opening of the low flow blade(s) and high flow blades are schematically illustrated in FIG. 4B. For example, at the 0% position, low flow blade 1615 and high flow blades 1614a, 1614b, 1614c, 1614d are completely closed thereby blocking airflow there through. Low flow blade 1615 opens progressively between the 0% to 50% position of gear 160 with low flow blade completely open at the 50% position. High flow blades 1614a, 1614b, 1614c, 1614d open progressively between the 50% to 100% position with the high flow blades 1614a, 1614b, 1614c, 1614d completely open at the 100% position. It can be seen that at the 100% position, all the blades are completely open, thereby allowing maximum airflow there through, and that the reverse process occurs for closing the blades.

Damper assembly may be housed or un-housed in a tube or other geometric housing defining a portion of the flow pathway as shown in FIG. 12. Fluid flow measurements through initial opening 1615 can be done with pressure sensor $P_2$ in front of damper assembly and pressure sensor $P_1$ behind damper assembly. In a preferred implementation, openings facing upstream in an upstream sensor tube may be located somewhat toward the boundary between the low-flow opening and high flow area, to delay transition into the low Reynolds flow regime. Downstream pressures may be measured in the wake of a high-flow shaft or section of shaft; or in the blade damper case, by a simple pressure tap: out of the airstream in either case. Alternatively, pitot tubes, orifice rings (in the ducted case), and the like may be used to measure fluid flow through damper assembly. From a fully closed position, the preferred opening sequence is to first open the low flow region, followed, possibly with some overlap, by opening the high flow region. Flow rates between the minimum and maximum may be obtained by opening the blades in preferred order. Blades may be of identical sizes or of different sizes relative to each other. A variable speed fan (not shown) is disposed up- or downstream of the damper assembly to generate the fluid flow through the flow pathway and through the damper assembly.

Damper assemblies as described herein allow for more effective zoning and flow control since damper assemblies can not only measure air flow there through, but also air temperature and $CO_2$ concentrations of the zone. The sensors that measure zone temperature and $CO_2$ concentrations may communicate with a controller 1200 via wired or wireless signals. Damper assembly can be controlled through the cloud, wi-fi, or a smart device, via wireless communication such as wi-fi, Bluetooth, infrared, or the like, due to real time flow measuring capabilities. Smart devices may include, and is not limited to smart phones, tablets, universal remote controllers, and the like. Temperature sensors may include combination temperature sensor learning thermostats, such as the Nest Learning Thermostat. The output of flow and/or temperature etc. measurement is sent to controller 1200 in FIG. 12 that provides a signal to control actuators that, in turn, control the position of the blades in damper assembly. Controller 1200 comprises a processor, a memory coupled to and readable by the processor. The memory includes instructions stored therein that determine present flow from a pressure differential between the pressure sensors $P_1$ and $P_2$ and the position of the blades based on positional feedback received from the actuators, and continually adjusts a blade or blades position(s) to control flowrate to maintain required flow, temperature. or maximum allowed $CO_2$ concentrations in the zone. Note that controlling all three at once requires communication with the central controller to adjust flow and % outside air. A damper controller signals a fan controller when it is wide open and the desired condition based on room temperatures and maximum allowed $CO_2$ content is not being achieved. In such instance, the central controller slowly increments fan speed when more flow is required; outside and return air dampers if more outside air is required, allowing for relaxation time, until no damper controller reports being beyond its control range, and at least one damper controller reports being at the wide open damper limit. The fan controller adjusts fan speed to maintain that condition. The fan(s) is/are always at the lowest setting such that all zones are satisfied and at least one damper is wide open unless the fan setting is at maximum, as for example, on a Monday morning startup. Under such conditions, an auxiliary algorithm may be employed to instruct any damper controllers located in non-essential areas to limit flow so that critical areas may receive maximum flow until satisfied, after which they are allowed to gradually open subject to maintaining satisfaction in the critical areas. Normal mode resumes when the fan is no longer at maximum. It can thus be seen that such a system is clearly self-balancing/self-commissioning.

It is contemplated that all the blades may be controlled by a single actuator, as described earlier, wherein a linkage, cam or gearing assembly operatively and/or mechanically sequences the blades as required for generally staged control by the single actuator. Additionally, an uneven combination of actuators and blades may be implemented, by for example, having one pair of blades controlled by one actuator and the remaining set of blades controlled by another actuator. Furthermore, while this embodiment shows central opening 1615 as generally rectangular, it is contemplated that various opening configurations (e.g. circle, triangle, diamond, trapezoid, rectangle, ellipse, semicircle, and quarter circle) may also be implemented successfully.

Those skilled in the art will appreciate that damper assemblies provide for a multi-stage damper flow function that is very cost effective with high turndown ratio design that results in very accurate low flow capabilities while still allowing for very high flow rates when required. Those skilled in the art will also appreciate that damper assemblies disclosed herein may incorporate any number of blades that allow it to meet its overall design objectives. The advantages of a multi-stage damper design include a cost effective way to measure and control flow, use of existing tooling for damper construction and integration, fewer part numbers associated with high turndown ratios, complete integration of hardware and peripherals into the damper assembly.

Referring to FIGS. 15A and 15B, another embodiment of damper assembly 1500 is generally shown. Damper assembly 1500 in this embodiment comprises eight blades 1514a, 1514b, 1514c, 1514d, 1514e, 1514f, 1514g, 1514h (1514a-1514h) and has two actuators, high-flow actuator 1520a and low-flow actuator 1520b to vary the position of blades 1514a-1514h. High-flow actuator 1520a controls the position of seven of the blades, namely blades 1514a, 1514b, 1514c, 1514d, 1514f, 1514g, 1514h. High-flow actuator 1520a articulates shaft 1515 that in turn articulates links 1518a, 1518b 1518c, 1518f, 1518g, 1518h that are connected to blades 1514a, 1514b, 1514c, 1514f, 1514g, 1514h, respectively. High-flow actuator 1520a may be directly attached to blade 1514d, or alternatively, control blade 1514d via a link (not shown). Low-flow actuator 1520b controls only the position of blade 1514e and may be directly attached to blade 1514e, or alternatively, control blade 1514e via a link (not shown). Low-flow actuator 1520b is not connected to shaft 1515 and thereby controls blade 1514f independently of the other seven blades. As the name implies, low-flow actuator 1520b provides for a low flow rate through damper 1500 by controlling and opening only blade 1514e, as shown in FIG. 15A, while high-flow actuator 1520a provides for a higher flow rate through damper 1500 by controlling and opening the remaining seven blades of damper 1500. When a maximum flow rate is required, both high-flow actuator 1520a and low-flow actuator 1520b opens all the blades 1514a-1514h of damper 1500. In a 7-blade to 9-blade damper (not shown), the low flow blade may comprise the blade 1514e in its entirety. More generally, by using blades of several different widths, say 3" through 7", dampers of any required height may be devised, with low-flow blade opening typically, but not necessarily, about ⅛ the total damper face area. The low-flow blade is generally placed near the middle of the damper, as shown here.

Referring to FIGS. 16A and 16B, another embodiment of the LFFC damper assembly 1600 is generally shown. Damper assembly 1600 in this embodiment comprises four blades 1614a, 1614b, 1614c, 1614d and has two actuators, high-flow actuator 1620a and low flow actuator 1620b. One of the blades 1614c is split into two separately controlled sections with the low-flow open area generally comprising about ⅛ the total damper face area. Even though they share a common pivot axis, blade 1614c and low-flow blade 1615 operate independently from each other as low-flow actuator 1620b controls only low-flow blade 1615. High-flow actuator 1620a controls high-flow blades 1614a-1614d via a shaft 1617 that articulates links 1618a, 1618b, 1618c, 1618d that are connected to high-flow blades 1614a, 1614b, 1614c, 1614d, respectively. High-flow damper 1620a is preferably positioned on the opposite side of low-flow actuator 1620b of damper assembly 1600 to provide for better clearance of shaft 1617 and links 1618a-1618d. Low-flow blade 1615 typically opens first followed by the remaining high flow blades 1614a-1614d. High flow blades 1614a-1614d may begin opening before low-flow blade 1615 is completely open. By appropriately splitting (generally) one of many typically identical width blades, dampers of any required height may be obtained.

Figure 17A:
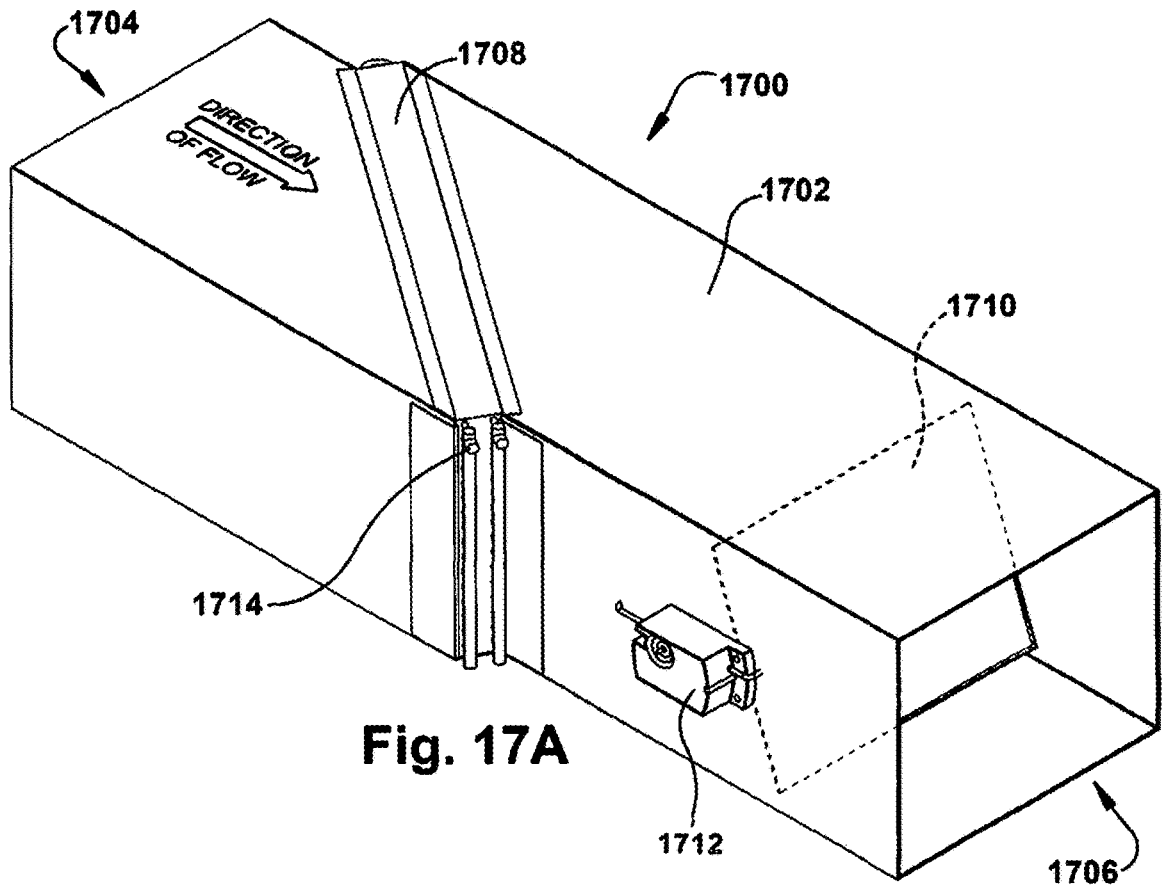
FIG. 17A is a perspective view of a reheat box with a blade damper assembly incorporated therein.
Figure 17B:
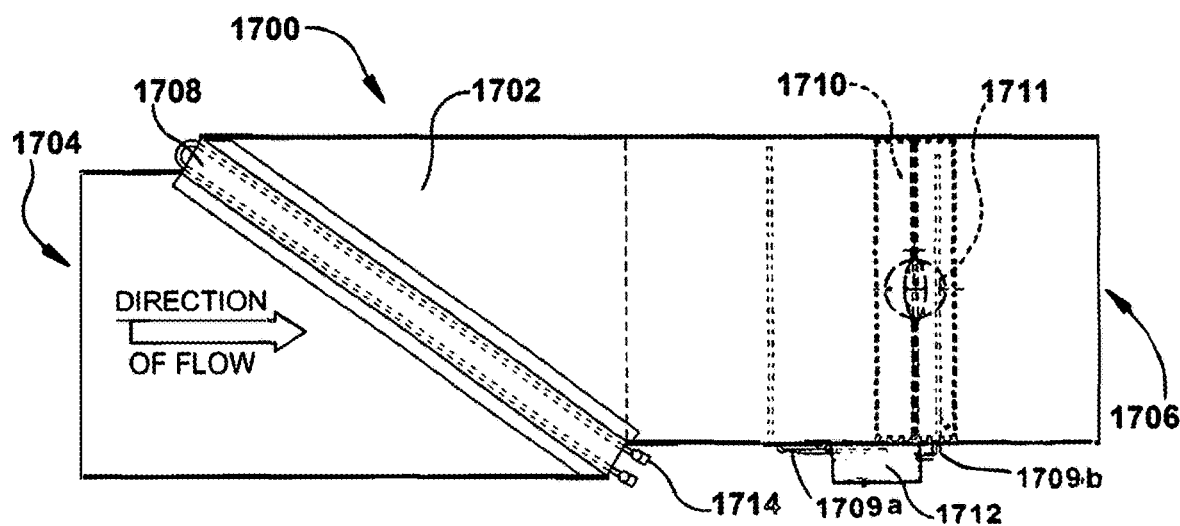
FIG. 17B is a top view of the reheat box shown with a butterfly damper assembly incorporated therein.

Referring now to FIGS. 17A and 17B, a reheat box 1700 in accordance with the present invention is generally shown. Reheat box 1700 includes a housing 1702 having an inlet end 1704 and an outlet end 1706. A coil 1708 is disposed within housing 1702 through which air entering inlet end 1704 of housing 1702 flows through to outlet end 1706 as depicted by the flow direction arrow. Also disposed within housing 1702 is a damper assembly 1710 located downstream of coil 1708. Sensor tubes 1709a and 1709b are disposed upstream and downstream, respectively, of damper assembly 1710. Damper assembly 1710 may include a nested butterfly type 1711 as shown or blade type damper (not shown) controlled by an actuator 1712. Damper assembly 1710 regulates the flow of air coming through coil 1708 that exits outlet end 1706 of housing 1702. The airflow is stabilized passing through coil 1708 preserving air flow reading accuracy even when upstream air is extremely non-uniform. Coil 1708 acts as a flow stabilizer thus allowing for a more compact housing 1702. Piping 1714 exiting coil 1708 determines a right-hand (as shown) or left-hand piping configuration of Reheatbox 1700. Reheat box 1700 allows for either a right-hand or left-hand piping configuration by simply flipping coil 1708 or the entire box by 180 degrees to accommodate any required configuration. This simplifies assembly and integration of VAV box 1700.

The coil is typically rotated (tipped) relative to the direction of upstream and downstream airflow to increase flow area and reduce pressure drop. FIG. 17B represents a top or bottom view if the coil is rotated about a vertical axis and a side view (except for the orientation of the coil tubes) if the coil is rotated about a horizontal axis. To keep the unit short, the axis of rotation generally runs the longer way across the duct, which is usually the width. So the left side of 17B is generally a side view, except for tube orientation. The damper shaft also usually runs the long way, so 17B does not reflect the usual combination.

Reheat box 1700 has approximately a 250:1 turndown ratio as it allows for air to enter the coil and discharge the tempered air through damper assembly 1710. As such, this allows for lower cost alternative and better performance from coil 1708. The damper technology, as disclosed herein, makes possible the next generation in low air volume systems and is applicable to both cooling and heating thermal transfer devices. Moreover, with this damper technology, high turndown noise issues are eliminated, the housing can be extended, and a damper assembly can be configured to the exact dimensions of the housing. No internal liner is required as unit is insulated externally. Little skew part numbers is created and better heat transfer is generated with this design.

Reheat box 1700 represents an improvement over current VAV boxes. Current VAV boxes with coils have the air flowing through an air valve at approximately 3000 fpm into a plenum and transitioning the air down to approximately 1500 fpm before flowing through the coil. These current VAV boxes have only approximately a 5:1 turndown ratio from 3000 fpm, limited flow measurement accuracy, and undesirable acoustics. The present design supports 40:1 turndown from just 1400 fpm. This low velocity capability relieves noise and air pressure drop problems.

Current VAV boxes use a round air valve that blows into a square plenum and then across the thermal transfer unit that is typically an electric reheat or a hot water coil. The round inlet is necessary because an airflow velocity of 500 fpm to 3000 fpm through the inlet is required to measure the flow and/or pressure. The transducer on the VAV controller cannot accurately measure the flow and/or pressure below 500 fpm to 700 fpm, and therefore controlling the zone temperature and airflow is difficult. As such, the air is pumped into a square plenum where it discharges at about 750 fpm to minimize noise and to allow for proper heat transfer across the hot water coil. Cooling coils cannot be used as they require 550 fpm or less to operate without creating moisture in the air stream. Air enters through the 5:1 turndown air valve for measuring purposes and into a plenum and then flows across the coil in a blow through configuration, which also causes spotting on the coil. The low flow damper does not require a high velocity airflow round inlet as on a VAV box. A rectangular Air Valve can be used at the full diameter of low velocity rectangular ductwork. Thus, the air can enter through the coil/thermal transfer unit and discharge out the square air valve box in a draw through configuration. Both heating and cooling coils can be used as the damper can measure flows down to 10-20 fpm. Coils can be configured in various orientations to optimize surface area and performance parameters economically The low flow damper technology can be applied to various types of dampers including round, square, rectangular, etc. They can be used in flow control and flow measurement applications such as air diffusers/vents, air valves, dampers, air handlers, roof top package units, variable refrigerant systems etc.

Another application for the low flow damper technology is for prevention of infiltration in building and the resulting energy savings therefrom. Virtually all buildings are leaky, which creates no discomfort as long as air is only leaking out and not in. Occupied buildings require ventilation, and the same amount of air must be expelled as is taken in. Infiltration can be prevented if every floor is adequately pressurized, and if the wind-induced pressure were known at every point on the surface of a building, each floor could be pressurized to slightly above the highest outside pressure at that level in order to prevent infiltration. However, since it is not practical to measure the outside pressure at every point on the surface of a building, wind-induced pressure at every point on the surface of a building may be approximated using only four pressure sensor/transducers by placing one at the center of each side of a rectangular plan floor and reading inside pressure relative to outside pressure ($\Delta P$) at that same point. If all four transducers read≥0 differential (inside pressure>outside pressure), no infiltration occurs from wind pointing perpendicular to a side of the building. In that case the highest outside pressure (lowest $\Delta P$) is in the middle of the face right where the pressure reading is taken. As the wind shifts 45 degrees to either side, pointing to a corner of the building, the high pressure point accordingly shifts toward that corner. Using the $\Delta P$'s derived from the four pressure transducers, the lowest $\Delta P$ anywhere on the floor perimeter can be estimated, as can wind direction. Accordingly, relief dampers can be adjusted to maintain a $\Delta P \geq 0$ all around the floor perimeter, eliminating infiltration.

The steps to prevent infiltration into a building floor by use of only four pressure transducers are as follows:

1. Determining $\Delta_{min}$ (the lowest of the four measured $\Delta P$'s at a given moment; $\Delta_2$=2nd lowest $\Delta P$; and $\Delta_{max}$=the highest $\Delta P$, on the side opposite $\Delta_2$).

2. Calculating x, wherein $x=(\Delta_2-\Delta_{min})/(\Delta_{max}-\Delta_{min})$ e $[0,1]$ 3. Applying correction factor $K(x)=0.27938343(1-x^{1.8184499})^{2.3339486}$. ($K(x) \approx 0.2794$ $(1.002-.1007x-3.0279x^2+2.1313x^3)$ is a fair approximation). The corrected $\Delta=\Delta_{min}-K(x)(\Delta_{max}-\Delta_{min})$ estimates the interior pressure relative to the exterior point of greatest wind impact.

4. Adjusting floor relief dampers to maintain $\Delta \geq 0.05$ in. w.c. (When relief is via a large central shaft, it is most efficient to allow greater pressurization on the highest floors in very cold weather; lowest floors in very warm weather, with floor relief dampers wide open.

5. Incrementing damper with smallest flow while $\Delta > 0.05$ in. w.c. and decrement damper with greatest flow while $\Delta < 0.05$ in. w.c.

$\Theta \approx 45-34.228x+15.001x^2-25.784x^3$ estimates wind direction. $\Theta=0°$ indicates flow 1 to the "min" face, and $\Theta=45°°$ indicates flow splitting 50-50 at the corner where the "min" and "2" faces meet. (Past that halfway point, the "2" and "min" faces switch roles, and the angle decreases back to 0 as flow becomes $\perp$ to the new "min" face. The previously unlabelled face becomes the new "max" face).

In legacy designs with large shafts carrying relief and return air together to central MER's, control is via the relief/return dampers on each floor. Controlling both relief and floor pressurization locally and simultaneously is much more energy efficient and compact than carrying relief air large distances in large ducts, against up to an inch w.c. or more stack effect. Four low flow blade dampers per floor are used for local relief, preferably in wireless communication with a controller provided on one of them, each centered on a building face and continuously carry out the building infiltration prevention steps outlined above to maintain both floor pressurization and balanced relief. This process allows 0.05 in. w.c. Pressurization relative to the highest outside pressure around each floor's perimeter to be maintained. Each low flow blade damper discharges about one-fourth of the total required relief for the floor, less infiltration. The controller computes flow through each damper using an algorithm based on $\Delta P$ and the blade opening percentages.

Figure 19A:
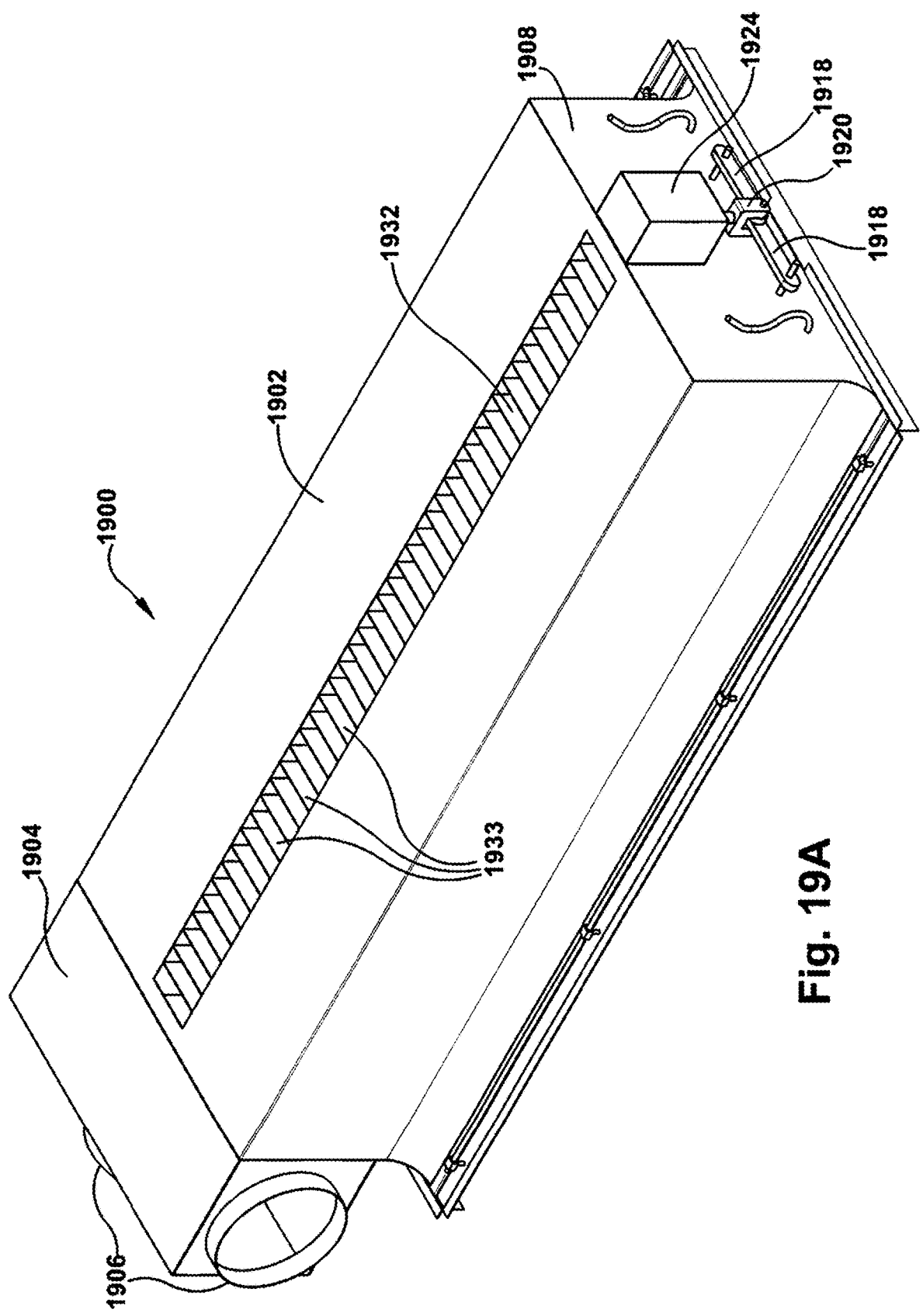
FIG. 19A is a perspective view of an air distribution apparatus in accordance with another embodiment of the present invention.
Figure 19C:
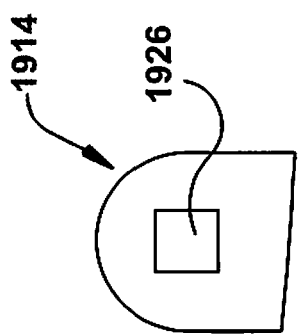
FIG. 19C is a lever rod square shown in FIG. 19B.

Referring to FIGS. 19A and 19B, an embodiment of the air distribution apparatus 1900 is generally shown. Air distribution apparatus 1900 is a diffuser that comprises a outer troffer plate 1902, an end supply box 1904 having at least a pipe 1906 incorporated therein, and a front troffer plate 1908. Outer troffer plate 1902, end supply box 1904, and front troffer plate 1908 together form a housing that defines a plenum 1909 space therein. There are a pair of inner troffer plates 1910 disposed toward the bottom and within center troffer plate 1912. Inner troffer plates 1910, along with side troffer plates 1912, form airflow passages that guide and regulate airflow therebetween and out of air distribution apparatus 1900. Inner troffer plates 1910 have a shape depending on the radiation pattern of the LED's, and the regulation of airflow is accomplished by articulating side troffer plates 1912 relative to inner troffer plates 1910, whereby side troffer plates 1912 are articulable between a closed position and an open position, and any position therebetween. The articulation of each side troffer plate 1912 may be accomplished by a plurality of hinge plates 1914 that attach each side troffer plate 1912 to a lever rod 1916. Lever rod 1916 is in turn connected to a lever rod square 1919 that is articulated by lever joint 1920 via lever pin 1922. In one embodiment a linear actuator 1924 controls the position of lever joint 1920. It can be seen by those skilled in the art that linear actuator 1924 is essentially a motor that drives side troffer plates 1912 between a closed position to a fully open position and any position therebetween that ultimately adjusts the airflow passage to regulate and control the flow of air from the air distribution apparatus 1900. A gasket 1938 seals airflow leakage between inner troffer plate 1910 and side troffer plate 1912 when the latter is disposed in a closed position. Although a single linear actuator 1924 is shown, a dual or multiple actuator configuration is also contemplated, and each side troffer plate 1912 may operate independently from the other. Air distribution apparatus 1900 may be scaled to various dimensions, and it is estimated that a 2 foot×4 foot apparatus with LED covers approximately a 100-144 square foot area, or twice that if supply-return troffers alternate with return-only troffers. A heat sink 1932, typically of aluminum, having a plurality of fins 1933 is incorporated within the plenum that helps remove heat from all the lighting sources thereby greatly reducing energy consumption and greatly prolonging LED lifetime Turning to FIG. 19C, the hinge plate 1914 can be seen in greater detail. Hinge plate 1914 incorporates an opening 1926 that receives lever rod 1916. Although a generally square profile of opening 1926 is shown, those skilled in the art will appreciate that any profile capable of receiving lever rod 1916 will suffice, as long as sufficient friction is maintained between hinge plate 1914 and lever rod 1916 such that they remain in a fixed position relative to each other.

Figure 19D:
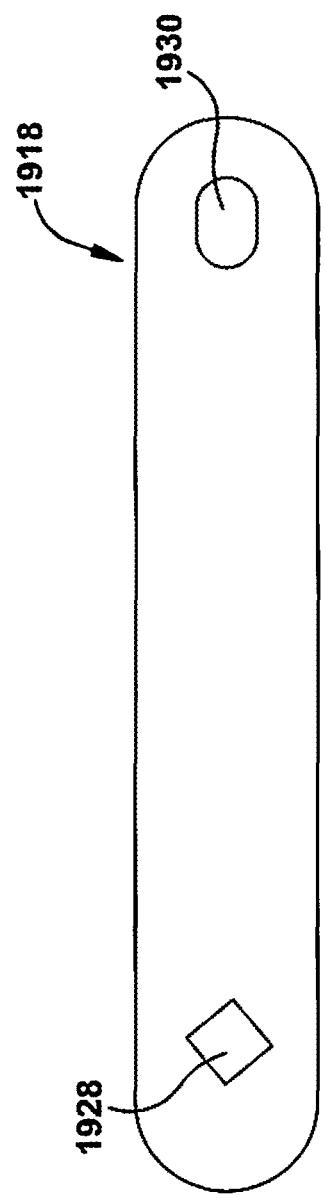
FIG. 19D hinge plate shown in FIG. 19B.

Turning to FIG. 19D, lever rod square 1918 can be seen in greater detail. Lever rod square 1918 comprises a first opening 1928 at its distal end and a second opening 1930 at its proximal end. First opening 1928 is adapted to engage lever rod 1916 which in this embodiment has a generally square profile. Those skilled in the art will appreciate that any profile capable of engaging lever rod 1916 will suffice, as long as sufficient friction is maintained between lever rod square 1918 and lever rod 1916 such that they remain in a fixed position relative to each other. Second opening 1930 of lever rod square 1918 is adapted to pivotably engage with lever joint 1920 and is connected lever pin 1922.

Figure 19E:
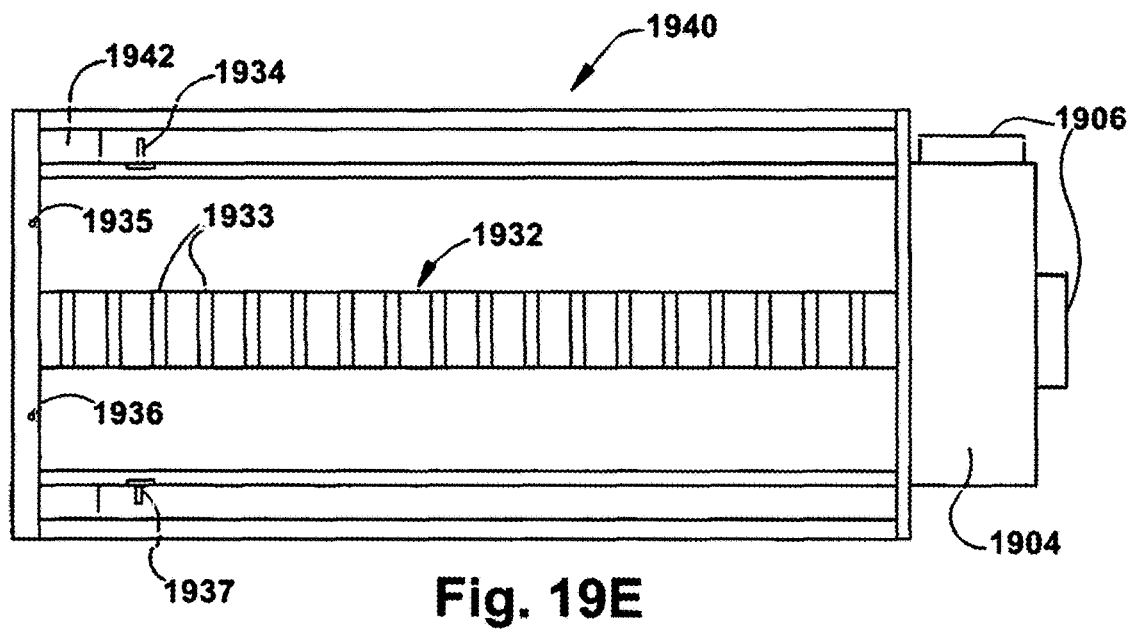
FIG. 19E is a perspective view of a air distribution apparatus in accordance with another embodiment of the present invention.

Sensors TP 1934 and SP 1936, as shown in FIGS. 19A, 19B and 19E detect the surrounding air pressure wherein TP 1934 is located upstream and SP 1936 downstream of side troffer plates 1912 of air distribution apparatus 1900. The supply of air enters laterally into air distribution apparatus 1900 and 1940 through pipe 1906 and flows into a plenum space within air distribution apparatus 1900 and 1940. The lateral pipe design allows for a lower profile ceiling space than systems having top mounted supply pipes. Pressure sensors 1935, 1936, and 1939 provide room pressure and pressure sensors 1934, 1937, and 1938 provide pressure measurements within plenum 1909.

Air distribution apparatus 1900 and 1940 serves as a single sensing device for both lighting and HVAC functions that are operable on a single platform by building automation systems (BAS). It is contemplated that the BAS may be controllable by a single software system or network accessible locally on site or remotely off site. Air distribution apparatus 1900 and 1940 can operate as a single zone or coupled with multiple like apparatuses for multi-zone operation. Air distribution apparatus 1900 and 1940 is a high turndown, self-balancing system which allows for continuous commissioning with built-in fault diagnostic systems. It may be used as a supply, return, or exhaust, or a combination thereof.

One improvement of air distribution apparatus 1900 and 1940 possess is in the difference in method of reporting CFM's. Very low airflows may be measured in any LFFC by reducing the opening area to raise the airflow through the opening to about 600 FPM, assuming a transducer has at least a 0.02" measurement sensitivity. In air distribution apparatus 1900 and 1940, airflow discharges directly into occupied space, at velocities often far less than 600 FPM, so CFM's must be determined by other means. A ducted LFFC is generally employed upstream of a group of apparatus 1900/1940 to maintain for example 0.08" in the ductwork supplying the group. After initial one-time-only auto-calibration to obtain and store flow coefficients for the installed connecting ductwork and flex connections to the downstream devices 1900 and 1940, the upstream LFFC controller is able to determine CFM's for all downstream devices even where their discharge velocities are well below 600 FPM.

By means similar to that described elsewhere herein, the air handling unit together with the upstream LFFC's provide just enough air to keep all air distribution apparatus 1900 and 1940 satisfied and at least one wide open, thereby minimizing at every moment total energy consumption as well as flow-generated noise.

As outlined above, after the one-time auto-calibration to determine and store ductwork resistances, the upstream IDD can calculate the CFM of all the downstream air distribution apparatus 1900 and 1940 given their respective % open and the total flow at the upstream IDD. Apparatus 1900 and 1940 CFM's may become important when outside temperature is higher than the approximate 87-89F return temperature, so that AHU is in MOA mode and minimum ventilation CFM must be maintained; ~3 if unoccupied, plus 7.5 X number of occupants, usually 0 or 1, occasionally 2 in the 100-120 ft² zones. The central controller reports % OA to the IDD's in this mode so the CFM delivered at each apparatus 1940/1944 is able at all times to meet the minimum ventilation requirement based on zone occupancy Referring now to FIGS. 19E and 19F, another embodiment of air distribution apparatus 1940 is generally shown. In this embodiment, a rotary actuator 1942 controls the position of side troffer plate 1944 which is articulable between a closed position and an open position around pivot 1946. Side troffer plate 1944 is fixedly attached to a gear segment 1948 that comprises an arcuate slot '950 and a plurality of teeth 1952. Teeth 1952 of gear segment 1948 engage pinion gear 1954 whose rotation articulates gear segment 1948 along an arc within the range of slot 1950. When side troffer plate 1944 is in the open position, an air flow passage F is defined between side troffer plate 1944 and a bottom flange 1956 and is in fluid communication with plenum 1909. Those skilled in the art can will realize that side troffer plate 1944 and housing bottom flange 1956 extends approximately the entire length of air distribution apparatus 1940, and hence, when in the open position, forms a channel for air flow passage F. A gasket 1964 embedded in a slot in the housing 1956 seals airflow passage F when side troffer plate 1944 is in a closed position.

Figure 19F:
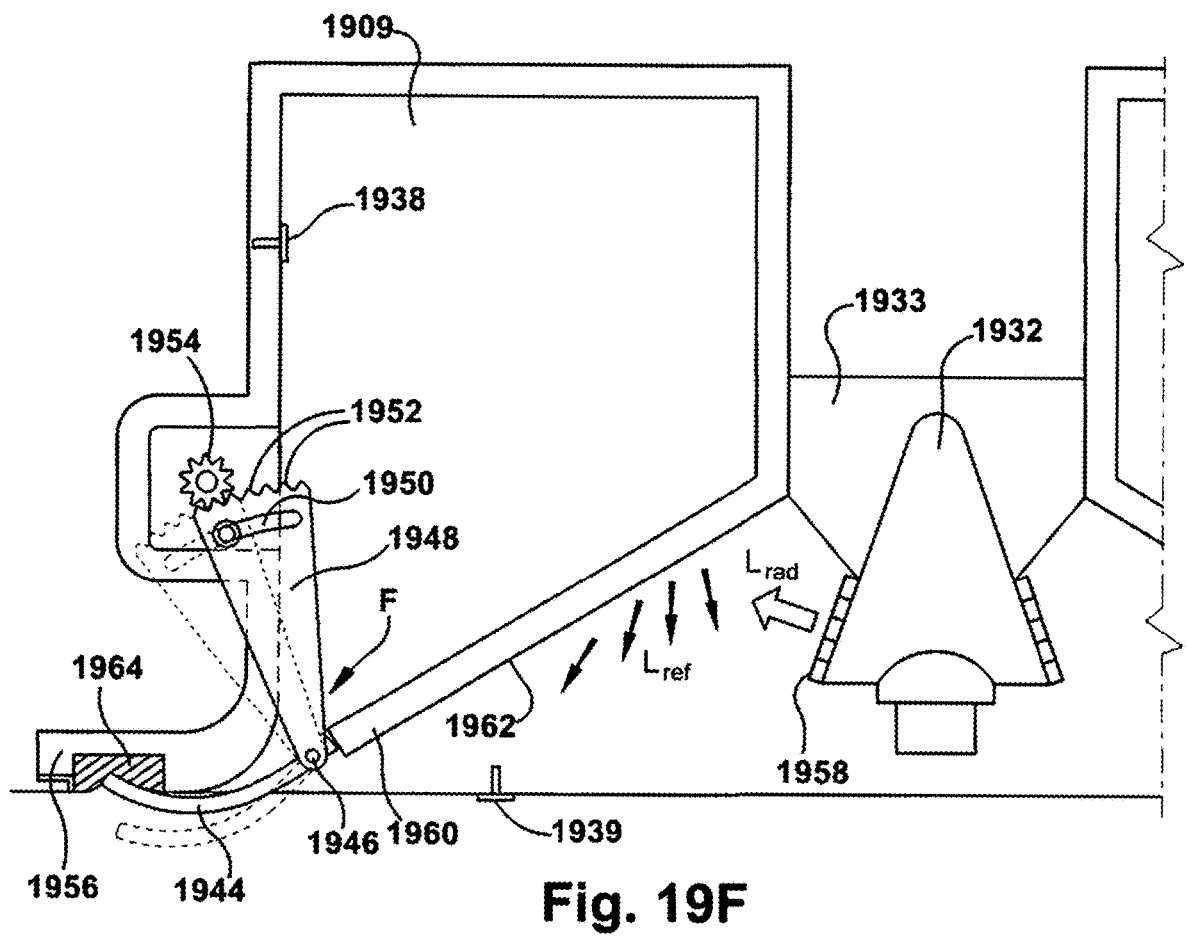
FIG. 19F is a partial front view of the air distribution apparatus shown in FIG. 19E with a rotary actuator.
Figure 19G:
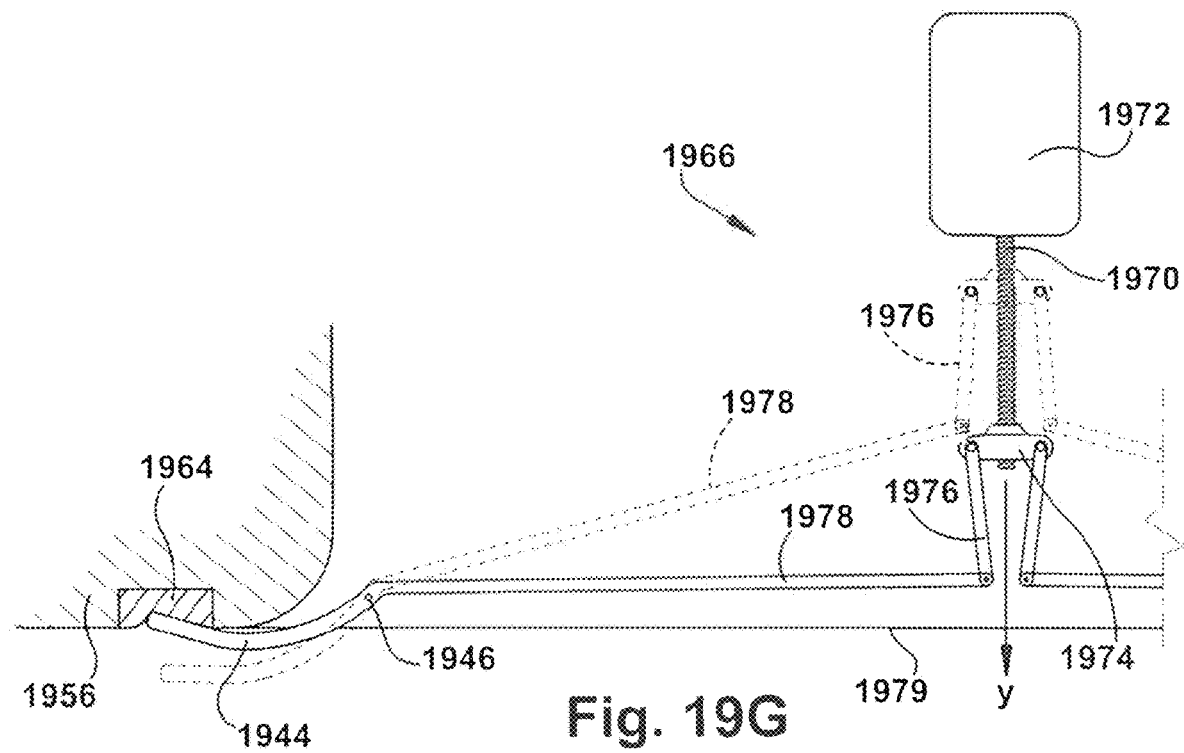
FIG. 19G is a detailed view of an embodiment of a linear actuator for an air distribution apparatus.
Figure 19H:
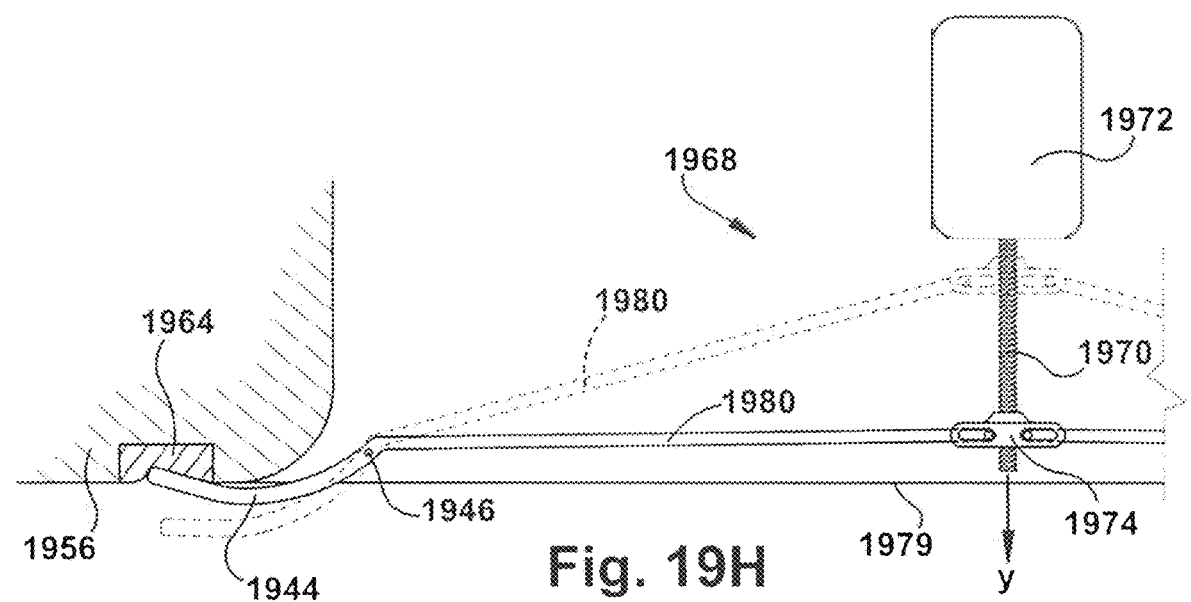
FIG. 19H is a detailed view of another embodiment of a linear actuator for an air distribution apparatus.

Referring to FIGS. 19G and 19H, an alternative to the rotary actuator 1942 is shown in FIGS. 19E and 19F. A linear actuator or rotary actuator continuous with a threaded shaft 1970 may be implemented to articulate the position of side troffer plates 1944. In such actuator embodiments, a threaded shaft 1970 is linearly or rotatably driven by an actuator motor 1972 and wherein an attached or threaded link 1974 engages shaft 1970 such that extension or rotation of shaft 1970 moves link 1974 linearly along the Y-axis. Link 1974 is hingeably connected to arms 1976, 1978, 1980. Combination arms 1976 and 1978 may be used, as shown in FIG. 19G or a single arm 1908 may be used, as shown in FIG. 19H. An arm 1978 and 1980 is fixedly attached to the end of the shaft rotating side troffer plate 1944, and the articulation of link 1974 along the Y-axis generates a corresponding articulation of side troffer plate 1944 between a closed position and an open position. A shield or cover (not shown) may be used to protect the actuation assemblies from the environment and damage, particularly from entanglement with surrounding insulation.

Air distribution apparatus 1940 further comprises a light source, such as a plurality of LEDs (light emitting diodes) 1958, tipped back to reduce direct radiation from the small high intensity LEDs so most emission $L_{rad}$ is directed toward the lower edge of inner troffer plate 1962 where a diffuse highly reflective surface is disposed. The transmitted light $L_{rad}$ is reflected from diffuse reflective surface 1962 and scattered multi-directionally $L_{ref}$. LEDs 1958 may be used as a light source that can be used for room lighting as well as LiFi signal transmission. As an alternative to the directly reflected light $L_{ref}$, holes sealed with transparent material (not shown) may be positioned at the ends of air distribution apparatus 1900 and 1940 such that LiFi signal transmission can propagate out in various directions in the above-ceiling space to provide signal coverage not only within the illuminated space below the air distribution apparatus 1900 and 1940, but in the above-ceiling space as well where required, as over walls. Small auxiliary LiFi sources and sensors may be disposed in the above-ceiling portion of the apparatus to enable communication where there are barriers in the below-ceiling space. The auxiliary LEDs 1958 are tipped back largely out of line of sight, so individually colored LEDs 1958 may be employed. 97-98% diffuse white reflectors of reflective surface 1962 largely merge the LED emissions to produce uniform white illumination. RGB (red/green/blue) or RYGB (red/yellow/green/blue) LED's may be employed, and occupants may control color temperature in their zone. When four LED high RGB LED strips are used, good initial color balance is achieved with current LED's using one blue, six yellow-green and 13 red LED's in each 4"×5" block. In a 48" long air distribution apparatus 1940, nine such blocks might be used on each side of heat sink 1932. Some studies have shown that color balance more natural than the blue and yellow phosphor balance of current LED and fluorescent luminaires improves worker satisfaction and productivity, so it is not only a matter of aesthetics. Using three or four LED colors will ultimately provide the most efficient as well as satisfying source of illumination. It is feasible to incorporate R,G, (Y) and B LEDs into a single envelope, and this eliminates the difficulty of achieving uniform white illumination that occurs using discrete R, G, (Y) and B LEDs, and it is contemplated this is form of LED could be incorporated. A large numbers of LEDs need not be driven hard to produce desired illumination, and this along with heat sink 1832 and incorporated forced convection heat exchanger yield very long LED lifetimes, such as for example, 100,000 hours or more. It is estimated that a 2' ×4' air distribution apparatus 1940 can provide illumination and conditioning to about 100-120 ft² of space and a 2'×2' air distribution apparatus 1940 to about 64-100 ft² of space.

Energy savings is realized by conducting the heat generated by the LED bank 1958 to the ceiling plenum above. Unlike fluorescent sources, visible light LED's do not radiate heat and all heat losses are conductive. According to a recent U.S. Department of Energy Better Buildings report, lighting currently accounts for 34% of energy consumption in small offices and 40% in large offices. Coupled with the fact that the 82% of LED power consumption not emitted as light is carried away by conductive heat transfer, this results in a means of reducing MER fan power consumption by a factor of about three. In a typical office scenario with LED light troffers in which workspace heat load raises 55° F. supply air to 78° F. at the ceiling, LED conductive heat loss accounts for 0.82×34% (40%)=28% (resp. 33%) of the total energy consumption. Removing the heat load from the workspace immediately reduces the CFM required to maintain 78° F. at the ceiling by the same factor. Air distribution apparatus 1800 achieves this by directing return air over a convective heat exchanger carrying the LED generated heat into the ceiling return plenum, from which it is drawn into a return shaft. All else being equal, MER fan power is reduced to $0.72^3=0.37$, resp. $0.67^3=0.3$, of the value obtained in the absence of air distribution apparatus 1800. The temperature in the ceiling return plenum and shaft is correspondingly raised to $T_{ret}$=55° F.+23° F./.72(resp. 0.67)=87° F. (resp. 89° F.), so they should be well insulated; in particular, high R ceiling tiles should be employed. The higher return temperature and correspondingly lower CFM facilitate raising efficiency on the chilled water side of the system as well.

Air distribution apparatus 1900 and 1940 also controls air supply to the region it supplies with light, which is typically around 100 square feet, or, if alternated with return-only troffers, to about twice that area, or 200 square feet. Side troffer plate 1812 on each side of air distribution apparatus 1800 controls bidirectional horizontal airflow from air distribution apparatus 1800. Using sensors TP 1834 upstream and sensor SP 1836 downstream of side troffer plates 1812, the control characteristic is modeled by $$\text{Flow} = C\,A_0\sqrt{2\Delta p/\rho} \text{ with } C \cong \frac{.61}{1 - .39(\% \text{ open})^2},$$

the correlation described elsewhere herein. The present device is in effect an LFFC embedded in a light troffer which may incorporate many or all sensory and communications described herein.

The flow coefficient curve C enables accurate flow measurement down to a few percent of full flow and control down to virtually zero flow, limited only by any inadvertent leakage out of air distribution apparatus 1900 and 1940. The actual factory calibration curves C are built into the controller. Calibrated accuracy is virtually independent of supply air inhomogeneities and other external factors; therefore, no on-site commissioning is required.

Temperature sensors and controller on each air distribution apparatus 1900 and 1940 adjust side troffer plates 1912 to maintain temperature as set (standard) in wireless communication with a control room, fan controller, and a mobile phone or computer application (via WiFi/LiFi) programmed individually to allow individual adjustability of air distribution apparatus 1900 immediately above each occupant's workspace. Intensity and color temperature control for each air distribution apparatus 1900 and 1940 is available and such controls are also available in the control room and also to supervisors.

Infrared or visual monitors, such as cameras, may be incorporated into the overall control scheme of each air distribution apparatus 1900 and 1940 to detect occupancy. Such occupancy sensors on each air distribution apparatus 1900 and 1940 may be set to dim lights and reduce airflow locally in communication with adjacent units in accordance with current occupancy levels. While $CO_2$ sensors/monitors could be used for this purpose, their relatively slow response time and low sensitivity and accuracy make separate occupancy sensing preferable. Off-hour setbacks help conserve energy by turning lights off and further reducing airflow. Small temperature sensors as well as cameras or other sensors for occupancy detection may be placed on an insulating layer at the bottom of the LED mounting wedge 1958. Additionally, facial recognition software may be incorporated with the cameras such that movement from zone to zone is monitored and user applications, such as WiFi, LiFi, computers lighting, are activated. Facial recognition capability would also allow identification and tracking of specific individuals from zone to zone as well as flagging of trespassers. This occupancy detection capability integral to air distribution apparatus 1900 and 1940 offers security features not otherwise available. Air distribution apparatus 1900 and 1940 also comprises fire detection capability wherein smoke sensors (not shown) is integrated into the building automation system. Thermal sensors may also be implemented to achieve the aforementioned functions. The following is an example of a model of a central-local control implementation for air distribution apparatus 1900 and 1940. Parameters used by an air distribution apparatus 1900 and 1940 and central controllers are as follows:

i. $T_z$=zone temperature, measured by AirLume controller
ii. $T_t$=Target temperature used by AirLume controller
iii. $T_u$=user temperature setting
iv. $T_s$=supply air temperature at AirLume controller
v. $T_c$=centrally set setback temperature
vii. $T_O$=outside air temperature used by central controller Operation MER supplies 55° F. air. In each zone, user sets $T_u$ as desired. $T_t=T_u$ in occupied zones, reverts to centrally set $T_c$ when space remains unoccupied for 10 minutes, for example, and immediately back to $T_u$ when occupancy resumes.

Outline of Normal Mode

Airlume displays Flag 1 to central controller while side troffer plates 1812 are wide open and $T_z>T_t-0.5F$; and Flag 2 if wide open and $T_z>T_t+0.5F$. Central controller polls each Airlume incrementing fan RPM every 2 minutes, for example, proportional to the number of Flag 2's observed; decrementing slowly while no flags are showing. (Therefore, holds steady while some flag 1's and no flag 2's are showing). Increment proportionality set for reasonable relaxation time without significant overshoot. Control zones are relatively small (100 to 200 square feet), so response times can be fairly quick without significant overshoot.

When chillers are operating (To>55F) central controller sets MOA according to occupancy, obtained by polling all Airlumes, and return air $CO_2$ monitors; either at each floor's return opening or with a single central return air MER monitor.

While $T_z<T_t-0.5F$ at a perimeter, controller goes into MOA mode, controlling CFM using whatever occupancy sensors are employed and activating perimeter heat at that location. See Perimeter Heating and Mixed Mode below.

Setback Modes (Unoccupied Zones)

During Business Hours, if To≥82° F.+0.5° F., maintain $T_z$<~82F. If To≤65° F.−0.05F at a perimeter Airlume, activate perimeter heat (see below) to maintain $T_z$>~65° F.

Off Hours: If To≥90° F., maintain $T_z$<~Ts=90° F. (Chillers cycle on). If To≤50° F., maintain $T_z$>~Ts=50° F. (Large MER unit heater or CW/HW coil set to H mode cycles on).

Weekend: If To≥95° F., maintain $T_z$<~Ts=95° F. (Chillers cycle on). If To≤32° F., maintain $T_z$>~$T_s$=32° F. (Large MER unit heater or HW/CW coil set to H) cycles on).

Morning Startup, Winter. Using large MER unit heater or central HW/CW coils set to H mode, MER supplies 90° F. air to air distribution apparatus 1800, with side troffer plates 1812 initially set wide open or to individual presets designed to balance startup airflow, and FLAG 2 set. Perimeter heat may be engaged as well. While $T_z>T_t-0.5°$ F. air distribution apparatus 1800 controller closes damper and resets Flag 2. Sets FLAG 1 while $T_z>T_t+0.5°$ F. $T_t$.$T_c$ except in areas occupied by maintenance workers.

Normal operation resumes when the number of FLAG 1's exceeds the number of FLAG 2's.

Morning Startup, Summer. Normal operation except side troffer plates 1812 are initialized wide open or to preset values to balance startup airflow.

Perimeter Heating. The 87° F. to 89° F. ceiling plenum temperature is ideal for winter heating of office windows, particularly on the floor above. Very low pressure fans feed grills at the base of windows on the floor above, and controlled by proximate Airlumes located above. If the basement is not conditioned, a higher velocity downwash unit is placed in the first floor ceiling plenum.

Mixed Mode

When there are many calls for both heating and cooling, The Central System can alternate brief periods of 55F and 90F supply air. Central control orchestrates shutting off the open Airlumes and opening the closed ones when switching back and forth between 55F and 90F supply air. Mode ends when no Airlumes remain in H mode.

As with all systems designed around LFFC devices, no expensive and uneconomical VAV/reheat boxes are employed in Airlume-based systems.

A standard 24 foot×48 foot air distribution apparatus extends approximately 9 inches into the ceiling plenum. An intake on the side or end facilitates running supply ducts low in the ceiling plenum, between the rows of like air distribution apparatuses 1800, to both reduce heat transfer between the supply ducts and warm return plenum and leave a clear return path to the return shaft.

Calibration Device Generated Structures with Fluid Flow Valve Characteristics

Many of the above-described fluid flow structures are directed to fluid flow devices, for example, valves, often for use as structures for, among other things, generating signals representative of rates of fluid flow through flow regions defined by the fluid flow devices. In particular, those fluid flow devices are designed to establish a fluid flow paths within Interior flow regions defined by inward facing walls extending along a flow axis extending from an upstream end to a downstream end of the interior flow regions. Such designs often include a single or multiple element damper, or blade assembly which traverses the flow region and defines a controllable variable cross-section area array of one or more apertures fluidically coupling an upstream end of the flow region with a downstream end of the flow region.

Equations are set forth above which enable determination of the rate of fluid flow from the upstream to downstream ends thereof, which are detected parameter values associated with the flow. Important values for that determination include a fluidic pressure drop ΔP across the blade assembly (and an array of one or more aperture(s) that the blade assembly defines) and the aggregate area $A_o$ of the apertures of the array. In a particular useful form, where the parameters ΔP and $A_o$ are within certain ranges, the structures exhibit orifice-plate behavior, establishing one or more venae contractae in the fluid flow extending downstream from the apertures of the array. Preferably, ΔP is determined from an upstream pressure sensor adapted to determine an upstream pressure at a locus which is upstream by a distance D1 from the damper assembly, and a downstream pressure sensor adapted to determine an downstream pressure at a locus which is downstream by a distance D2 from the damper assembly. Preferably, DI>D2 and (1) the upstream pressure locus is disposed upstream of any substantial disturbance in the fluid flow due to the damper assembly, and (2) the downstream pressure locus is disposed adjacent or near-adjacent to the downstream-facing side of the damper assembly, and between peripheries of the apertures of the array and transverse to the flow axis.

When the parameters ΔP and $A_o$ are within the certain ranges, the above-noted equations can be used with the determined/detected parameters ΔP and $A_o$, or values representative thereof, to analytically provide flow rate values representative of the flow rate through the fluid flow devices.

When the parameters ΔP and $A_o$ are outside the certain ΔP and $A_o$ ranges, there generally are no venae contractae in the fluid flow extending downstream from the apertures of the array. Under such conditions, flow is "creep" flow (which is non-vena *contracta* flow) through the fluid flow devices, which is viscous flow at Reynold numbers<<1, and flow measurement methods other than those of this disclosure must be used. In contrast, for flow presenting vena contractae, the Reynolds number for such flows is well over 1,000, and usually more like 100.000, and the flow measurement methods of this disclosure may be used.

Thus, the methods described in conjunction with the above, set forth analyses enabling the design and build of fluid flow devices, such as valves, which, among other things, enable analytic computations providing accurate measurement of fluid flow through the fluid flow devices, for example, using the formulae set forth above.

After designing and building such valve devices, preferably operative over the above-noted certain ΔP and $A_o$ ranges, one of the valve devices could be used as a design prototype for the construction of other identical, or close-to-identical, i.e., similar valve structures. To do so, the prototype structure could be run through a set of ΔP and $A_o$ values in the certain ΔP and $A_o$ ranges, and the resultant fluid flow rate (CFM) through the prototype structure for each pair of ΔP and $A_o$ values, is determined. All those values could be stored in a "table of values" memory structure in communication with a controller of the "identical" (or near identical) valve structures, and that set of values could be used in operation, for example pursuant to a feedback control loop, to cause the "identical" valve structures to operate in the same manner as would the design prototype valve structure. Of course, the accuracy associated with the performance of the "identical" valve structures would depend on the degree to which the stored data represented the full set of continuous data which was implicit in the prototype valve structure. In any event, highly accurate performance of the "identical" valve structures would require significant computational resources if a highly accurate performance is desired. Rather than generate the "table of values" memory structure populated with the data corresponding to that measured by the prototype valve structure, one could computationally determine a similar set of values, and populate the "table of values" memory structure with those computed values. The latter approaches, while operational, require significant computing resources to generate and store the appropriate data for the "table of value" memory structures. To save memory, the data could be taken with respect to sparsely distributed data points, although the overall performance would be correspondingly degraded.

Valve CFM Calibration and Computation

Figure 20:
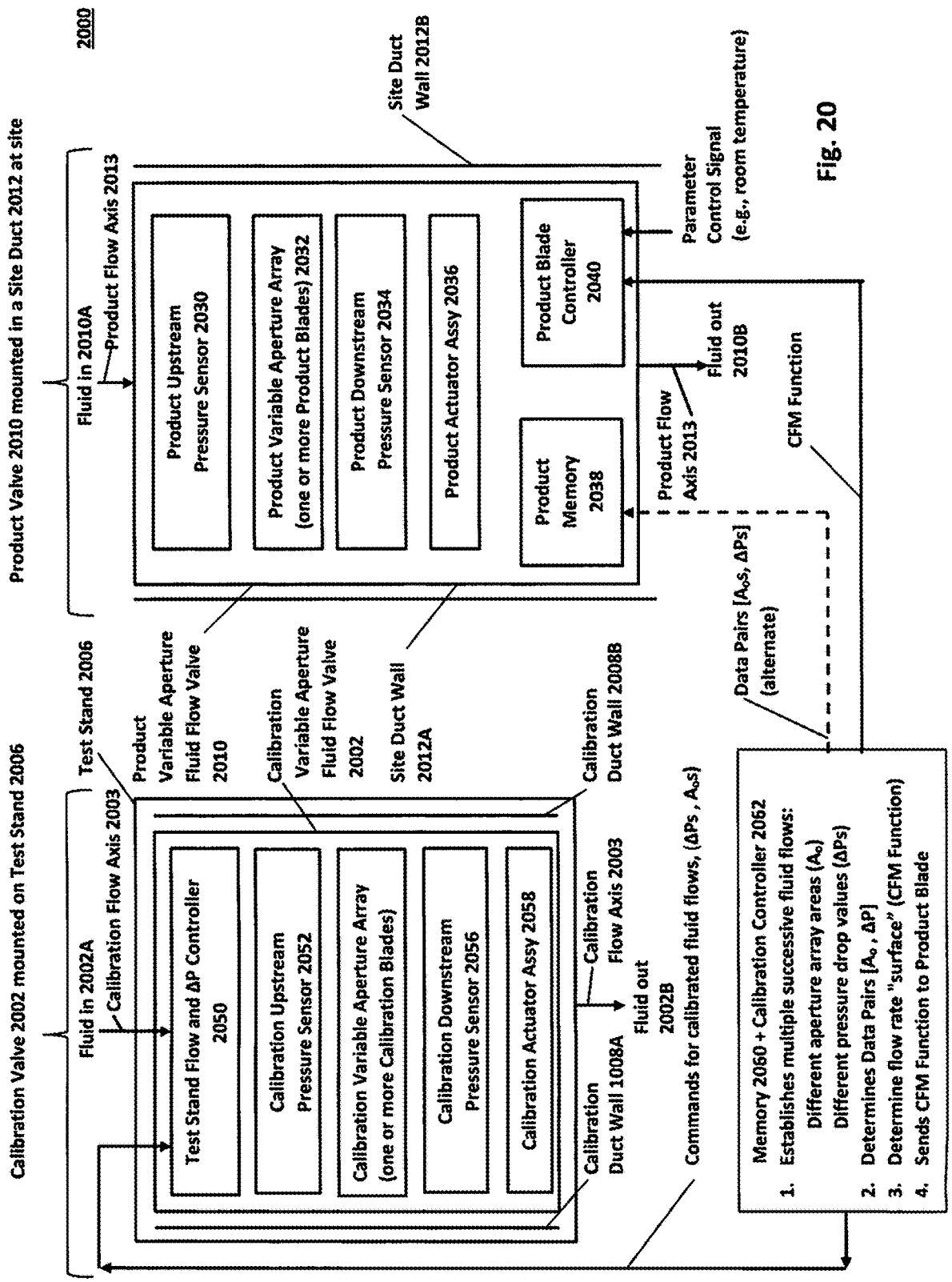
FIG. 20 shows in block diagram form, an exemplary calibration variable aperture fluid flow device configured to calibrate a remote variable aperture fluid flow device according to embodiments of the present invention.

As an effective alternative, "identical"-performance of multiple similar valve structures can be generated by the configuration shown in FIG. 20 and the exemplary data shown in FIGS. 21-24 and the following related description.

An exemplary calibration and computation configuration 2000 is shown in FIG. 20. Calibration and computation configuration 2000 includes, on the left-hand side of FIG. 20, a "Calibration" Variable Aperture Fluid Flow Valve 2002 (hereinafter calibration valve 2002) disposed on a test stand 2006 or other suitable calibration device such as a CFD simulation device. A "Product" Variable Aperture Fluid Flow Valve 2010 (hereinafter product valve 2010), on the right-hand side of FIG. 20, is disposed within a fluid flow site duct 2012, indicated in FIG. 20 by site duct sidewall cross-sections 2012A and 2012B. In calibration and computation configuration 2000, the physical structure of calibration valve 2002 is identical, or substantially identical, to product valve 2010. In a form, the physical structural characteristics and operational characteristics of calibration valve 2002 can track within +/−10 percent of those of product valve 2010.

By way of example, product valve 2010 has at least nearly the same, and in an optimal case, the identical, general physical structure of the calibration valve 2002 described above. However, instead of a product memory 2038 that directly stores values representative of aggregate aperture area $A_o$ and pressure drop ΔP values as do those described above for structure 2038, a table of predetermined, or calculated on-the-fly, flow coefficients, as might be computed or otherwise determined at or in association with a calibration controller 2062 of calibration valve 2002, is transferred to and stored in a product memory 2038 of product valve 2010. Those flow coefficients are used to determine, and adjust, aperture areas of the product aperture array 2032 as might be determined to control the product valve 2010 to effect a desired fluid flow therethrough. A downside of this alternate approach is that relatively large amounts of storage and computer resources at or associated with the product valve 2010, are required to obtain high level accuracy and control/measurement of fluid flow through the product valve 2010.

Pursuant to another, and more resource-conserving, approach, with configuration 2000, a product valve 2010 is calibrated by the calibration valve 2002. To do so, the calibration valve 2002 operates on a test stand 2006 or its equivalent. That operation is performed over a range of operational parameters, including, for example, data pairs representative of aggregate areas ($A_o$) of the apertures and pressure drops (ΔP) across variable aperture-forming dampers/blades of calibration valve 2002, and computing a CFM function representative of the fluid flow rate for those data pairs through product valve 2010. For example, a succession of different calibrated fluid flow rates are applied by the test stand 2006, pressure drops across the dampers/blades of calibration array 2054 are measured, and the aperture areas are successively varied for the different flow rates. The elements of the data pairs can be represented by signals corresponding to percent the apertures are open ("open %" or "opening %", or "% opening"), and the pressure drops ("ΔP") across the dampers/blades which define the apertures. Rather than sending a large number of (open %, ΔP) data pairs to the 2038 memory of the product valve 2010, a calibration controller 2062 associated with the test stand 2006 generates a CFM Function defining a mathematical surface which is "surface-fit" to a relatively sparse set of individual=data points. That formulaeic surface representation of the surface, the CFM Function, is sent to the product blade controller 2040 of the product valve 2010. The term "sparse" in the context of the invention, refers to regions where a plurality of points (or points within multi-point sub-regions) which comprise less than all of one or more ranges for example, of ranges of pressure and/or ranges of pressure drops (ΔP) and/or ranges of valve aperture areas. The surface representation defined by the CFM Function, is adapted to relatively easily permit derivation from the CFM Function, of highly accurate aperture area $A_o$ (for example, in the form of open %) and ΔP values) needed at site duct 2012 at a work site.

With the configuration in FIG. 20, a representation of the CFM Function is determined by the calibration controller 2062 associated with the calibration valve 2002. In an exemplary form, the CFM Function is determined mathematically in Python with sampled data at the calibration controller 2062 and the flow stand 2006, which, in turn, is transferred to the product blade controller 2040 in the form of a mathematical representation of fluid flow through the calibration valve 2002 at calibrated flow rates and pressure drops (established by test stand 2006) through and across the calibration valve 2002 in associated ranges of pressure and valve aperture. That representation can generally be close to the actual flow values associated with the calibration valve 2002 over the associated ranges of pressure and aperture. A preferred "closeness" to the actual flow, in practice, is related to the standard deviation of the data, with noise in the instrumentation setting limits in the "goodness" of the approximation. Moreover, before transferring that surface representation information from the calibration controller 2002 over to the product blade controller 2040, variations can be made in the surface defined by the representations, to accommodate variances as desired, for example, where the variances relate to changes in the behavior of calibration valve 2002. At the product valve 2010, the product blade controller 2040 is responsive to the received surface representation information, augmented or not, at the test stand 2006, to control the actual response of the product valve 2010 to match the response of the calibration valve 2002, over the same pressure and aperture ranges.

That functionality enables improved efficiency of operation of the remote valve's (such as product valve 2010) in a building, for example, since there, in effect, is no longer a need for a remotely located employee whose job it is to certify, to the performance of, or commission, the remote valves. Pursuant to the subject invention, the remote valves are precisely calibrated by the methodology described herein. The primary basis for the improved efficiency, is that the commissioning party can confirm operation over many points, particularly as such confirmation is needed in large buildings when measuring performance of a multi-valve HVAC system.

There are significant computational/storage advantages of transferring to and storing CFM function values in product memory 2038 for each damper/blade position and associated damper/blade pressure difference Δp directly rather than by first determining a flow coefficient dependent only on damper/blade position (open %), to be then multiplied by a measure of pressure difference ($\sqrt{\Delta P}$) to get CFM values:

a. any repeatable elastic deformation of the damper/blade assembly and/or its actuation mechanism causing deviation in the flow coefficient due to increased ΔP, is accounted for. The same is true for a deviation caused by deflection of a damper gasket, for example, under increased flow, at least while the gasket's deformation remains repeatable;

b. pressure transducers are generally accurate only over a pressure range of about 10:1, corresponding to a CFM range of 3:1 at a fixed damper/blade position. As a consequence, operation is needed over a range closer to 100:1; with CFM range 10:1. Production actuators need not be accurate over the wider range: the actuators just need to be consistent with the actuator or actuators used to create the measured calibration CFM data over the desired range of CFM's and ΔP's;

c. the flow coefficient is constant only for Reynolds numbers over a few thousand; by determining and tabulating damper CFM Function values directly over the entire range of damper open % positions and associated ΔP values, operation capability is extended into a low Reynolds range. In order to determine flow coefficient data directly, the data gathering would need to be extended into a low Reynolds region using a table of this sort in any case; and d. an orifice plate model (exhibiting one or more venae contractae, and allowing relatively easy analytical determinations of fluid flow rates) gives way to an obstruction model somewhere around 80-90% open, and the effective flow coefficient passes through a transition that may not be pressure independent, even theoretically. The direct method, based on use of CFM Function values from the mathematical surface fitting the relatively sparse data points, eliminates that concern.

In an exemplary form illustrated in FIG. 20, the product valve 2010 resides within a duct at a site, defined at least in part by site duct walls 2012A and 2012B, and includes product upstream pressure sensor 2030, product variable aperture array 2032, product downstream pressure sensor 2034, a product actuator assembly 2036, product memory 2038 and product blade controller 2040. The product valve 2010 includes one or more product dampers/blades which are selectively movable to define a product variable aperture array 2032, upstream and downstream product pressure sensors 2034 and 2036 which sense the basis for differential pressures ΔP across the product aperture array 2032, and product actuator assembly 2036 which controls blade "positions" and thus the aperture area between upper and lower limits, all under control of product blade controller 2040. The product valve 2016 is characterized by a defined structural geometry and operational parameters.

Again, in the exemplary form illustrated in FIG. 20, the calibration valve 2002 removably resides on a calibrated test stand 2006 and includes a structural geometry identical, or substantially similar (e.g., within +/−10%) to, and operational parameters of, those of a product valve to be calibrated. The calibration valve 2002 is disposed within a calibration duct 2008 (shown in cross-section in FIG. 20 by calibration duct walls 2008A and 2008B). Calibration valve 2002 is characterized by the same, or substantially the same (within +/−10 percent), geometry as the site duct 2012. A test flow and ΔP controller 2050 effects fluid flow at calibrated rates through the calibration valve 2002 along a calibration flow axis 2003 and sets aperture areas for measurement conditions. The calibration valve 2002 further includes one or more calibration damper/blades which are selectively movable to define a calibration variable aperture array 2054, upstream and downstream calibration pressure sensors 2052 and 2056 which sense the basis for differential pressures ΔP across the calibration aperture array 2054, and a calibration actuator assembly 2058 which controls blade "positions" and thus calibration aperture area between upper and lower limits, all under control of a calibration controller 2062. The calibration controller 2062 is responsive to the calibrated succession of flow rates established by test stand flow and ΔP controller 2050 and measured pressure drops across the dampers/blades of the calibration aperture array 2054, to determine a surface-fit mathematical surface representation of the flow rates (CFM Function) through calibration valve 2002 over the applied calibrated flow rates and the measured pressure drops. The determined CFM Function is transferred to the product blade controller 2040, where product blade controller 2040 processes the CFM function and controls fluid flow through product valve 2010 based on $A_o$ and ΔP values extracted from the received CFM Function as well as at least one parameter control signal indicative of a desired set point. By way of example, the set point may represent a desired temperature for a zone in a building, e.g., a room.

Again, by way of example, a high precision, high and low airflow measurement and control system at the test stand 2006 uses a single damper/blade assembly (effected by calibration array 2054) and a pitot tube or orifice sensor to measure calibrated air speed through the calibration valve 2002 on test stand 2006, corresponding to a flow, for example, in cubic feet per minute. Also, the test calibration valve 2002 includes calibration actuator assembly 2058 that provides an aperture area signal (representative of the area of the variable aperture of calibration aperture array 2054) to calibration controller 2060, where that signal is used to move the dampers/blades of the variable aperture array 2054 In the illustrated form of FIG. 20, the aperture area signal is generated by a potentiometer associated with the calibration actuator assembly 2058 which is adapted to provide an actual position feedback signal to the calibration controller 2062.

$\Delta P$ values are determined for the various applied calibrated flows, by determined differences between upstream (of calibration aperture array 2054) pressures measured by calibration sensor 2052 at one or more sensor loci relatively far upstream from the damper/blades, and downstream (of calibration aperture array 2054) pressures measured by calibration sensor 2056 at one or more sensor loci relatively close to downstream-facing dampers/blades of calibration aperture array 2054 and between peripheries of the apertures. Preferably, the sensor loci for calibration sensor 2052 are disposed outside of flow disturbances caused by the presence of the dampers/blades of calibration aperture array 2054 along the flow path 2010A and 2010B. Preferably, the sensor loci for calibration sensor 2056 are disposed fully within the wake of the fluid flow just downstream along the flow path from the downstream-facing dampers/blades of calibration aperture array 2054, although variances may be used in some embodiments.

Exemplary Remote Calibration

To calibrate a remote product valve 2010 using configuration 2000, data is gathered from calibration valve 2002 on test stand 2006 for different sets of pressure drops ($\Delta P$) and percentage of damper/blade openings (% open) applied to the calibration valve 2002, establishing a set of 2-element data pairs ($\Delta P$, % open). Using calibrated flow test stand 2006, a measured flow rate (CFM) for each data point is obtained for the respective data points.

Using that set of data pairs, an equation (CFM Function) for a mathematical surface is determined to fit the multiple ($\Delta P$, % open) data points.

For the CFM Function, there are two independent variables:

X: % Open $Y: \sqrt{\text{Pressure difference}} = \sqrt{\Delta P}$ and one dependent variable:

$Z: CFM = f(X, Y)$

For example, using 2D polynomial curve-fitting, or surface-fitting, a data element-matching technique is used where the surface-matching equation is a 2D polynomial of the form $Z = f(X, Y)$:

$$Z = a_1 + a_2 Y + a_3 Y^2 + a_4 Y^3 + a_5 X + a_6 YX + a_7 Y^2 X + a_8 Y^3 X + a_9 X^2 + a_{10} YX^2 + a_{11} Y^2 X^2 + a_{12} Y^3 X^2 + a_{13} X^3 + a_{14} YX^3 + a_{15} Y^2 X^3 + a_{16} Y^3 X^3 + a_{17} X^4 + a_{18} YX^4 + \ldots$$

Other surface-fitting techniques may alternatively be used. For example, standard methods of compressing data known in the art, may be used, for example, polynomials or piecewise polynomials such as splines, or where the product controller has a suitably-sized memory, the entire set of test stand data itself, together with a conventional interpolation mechanism, may be used.

For the above 2D polynomial curve-fitting, or surface-fitting, the equation is order 6 for X and order 3 for Y. To compute the equation parameters, again by way of example, the CFM Function is determined using an extension of the well-known least squares method for a one dimensional case to a two dimensional case. That algorithm provides a suitable match for many purposes, as confirmed in Octave GNU (software) and then implemented in Spyder-Anaconda Python (software).

An exemplary set of 28 parameters a(i), where $1 \leq i \leq 28$, for a data-fitting surface are based on:

% Damper Opening values from 0 to 100, and

Pressure Difference (or Drop) $\Delta P$ values from 0.003 to 3.0 inches of water. By way of example, a particular parameter data set solution from a test may be constructed for a particular damper. Then, with no loss of generality, the structure is a fixed polynomial of 28 parameters, but the parameters values vary depending on each test, or calibration.

With those parameters, the CFM Function/equation is:

$$Z = a(1) + a(2)*Y + a(3)*Y^2 + a(4)*Y^3 + a(5)*X + a(6)*X*Y + a(7)*X*(Y^2) + a(8)*X*(Y^3) + a(9)*X^2 + a(10)*(X^2)*Y + a(11)*(X^2)*(Y^2) + a(12)*(X^2)*(Y^3) + a(13)*X^3 + a(14)*(X^3)*Y + a(15)*(X^3)*(Y^2) + a(16)*(X^3)*(Y^3) + a(17)*X^4 + a(18)*(X^4)*Y + a(19)*(X^4)*(Y^2) + a(20)*(X^4)*(Y^3) + a(21)*X^5 + a(22)*(X^5)*Y + a(23)*(X^5)*(Y^2) + a(24)*(X^5)*(Y^3) + a(25)*X^6 + a(26)*(X^6)*Y + a(27)*(X^6)*(Y^2) + a(28)*(X^6)*(Y^3)$$

Fitting Error

The Standard Deviation for an exemplary surface fitting is 27.77 CFM. Considering a medium flow of 1300 CFM, in that case, the error is on the order of 2%, and 1% for the maximum flow. The percentual error increases for low flows.

Graphics

Figure 21:
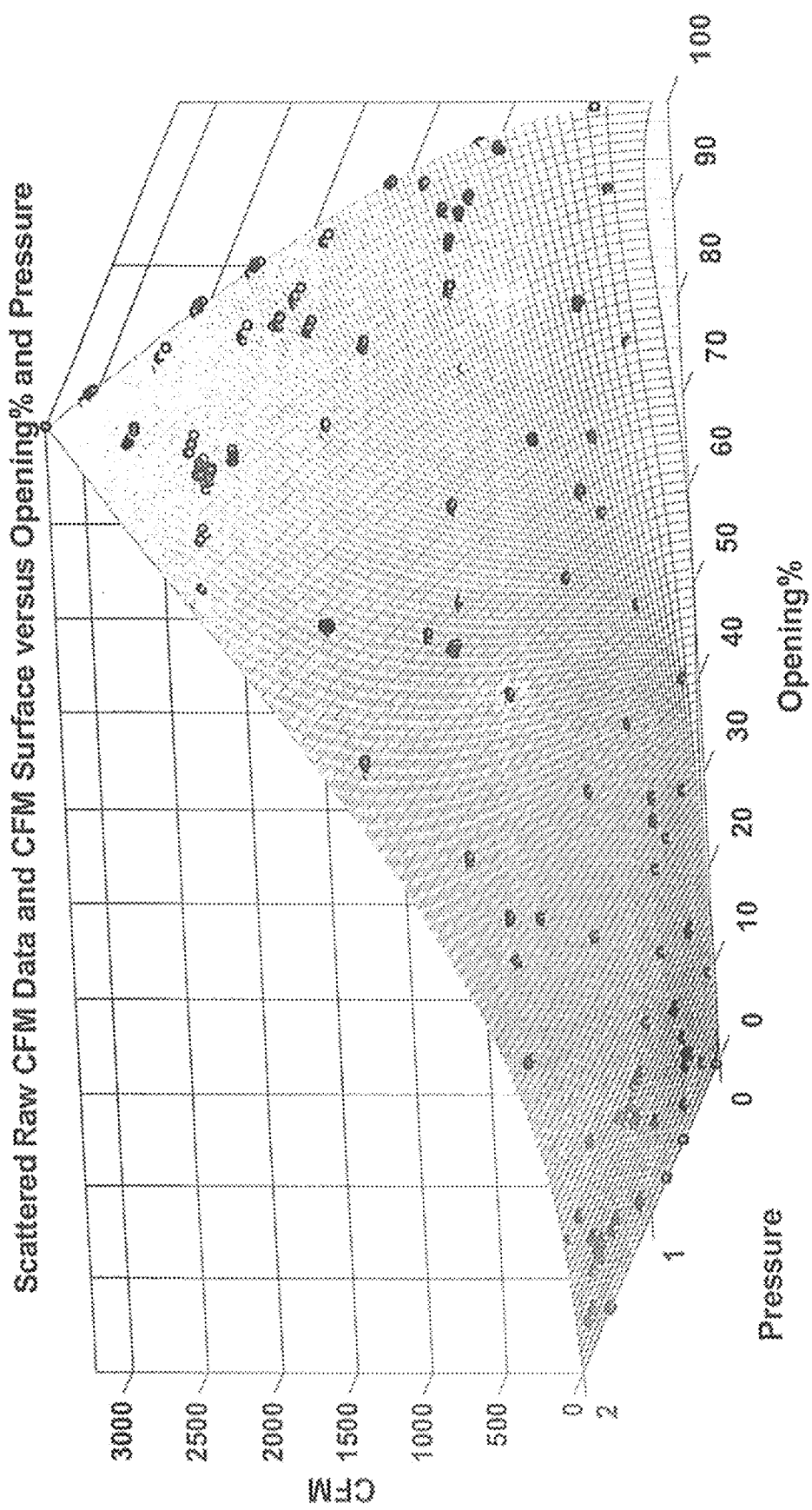
FIG. 21 depicts a functional relationship of CFM versus Opening % and Pressure for the configuration of FIG. 20 according to an exemplary embodiment of the present invention.
Figure 22:
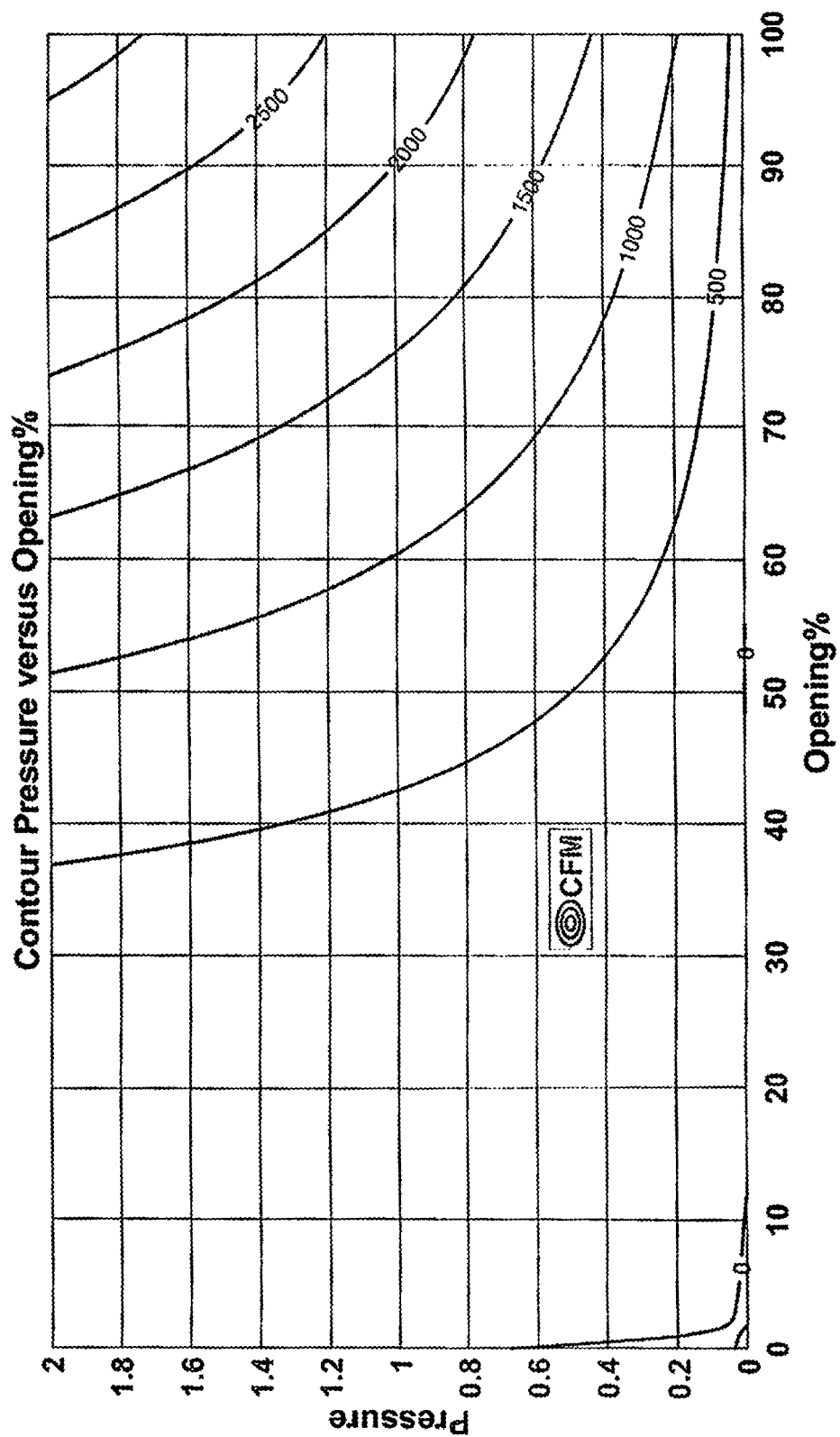
FIG. 22 depicts a functional relationship of CFM versus Opening % and Pressure for the configuration of FIG. 20 according to an exemplary embodiment of the present invention.
Figure 23:
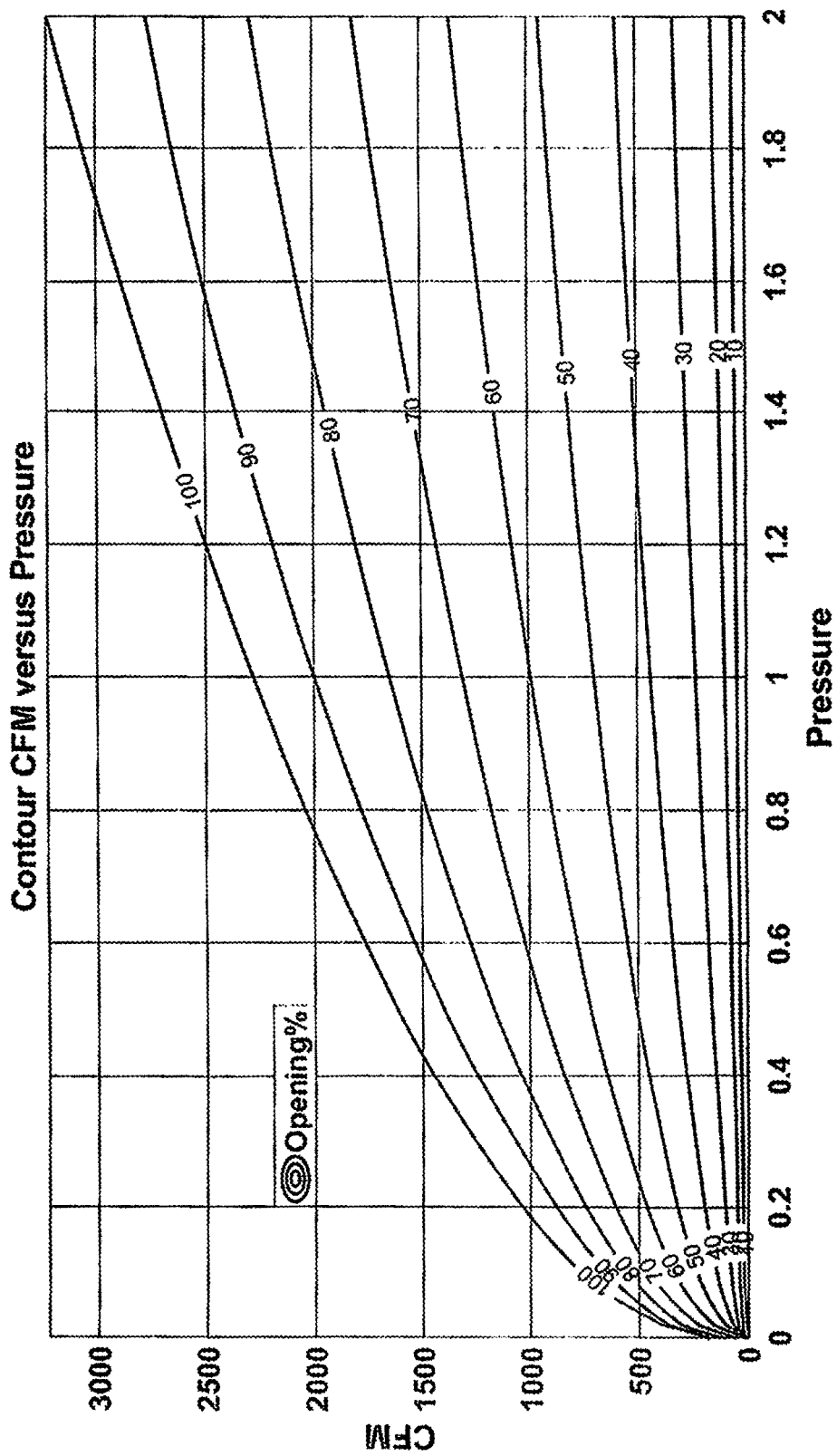
FIG. 23 depicts a functional relationship of Opening % versus Pressure and CFM for the configuration of FIG. 20 according to an exemplary embodiment of the present invention.
Figure 24:
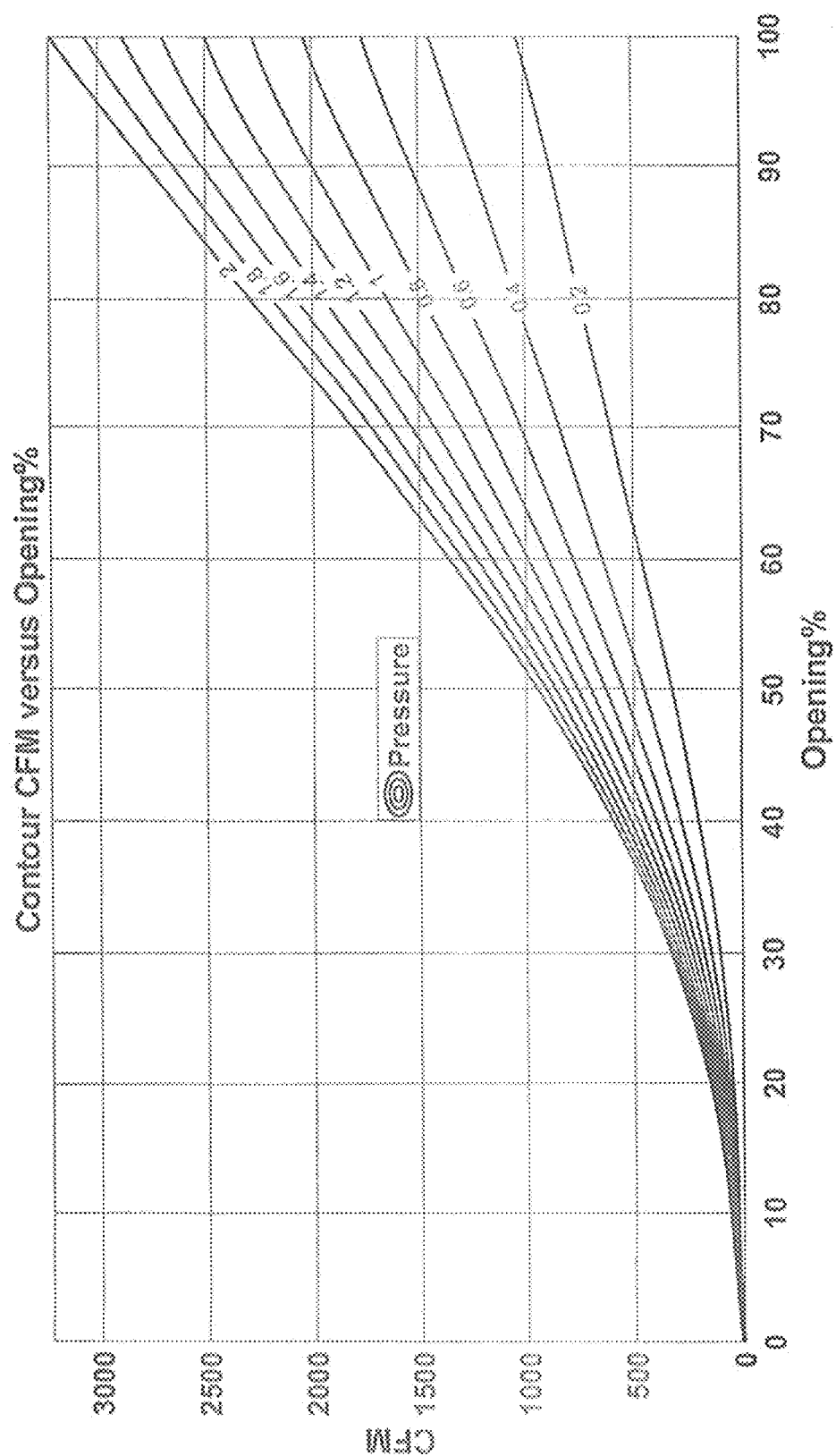
FIG. 24 depicts a functional relationship of Pressure versus Opening % and CFM for the configuration of FIG. 20 according to an exemplary embodiment of the present invention.

FIG. 21 shows the continuous mathematical surface with scattered raw data obtained by plotting CFM versus Pressure Difference and % Damper Opening. FIG. 22, FIG. 23 and FIG. 24 show contour projections of the surface for different angles.

The above-described example does not compute values of coefficient equations (which might be transferred to the product blade controller/computer 2040) because, although such equation would work, the result is just a slice of the surface of FIG. 21. Alternatively, one could compute CFM=f (Pressure Difference) as shown in FIG. 23, keeping the aperture [% Opening] constant. This too would work but is limited because the data used is just a slice of the surface of FIG. 21. Moreover, one could compute CFM=f(% Opening) as shown in FIG. 24, keeping the Pressure Difference constant. This too would work but is limited because the data used is also just a slice of the surface of FIG. 21.

One could also use an equation to approximate the effective area for the air the was passing through the valves. This too works but is computationally difficult, as the area is calculated from a geometrical projection of the opening produced by the damper/blade movement. Such area is not easily computed. One could use several complex curved surfaces capping the entire flow and everywhere normal to the flow. Alternatively, simpler surfaces could be used, and only the normal component of the flow at each point used to determine the flow through the surfaces. Either way, with such a method, the flow itself is determined for each damper position and, at many different pressures.

Just directly measuring the CFM at each damper position and associated pressure differences, and using surface-fitting, as described above, is much simpler and more accurate. The surface-fitting determined from the data values from the CFM calculations used in the surface-fitting, is based on use of the in the calibrated flow test stand. The latter methodology is very versatile because it can be applied to any air valve, regardless of the geometric shape, as long as the construction ensures repeatability in the behavior of all the air valves. Also, the latter methodology is very general because a user can work with a wide range of pressures and still obtain a CFM reading characterized by much improved precision compared results obtained using prior art techniques.

Linearization of System Components.—Non-Linear Fluid Valves

Actuators are typically used to control opening and closing of dampers in valves of fluid flow systems. Such actuators, as well as other components used in the industry, generally exhibit a deviation from an ideal (linear) relationship between their respective outputs and inputs. For example, in damper-based valves for an air-based fluid flow system, for example, an HVAC system, a given change in a damper opening percentage (referred to below as "opening %") at an input does not in general give rise to the same percentage change in output fluid flow (e.g., in cubic feet per minute (CFM)) through the valve, particularly when measured over different ranges of pressure drop across a flow-through aperture of the valve. Actuators which exhibit this behavior are said to be non-linear. Typically, in the industry, a mapping function is used to characterize performance of a valve. A characteristic static non-linear static mapping function for output versus input is shown by the solid line curve of FIG. 25 for an exemplary actuator 3010 of an air valve assembly.

Figure 25:
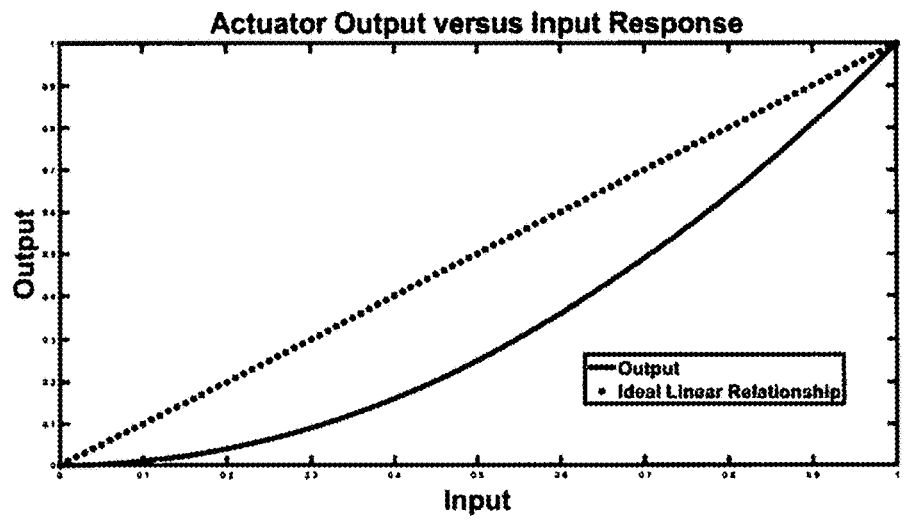
FIG. 25 shows for an exemplary actuator, a non-linear [static?] output versus input mapping function.
Figure 26:
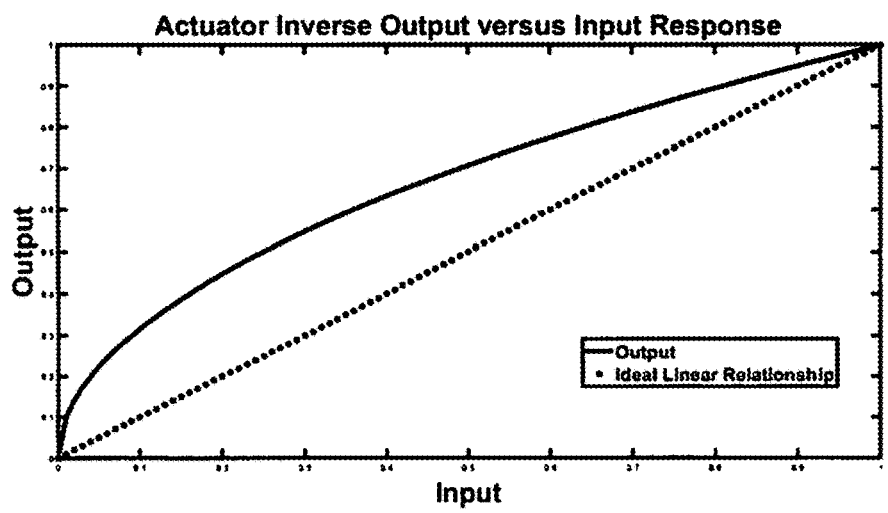
FIG. 26 shows an exemplary non-linear inverse [static?] output versus input mapping function for the actuator of FIG. 25.

A characteristic non-linear inverse mapping function associated with actuator 3010's characteristic static non-linear static mapping function for output versus input. That inverse mapping function, which has high utility as described below, can be determined for actuator 3010, for example, by using a least-squares method, wherein the non-linear inverse mapping function is computed to be opposite to the native non-linear mapping function that characterizes actuator 3010 with respect to an ideal linear relationship. An exemplary non-linear inverse mapping function for the actuator 3010 of FIG. 25, is shown by the solid line curve in FIG. 26. Non-linear actuators are less than optimal for use in controlling fluid flow valves, unless their behavior can be controlled to be linear, for example, in the manner described below.

In order to linearize the performance of the exemplary actuator 3010, or others, for use in a valve assembly, a module adapted to effect a nonlinear inverse mapping function can be is inserted at a flow control input of the exemplary actuator 3010. Preferably, the module is a software module adapted to perform necessary processing to convert the native non-linear characteristic of the actuator to a linearity-inducing characteristic. The net result of so-deploying the inserted software module, is that the resultant output fluid flow response through the valve associated with actuator 3010 is linear with respect to a given input parameter such as a commanded damper opening percentage (referred to below as "damper opening %"). In that example, the output fluid flow rate of actuator 3010 (characterized by the actuator's native non-linear mapping function of FIG. 25), which has been static linearized by the software module-introduced non-linear inverse mapping function of FIG. 26 deployed at its input, resulting in the software module/actuator/valve combination exhibiting linear output versus input behavior. The net output versus input mapping function is shown by the solid line curve overlapping the "ideal" straight dotted line of FIG. 27.

Figure 27:
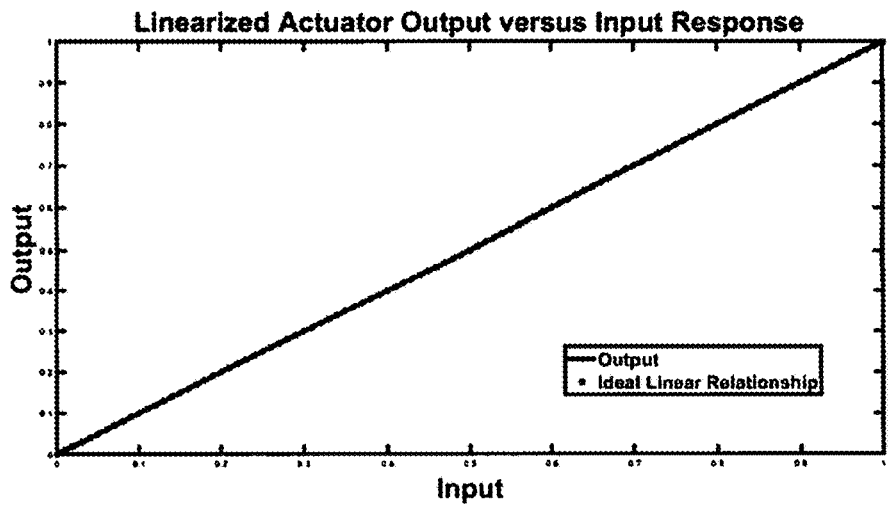
FIG. 27 shows an exemplary linearized output versus input mapping function for the actuator of FIG. 25.

That linearization is beneficial to a user of the valve assembly because it reduces complexity by eliminating tedious software routines which otherwise would be needed to effect a linearized output signal by conventional means, for example, through the use of high-order polynomial models or look-up tables. If the nonlinear mapping is highly complex, non-smooth or non-monotone, an operative inverse mapping function might not exist or might include some heuristics to consider "special" zones. For such a circumstance, a straightforward nonlinear function can often be used. For example, if an output-input relationship was $Y=X^2$, where Y represents an output parameter and X represents an input parameter, then a "perfect" inverse exists, namely, in that example, $YI=X^{1/2}$ can be used, where YI represents an inverse output parameter and X represents an input parameter, resulting in perfect linearization. Such a linearized response is shown in FIG. 27 where a linear fluid flow output response overlies a commanded input.

For a fluid flow valve having a damper assembly that controls percentage opening/closing with respect to a fluid flow passing therethrough, the input-output mapping can be non-monotone and non-zero for very low inputs (where linearization is to be performed with respect to damper percentage opening), and a "jump" can be observed to reach the "linear" response.

Figure 28A:
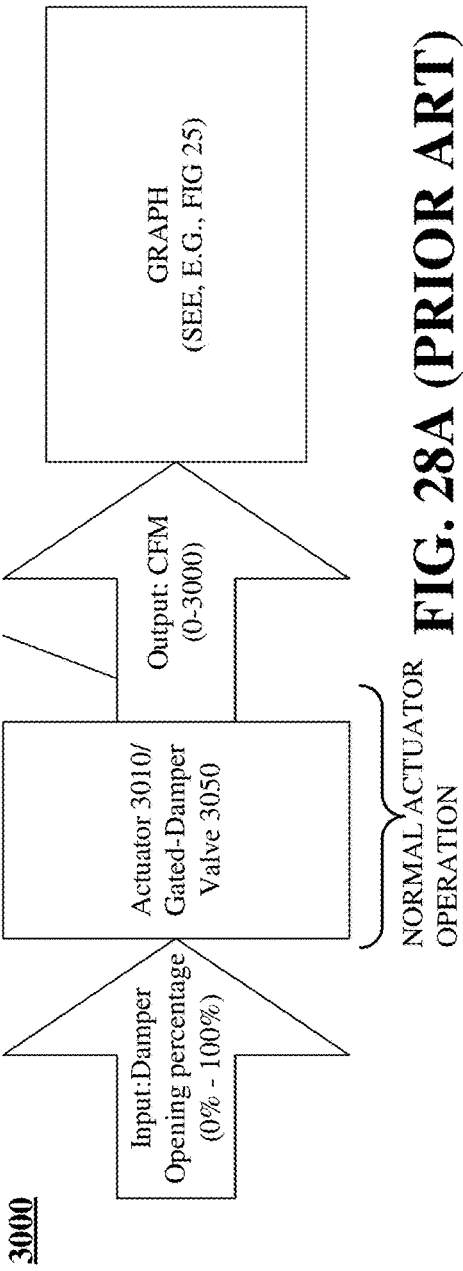
FIG. 28A shows a signal flow diagram for operation of a prior art actuator configured for "normal" operation.
Figure 28B:
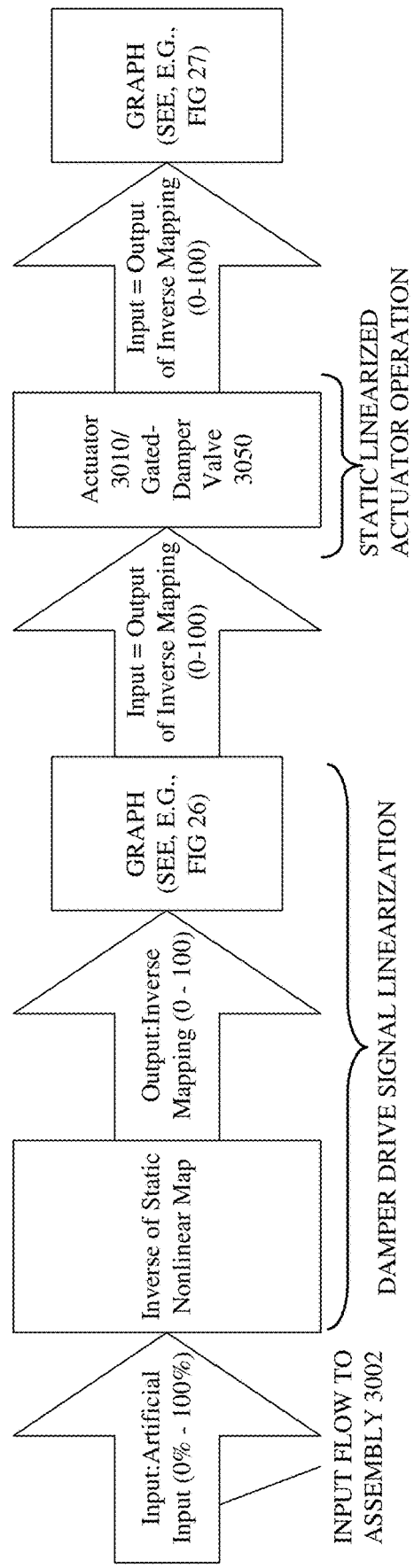
FIG. 28B shows a signal flow diagram for operation of an exemplary actuator configured for operation with static linearization.

In FIGS. 28A and 28B, signal flow configurations are shown for illustrative prior art valve assembly 3000 and novel valve assembly 3002 each assembly comprising (i) an actuator 3010 having an actuator input line 3010A and an actuator output line 3010B, and (ii) an associated 1-100% damper-gated valve 3050 having a fluid flow input port 3050A, a fluid flow exit port 3050B and a damper driver line 3050C. The actuator 3010 and associated valve 3050 of each of assemblies 3000 and 3002 are adapted to act in concert to control fluid flow received from input fluid flow port 3050A of valve 3050 and passing through and exiting at exit port 3050B of valve 3050, in response to a damper drive signal applied (directly for prior art assembly 3000 of FIG. 28A, and indirectly for novel assembly 3002 of FIG. 28B) to damper driver input line 3050C of valve 3050.

Figure 29A:
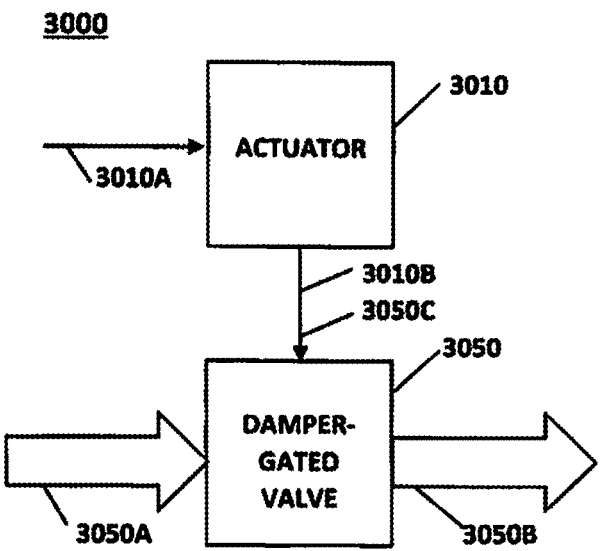
FIG. 29A shows in block diagram form, a prior art actuator configured for "normal" operation.
Figure 29B:
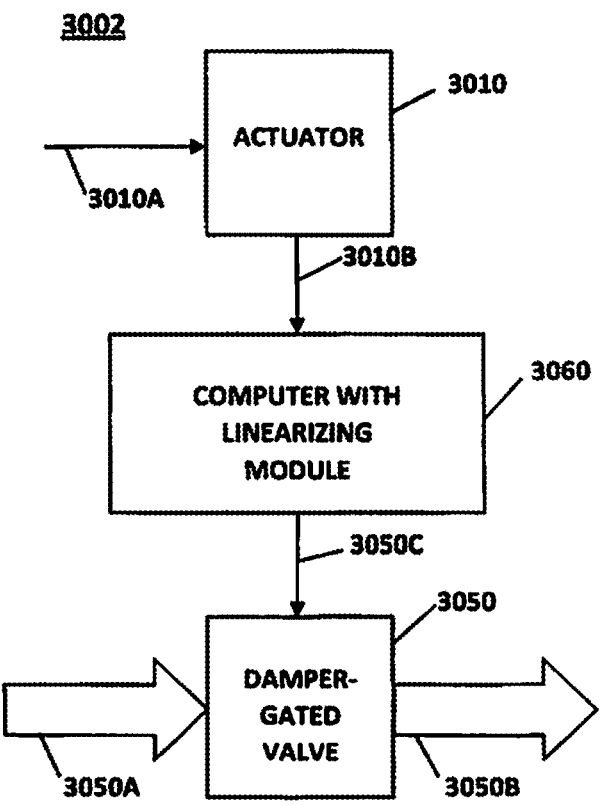
FIG. 29B shows in block diagram form, an exemplary actuator configured for operation with static linearization.

Block diagrams for circuit element configurations embodying the prior art signal flow configuration of FIG. 28A and the novel configuration of FIG. 28B are shown in corresponding configurations of FIGS. 29A and 29B, respectively. Those two signal flow configurations and two circuit element configurations are presented herein for comparison purposes.

For valve assembly 3000 as shown in FIGS. 28A and 29A, actuator 3010 is configured in accord with the prior art for "normal" operation where a change of a commanded flow rate at actuator input line 3010A (for example, damper opening %) does not produce a linearly related change in output fluid flow at output exit port 3050B), with the associated valve assembly 3000 thereby behaving in a non-linear manner.

For valve assembly 3002 as shown in FIGS. 28B and 29B, actuator 3010 is configured for static linearization operation, with the associated assembly 3002 acting in response to a commanded flow rate signal at actuator input line 3010A, to effect a directly corresponding output fluid flow at a output exit port 3050B, with the associated valve assembly 3000 thereby behaving in a linear manner.

In the two illustrative configurations, it is assumed for simplicity, that all non-linearities to be addressed are introduced by output/input non-linearities in the actuators 3010, and not in the valves 3050 or any other components. In alternate forms, one or more other nonlinear components can be similarly configured to function in a linear manner.

In the above illustrated examples, the assemblies 3000 and 3002 of both signal flow/circuit element pairs of FIGS. 28A/29A, and FIGS. 28B/29B, are similar in the following manner. In both assemblies 3000 and 3002: (i) the included actuators 3010 are characterized by the solid curve non-linear mapping function of FIG. 25, (ii) output ends of the damper driver input lines 3050C are both connected directly to damper driver inputs of the respective damper-gated valves 3050 in the same manner, and (iii) the damper drive signals applied to the damper driver input lines 3050C are adapted for controlling the opening and closing of an adjustably sized flow-through apertures traversing respective fluid flow paths extending from fluid flow input ports 3050A to fluid flow exit ports 3050B.

In the exemplary conventional assembly 3000 of FIGS. 28A and 29A, in order to effect conventional operation, a damper opening % signal, representing a command for a desired flow-through aperture size for valve 3050, is applied to actuator input line 3010A. That damper opening % signal is processed by the actuator 3010 in accord with its characteristic non-linear [static?] mapping function of FIG. 25 and provides a damper drive signal from an actuator output via actuator output line 3010B directly to damper driver input line 3050C. That damper drive signal in turn effects adjustment of the position of a damper of the valve 3050, changing the aperture size depending on the input signal, and thereby modulates the fluid flow from actuator fluid flow input port 3050A, along the fluid flow path through the aperture, to the output at fluid flow exit port 3050B. Because of the nonlinearity of the output fluid flow versus input commanded flow due to the characteristic non-linear mapping function of actuator 3010, in general, the output fluid flow at exit port 3050B does not track the commanded flow represented by the damper opening % signal applied to actuator input line 3010A. As a result, in general, the opening % signal (on actuator input line 3010A) and output fluid flow (at exit port 3050 B) do not track so that the operation of those elements is nonlinear, with the attendant disadvantages of non-linearity.

In contrast, in the novel assembly 3002 of FIGS. 28B and 29B, in order to effect operation, a damper opening % signal, representing a command for a desired flow-through aperture size for valve 3050, is also applied to actuator input line 3010A. As in FIGS. 28A and 29A, a desired damper opening % signal applied to actuator input line 3010A, is processed by the actuator 3010 and (i) effects adjustment, if called for, of the position of the damper of valve 3050, and (ii) generates an "actual opening percent" signal representative of the actual (as opposed to the commanded) position of the damper of valve 3050. With respect to the actual opening percent signal, that signal is provided on output line 3010B of actuator 3010, and, subject to further processing described below, provides a basis for a damper driver signal to be applied to damper driver input line 3050C.

The actual opening percent signal represents the effects of the nonlinearities of actuator 3010 (in keeping with the solid curve native non-linear mapping function of FIG. 25). However, the actual opening percent signal output of the actuator 3010 is not applied directly to the damper driver input line 3050C of damper-gated valve 3050 as in the "normal" configurations of FIGS. 28A and 29A. Instead, the actual opening percent signal output of the actuator 3010 is applied to a computer 3060 which includes a software module adapted to determine a mathematical inverse to the solid curve of FIG. 25 representing the native non-linear mapping function of actuator 3010, and generate therefrom, and use, a resultant non-linear inverse mapping function (corresponding to the solid curve in FIG. 26), to process the actual opening percent signal output of the actuator 3010 with that non-linear inverse mapping function, to obtain a linearized form of the output of the actuator 3010, By this means, the operation of the actuator is linearized. Since, pursuant to this illustrative example, it has been assumed that the only a source of non-linearity in assembly 3002 is actuator 3010, the now-linearized actuator 3010 acting in concert with the valve 3050, are a linearized system in the aggregate. If linearization of other components is needed, such components can be linearized in the same manner as was actuator 3010.

The output from the linearization software module of computer 3060, which in some forms may be a hardware module, or a hardware/software hybrid, is applied from an output line 3060C as the damper drive signal on damper drive input line 3050C. That processed signal, hereinafter referred to as a "linearized damper opening %" signal is then applied to the input damper driver line 3050C of valve 3050, where that signal performs control of the aperture size of the damper-gated valve 3050 so that the fluid flow from input port 3050A to exit port 3050B of valve 3050, is linearized with respect to the damper opening % signal applied on input line 3050A to actuator 3050.

Thus, actuator 3010 is subject to a static operation shown in FIGS. 28B and 29B, where a change in the signal of the input line 3010A (which may be represented by an input flow rate or opening % or some other input parameter) produces a change in an otherwise nominally produced pursuant to the actuator inverse mapping used as an input to the actuator 3010, which in turn produces a linearized output applied to damper driver line 3050C when compared to the a signal, or other parameter, at input line 3010A.

The difference between the nonlinearity of actuator 3010 and the linearization provided by the software module of computer 3060 is referred to as the Conformity Error, which is a measure of how well the linearization "conforms" the nonlinear solid curve of FIG. 25 to the ideal linear relationship depicted by the dashed line in FIGS. 25. For the illustrated example, that conformance is shown in FIG. 27.

In a form, linearization of a given input is based upon allowed input minimum and maximum values. For any input, within those limits, the output of the software is a linear representation of the input. In such forms, if the input is outside the allowed minimum or maximum values, the output of the software module is no longer a linear representation of the input signal. Operation of a linearization software beyond the specified input span is not recommended because the output is difficult to calculate. If a standard software input span does not need requirements, a custom software module is utilized to effect optimal performance for a given system.

CFM versus Pressure and Damper Opening %

Figure 30A:
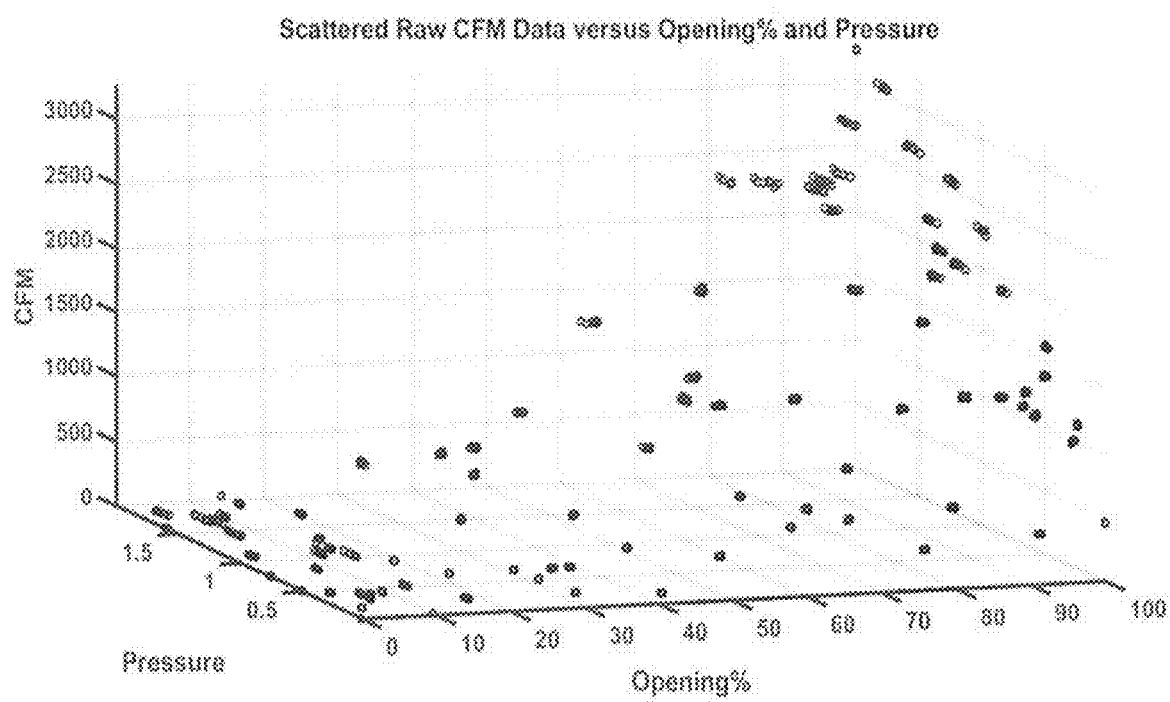
FIG. 30A shows a plurality of relatively sparse data points of scattered raw (measured) CFM data versus valve opening percent and pressure across an exemplary valve.
Figure 30B:
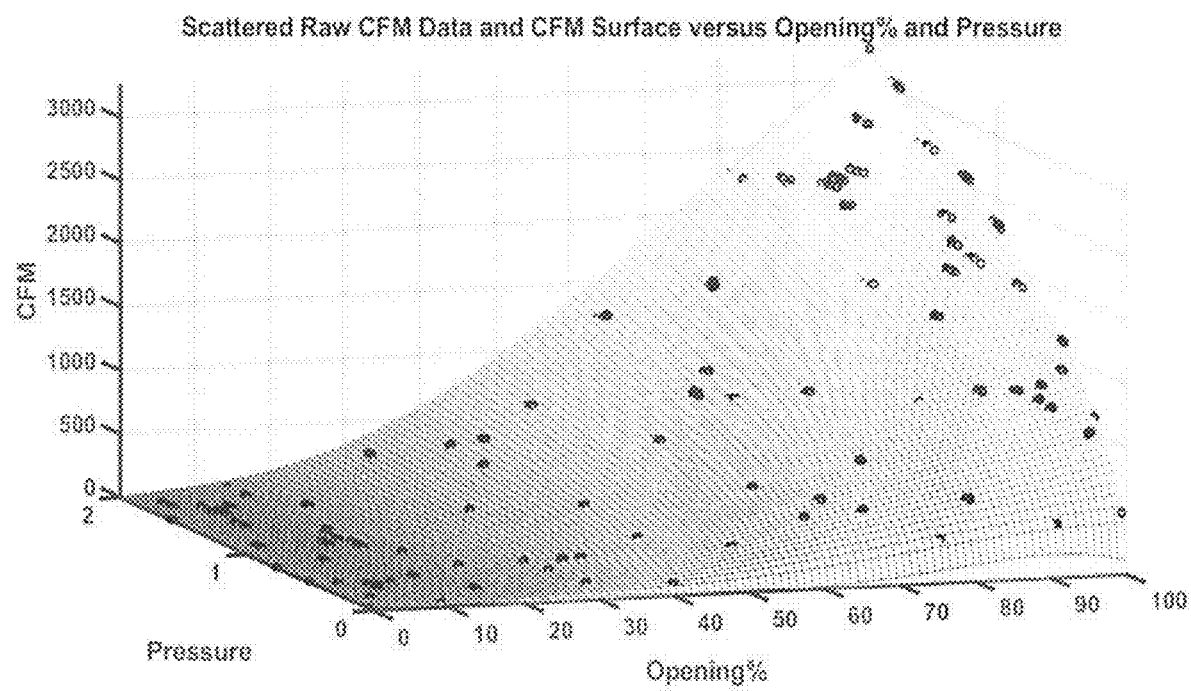
FIG. 30B shows the plurality of relatively sparse data points of scattered raw (measured) CFM data versus valve opening percent and pressure across the valve of FIG. 30A together with a mathematical surface passing through the data points.

FIG. 30A shows a number of sparse data points, wherein each data point is representative of a measured parameter for valve within a range for which linearization may be attained. In the illustrated example, each data point represents a measured fluid flow rate (for example, in cubic feet per minute (CFM)) for various pressure drops across a valve (P)

and percentage openings of the valve (opening %). That set of data points in FIG. 30A, as raw data, is shown in FIG. 30B, which further shows a continuous mathematical non-linear surface which has been determined to pass through the respective data points. The mathematical surface is used as a model for the CFM versus pressure P and opening % performance characteristics of the associated valve.

In order to obtain such a mathematical surface for a prototype valve, the prototype valve is configured on a test stand and provided with a stepped flow through of a fluid of interest, at stepped pressure P values, and the resultant fluid flow through the valve (CFM) is measured for the various combinations of steps. The resultant CFM values can be plotted, for example as in FIGS. 30A and 30B, thereby displaying the CFM performance characteristic of the prototype valve with respect to pressure P and opening percentage sign %. Through the generation of the mathematical surface, a performance model is established, where the accuracy of the model depends on the number of CFM data points obtained; wherein the sparser the number of data points results in a less accurate, but still useful model, compared with a mathematical surface generated from a less sparse number of CFM data points.

The mathematical surface represents a model for the distribution of CFM data points. In various uses, a formulaic representation of the mathematical surface can be ported by way of a relatively low bandwidth line to a remote location, where the ported mathematical surface can be used to provide operational parameters for a remote valve, which corresponds in geometric shape to the performance of the prototype valve. The formulaic representation of the mathematical surface is a highly efficient way of transferring a performance model of the prototype valve, from which operational parameters may be extracted and applied to a geometrically similar remote valve.

Thus, with a relatively sparse distribution of measured points, a formula representing the mathematical surface may be determined, and for a similar valve remote from the prototype valve, the parameters of operation and general performance may be determined remotely. The degree to which the precision of the parameters of operation match the actual parameters of the remote valve, bears a conformity in performance with the prototype valve which depends on the density, or degree of sparseness, of the points for which the mathematical surface is determined. As a result, depending on desired conformity of the remote valve to the prototype valve, more or fewer points may be used as a basis for generating the equation for the mathematical surface.

Once the formula is determined, it can be relatively easily transferred to the site where the remote valve is being installed, and control may be affected so the performance of the remote valve matches that on the prototype test stand. That process is highly efficient because a relatively simple equation representing a mathematical surface may be transferred and points from that service may be used to control the remote valve, so that the computing facilities necessary at the remote location are relatively small compared to a highly dense data set of measured values. But requiring significant computational resources to implement such control compared to a more sparsely populated set of data points.

Figure 31:
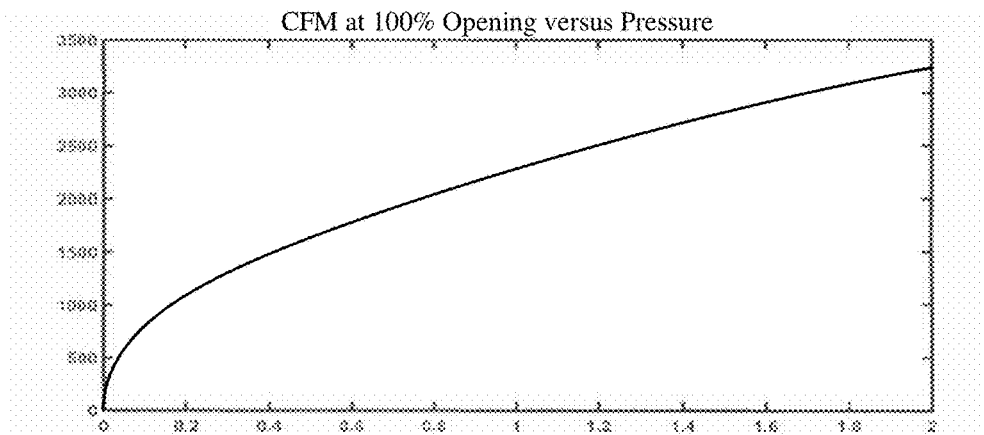
FIG. 31 shows the sparse data points of FIG. 29 together with a mathematical surface passing at least approximately through the respective data points.

By way of example FIG. 31 shows a maximum output of a valve for different pressures. The curve in FIG. 31 can be used to normalize the inverse output-input mapping, which only can have the input range in both axes.

Figure 32:
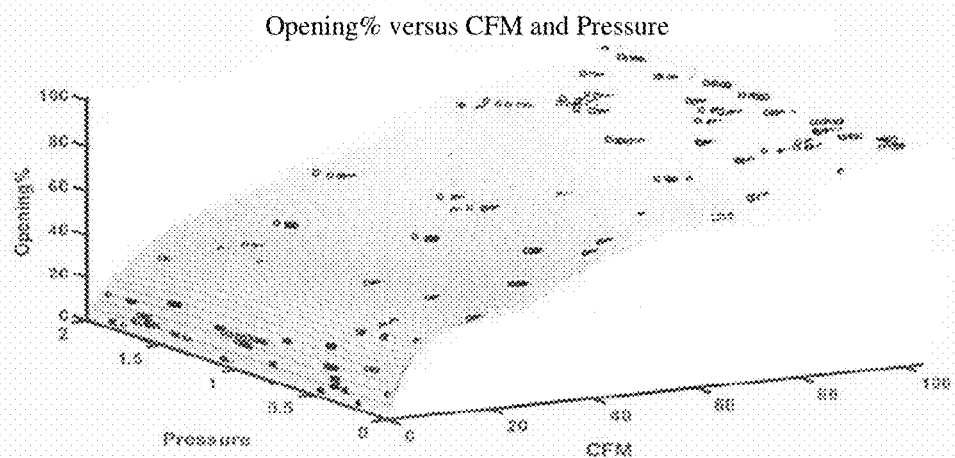
FIG. 32 shows, for an exemplary valve, the maximum CFM output at 100% opening versus pressure for an exemplary valve.

Again by way of example, FIG. 32 illustrates a computed inverse of the opening % versus CFM and Pressure P relationship for CFM data points measured from a prototype valve on a test stand yielding the data point distribution of FIGS. 30A and 30B.

Figure 33:
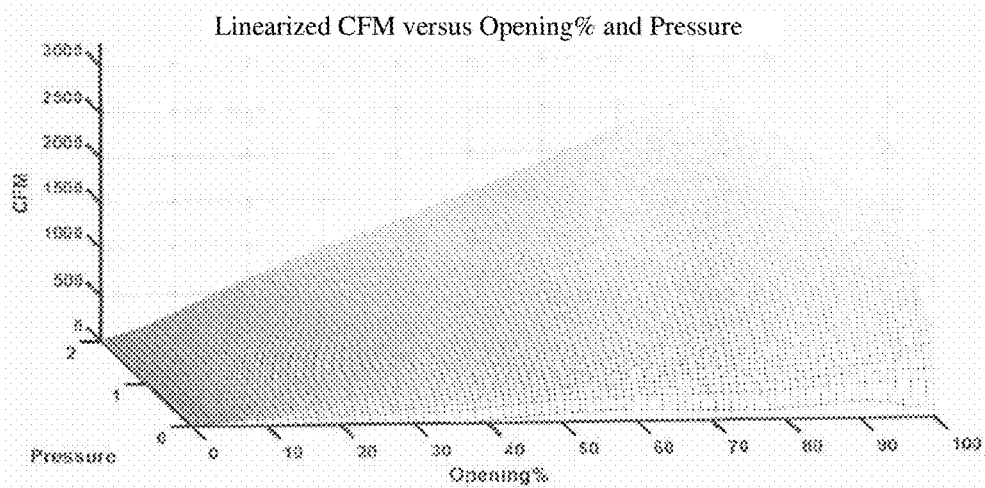
FIG. 33 shows an inverse nonlinear surface for the mathematical surface in FIG. 30B.

FIG. 33 illustrates the linearized CFM versus opening % and pressure P, corresponding to the linearization of the remote valve of FIGS. 30A, 30B and 3 Of this example.

Figure 34:
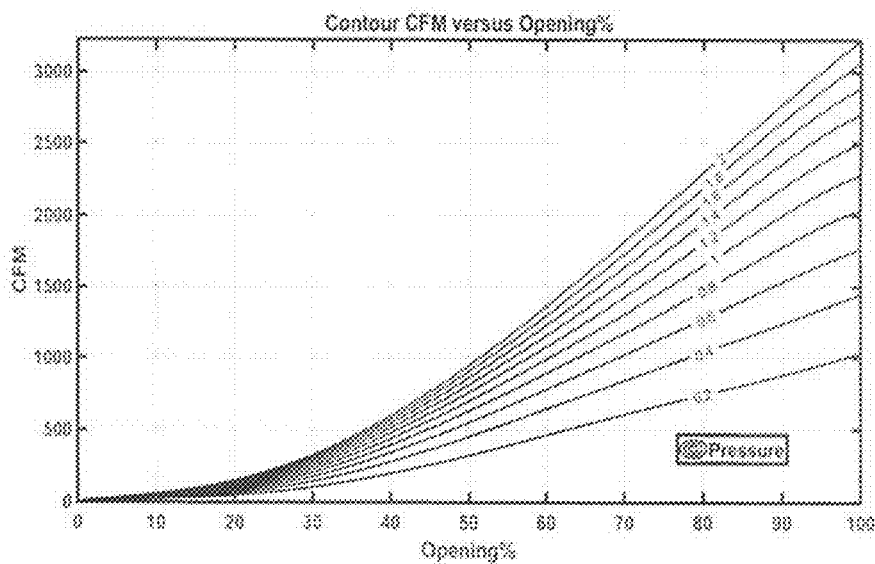
FIG. 34 shows a linearized surface in terms of opening percent.

Providing somewhat different information, FIG. 34 shows a contour of the CFM versus Opening % for the "normal" case. For the maximum pressure, maximum CFM is near 3000 and for 50% of maximum opening, the CFM is less than 1000.

Figure 35:
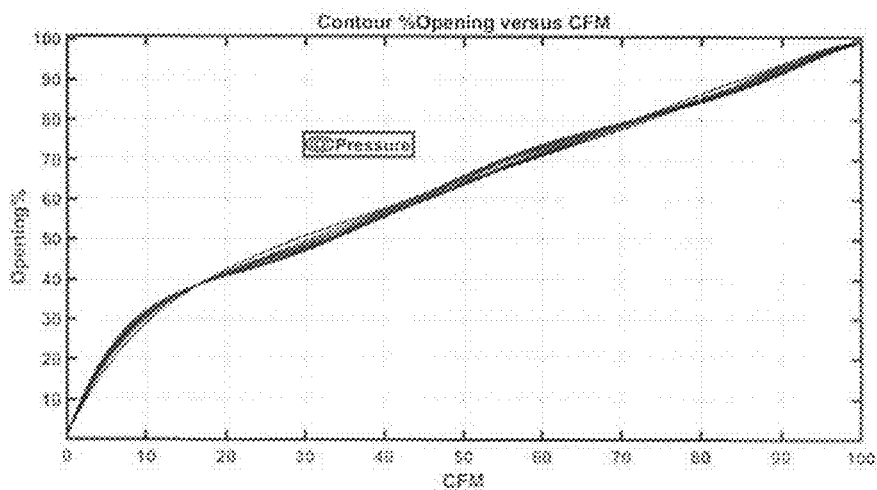
FIG. 35 shows a contour of CFM versus opening percent for a "normal" case.

FIG. 35 shows Contour Opening % versus CFM, providing a contour of Opening % versus CFM for the inverse mapping. All of the pressure curves are in a cluster. The near-overlapping values of the various curves in FIG. 35 are for different values of pressure going from 0.2 inches to 2 inches, in 0.2 inch increments.

Figure 36:
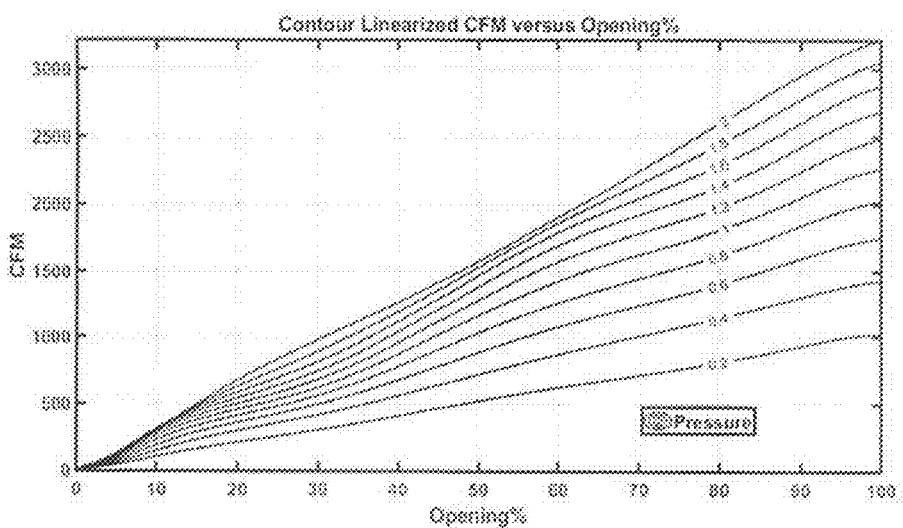
FIG. 36 shows a contour of "opening percent" versus CFM for an inverse mapping.

FIG. 36 shows the contour of the CFM versus Opening % for the linearized case. For the maximum pressure, maximum CFM is near 3000 and for 50% opening, the CFM is near 1500.

Figure 37:
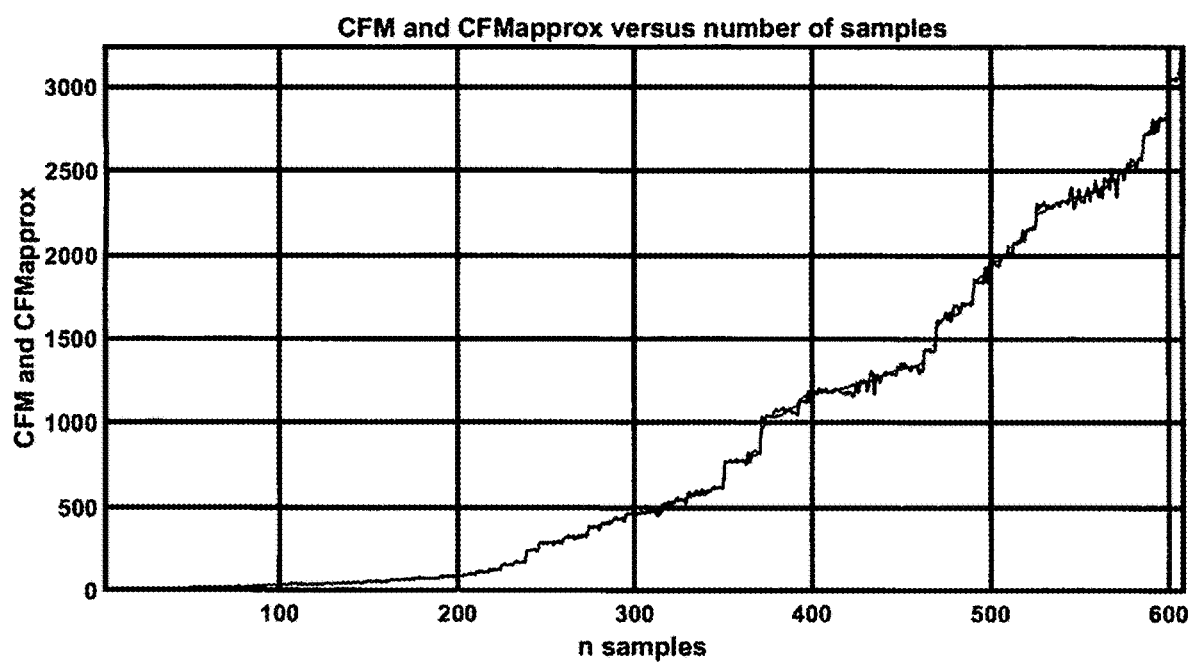
FIG. 37 shows a contour of CFM versus opening percent for a linearized case.

FIG. 37 shows the raw CFM and approximated CFM using a 3-dimensional polynomial equation. In FIG. 37, the approximated CFM values provide a relatively good fit with a general standard deviation on the order of 21.58 CFM. This is due to the least squares method being used. As a consequence, the polynomial behaves like a low-pass filter, which appears in the figure when the raw data shows high frequency noise.

With configurations of the type of assembly 3002, the "inverse" function methodology provides improved symmetry for most actuator positions. In addition, relatively high uniformity of response is achieved across a relatively wide range of operating conditions. As a result, the improvements in linearity provide substantially higher precision-control positioning and significantly better performance using linear controllers The technique of the disclosure computes the static linearization of a 3-dimensional surface in terms of damper opening percentage. Pressure P may be used to produce a slice of the 3-dimensional surface with linear mapping between the output, CFM, and an artificial input in the 0%400% range which is not fully representative of the actual opening percentage. A controller, in an alternate form, can provide two inputs, one for damper opening percentage and the other with an artificial input that could be used for control related applications.

Air valves usually are classified as based on flow characteristics in "slow opening" like in HVAC systems, or "quick opening" like the air valves that deliver more than 50% of flow before the 50% of the opening is reached. Using the above technique, linear responses can be obtained for prior art "difficult-to-linearize" components. Use of computational mathematical surfaces allows the application of relatively sparse data to provide highly accurate and functional configurations, and custom configurations for example providing any other static nonlinear response, such as "quick opening", if desired.

Remote Calibration of Fluid Flow Devices ±

It is important to determine operational characteristics of fluid flow devices used, or to be used, as commercial products ("product fluid flow devices") over a range of parameters associated with the devices, where the product fluid flow devices each include one or more (varying sized) adjustable apertures of aggregate area $A_o$ through which fluid flows in response to pressure differentials $\Delta P$ applied across the respective apertures. The fluid flow rate through the product fluid flow devices is functionally related to $A_o$ and $\Delta P$.

In practice, multiples of such product fluid flow devices are often installed in an overall structure and require calibration. For example, in an HVAC system of a building, or a flowable liquid fluid flow device structure, and particularly structures utilizing multiple such devices, it is often desired or required to "calibrate" the respective product fluid flow devices to a "standard" calibration fluid flow device of the same or similar geometry as the product fluid flow devices, where the standard calibration fluid flow device is characterized by a set of "standard" operational performance characteristics.

Figure 38:
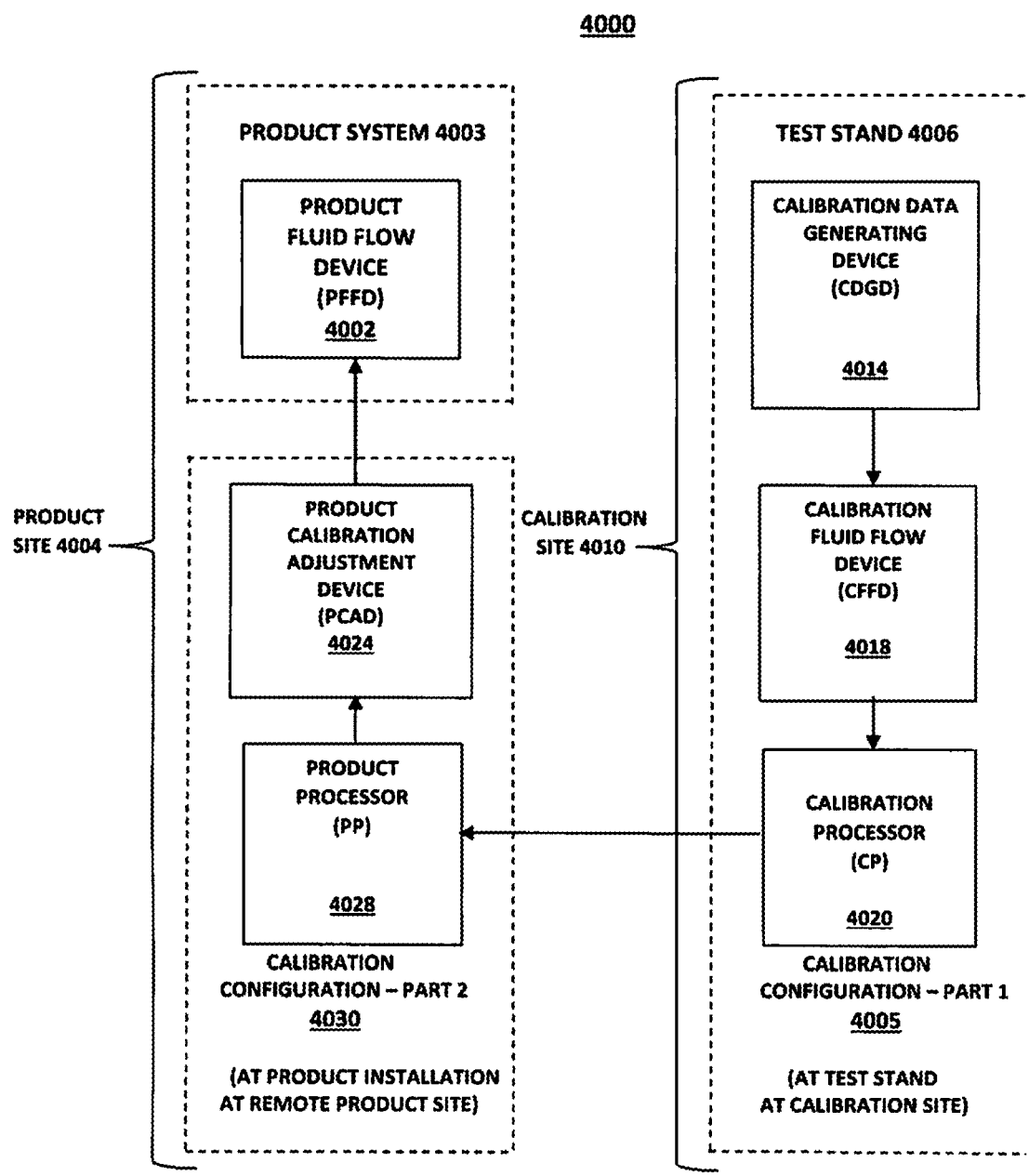
FIGS. 38-41 respectively show an exemplary general remote calibration configuration/method and three specific exemplary remote calibration configurations/methods.

A general form of a calibration configuration is illustrated in FIG. 38. With that configuration, calibration is effected by a Calibration Configuration 4000 for a Product Fluid Flow Device (PFFD) 4002 of a Product System 4003 installed, or to be installed, and calibrated at a Product Site 4004 which is remote with respect to at least a portion of Calibration Configuration 4000, for example, by a 2-part "calibration" configuration including: for Part 1 4005 at a Test Stand 4006 at a Calibration Site 4010 remote with respect to the Product Site 4004, a Calibration Data Generating Device (CDGD) 4014, a Calibration Fluid Flow Device (CFFD) 4018 and a Calibration Processor (CP) 4020, for example, are all disposed at test stand 4006. In that configuration, the Calibration Fluid Flow Device (CFFD) 4018 is characterized by the same or similar (for example, within ±5%) geometry and operational performance as Product Fluid Flow Device-to-be-calibrated (PFFD) 4002, and for Part 2 4030 at a Product Site 4004 remote with respect to the Calibration Site 4010, a Product Calibration Adjustment Device (PCAD) 4024, and a Product Processor (PP) 4028 in communication with the upstream Calibration Processor (CP) 4020 and the downstream Product Calibration Adjustment Device (PCAD) 4024, are disposed at or associated with the Product Fluid Flow Device-to-be-calibrated (PFFD) 4002.

Typically, after calibration by Calibration Configuration 4000, the Product Fluid Flow Device (PFFD) 4002 is installed as a ready-for-operation component of a Product System 4003 at a desired Product Site 4004, or other locus, remote from the Calibration Fluid Flow Device (CFFD) 4018 located, for example, at the test stand 4006. FIG. 38 shows an exemplary 2-part calibration configuration; other similarly functioning multiple-part, or unitary-part calibration configurations encompassing the same functionality may be used as well, for example, where at least one portion of the calibration operation is performed at a calibration site and another portion of the calibration process is performed at a product site, or other site, remote with respect to the calibration site.

Generally, a calibration process of this disclosure, which is at least in part remotely calibrates a Product Fluid Flow Device-to-be-calibrated (PFFD) 4002 to a Calibration Fluid Flow Device (CFFD) 4018, can be initiated by the Calibration Processor (CP) 4020 at the test stand 4006, and completed for the Product Fluid Flow Device (PFFD) 4002 while Product Fluid Flow Device (PFFD) 4002 is installed in a Product System 4003 remote from the test stand 4006.

Figure 39:
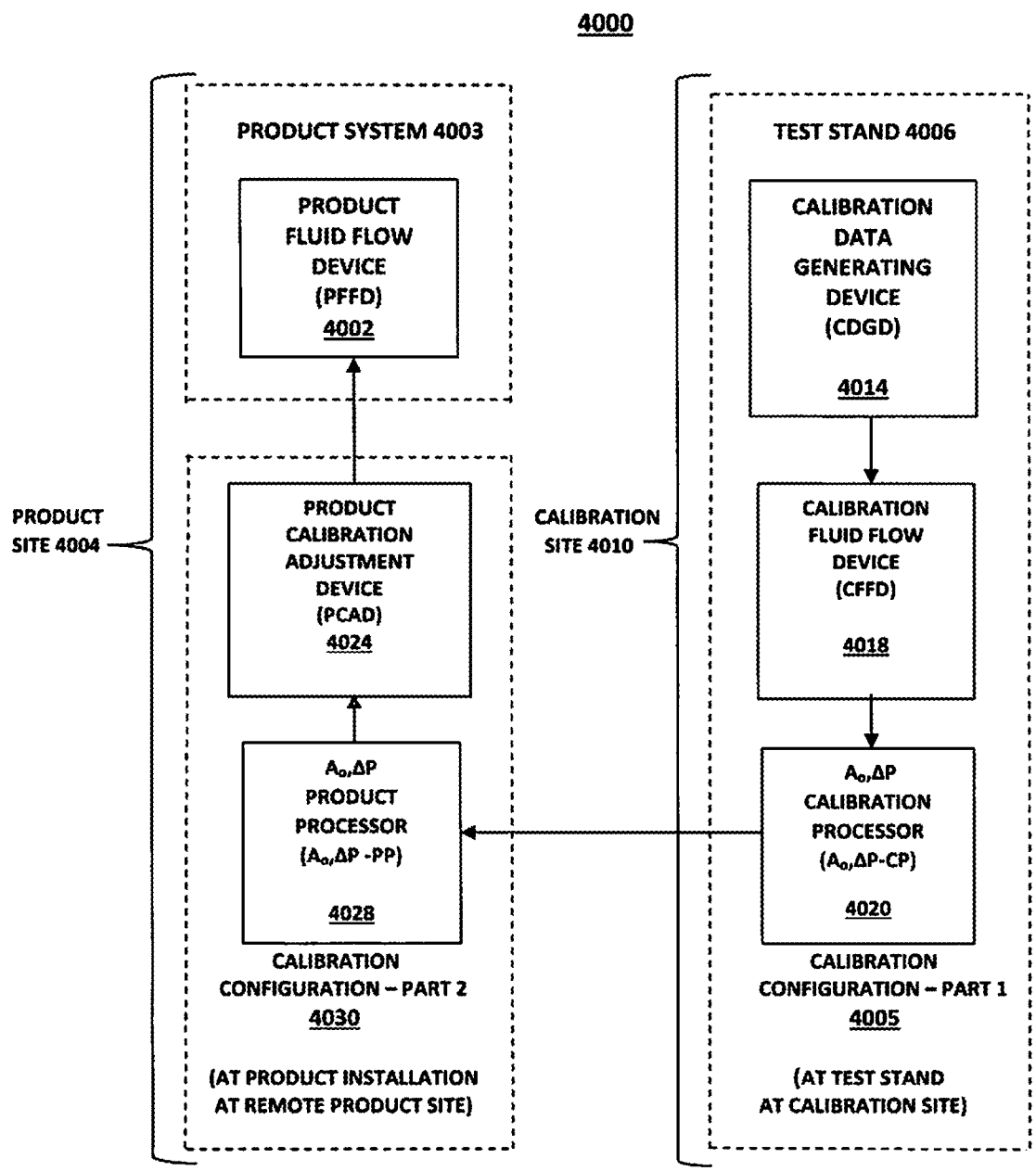
Figure 40:
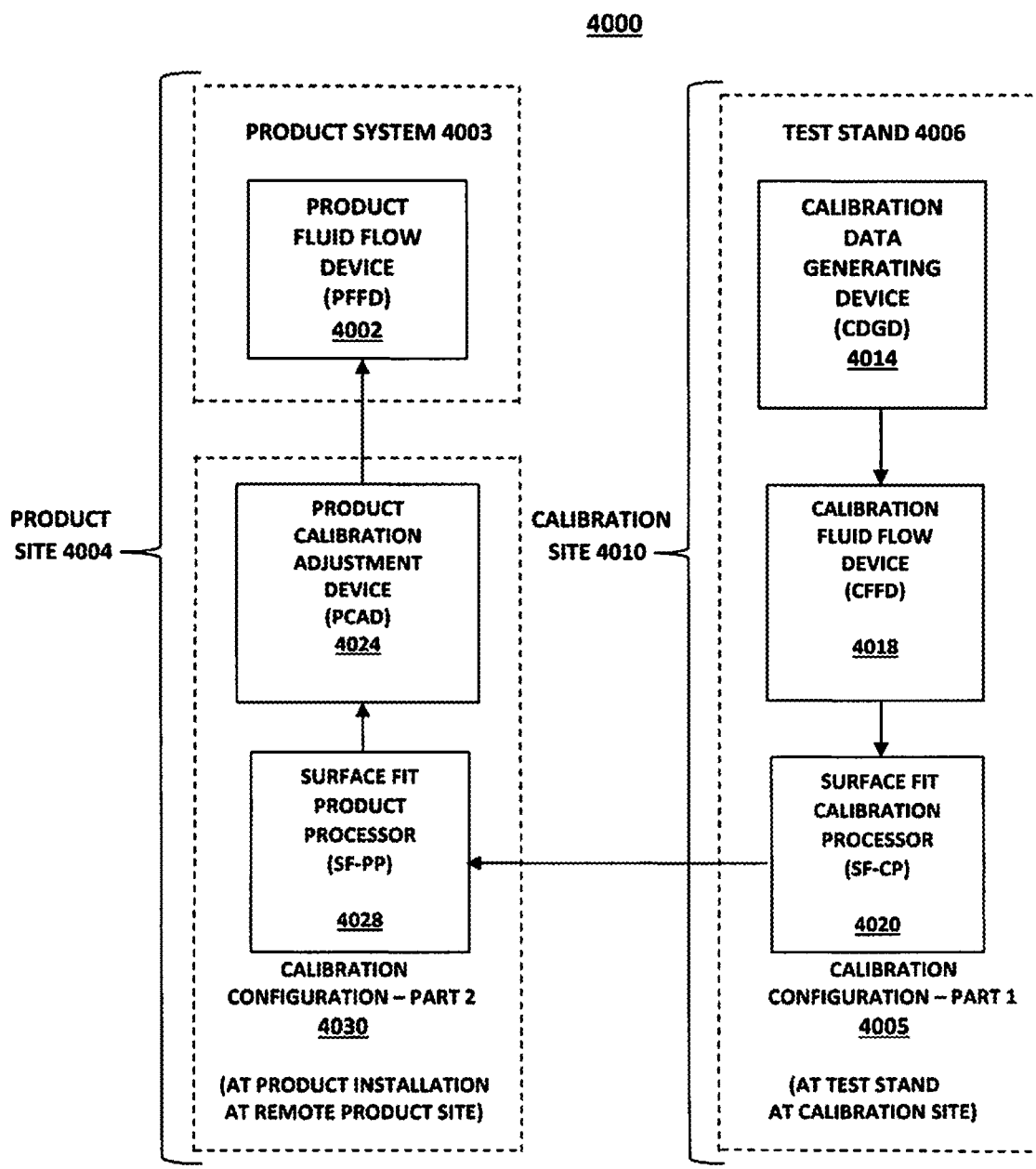
Figure 41:
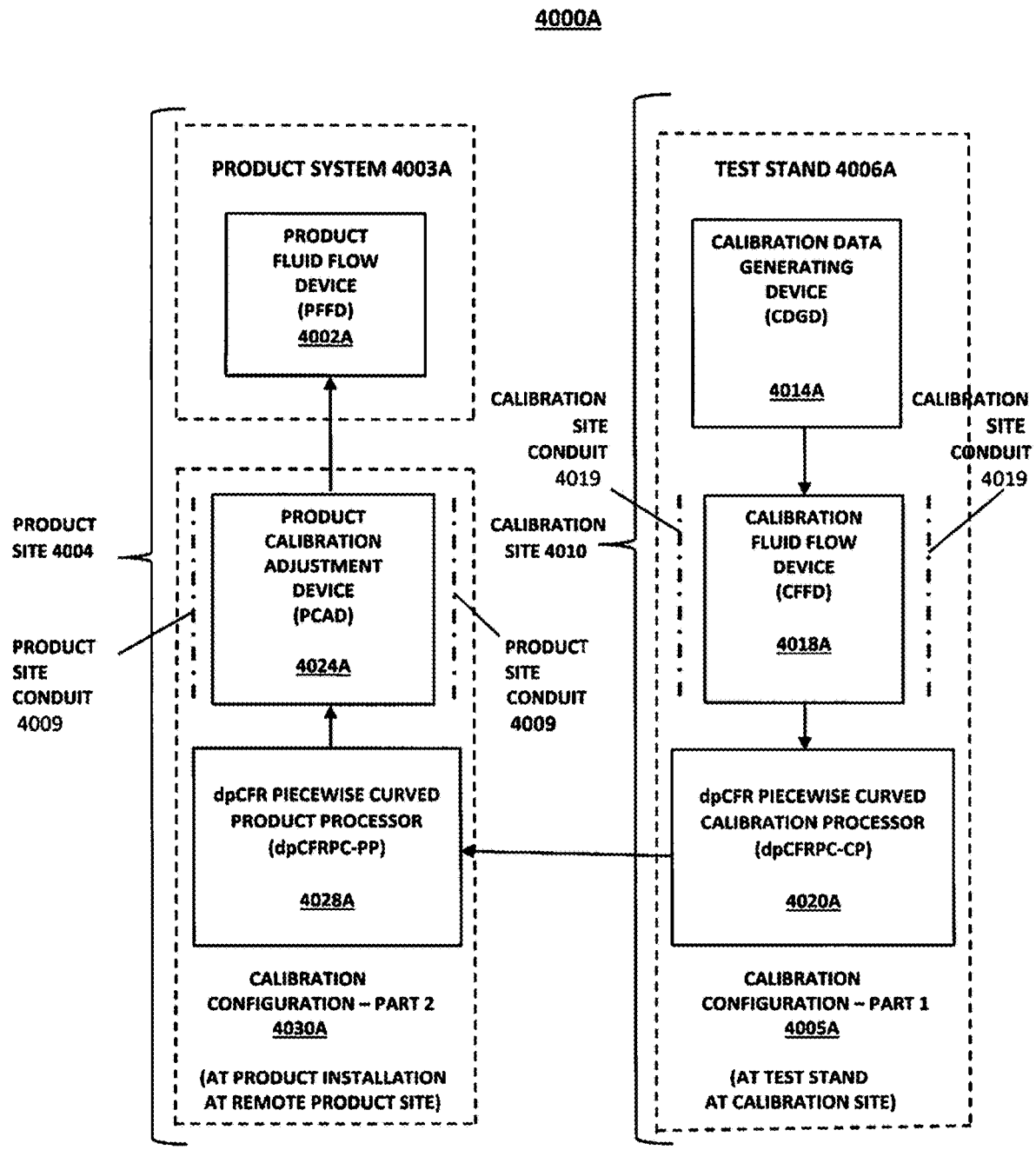

As noted above, FIG. 38 illustrates a general form for an exemplary calibration structure/configuration which performs/employs a remote calibration method/configuration. FIGS. 39, 40, and 41 respectively illustrate a specific calibration operation for three exemplary calibration configurations/methods which perform distinct remote calibration methods/configurations.

Figure 9A:
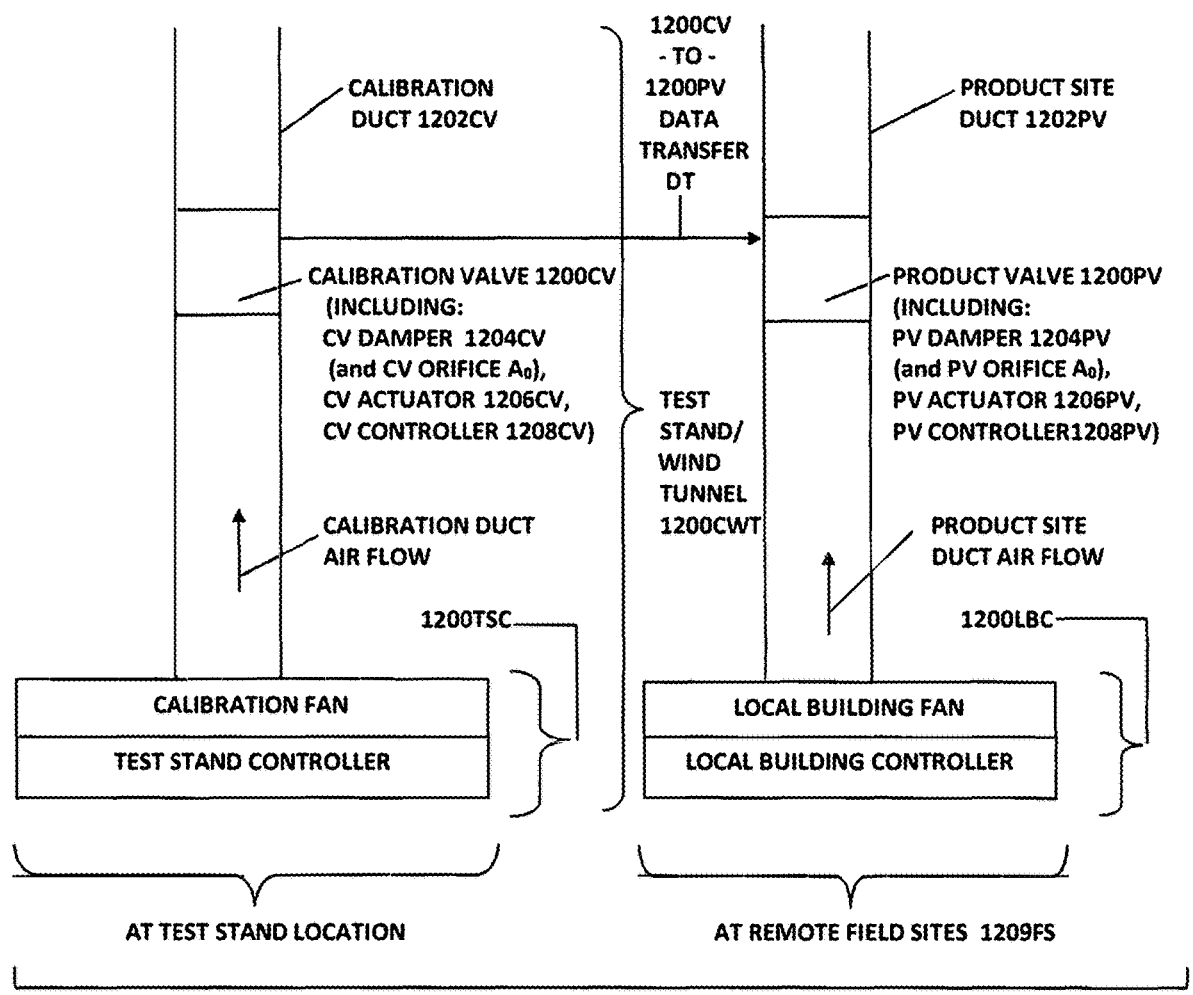
FIG. 9A schematically shows a remote calibration configuration for various embodiments of fluid flow valves of the present invention.

Two such calibration configurations/methods are:

(1) an $A_o$, $\Delta P$ Calibration Configuration and Method (shown in FIGS. 38 and 39) based on an "$A_o,\Delta P$ determination" by the detailed configuration of FIGS. 9A and 39 in which the principal system blocks which control the $A_o,\Delta P$ determination are the $A_o,\Delta P$ Calibration Processor ($A_o$,AP-CP) and the $A_o,\Delta P$ Product Processor ($A_o$,AP-PP). In order to effect that $A_o,\Delta P$ determination, a Calibration Data Generating Device (CDGD) applies a succession of different pressure differentials $\Delta P$ across the respective apertures of the Calibration Fluid Flow Device (CFFD), while varying the cross-section areas of the aggregate apertures $A_o$, and measures consequent values representative of the fluid flow rate through the apertures for the respective $A_o,\Delta P$ values applied to the Calibration Fluid Flow Device. An $A_o,\Delta P$ Calibration Processor ($A_o$,AP-CP) at the test stand, determines fluid flow rates through the apertures in response to the applied $A_o$, and $\Delta P$ values, as measured by the Calibration Fluid Flow Device (CFFD), alone or in concert with the $A_o,\Delta P$ Calibration Processor ($A_o,\Delta P$-CP) and a Calibration Flow Rate (CFR) function is generated in $A_o,\Delta P$ space. The CFR Function is transferred to the $A_o,\Delta P$ Product Processor ($A_o$,AP-PP) at the Product Site. The CFR Function is processed at the $A_o,\Delta P$ Product Processor ($A_o$,AP-PP), and, in concert with the Product Calibration Adjustment Device (PCAD), generates, and applies to the Product Fluid Flow Device-to-be-calibrated (PFFD), signals which adjust parameters of the Product Fluid Flow Device-to-be-calibrated (PFFD) so its operational performance matches (or approximates within ±5%) that of the Calibration Fluid Flow Device (CFFD), as described and claimed in U.S. patent application Ser. No. 17/176,537, now U.S. Pat. No. 11,231,196 and (2) a Surface-Fit Calibration Configuration and Method (described in detail above in connection with FIGS. 20-37 herein and shown in less detail in FIG. 38 and in detail in FIG. 40, based on a "Surface Fit determination" by the detailed configuration of FIG. 40. In FIG. 40, the principal system blocks which control the Surface Fit determination are the Surface Fit Calibration Processor (SF-CP) and the Surface Fit Product Processor (SF-PP). In order to effect that Surface Fit determination, a calibration data generating device (CDGD) applies a succession of different pressure differentials $\Delta P$ across the respective apertures of the Calibration Fluid Flow Device (CFI-4D), while varying the cross-section area of the aggregate apertures $A_o$. Calibration Data Generating device (CDGD) alone, or in concert with the Surface Fit Calibration Processor (SF-CP), or the Surface Fit Calibration Processor (SF-CP) alone, measures, consequent "Surface Fit" values which are representative of the fluid flow rate through the aggregate apertures $A_o$. The Surface Fit Calibration Processor (SF-CP), then determines fluid flow rates through the aggregate apertures $A_o$ in response to the $A_O$ and $\Delta P$ values, as so measured. In a form, in response to the measured values, the Surface-Fit Calibration Processor (SF-CP) determines a Calibration Flow Rate (CFR) Function characterizing the fluid flow rate through the apertures for the respective applied $A_o$,P values, and then performs surface fit processing whereby a formulaic mathematical surface representation is generated for the Calibration Flow Rate (CFR) Function, providing a near-match, or "surface fit", to the Calibration Flow Rate (CFR) Function. The formulaic mathematical surface representation is then transferred to the Surface Fit Product Processor (SF-PP) at the product site 4004, providing the near-match surface representation characterized by a form, for example, a polynomial representation, which allows a highly efficient computer-resource allocation and processing compared to the computer processing required for the $A_o$, $\Delta P$ Calibration Configuration and Method described above. After transfer of data representative of the determined formulaic mathematical surface to the Surface-Fit Product Processor (SF-PP) associated with a Product Fluid Flow Device-to-be-calibrated (PFFD), extracted data from the determined formulaic mathematical surface is applied to the Product Calibration Adjustment Device (PCAD) which in turn adjusts characteristics of the Product Fluid Flow Device-to-be-calibrated (PFFD), thereby calibrating the Product Fluid Flow Device-to-be-calibrated (PFFD) so that its operational performance matches (or approximates within ±5%) that of the Calibration Fluid Flow Device (CFFD), as described and claimed in U.S. patent application Ser. No. 17/522,481, now U.S. Pat. No. 11,429,121.

Three or More Vertex Tiling [or "Discrete Point Calibration Flow Rate Piecewise Curved" (dpCFRPP)] Configuration and Method A third such configuration/method is a Three or More Vertex Tiling [or "discrete point Calibration Flow Rate Piecewise Curved"] Calibration Configuration 4000A and related Method. The term "piecewise curved" is a 3-D analog to "2-D piecewise linear". The configuration and method are described generally immediately below in connection with FIG. 38 and described in detail in conjunction with FIGS. 41 and 42). The Three or More Vertex Tiling Configuration and Method is based on a "discrete point calibration flow rate (dpCFR)" determination and a "Piecewise Curved" determination" described below in detail together with the configuration of FIGS. 41 and 42. In FIG. 41, the principal blocks which control the Discrete Point Calibration Flow Rate (dpCFR) determinations and the Piecewise Curved determinations are the Discrete Point Calibration Flow Rate Piecewise Curved Calibration Processor (dpCFRPC-CP) 4020A and the Discrete Point Calibration Flow Rate Piecewise Curved Product Processor (dpCFRPC-PP) 4028A.

In a form, as set forth in FIG. 41, the overall Three or More Vertex Tiling [or "discrete point Calibration Flow Rate Piecewise-Curved"] Calibration Configuration 4000A includes two parts: Calibration Configuration—Part 1 4005A at a test stand 4006A located at a calibration site 4010, and a Calibration Configuration (Part 2) 4030A located at a remote product site 4004A:

(1) Calibration Configuration—Part 1 4005A at a test stand 4006A located at a calibration site 4010; Calibration Configuration (Part 1) 4005A includes a Calibration Data Generating Device (CDGD) 4014A, a Calibration Fluid Flow Device (CFFD) 4018A and a Discrete Point Calibration Flow Rate Piecewise Curved Calibration Processor (dpCFRPC-CP) 4020A, and (2) Calibration Configuration (Part 2) 4030A at a product site 4004, includes a Discrete Point Piecewise Curved Product Processor (dpCFRCP-PP) 4028A and a Product Calibration Adjustment Device (PCAD) 4024; Discrete Point Calibration Flow Rate Piecewise Curved Calibration Processor (dpCFRPC-CP) 4020A is communicatively coupled to an input of Discrete Point Calibration Flow Rate Piecewise Curved Product Processor (dpCFRPC-PP) 4028A and Discrete Point Calibration Flow Rate Piecewise Curved Product Processor (dpCFRPC-PP) 4028A is communicatively coupled to an input of Product Calibration Adjustment Device (PCAD 4024A). Product Fluid Flow Device-to-be-calibrated (PFFD) 4002A is coupled to an output of Product Calibration Adjustment Device (PCAD) 4024A of a Product System (PS) 4003A.

Calibration Fluid Flow Device (CFFD) 4018A and Product Fluid Flow Device-to-be-calibrated (PFFD) 4002A are of the type described above in conjunction with the $A_o$, $\Delta P$ Calibration Configuration and Method and the Surface Fit Calibration Configuration and Method.

The calibration fluid flow device (CFFD) 4018A is shown in FIG. 41 in a calibration site conduit 4019 (denoted by dot-dash lines in FIG. 41) at the calibration site 4010, is characterized by calibration operational parameters which can be the same as the product operational parameters of the product fluid flow device (PFFD) 4002A in a product site conduit 4007 (also denoted by dot-dash lines in FIG. 41) at the product site 4004.

The calibration fluid flow device (CFFD) 4018A is also characterized by the same geometry ±20% as the product fluid flow device (PFFD) 4002A, including the calibration fluid flow path corresponding to the product fluid flow path of the product fluid flow device (PFFD) 4002A, being disposed within calibration site conduit 4019 at the calibration site 4010 and characterized by the same inward-facing geometry ±20% as the product site conduit.

It is appreciated that, as was noted in connection with test stand 2006, test stand 4006 and test stand 4006A, as well as any other CFFD device is not specifically limited to test stands. For example, a computational fluid dynamics (CFD) simulation device can be employed instead of, or in addition to, a test stand. Other suitable devices are contemplated as well, such as a Multiphysics simulation device and so forth.

In operation, in order to effect discrete point calibration flow rate (dpCFR) determinations and the piecewise curved determinations, Calibration Data Generating Device (CDGD) 4014A applies a succession of pressure differentials $\Delta P$ across the respective aggregate apertures $A_o$ of the Calibration Fluid Flow Device (CFFD) 4018A, while varying the cross-section area of the aggregate apertures $A_o$. Calibration Data Generating Device (CDGD) 4014A alone, or in concert with the Discrete Point Calibration Flow Rate Piecewise Curved Calibration Processor (dpCFRPC-CP) measures consequent Calibration Flow Rate (CFR) values which are representative of the fluid flow rate through the aggregate apertures $A_o$, or only a subset of those values (at discrete points within the operating range of Calibration Configuration 4000A). Only the subset of those values is needed for the discrete point Calibration low Rate (dpCFR) processing.

Figure 42:
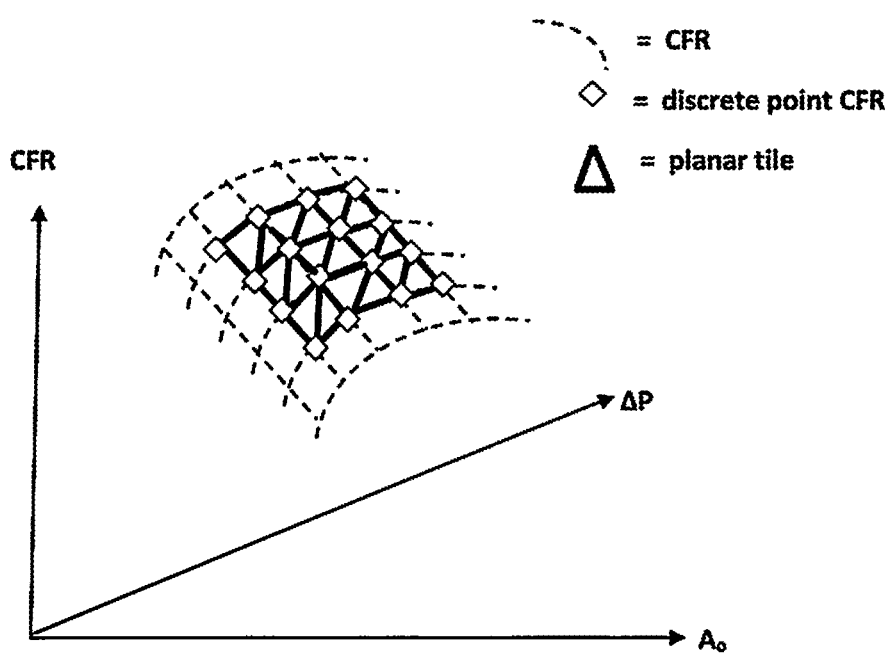
FIG. 42 shows exemplary zero curvature tiled piecewise mathematical surface; segments adjacent to a portion of an exemplary Calibration Flow Rate (CFR) function.
Figure 43:
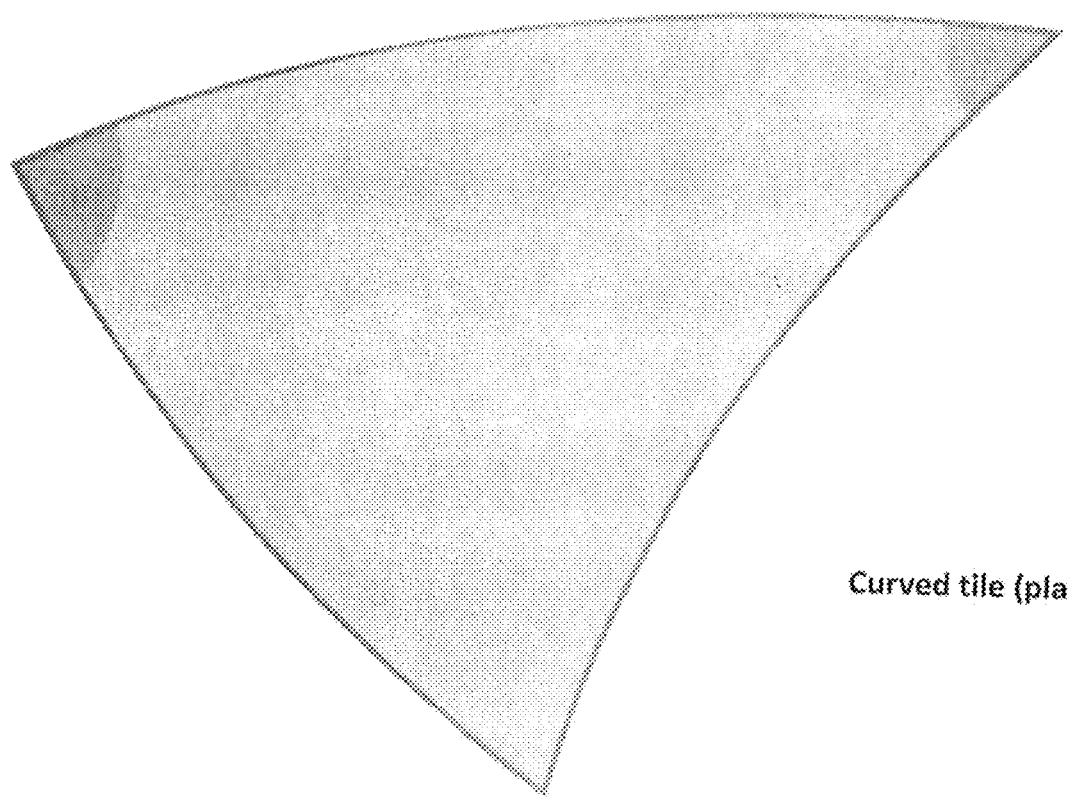
FIG. 43 shows an exemplary tiled piecewise-curved mathematical surface segment with a non-zero curvature.

Thus, Calibration Data Generating Device (CDGD) 4014A applies a succession of different pressures $\Delta P$ across the respective apertures of the Calibration Fluid Flow Device (CFFD) 4018A, while varying the cross-section area of the aggregate apertures $A_o$, and measures (alone or in concert with Discrete Point Calibration Flow Rate Piecewise Curved Calibration Processor (dpCFRPC-CP) 4020A), at a sparse set of points in a region of interest in $A_o, \Delta P$ space (where the term "sparse" means fewer than all points in a region of interest). The consequent measured values at the set of sparse points $A_o, \Delta P$ space are representative of the fluid flow rate through the apertures for the respective $A_o, \Delta P$ values applied to the Calibration Fluid Flow Device (CFFD) 4018A, at the test stand 4006A. From the measured flow rate values at the sparse points in $A_o$, $\Delta P$ space, a determination is made by a Discrete Point Calibration Flow Rate Piecewise Curved Calibration Processor (dpCFRPC-CP) 4020A, of a formulaic, multielement, constructed of contiguous tiles, 3-D polygon-like mathematical surface segment having vertices at multiple ones of the sparse points. A portion of an exemplary piecewise curved mathematical surface segment is illustrated in FIG. 42 adjacent to a portion of an exemplary discrete point Calibration Flow Rate (dpCFR) function (represented by white "diamond" icons in FIG. 42). Data representative of the formulaic mathematical surface segment is then transferred to a Discrete Point Calibration Flow Rate Piecewise Curved Product Processor (dpCFRPC-PP). Then, the Product Fluid Flow Device (PFFD) 4002A is adjusted to calibration by the Product Calibration Adjustment Device (PCAD) 4024A acting in concert with the Discrete Point Calibration Flow Rate Piecewise Curved Product Processor (dpCFRPC-PP), so that operational performance the Product Fluid Flow Device-to-be-calibrated (PFFD) 4002A matches (or approximates within ±20%) that of the Calibration Fluid Flow Device (CFFD) 4018A, as described and claimed herein. The "tiles" of the piecewise curved mathematical surface segment may comprise individual tiles which are planar (zero curvature), curved or a combination of planar and curved, with at least a portion of the respective tiles having all, or at least three of their vertices disposed in the locus of the discrete point Calibration Flow Rate (dpCFR) function of the Calibration Fluid Flow Device (CFFD)0.4018A Results of the functioning of the Discrete Point Piecewise Curved Calibration Processor (dpCFRPC-CP) 4020A illustrating the Method is shown in FIG. 42. That figure shows the locus in the $A_o$, $\Delta P$ space of an exemplary full Calibration Flow Rate (CFR) Function (indicated by dashed lines in FIG. 42) and a determined discrete point Calibration Flow Rate (dpCFR) Function comprising a sparse subset of the full set of CFR flow rate data points (shown as white "diamond" icons in FIG. 42), and further shows an exemplary set of nested n-gons in the form of curved triangular polygon-like mathematical surface "tiles", with each tile being characterized by a degree of curvature C≥0, where "zero curvatures" or "C" is "planar", and each tile being an n-gon, having multiple vertices,(n), in the illustrated case, three vertices, that is, where n=3. Each vertex is disposed at (or near) one of the discrete points of the discrete point subset of points in the locus of the discrete point Calibration Flow Rate (dpCFR) Function. Each of the nested triangular tiles spans an underlying or overlying section of the full CFR Function. The respective tiles are identical and planar (zero curvature) in the illustrated exemplary segment of FIG. 42. In other embodiments, the tiles may have a curved surface, for example, as shown in FIG. 43, or some tiles may be curved and some may be planar. The tiles in FIG. 42 are identical in shape, although in other embodiments, the tiles can have different shapes, while maintaining the nesting characteristic. A preferred form uses triangle (3 vertices) or hexagonal (6 vertices) polygonal shaped tiles.

The mathematical surface formed by the nested tile arrangement is an approximation for the actual full CFR function, but provides an easily, and economically, processable model which enables great savings in computational resources, and resultant costs, particularly for systems having large numbers of fluid flow devices that require calibration in order to effect a low cost operation.

After the nested tile mathematical surface is determined by the Discrete Point CFR Piecewise Curved Calibration Processor (dpCFRPC-CP) 4020A, data representative of the mathematical surface is transferred to the Discrete Point CFR Piecewise Curved Calibration Product Processor (dpCFRPC-PP) 4028A where that data is processed, preferably in concert with the Product Calibration Adjustment Device (PCAD) 4024A, to generate signals for application to the Product Fluid Flow Device-to-be-calibrated 4002A which in turn adjust characteristics of the Product Fluid Flow Device-to-be-calibrated (PFFD) 4002A, thereby calibrating the Product Fluid Flow Device-to-be-calibrated (PFFD) 4002A so that its operational performance matches (or approximates within ±5%) that of the Calibration Fluid Flow Device (CFFD), The processing results in a determination of a Calibration Flow Rate (CFR) Function representative of the fluid flow through the aggregate apertures $A_o$, characterized by a plurality of nested polygon-like curved (or planar with C=0) or both) sections having three or more vertices overlying and/or underlying in whole or in part, an exemplary discrete point Calibration Flow Rate (dpCFR) surface segment.

As shown in FIGS. 39, 40, and 41, all three illustrated calibration configurations and methods have general similarities, except for the respective functions of the $A_o, \Delta P$ Calibration Processor/$A_o, \Delta P$ Product Processor pair, the Surface Fit Calibration Processor/the Surface Fit Product Processor pair, and the Piecewise Curved (zero with C=0 or non-zero) Calibration Processor/Piecewise Curved (zero with C=0 or non-zero) Product Processor pair. Those Processor pairs perform their own distinct processing functions, as described above. All three illustrated exemplary configurations incorporate a Calibration System at a test stand for example, with a Product Fluid Flow Device-to-be-calibrated (PFFD) at a location remote from the Calibration Fluid Flow Device (CFFD) at the test stand.

Utilization and Applications

The remote calibration configurations and methods of this disclosure can be used for many applications, particularly including fluid flow devices where the fluid is a gas, liquid, or a particulate material where the nature of the material enables liquid-like behavior. Particular utilities include: air flow devices in HVAC systems, gas flow devices for medical gases (for example anesthesia, oxygen, carbon dioxide, nitrogen, nitrous oxide, argon, and helium), gas flow devices for semiconductor processing, gas flow devices for paint systems, and gas flow devices for supporting combustion in industrial systems.

As is understood from the above disclosure, modeling fluid flow through various portions (e.g., conduits) of devices, such as the PFFD, can have significant benefits. In the case of three dimensions, in which two variables are used, such can yield a surface equation of the fluid flow. One of the variables can be, for example, an actuator or other device setting, which can indicate size or other characteristics of $A_O$. It is noted that this device setting variable can be controlled by instructing the actuator to change state and can additionally be measured by polling or requesting state information. Another variable can be a pressure such as a pressure differential, $\Delta P$, many examples of which are provided herein. The pressure variable can be a measured variable. Other variables can exist, such as a temperature variable and the number of variables employed affects the dimensions of the model. Thus, while the fluid flow models or profiles ares presented herein in the context of three dimensions as surfaces (e.g., surface equation), when in the context of different dimensions, or more generally such can be referred to as a fluid flow graph, which is intended to be inclusive of the fluid flow surface equation.

An initial fluid flow graph for any suitable PFFD can be generated by the CFFD. Again, the CFFD can comprise a computational fluid dynamics (CFD) simulation device, a test stand or another suitable device. This process can be intensive in terms of time or computational resources, but the structure and range of operation of the PFFD can be known at this time. However, what is not known at this time is how the PFFD will ultimately be installed at the product site. Thus, when a given fluid flow graph is generated for a particular PFFD, such can be based on the assumption that there will be, e.g., 20 feet of unobstructed flow upstream of the PFFD. If the PFFD is installed in such a way that there is not the specified 20 feet of unobstructed flow upstream, then the fluid flow graph will likely not accurately reflect the actual performance of the PFFD, at least not within a desired accuracy. Downstream configurations might also affect the accuracy, but, typically, upstream configuration is much more important.

Thus, customers are informed in advance that, for the fluid flow graph to be sufficiently accurate, the PFFD is to be installed within certain constraints, the example here being that there is 20 feet of unobstructed flow leading into the PFFD. However, in many cases, the customer is not willing or not able to meet these constraints. For example, suppose the customer installs the PFFD in which there is an unguided elbow three feet upstream of the PFFD. In that case, it is exceedingly likely that the fluid flow graph generated beforehand by the CFFD and loaded into the PFFD will be significantly inaccurate and unable to effectuate many of the advantages detailed herein.

One potential solution is to obtain arrangement data from the customer that indicates the actual installation arrangement of the PFFD, in this example, that there is an unguided elbow three feet upstream of the PFFD. Upon receipt of the arrangement data, it may be possible to simulate similar conditions at the CFFD to generate a new fluid flow graph for the PFFD that models that particular customer arrangement. Thereafter, this new fluid flow graph, or portions or elements thereof, can be provided as an update to the PFFD so that the PFFD can function consistent with the numerous advantages detailed herein and/or according to customer expectations.

However, while the above illustration gives one example of arrangement data (e.g., an unguided elbow three feet upstream), it is readily appreciated that there are quite literally an unbounded number of potential different arrangement. For instance, instead of being 3 feet upstream, the unguided elbow could instead be 3.6 feet upstream, 10 feet upstream, or any other distance. The elbow may instead be a guided elbow, or a different element altogether. There may be multiple different elbows or other elements that need to be accounted for. There may be upstream elements and downstream elements that need to be accounted for.

Hence, the way in which fluid flow graph is modeled can be significant. The interpolation scheme that is used to generate the fluid flow graph benefits immensely from being flexible. The more flexible the interpolation scheme, the more potential customer arrangements can be accounted for. With an inflexible approach, many potential customer arrangement will not yield viable updates without changing the programming (as opposed to the parameters) of the PFFD. Such is one focus of the noted tiling approach.

In some embodiments, the tiling approach can rely on different polynomials, each potentially have a different degree, and each potentially relating to different regions of the fluid flow. In some embodiments, the number of tiles or number of polynomials can be a configurable parameter. In some embodiments, the degree of the individual polynomials can be a configurable parameter.

In some embodiments, the different regions of the fluid flow can represent different regions as a function of Reynolds numbers. For example, a first region can relate to Reynolds numbers at are less than about 1000 or 2000. A second region can relate to Reynolds numbers that are greater than about 1000 or 2000. Additionally or alternatively, a third region can relate to a wide open flow (e.g., greater than about 80-90%) in which there is no dead space and/or the flow is obstructed so the Reynolds number may be any value or may not be controlling.

In some embodiments, the fluid flow graph can be modeled as a function of one or more variables, with one example being two variables to yield the surface equations. In some embodiments, the variables can be selected from a group comprising a device (e.g., actuator, damper, valve, and so on) setting; a device pressure, pressure drop, or pressure differential; a temperature, such as a fluid temperature or another temperature; or some other suitable variable.

In some embodiments, the fluid flow graph can be a joint polynomial in the one or more given variables. In some embodiments, the fluid flow graph can be realized as multiple joint polynomials representing respective or different ranges the one or more given variables. In some embodiments, the fluid flow graph can be realized as a tiling of the graph with numerous smaller regions, wherein the numerous smaller regions can respectively represent different ranges of the one or more given variables within respective joint polynomials. These different ranges can be exclusive or overlap.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. In particular, the indicated temperature and timing values as well as signaling protocols are to be taken as examples.

What is claimed is:

1. A calibration method for calibrating a product fluid flow device-to-be-calibrated (PFFD) to a calibration fluid flow device (CFFD) remote with respect to the product fluid flow device-to-be-calibrated (PFFD), wherein the product fluid flow device-to-be-calibrated (PFFD) is characterized by product operational parameters, and adapted for disposition within a product site conduit characterized by a product inward-facing geometry and defining a product fluid flow path extending from an upstream portion of the product site conduit to a downstream portion of the product site conduit, and wherein the product fluid flow device (PFFD) includes:
 a. a product aperture assembly including one or more adjustable product apertures traversing the fluid flow path and characterized by an adjustable aggregate aperture area $A_o$, and
 b. a product actuator adapted to adjust the adjustable aggregate aperture area $A_o$ in response to an applied actuator signal, wherein the product fluid flow device (PFFD) is adapted to pass a flowable fluid along the product flow path and through the adjustable aggregate aperture area $A_o$ in response to a product pressure differential $\Delta P_P$ applied across the adjustable aggregate aperture area $A_o$, wherein $\Delta P_P$ and $A_o$ are within respective pressure and area ranges of interest $\Delta P$ and A, comprising the steps of:

A. providing a product fluid flow device-to-be-calibrated (PFFD),

B. with a calibration fluid flow device (CFFD) at a calibration site remote with respect to the product fluid flow device (PFFD), and characterized by:
  i. calibration operational parameters,
  ii. the same geometry ±20% as the product fluid flow device (PFFD), including a calibration fluid flow path corresponding to the product fluid flow path of the product fluid flow device (PFFD),
  iii. being disposed within a calibration site conduit at the calibration site and characterized by the same inward-facing geometry ±20% as the product site conduit, effecting a flow of a flowable fluid along a calibration fluid flow path of the calibration fluid flow device (CFFD), by applying:
  iv. a succession of one or more pressure differentials $\Delta P_c$ across the adjustable aggregate aperture $A_o$ of the calibration fluid flow device (CFFD) and
  v. a succession of actuator signals to a calibration actuator to adjust the aggregate aperture $A_o$, thereby generating a set of discrete point calibration flow rate (dpCFR) values in a locus of a Calibration Flow Rate (CFR) Function representative of the flow rate of the flowable fluid for a range of sparse discrete $A_O, \Delta P_c$ points in an associated $A_o, \Delta P$ space, where sparse points are fewer than all points in the range of $A_o, \Delta P_c$ points in $A_o, \Delta P$ space, C. responsive to the discrete point calibration flow rate (dpCFR) values: by a calibration processor at a calibration site:
  i. generating tile data representative of a mathematical surface segment including a nested array of one or more tiles having three or more vertices wherein at least three of the three or more vertices of the one or more tiles are disposed in the locus of the CFR Function in $A_o, \Delta P$ space, and
  ii. transferring the tile data to a product site remote with respect to the calibration site, and D. receiving the transferred tile data at the product site and generating actuator signals and pressure differentials $\Delta P_c$ for application to the product fluid flow device (PFFD) thereby effecting control of the product operational parameters of the product fluid flow device (PFFD) to conform to the calibration operational parameters of the calibration fluid flow device (CFFD), thereby calibrating the product fluid flow device (PFFD) to the calibration fluid flow device (CFFD).

2. The calibration method according to claim 1 wherein fluid flow exiting from one or more of the product apertures of the adjustable product aperture assembly establish one or more vena contractae extending downstream from respective product apertures.

3. The calibration method according to claim 1 wherein fluid flow exiting from one or more of the calibration apertures of the adjustable calibration aperture assembly establish one or more vena contractae extending downstream from respective calibration apertures.

4. The calibration method according to claim 1 wherein the mathematical surface segment has the form of a nested array of two or more mutually adjacent n-gons.

5. The calibration method according to claim 4 wherein n is an integer from the group consisting of 3, 4 and 6.

6. The calibration method according to claim 1 wherein the nested array of the mathematical surface segment includes two or more mutually adjacent geometrically similar n-gons.

7. The calibration method according to claim 1 wherein the nested array of the mathematical surface segment includes two or more mutually adjacent geometrically identical ±20% n-gons.

8. The calibration method according to claim 1 wherein the nested array of the mathematical surface segment includes two or more mutually adjacent planar n-gons.

9. The calibration method according to claim 1 wherein the nested array of the mathematical surface segment includes two or more mutually adjacent curved or non-curved n-gons.

10. The calibration method according to claim 1 wherein the nested array of the mathematical surface segment includes at least one curved n-gon and at least one planar n-gon.

11. The calibration method according to claim 1 wherein the flowable fluid is a liquid fluid.

12. The calibration method according to claim 1 wherein the flowable fluid is a particulate fluid.

13. The calibration method according to claim 1 wherein the flowable fluid is a gaseous fluid.

14. The calibration method according to claim 13 wherein the gaseous fluid is air in a building.

15. The calibration method according to claim 14 wherein at least a portion of the air in the building is adapted for distribution in the building for control of one or more parameters of interest.

16. The calibration method according to claim 15 wherein the one or more parameters of interest include one or more of the group consisting of temperature, humidity and carbon dioxide content.

17. The calibration method according to claim 13 wherein the gaseous fluid is a medical gas from the group consisting of oxygen, carbon dioxide, nitrogen, nitrous oxide, argon, helium and anesthesia gas.

18. The calibration method according to claim 13 wherein the gaseous fluid is a processing gas for manufacturing semiconductor devices.

19. The calibration method according to claim 13 wherein the gaseous fluid is a processing gas for effecting clean air.

20. The calibration method according to claim 13 wherein the gaseous fluid is a processing gas for painting systems.

21. The calibration method according to claim 13 wherein the gaseous fluid is a gas adapted to support combustion in industrial applications.

22. A calibration system for remotely calibrating a product fluid flow device (PFFD) having product operational parameters and being adapted for disposition within a product site conduit, at a product site, characterized by a product inward-facing geometry and defining a product fluid flow path extending from an upstream portion of the product site conduit to a downstream portion of the product site conduit, and wherein the product fluid flow device (PFFD) comprises:
  i. a product aperture assembly characterized by the product inward-facing geometry including one or more adjustable product apertures traversing the fluid flow path, resulting in an adjustable aggregate aperture area $A_o$, and
  ii. a product actuator adapted to adjust the adjustable aggregate aperture area $A_o$ in response to an applied actuator signal, wherein the product fluid flow device (PFFD) is adapted to pass a flowable fluid along the product flow path and through the adjustable aggregate aperture area $A_o$ in response to a product pressure differential $\Delta P_P$ applied across the adjustable aggregate aperture area $A_o$, wherein $\Delta P_P$ and $A_o$ are within respective pressure ranges and area ranges of interest, $\Delta P$ and A, the calibration system comprising:

A. a calibration fluid flow device (CFFD) that generates a set of discrete point calibration flow rate (dpCFR) values in a locus of a Calibration Flow Rate (CFR) Function representative of the flow rate of the flowable fluid for a range of $A_o$, $\Delta P_c$ points in an associated $A_o$, $\Delta P$ space, B. a calibration processor (CP) responsive to the discrete point calibration flow rate (dpCFR) values to:
 a. generate tile data for a mathematical surface segment representative of a nested array of one or more tiles having three or more vertices wherein at least three of the three or more vertices of one or more tiles are disposed in the locus of the CFR Function, and
 b. transfer the tile data to a product processor (PP) situated at the product site.

23. The calibration system according to claim 22 wherein the calibration fluid flow device (CFFD) comprises:
 a. calibration operational parameters,
 b. a same geometry ±20% as the product fluid flow device (PFFD), including a calibration fluid flow path corresponding the product fluid flow path of the product fluid flow device (PFFD),
 c. being disposed within a calibration site conduit characterized by a same inward-facing geometry ±20% as the product site conduit, and
 wherein the calibration fluid flow device (CFFD) is adapted to effect a flow of a flowable fluid along a calibration fluid flow path of the calibration fluid flow device (CFFD).

24. The calibration system according to claim 22 wherein the product processor (PP) comprises an associated product configuration device (PCD), and wherein the product processor (PP) is adapted to receive the transferred tile data, and the product configuration device (PCD) is adapted to separately from, or in concert with, the product processor (PP), generates actuator signals effective for application to the product fluid flow device (PFFD) to effect control of the product operational parameters of the product fluid flow device (PFFD) to conform to the calibration operational parameters of the calibration fluid flow device (CFFD), thereby calibrating the product fluid flow device (PFFD) to the calibration fluid flow device (CFFD).

25. The calibration system according to claim 22 wherein fluid flow exiting from one or more of the product apertures of the adjustable product aperture assembly establish one or more vena contractae extending downstream from respective product apertures.

26. The calibration system according to claim 22 wherein fluid flow exiting from one or more of the calibration apertures of the adjustable calibration aperture assembly establish one or more vena contractae extending downstream from respective calibration apertures.

27. The calibration system according to claim 22 wherein the mathematical surface segment has the form of a nested array of two or more mutually adjacent n-gons.

28. The calibration system according to claim 27 wherein n is an integer from the group consisting of 3, 4 and 6.

29. The calibration system according to claim 22 wherein the nested array of the mathematical surface segment includes two or more mutually adjacent geometrically similar n-gons.

30. The calibration system according to claim 22 wherein the nested array of the mathematical surface segment includes two or more mutually adjacent geometrically identical ±20% n-gons.

31. The calibration system according to claim 22 wherein the nested array of the mathematical surface segment includes two or more mutually adjacent planar n-gons.

32. The calibration system according to claim 22 wherein the nested array of the mathematical surface segment includes two or more mutually adjacent curved n-gons.

33. The calibration system according to claim 22 wherein the nested array of the mathematical surface segment includes at least one curved n-gon and at least one planar n-gon.

34. The calibration system according to claim 22 wherein the flowable fluid is a liquid fluid.

35. The calibration system according to claim 22 wherein the flowable fluid is a particulate fluid.

36. The calibration system according to claim 22 wherein the flowable fluid is a gaseous fluid.

37. The calibration system according to claim 36 wherein the gaseous fluid is air in a building.

38. The calibration system according to claim 37 wherein at least a portion of the air in the building is adapted for distribution in the building for control of one or more parameters of interest.

39. The calibration system according to claim 38 wherein parameters of interest include one or more of the group consisting of temperature, humidity and carbon dioxide content.

40. The calibration system according to claim 36 wherein the gaseous fluid is a medical gas from the group consisting of oxygen, carbon dioxide, nitrogen, nitrous oxide, argon, helium and anesthesia gas.

41. The calibration system according to claim 36 wherein the gaseous fluid is a processing gas for manufacturing semiconductor devices.

42. The calibration system according to claim 36 wherein the gaseous fluid is a processing gas for effecting clean air.

43. The calibration system according to claim 36 wherein the gaseous fluid is a processing gas for painting systems.

44. The calibration system according to claim 36 wherein the gaseous fluid is a gas adapted to support combustion in industrial applications.

* * * * *